Oct. 28, 1930.  F. J. SPRAGUE  1,780,148
METHOD OF AND APPARATUS FOR CONTROL OF TRAIN MOVEMENTS
Filed Dec. 31, 1914  47 Sheets-Sheet 2
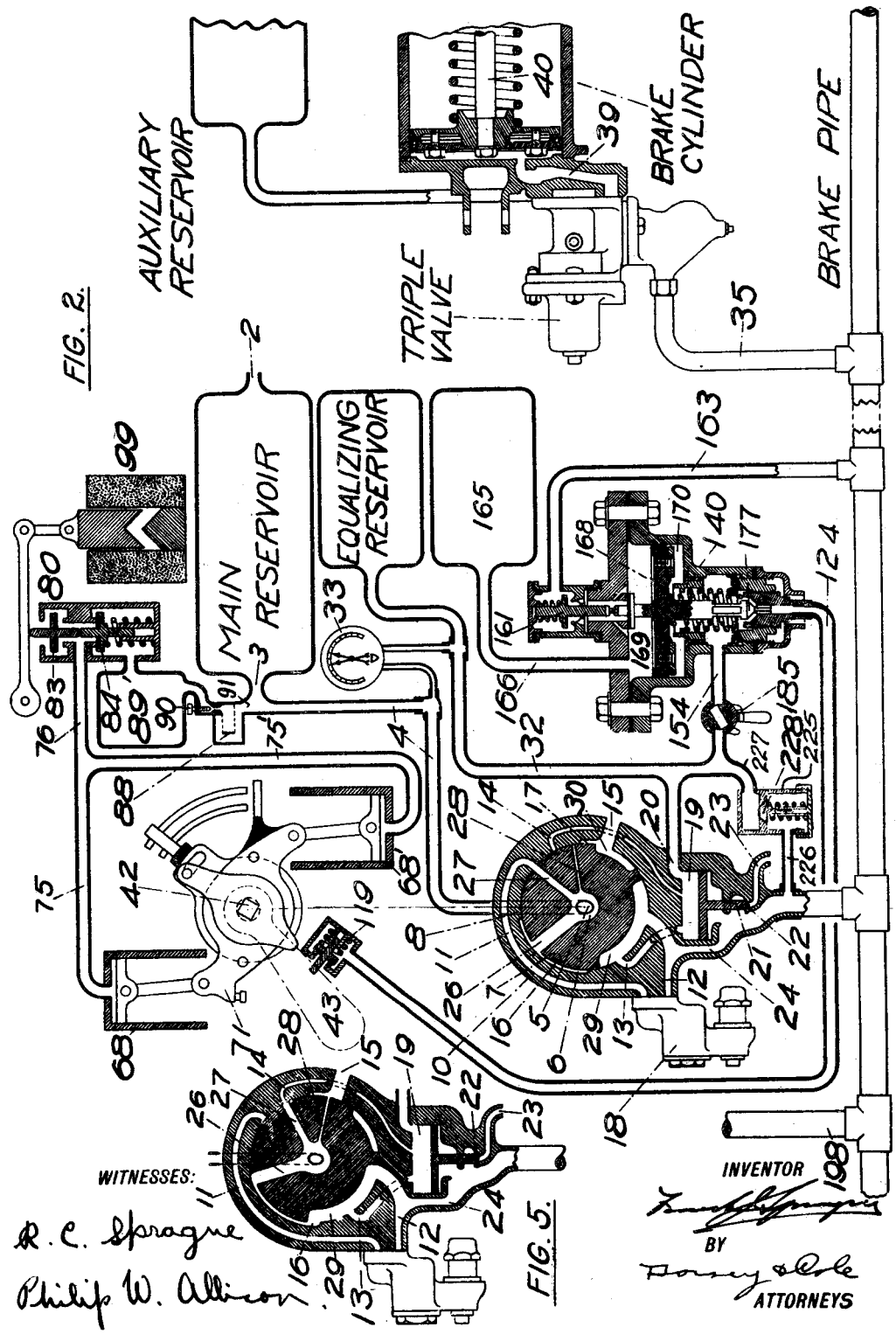

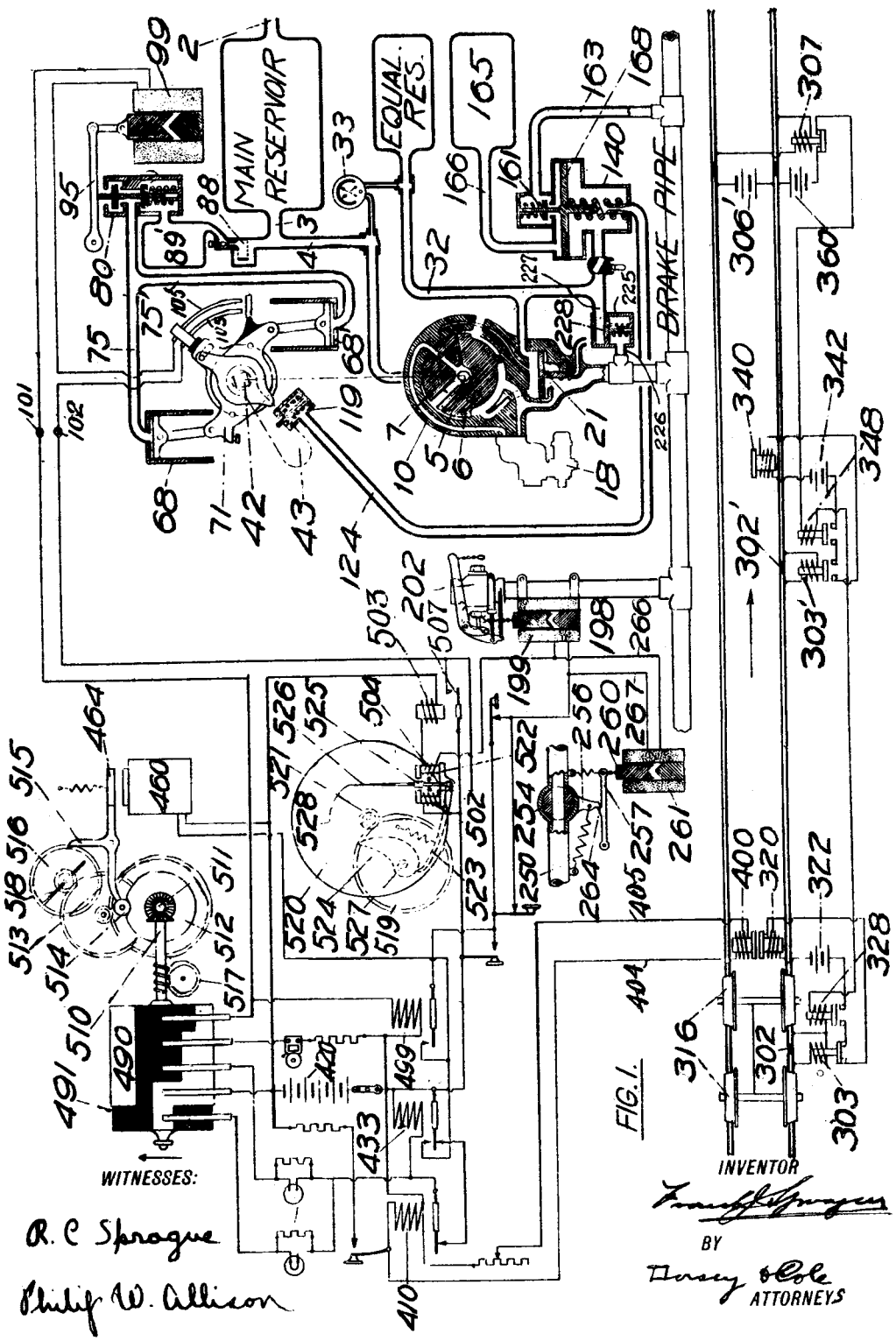

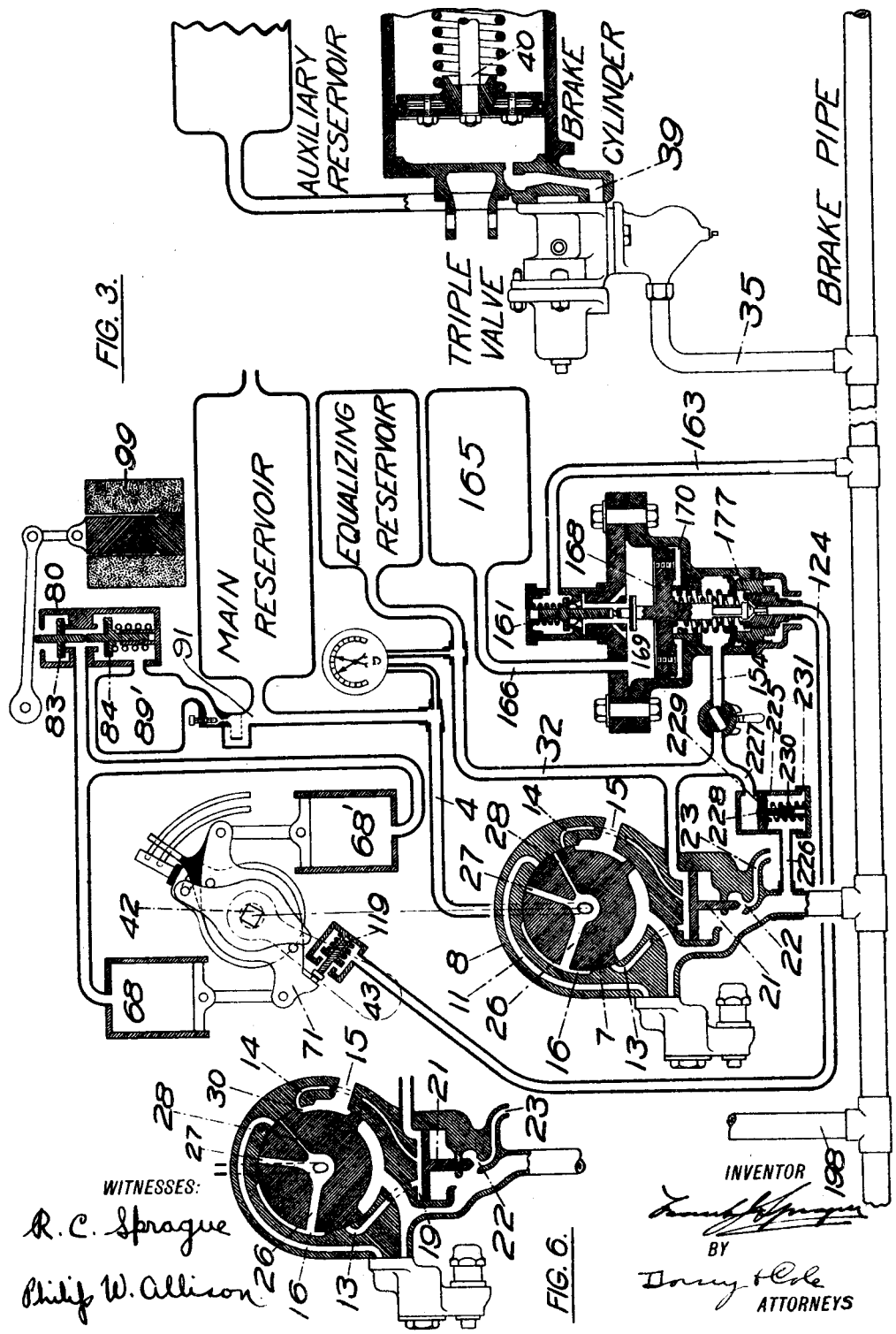

Oct. 28, 1930.    F. J. SPRAGUE    1,780,148
METHOD OF AND APPARATUS FOR CONTROL OF TRAIN MOVEMENTS
Filed Dec. 31, 1914    47 Sheets-Sheet 4
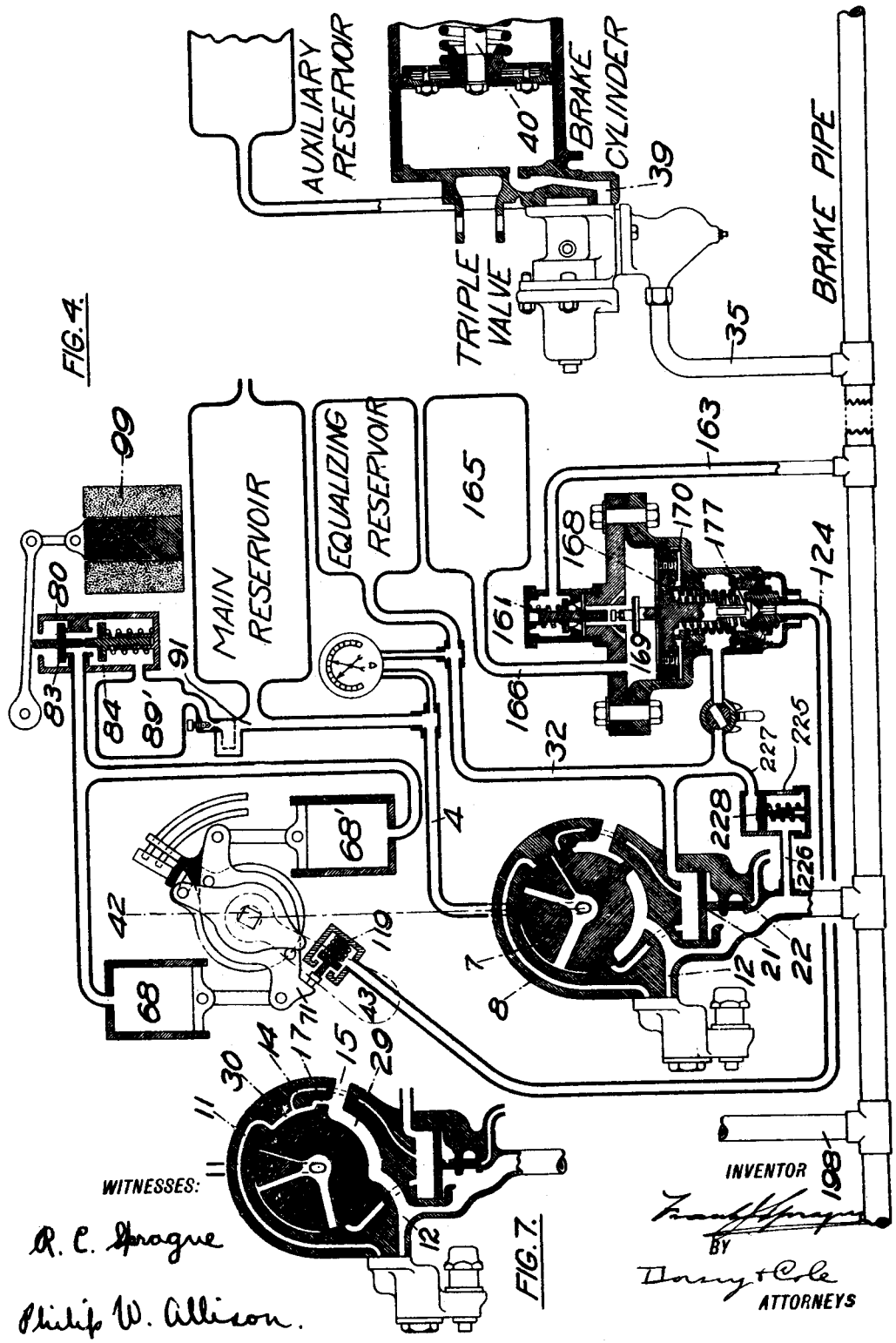
WITNESSES:
R. C. Sprague
Philip W. Allison.
INVENTOR
Frank J. Sprague
BY
Dorsey & Cole
ATTORNEYS

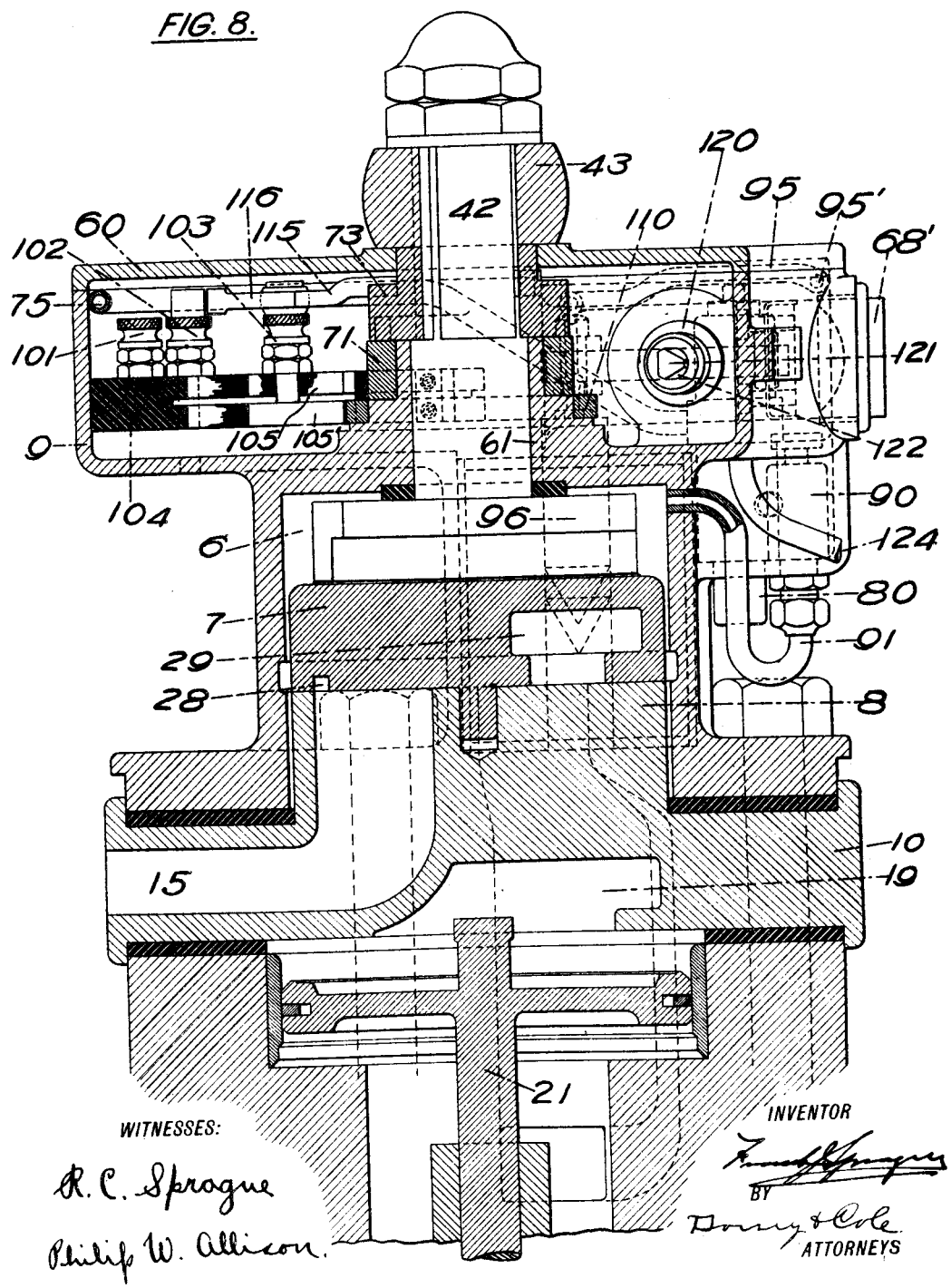

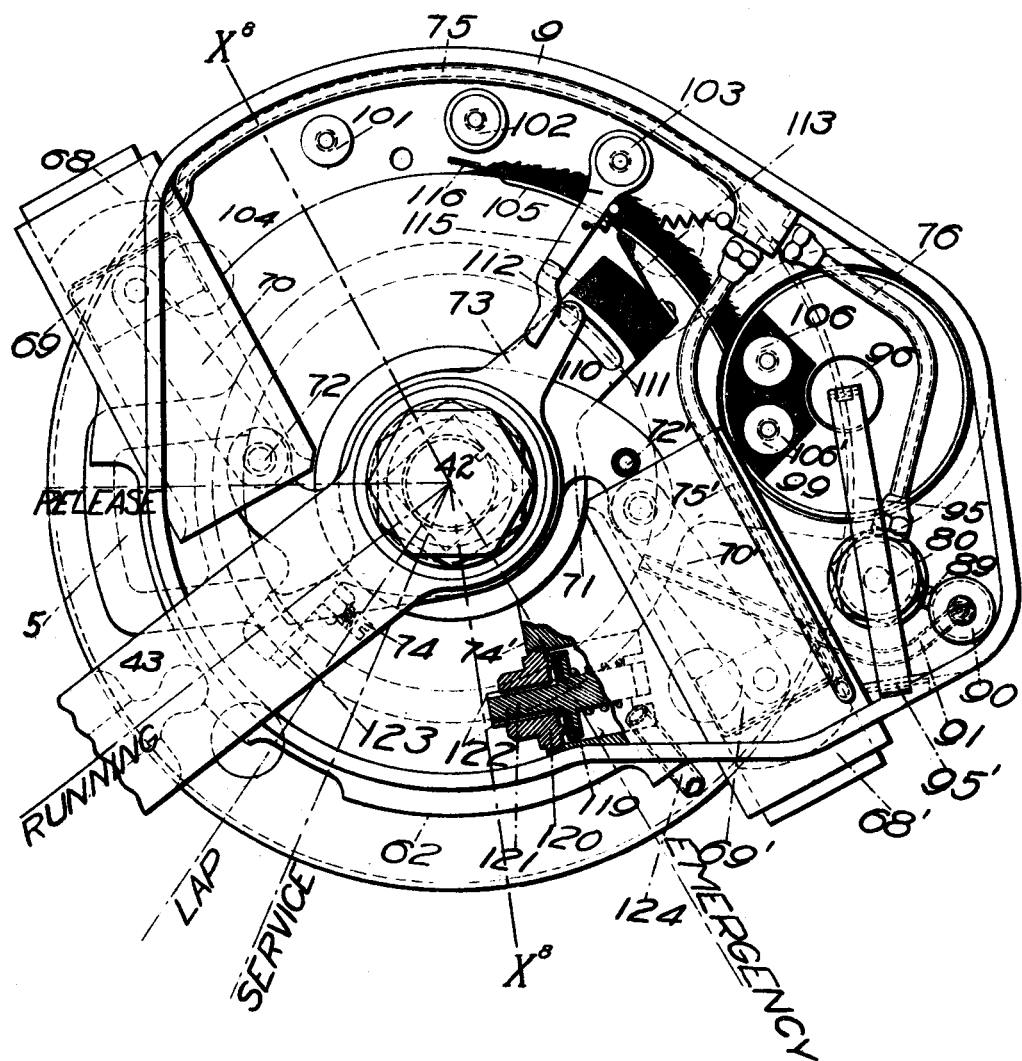

Oct. 28, 1930.  F. J. SPRAGUE  1,780,148
METHOD OF AND APPARATUS FOR CONTROL OF TRAIN MOVEMENTS
Filed Dec. 31, 1914  47 Sheets-Sheet 7

Oct. 28, 1930.  F. J. SPRAGUE  1,780,148
METHOD OF AND APPARATUS FOR CONTROL OF TRAIN MOVEMENTS
Filed Dec. 31, 1914  47 Sheets-Sheet 8

WITNESSES:
R. C. Sprague
Philip W. Allison

INVENTOR
BY
ATTORNEYS

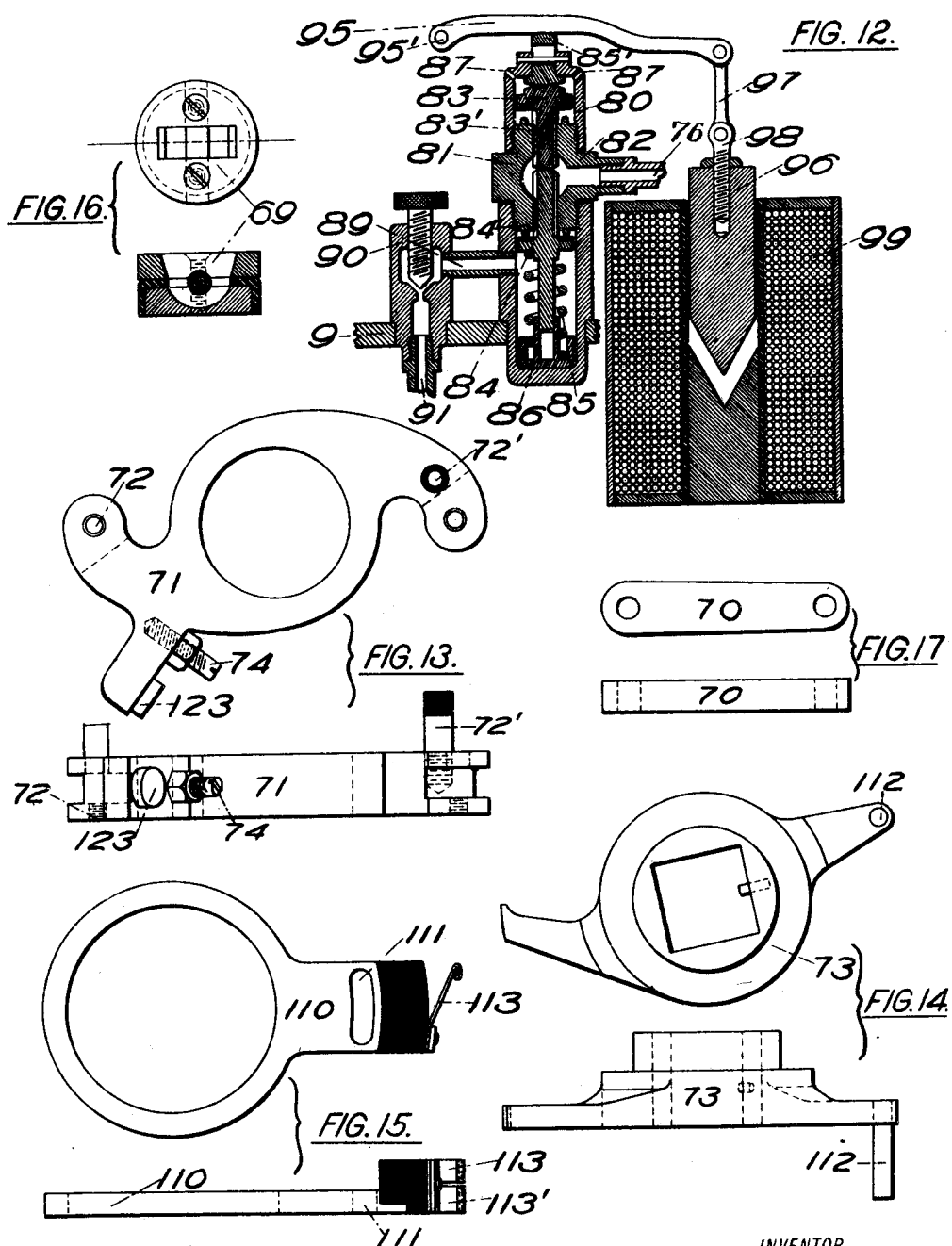

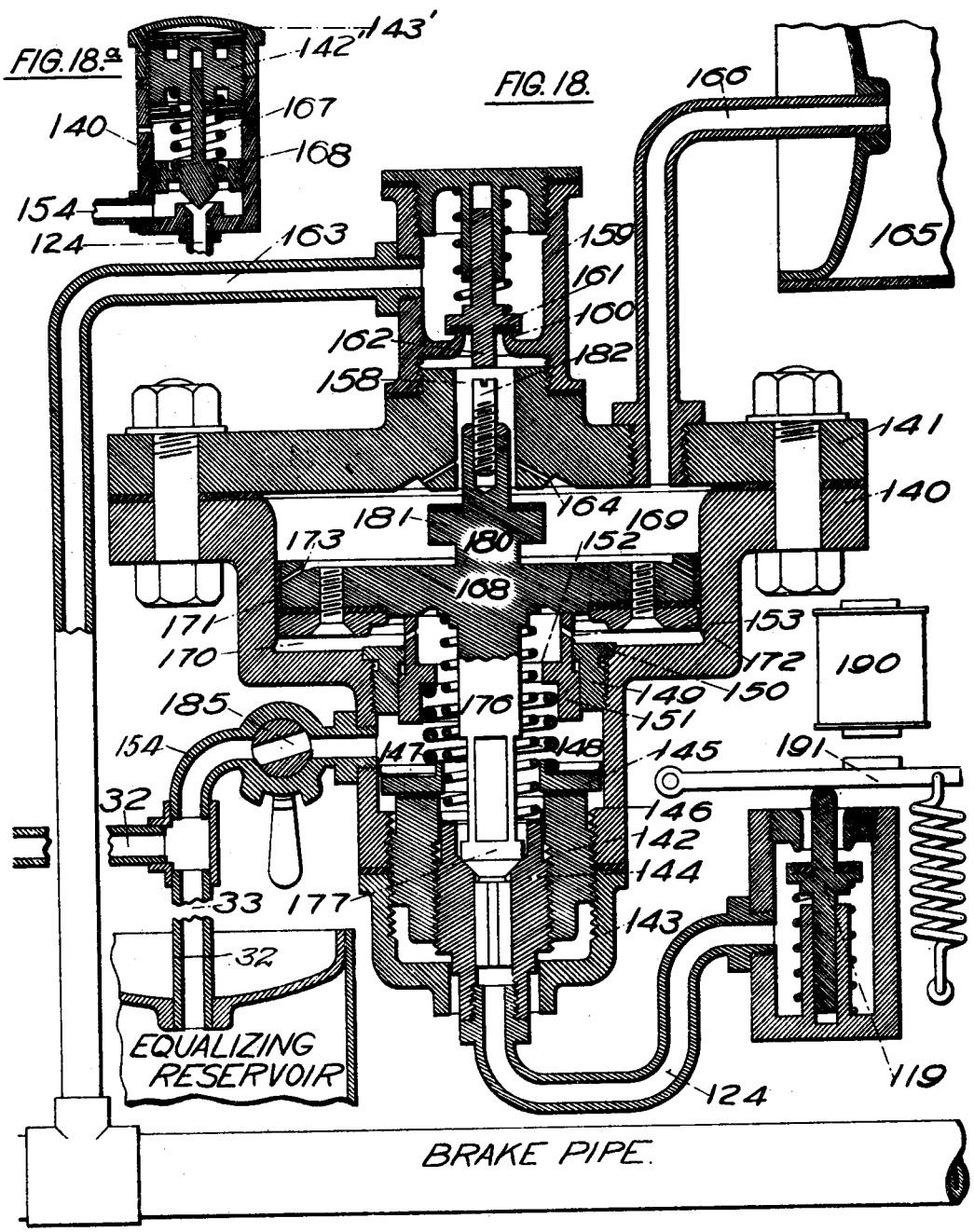

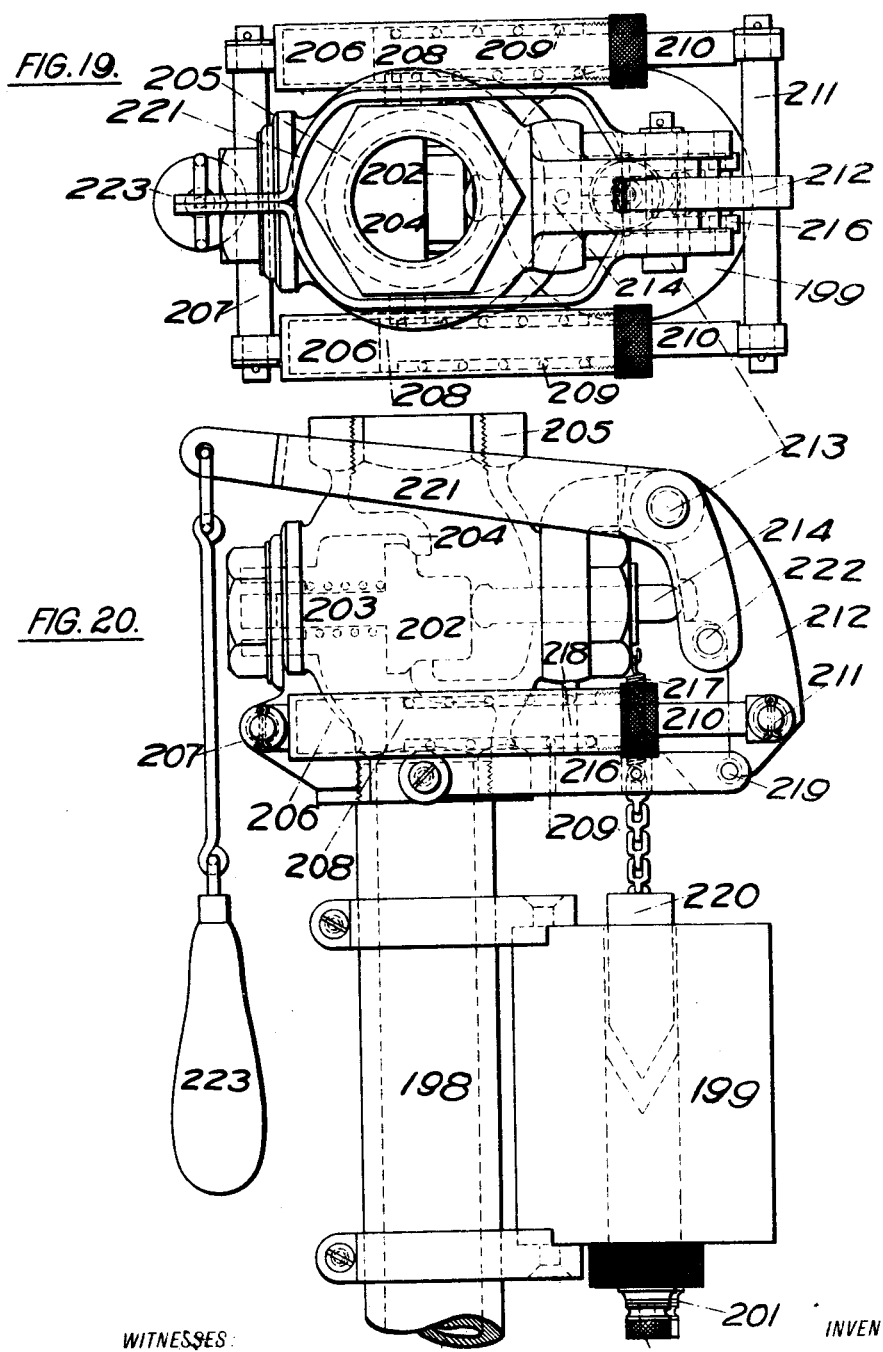

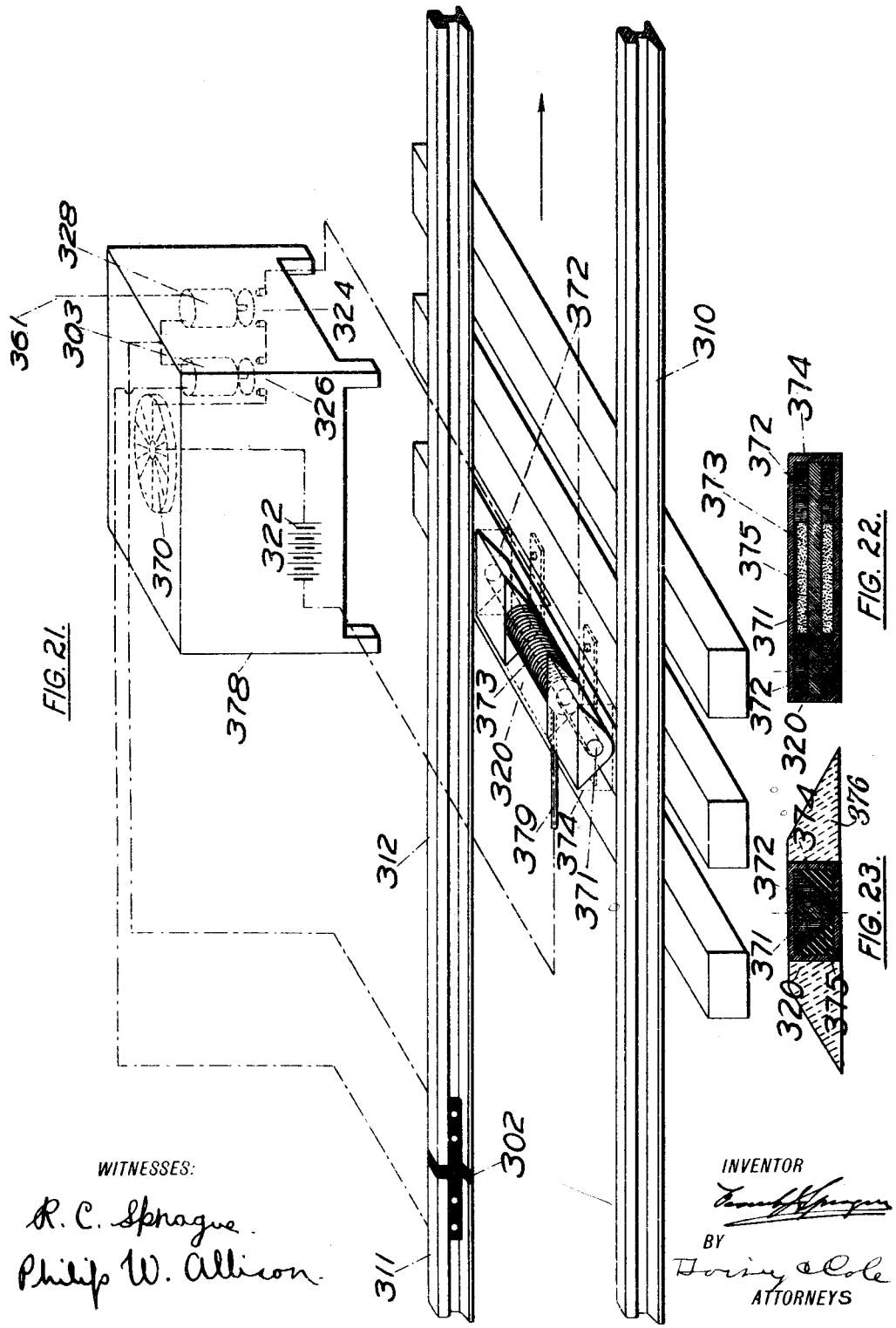

Oct. 28, 1930. F. J. SPRAGUE 1,780,148
METHOD OF AND APPARATUS FOR CONTROL OF TRAIN MOVEMENTS
Filed Dec. 31, 1914 47 Sheets-Sheet 13

Oct. 28, 1930.　　　F. J. SPRAGUE　　　1,780,148
METHOD OF AND APPARATUS FOR CONTROL OF TRAIN MOVEMENTS
Filed Dec. 31, 1914　　　47 Sheets-Sheet 14

Oct. 28, 1930.　　　　F. J. SPRAGUE　　　　1,780,148
METHOD OF AND APPARATUS FOR CONTROL OF TRAIN MOVEMENTS
Filed Dec. 31, 1914　　47 Sheets-Sheet 17
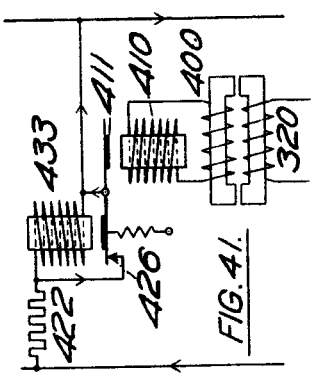
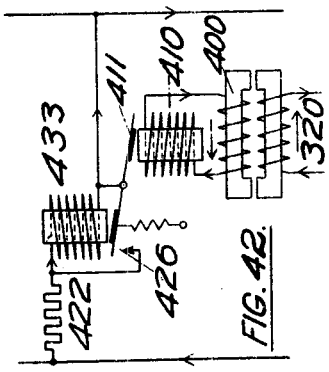
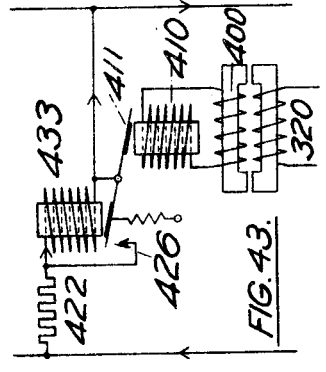
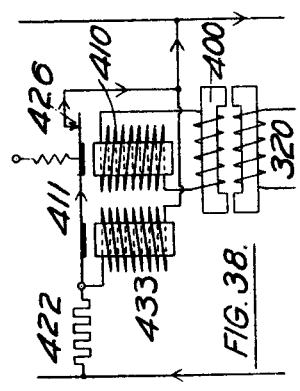
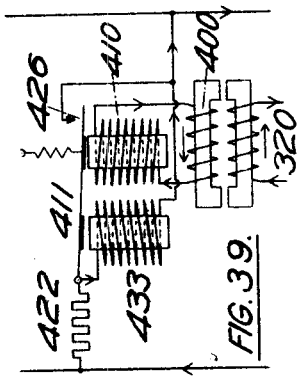
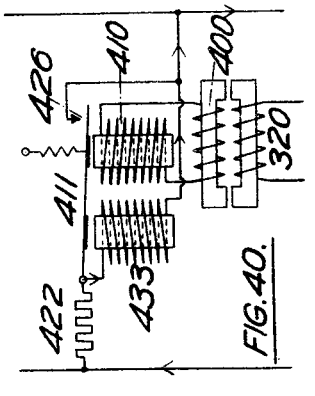
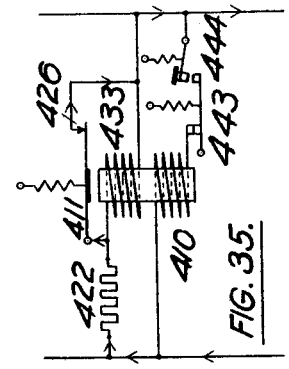
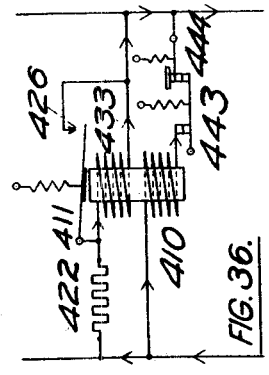
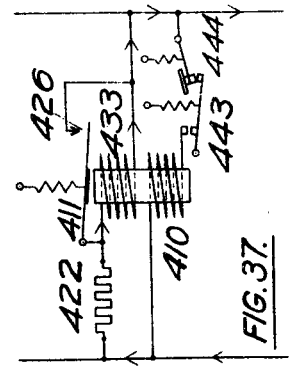
WITNESSES
R. C. Sprague
Philip W. Allison
INVENTOR
BY
ATTORNEYS

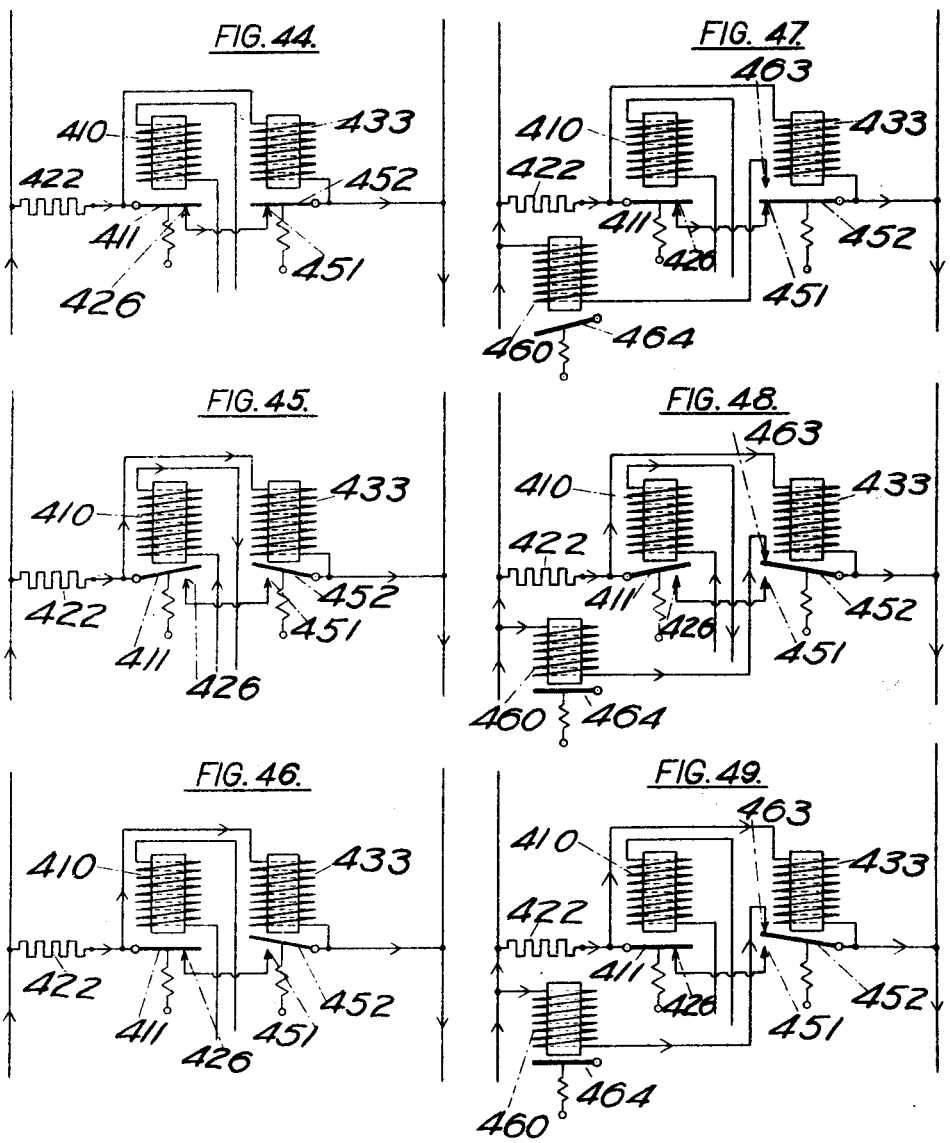

Oct. 28, 1930.                F. J. SPRAGUE                1,780,148
            METHOD OF AND APPARATUS FOR CONTROL OF TRAIN MOVEMENTS
                     Filed Dec. 31, 1914        47 Sheets-Sheet 19
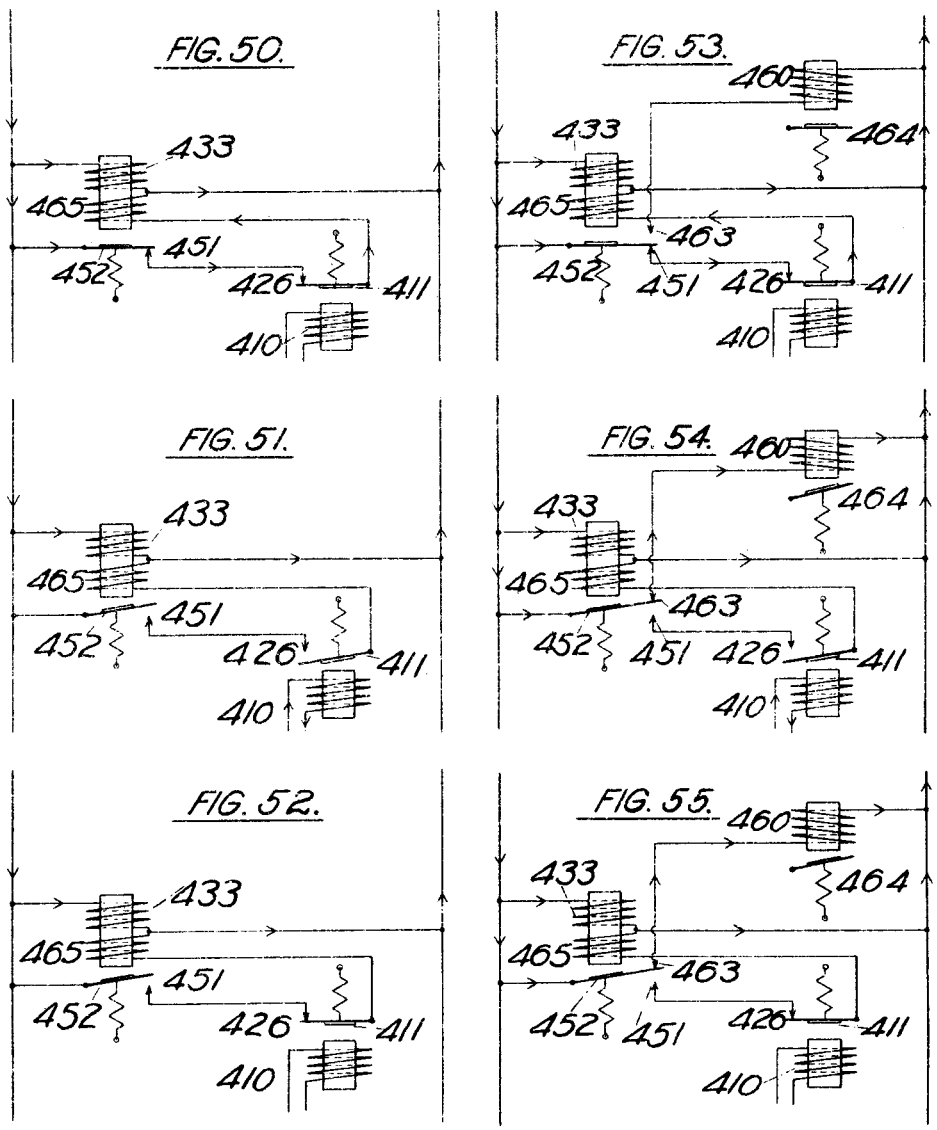

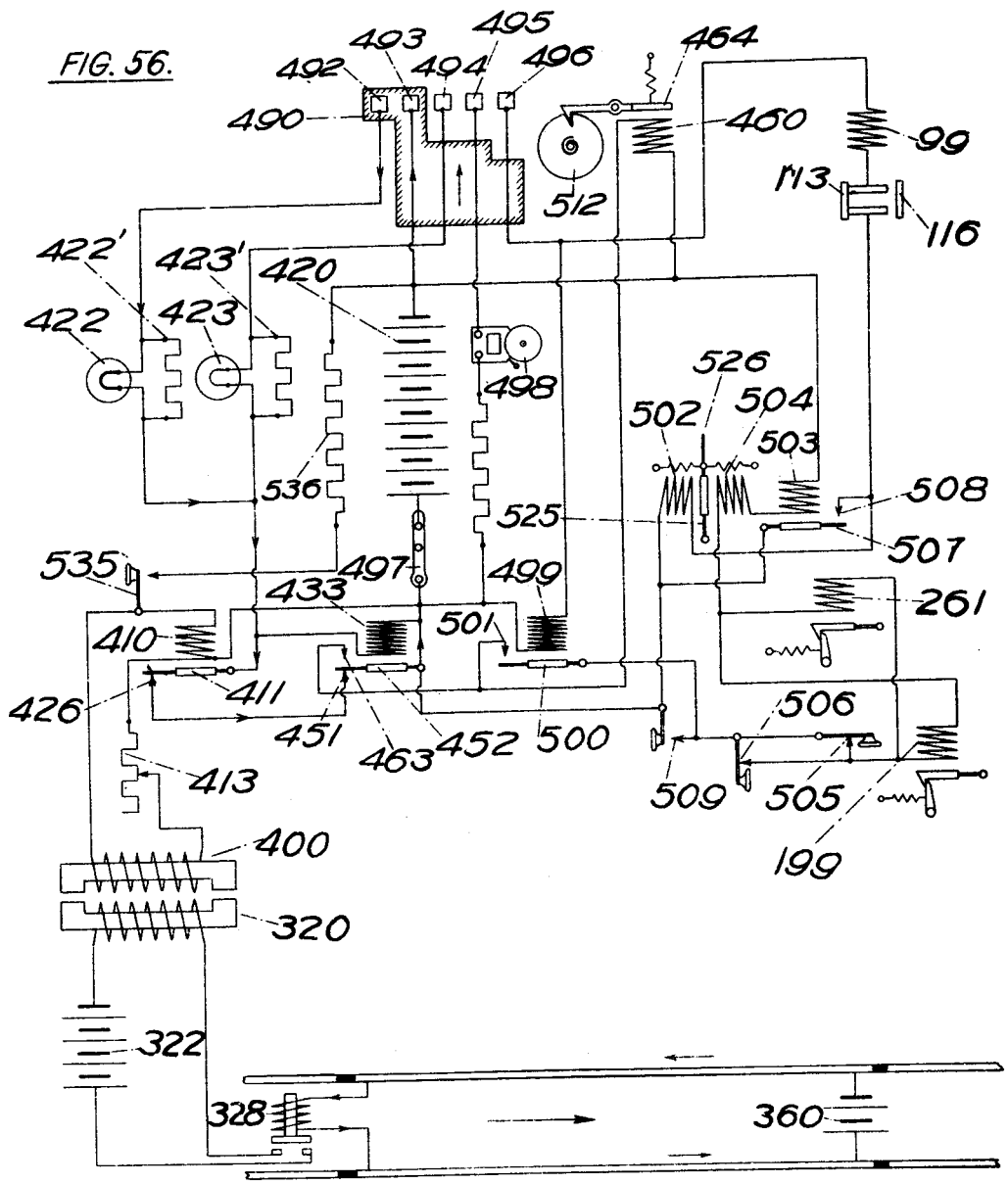

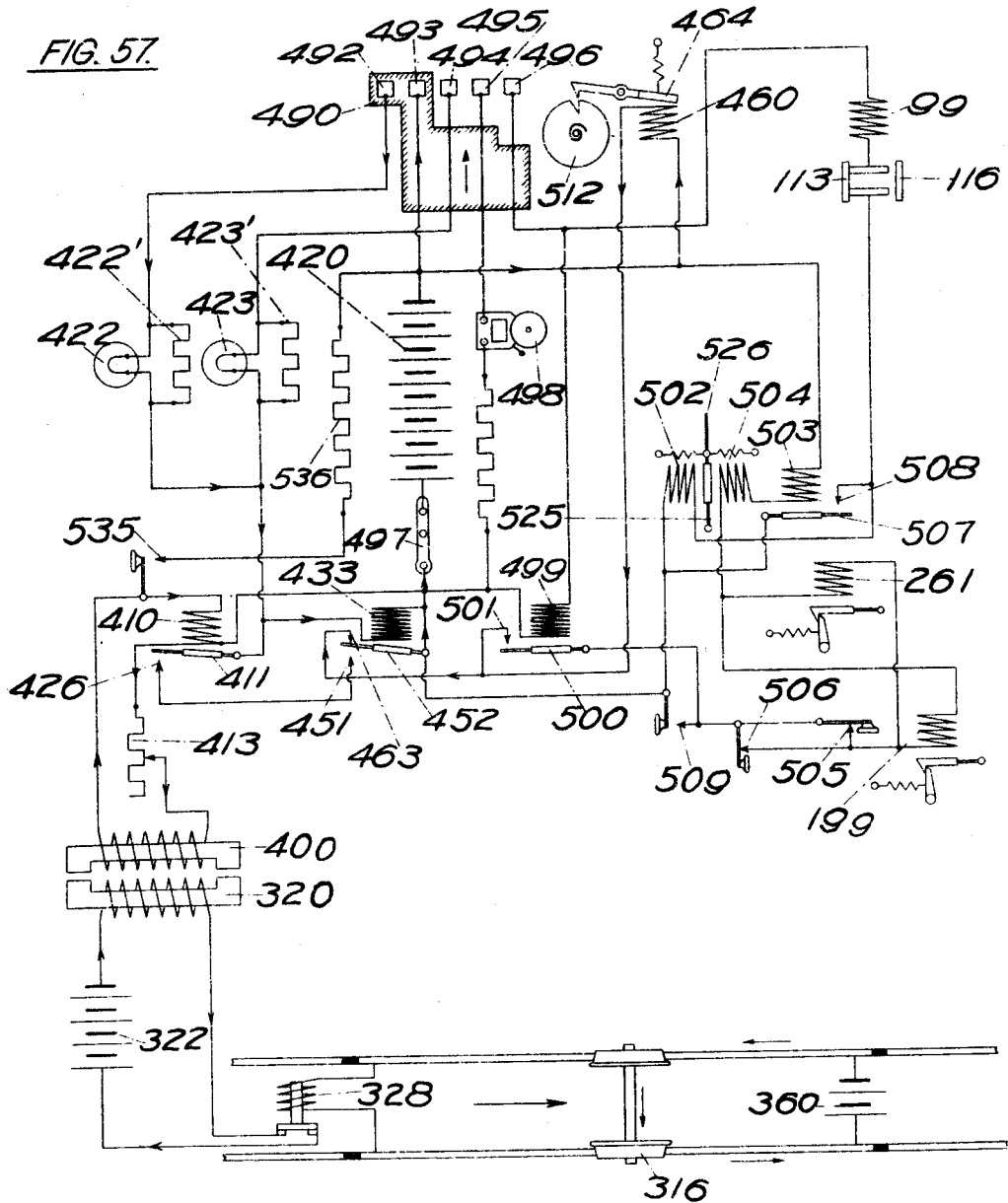

Oct. 28, 1930.   F. J. SPRAGUE   1,780,148
METHOD OF AND APPARATUS FOR CONTROL OF TRAIN MOVEMENTS
Filed Dec. 31, 1914   47 Sheets-Sheet 22
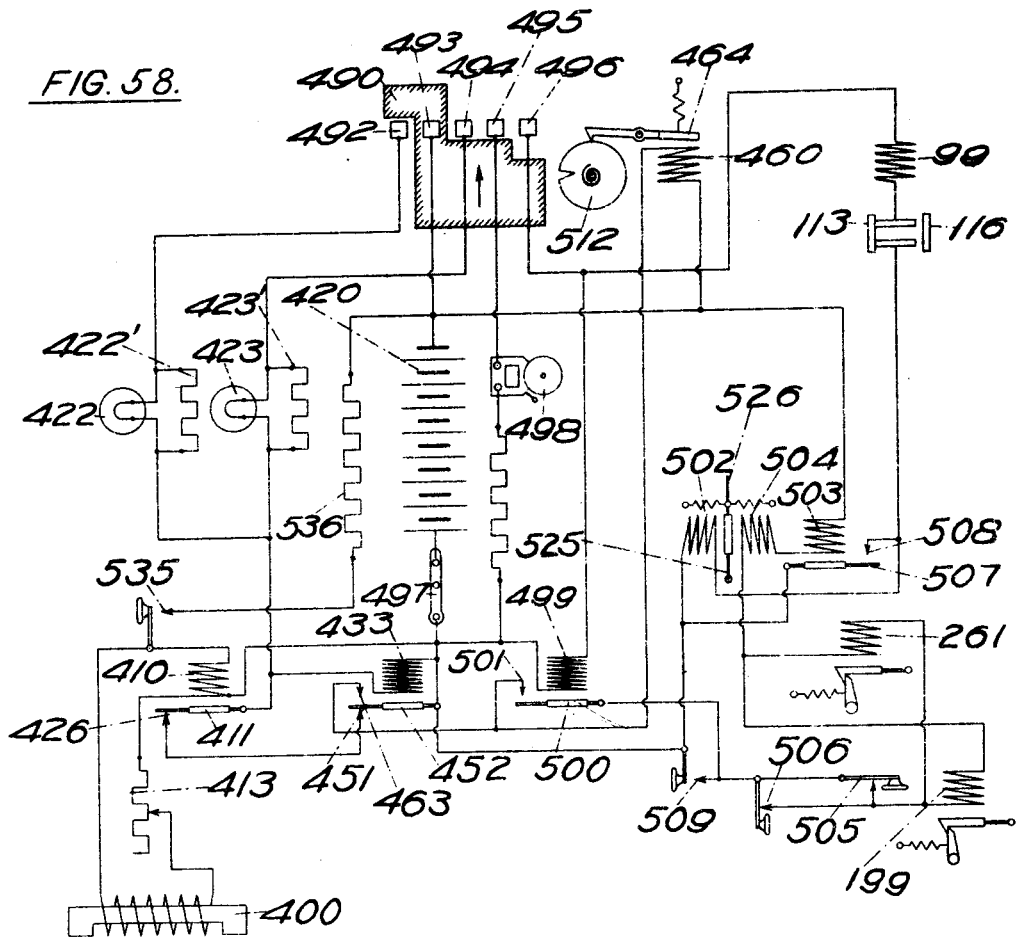
FIG. 58.
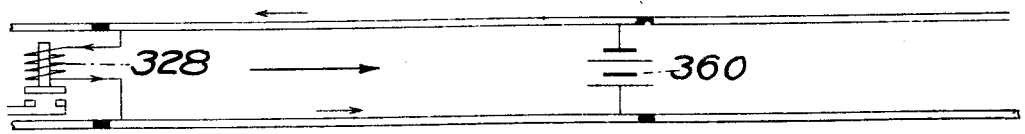
WITNESSES:
R. C. Sprague
Philip W. Allison.
INVENTOR
Frank J. Sprague
BY
Dorsey & Cole
ATTORNEYS Oct. 28, 1930.　　　　F. J. SPRAGUE　　　1,780,148
METHOD OF AND APPARATUS FOR CONTROL OF TRAIN MOVEMENTS
Filed Dec. 31, 1914　　　47 Sheets-Sheet 23
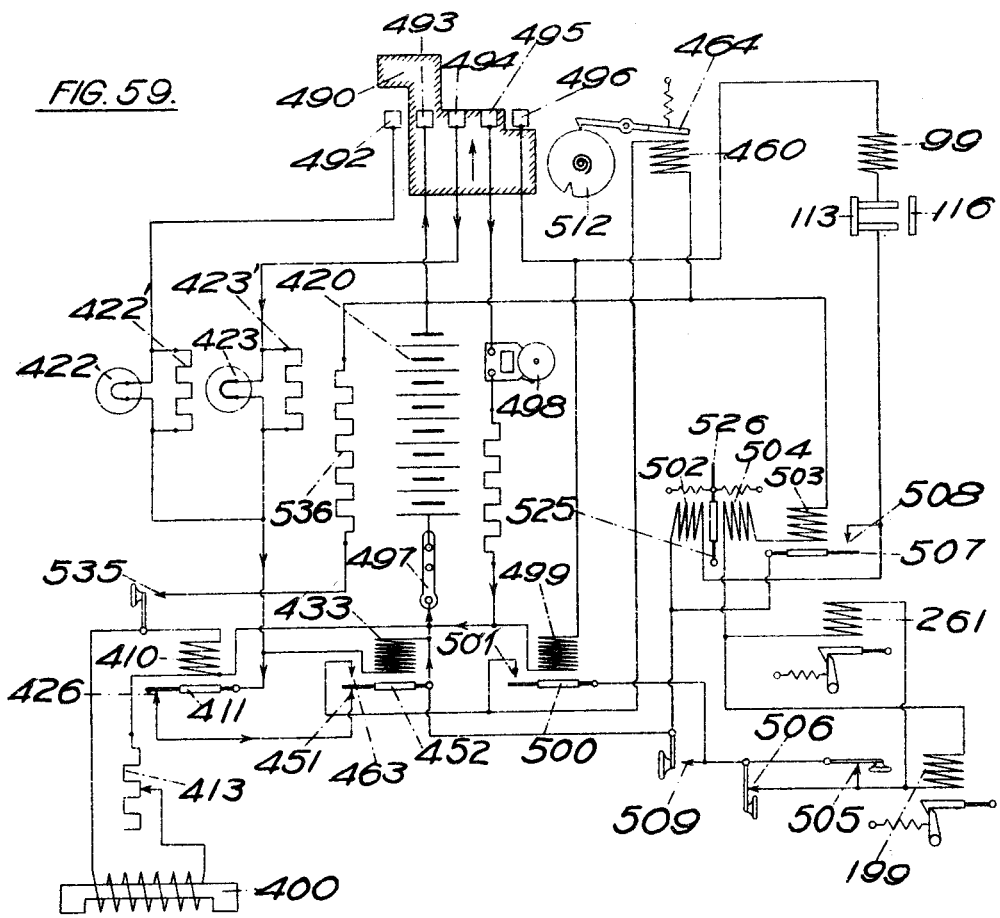
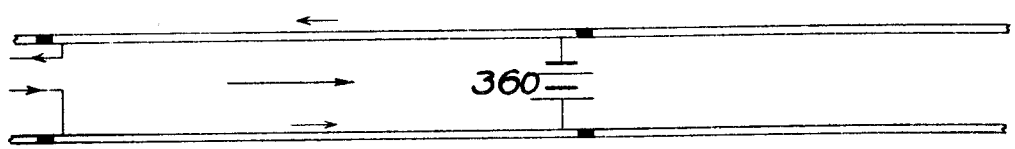
WITNESSES:
INVENTOR
ATTORNEYS Oct. 28, 1930. F. J. SPRAGUE 1,780,148
METHOD OF AND APPARATUS FOR CONTROL OF TRAIN MOVEMENTS
Filed Dec. 31, 1914 47 Sheets-Sheet 27
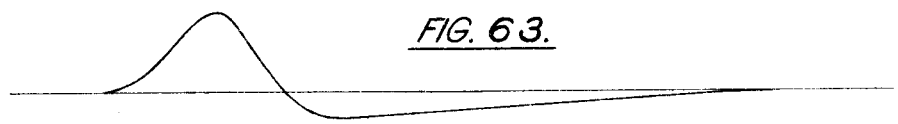
FIG. 63.
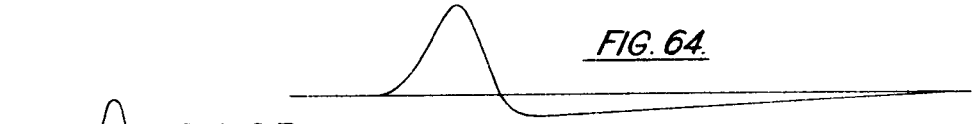
FIG. 64.
FIG. 65.
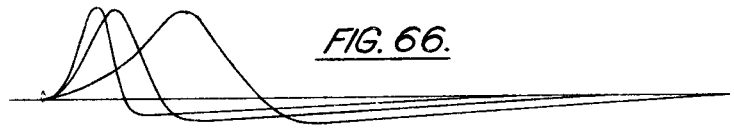
FIG. 66.
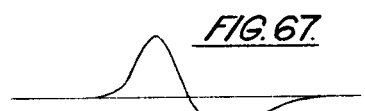 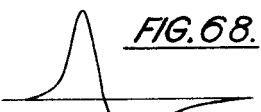 
FIG. 67.     FIG. 68.     FIG. 69.
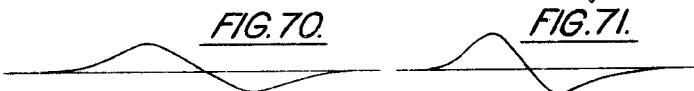 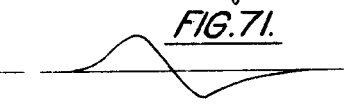 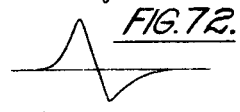
FIG. 70.     FIG. 71.     FIG. 72.
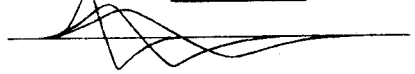
FIG. 73.
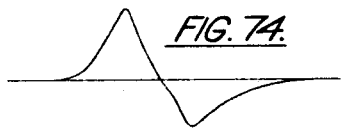  
FIG. 74.     FIG. 75.     FIG. 76.
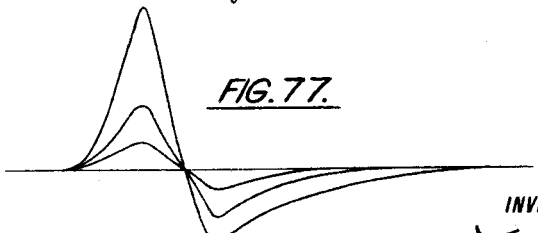
FIG. 77.
WITNESSES:
R. C. Sprague
Philip W. Allison.
INVENTOR
Frank J. Sprague
BY
Davis & Cole
ATTORNEYS Oct. 28, 1930.  F. J. SPRAGUE  1,780,148
METHOD OF AND APPARATUS FOR CONTROL OF TRAIN MOVEMENTS
Filed Dec. 31, 1914  47 Sheets-Sheet 28
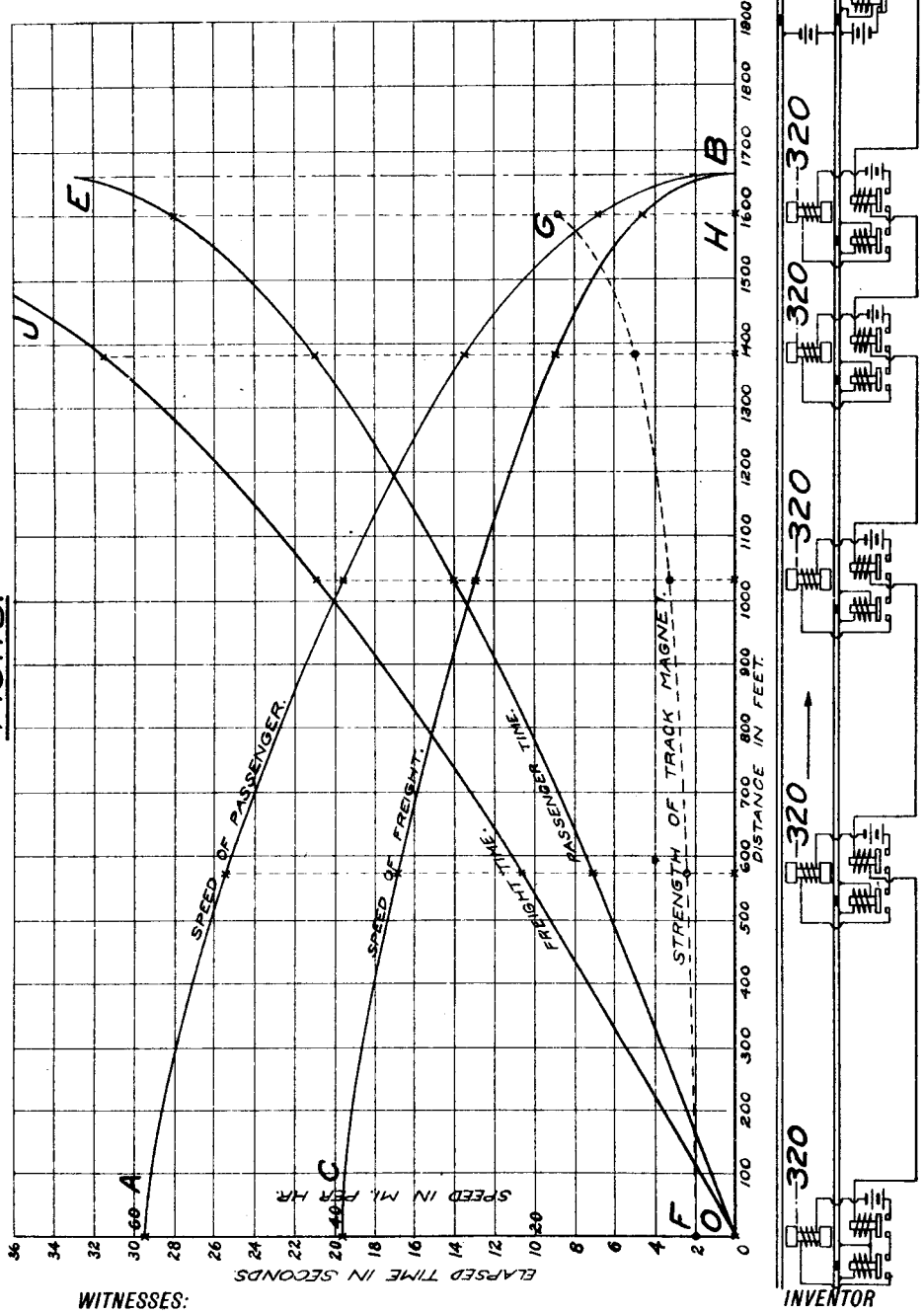

Oct. 28, 1930.     F. J. SPRAGUE     1,780,148
METHOD OF AND APPARATUS FOR CONTROL OF TRAIN MOVEMENTS
Filed Dec. 31, 1914     47 Sheets-Sheet 29
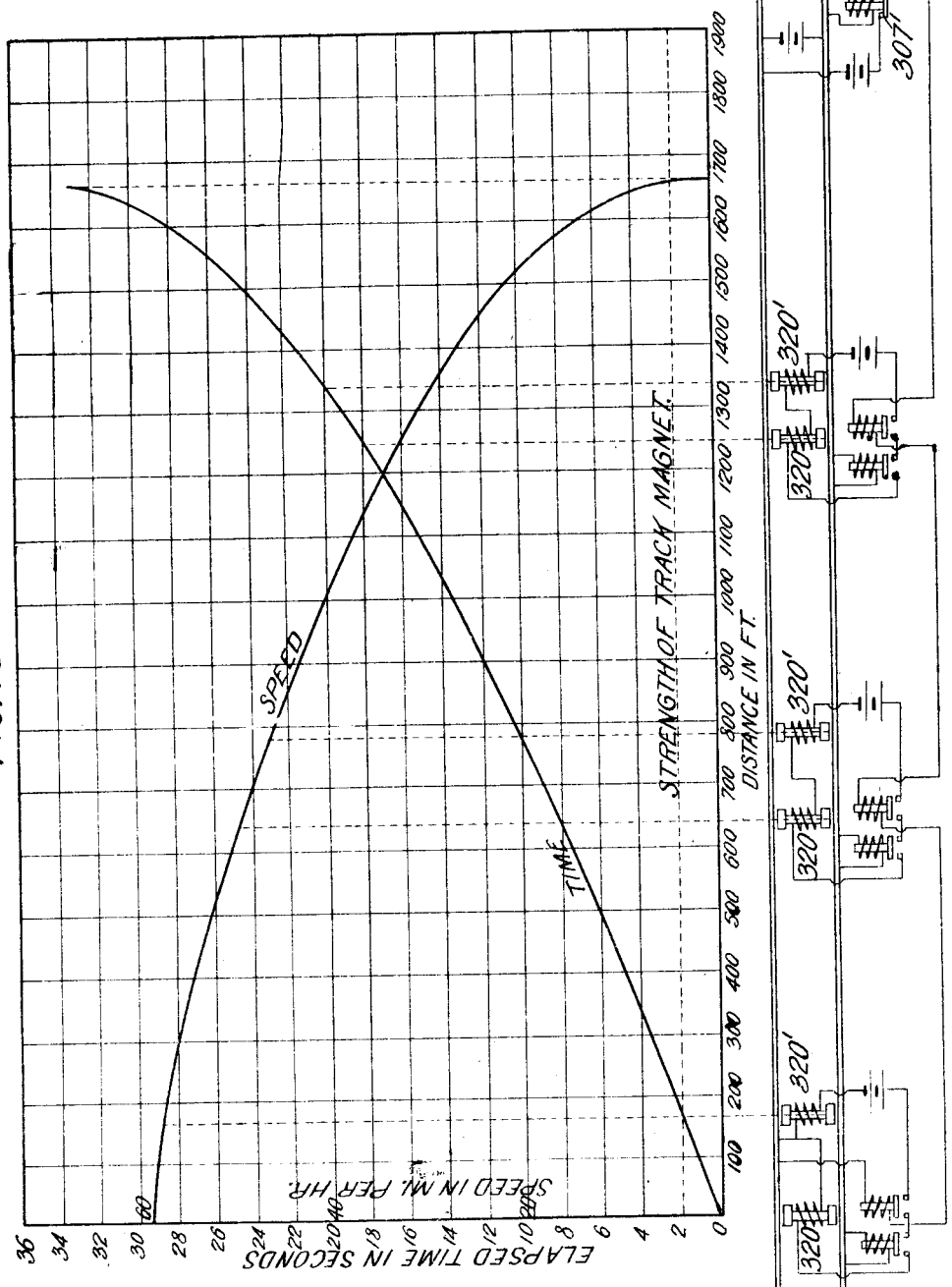

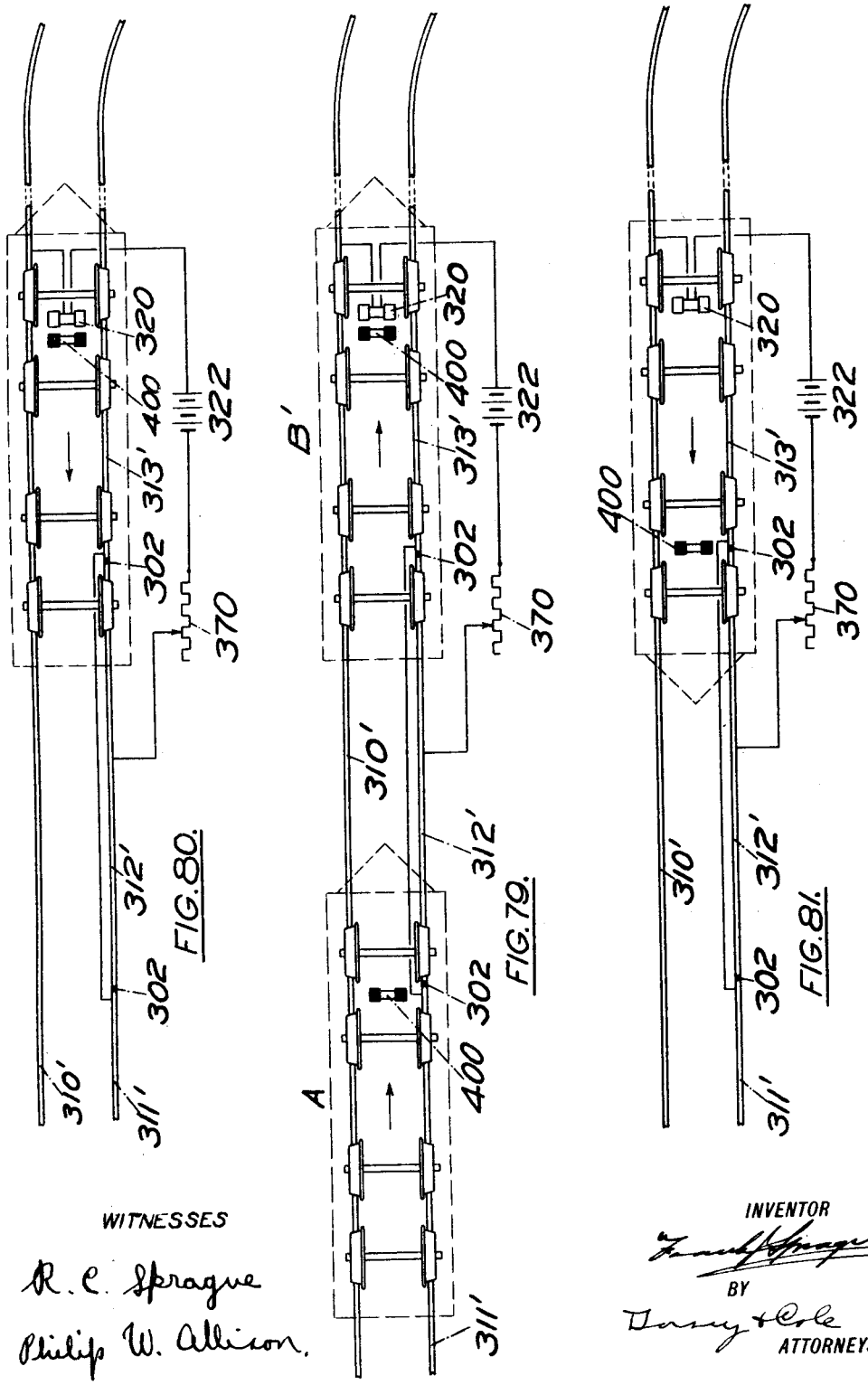

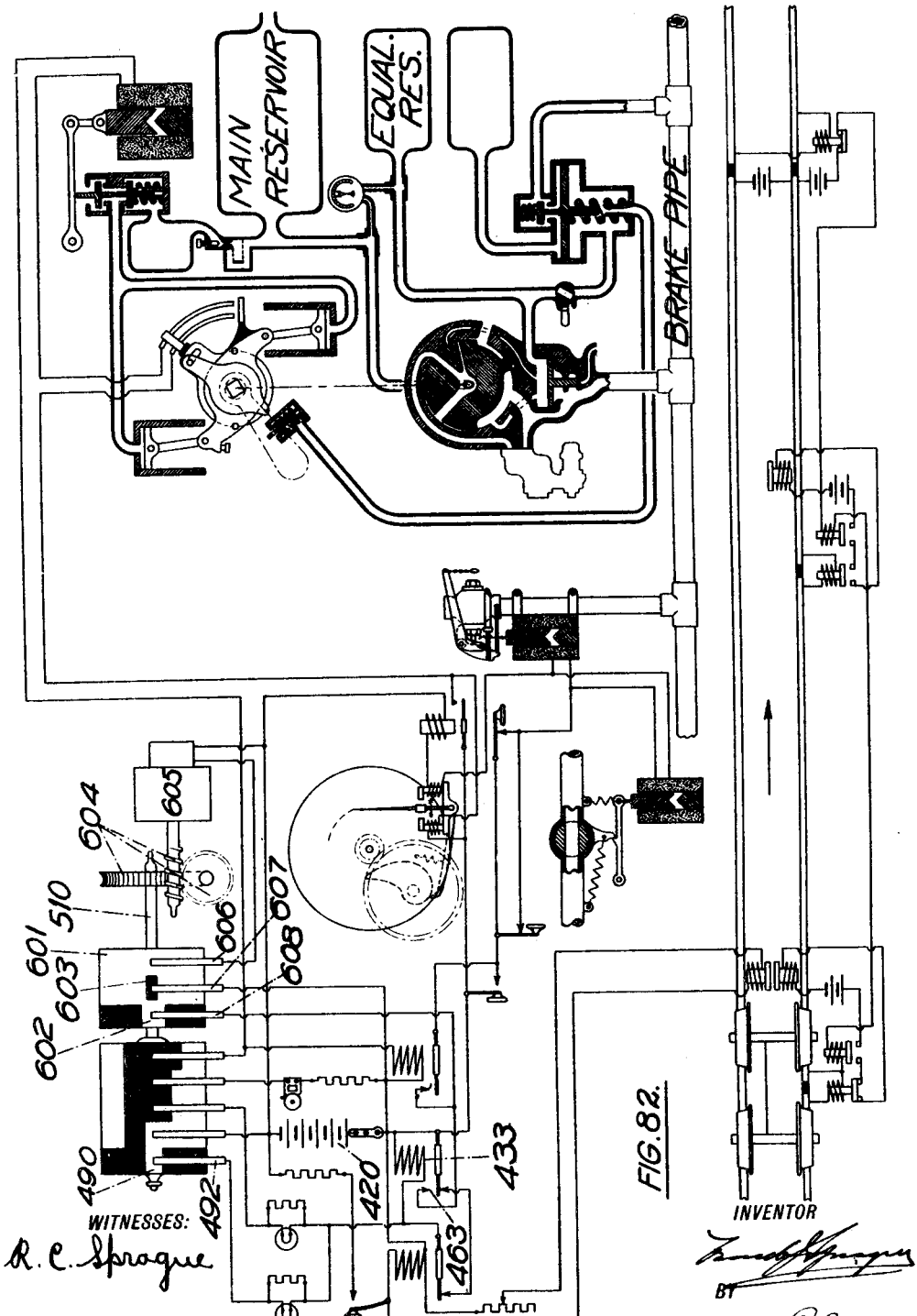

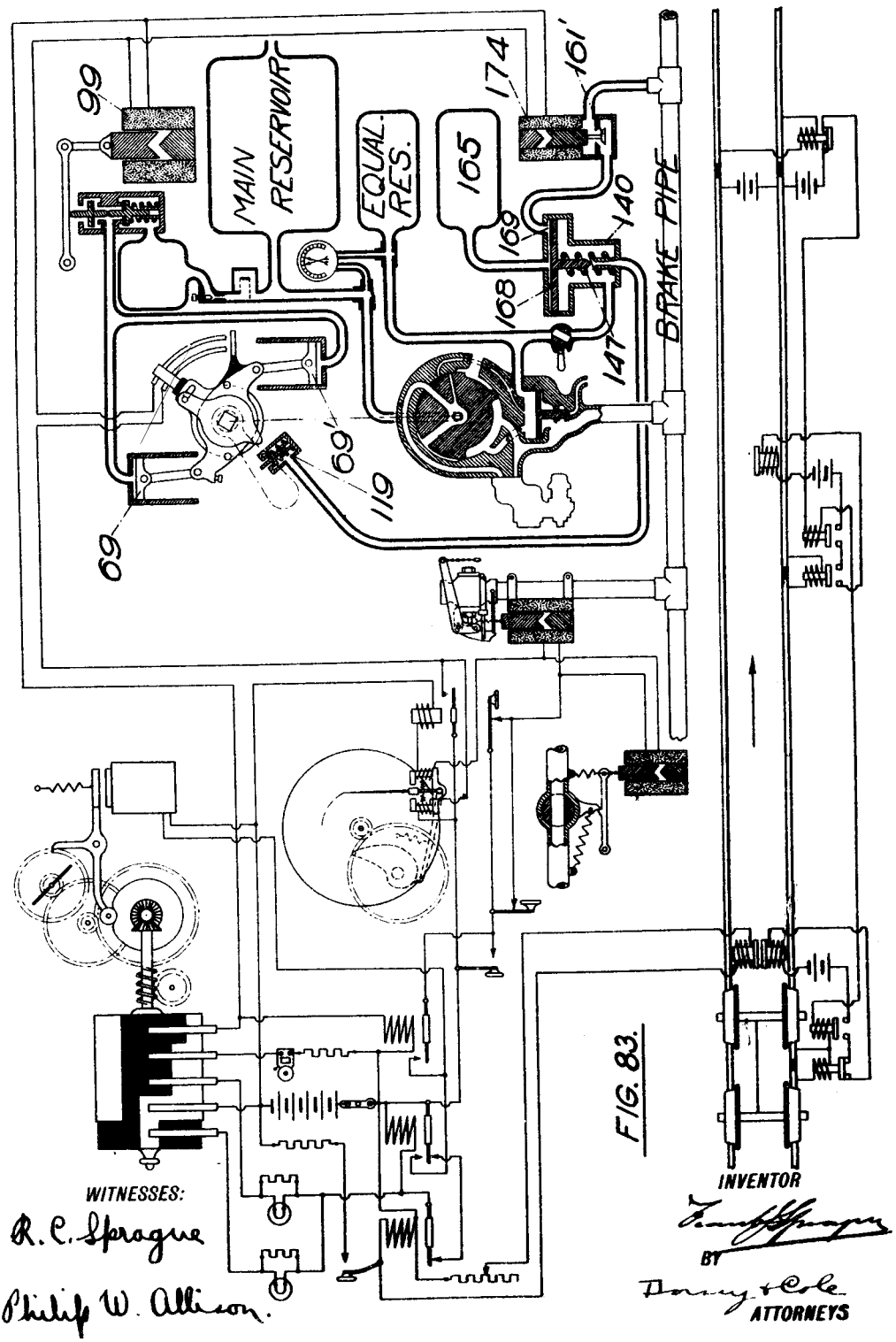

Oct. 28, 1930.  F. J. SPRAGUE  1,780,148
METHOD OF AND APPARATUS FOR CONTROL OF TRAIN MOVEMENTS
Filed Dec. 31, 1914  47 Sheets-Sheet 33

Oct. 28, 1930.    F. J. SPRAGUE    1,780,148
METHOD OF AND APPARATUS FOR CONTROL OF TRAIN MOVEMENTS
Filed Dec. 31, 1914    47 Sheets-Sheet 36

Oct. 28, 1930.   F. J. SPRAGUE   1,780,148
METHOD OF AND APPARATUS FOR CONTROL OF TRAIN MOVEMENTS
Filed Dec. 31, 1914   47 Sheets-Sheet 38

Oct. 28, 1930.  F. J. SPRAGUE  1,780,148
METHOD OF AND APPARATUS FOR CONTROL OF TRAIN MOVEMENTS
Filed Dec. 31, 1914  47 Sheets-Sheet 39

WITNESSES:  INVENTOR

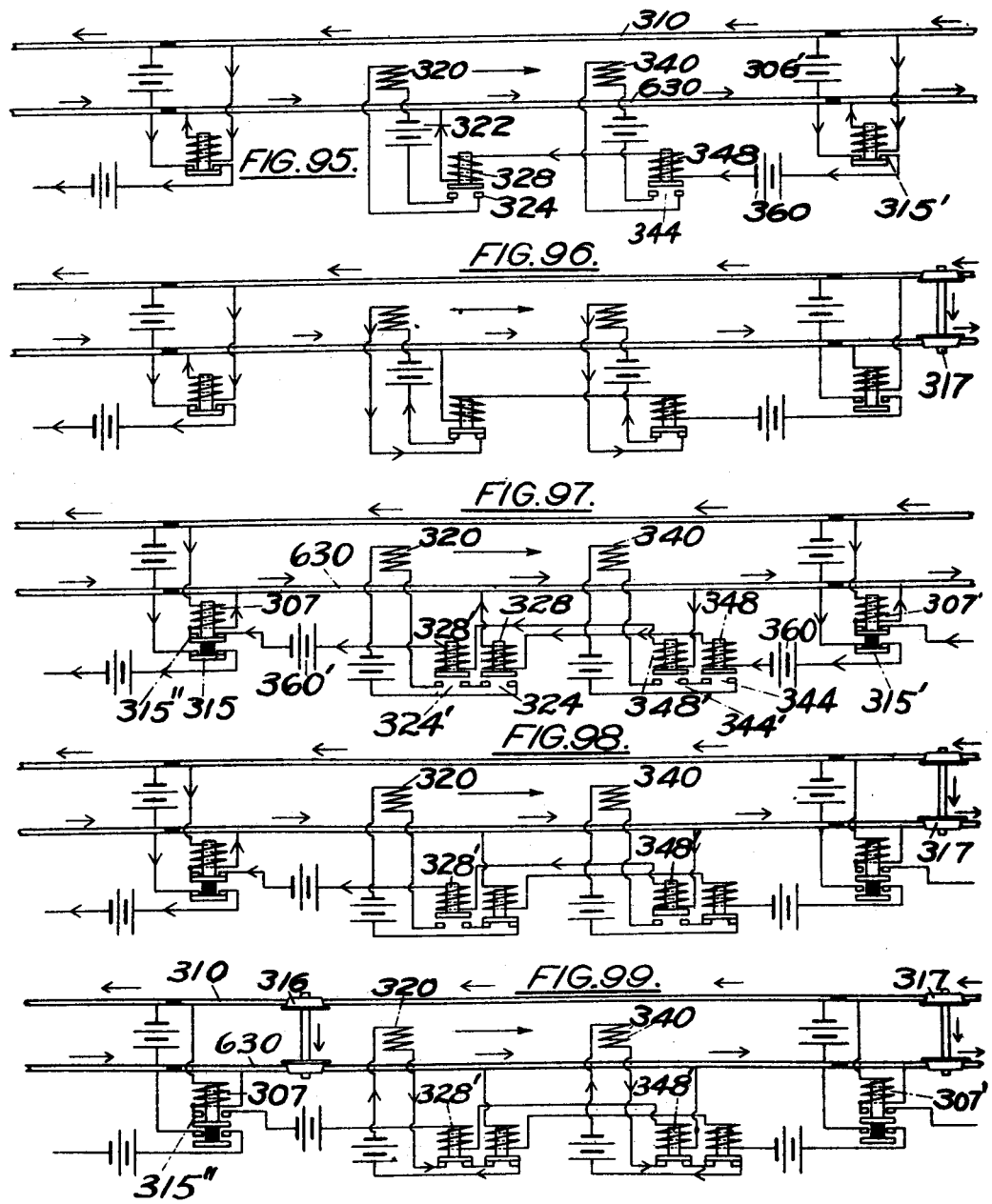

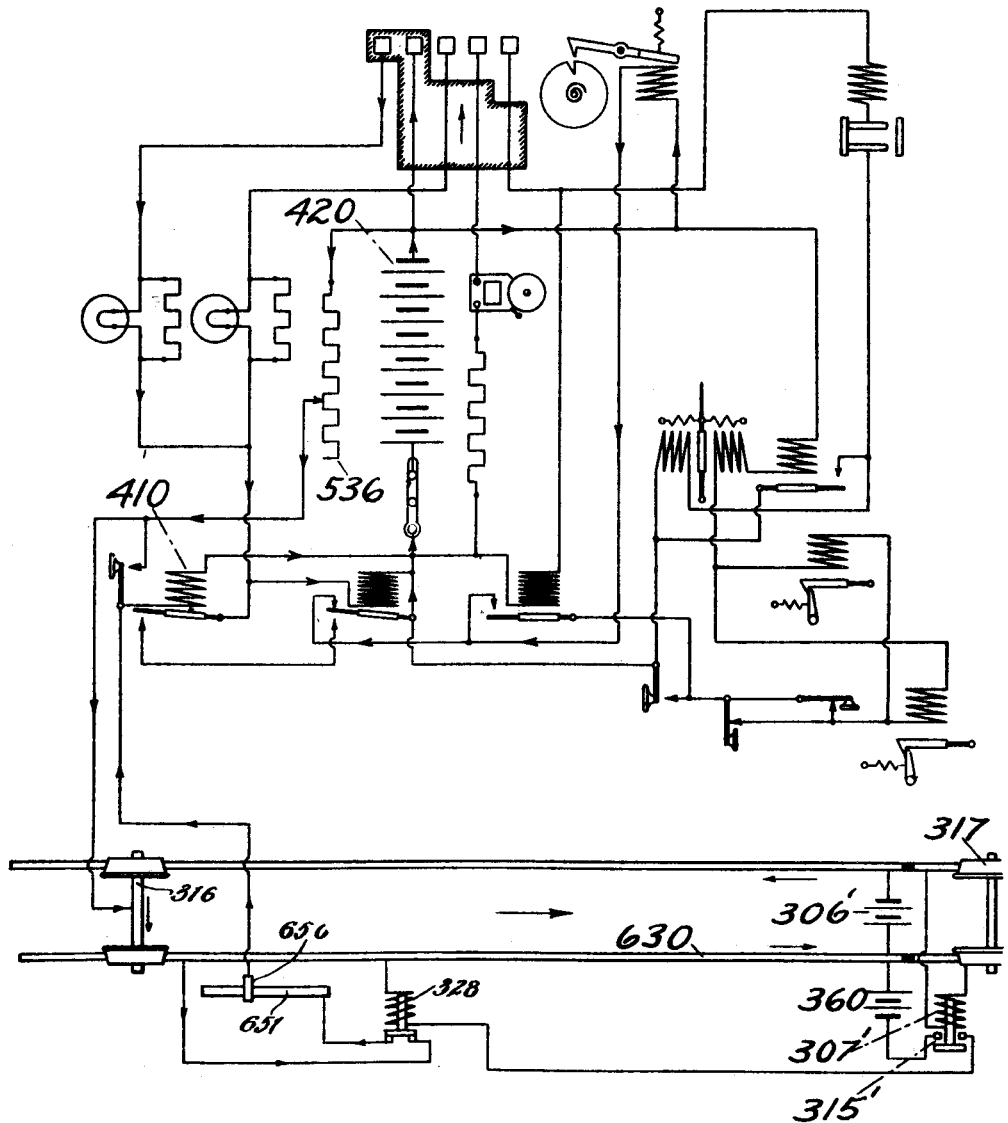

Oct. 28, 1930.  F. J. SPRAGUE  1,780,148
METHOD OF AND APPARATUS FOR CONTROL OF TRAIN MOVEMENTS
Filed Dec. 31, 1914  47 Sheets-Sheet 42
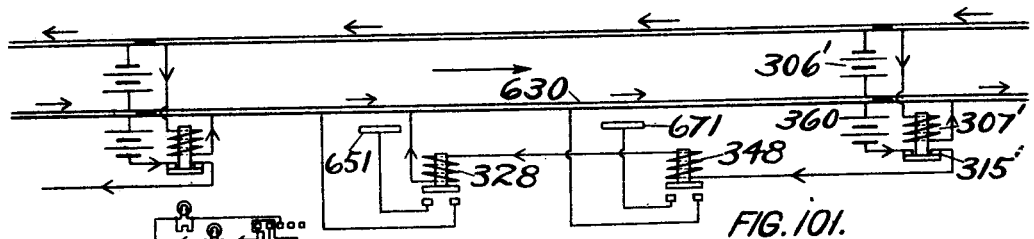
FIG. 101.
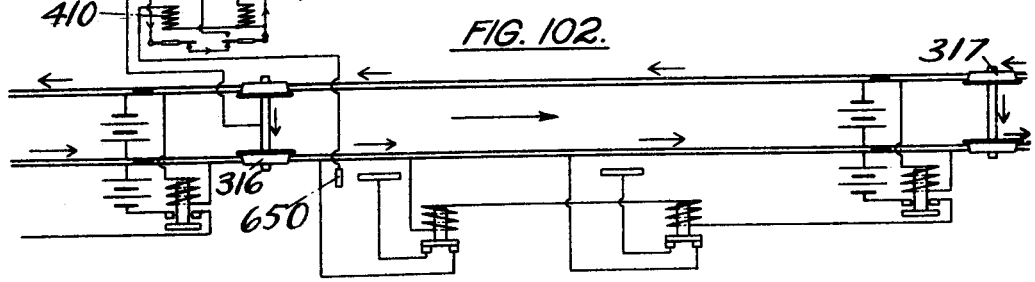
FIG. 102.
FIG. 104.
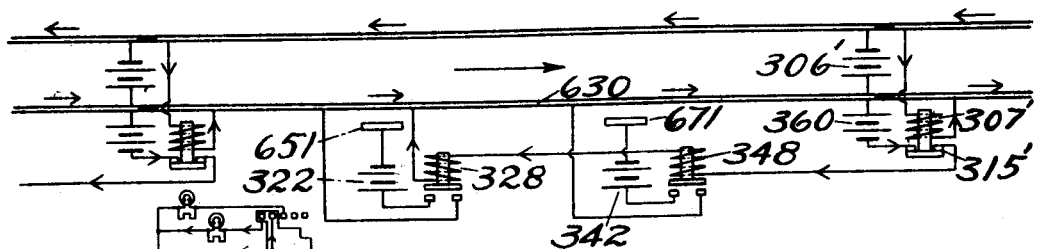
FIG. 105.
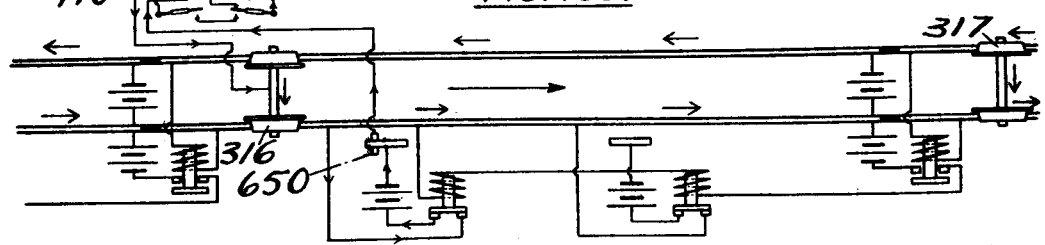
WITNESSES:
R. C. Sprague
Philip W. Allison
INVENTOR
Frank J. Sprague
BY
Dorsey & Co.
ATTORNEYS

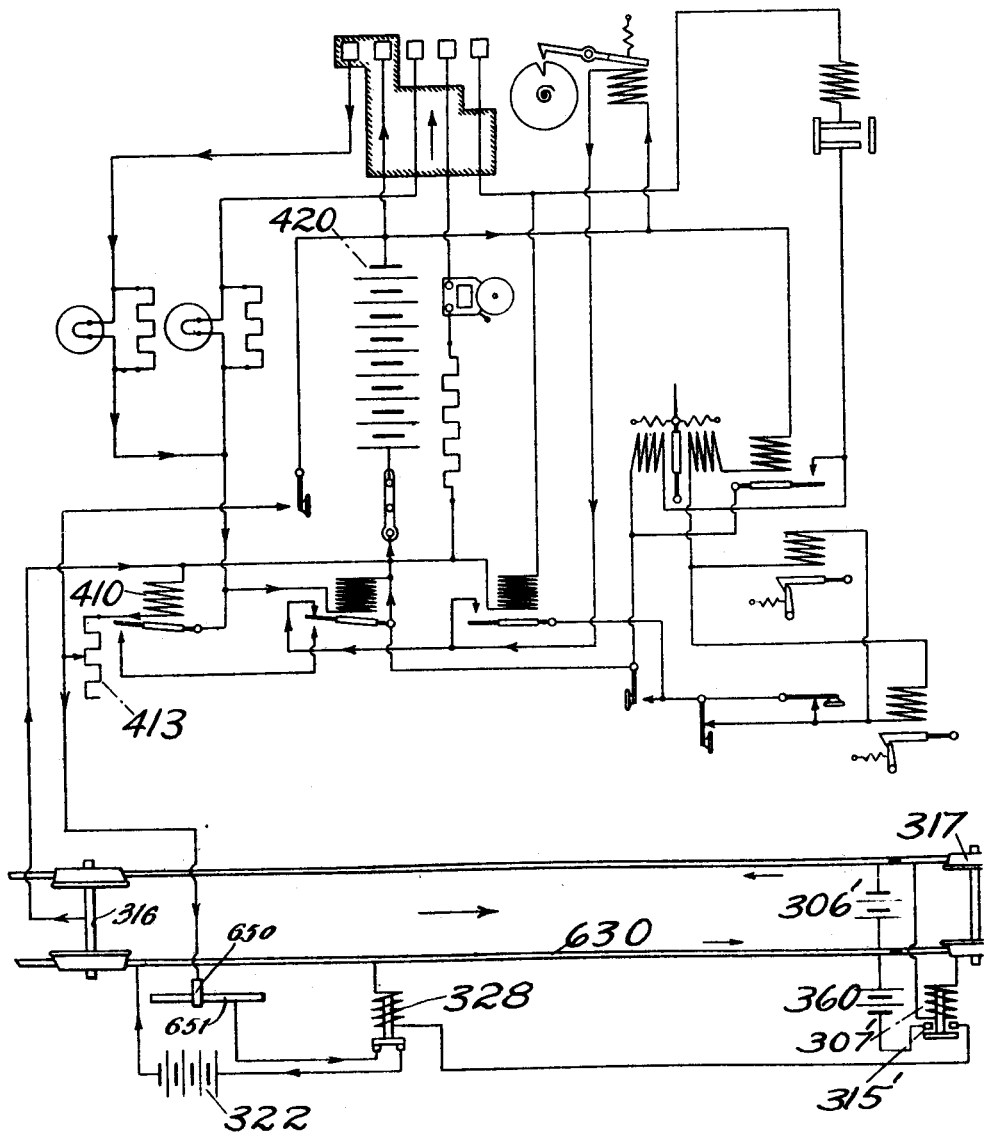

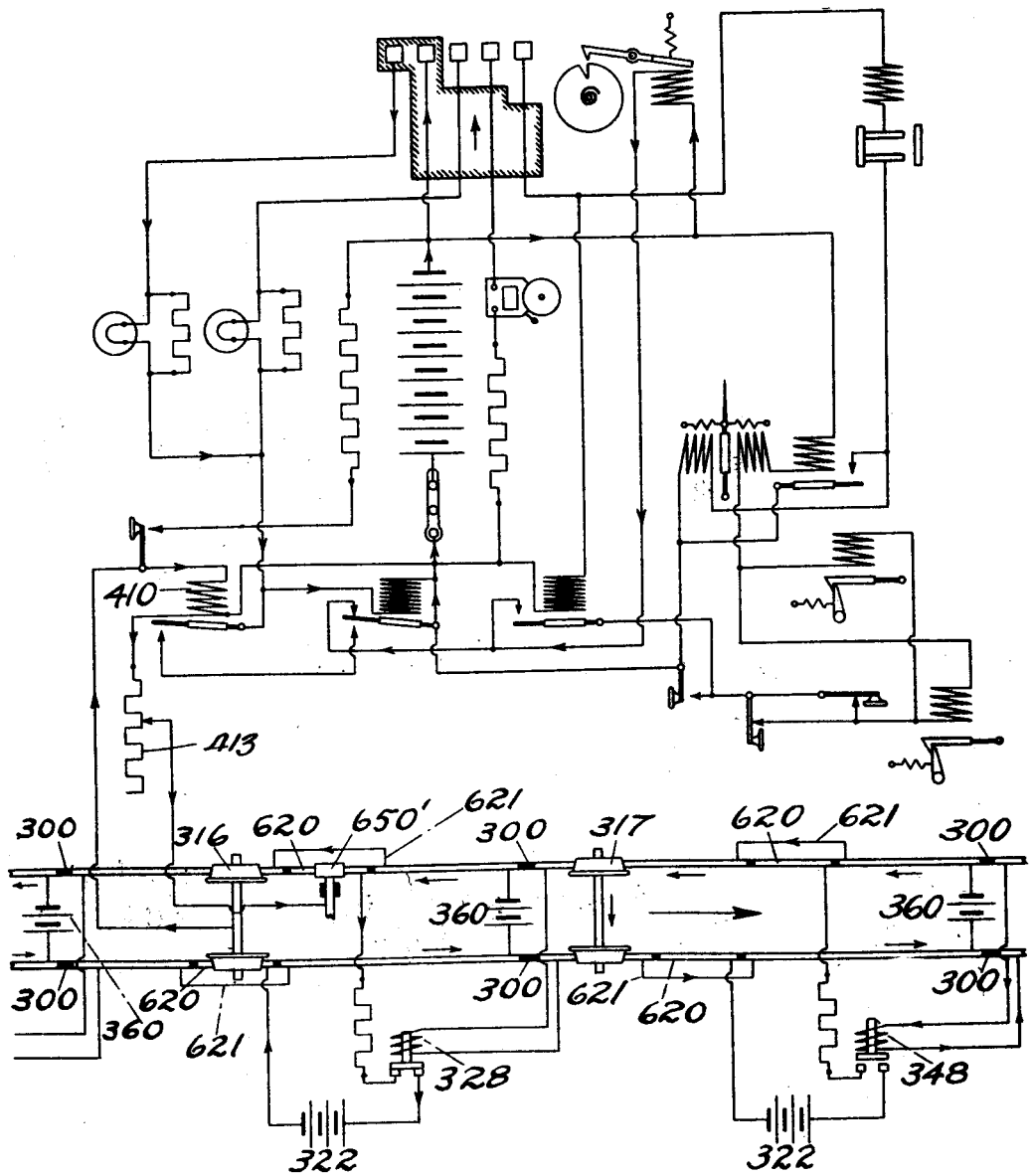

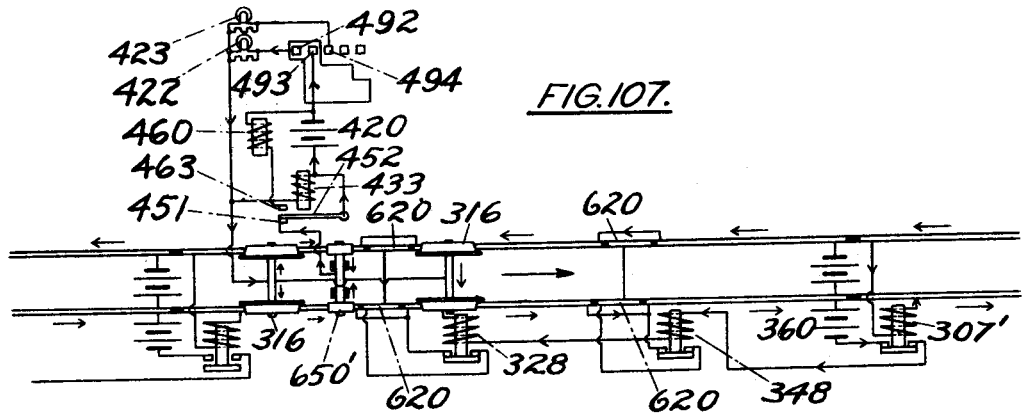
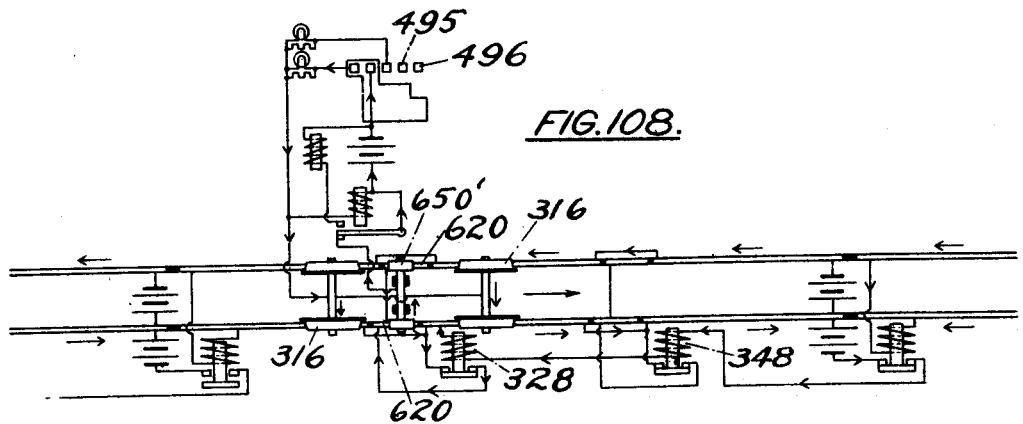
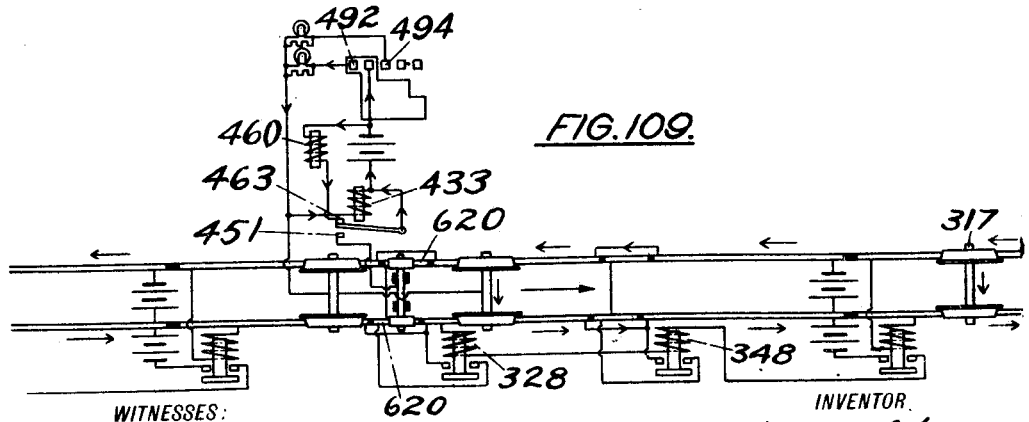

Oct. 28, 1930.    F. J. SPRAGUE    1,780,148
METHOD OF AND APPARATUS FOR CONTROL OF TRAIN MOVEMENTS
Filed Dec. 31, 1914    47 Sheets-Sheet 46

Patented Oct. 28, 1930

1,780,148

UNITED STATES PATENT OFFICE

FRANK J. SPRAGUE, OF SHARON, CONNECTICUT, ASSIGNOR TO SPRAGUE SAFETY CONTROL AND SIGNAL CORPORATION, A CORPORATION OF VIRGINIA

METHOD OF AND APPARATUS FOR CONTROL OF TRAIN MOVEMENTS

Application filed December 31, 1914. Serial No. 879,939.

The object of this invention in its preferred and most complete form is, by a new system of cab-signaling and semi-automatic brake control, to increase the safety and efficiency of railway operation whether steam or electric, and to augment the practical capacity of any given trackage.

Many of the units of my system may be applied singly or in varying combinations to produce only certain of the results attainable by the most complete embodiment of the invention; in fact many of the units of the system have the possibility of a wide application for purposes entirely foreign to a signaling or braking system. While my invention contemplates all of these, in its preferred form and for the purposes immediately in view, it combines signaling, braking, and the recording thereof into a single unitary system.

The preferred form described herein provides for a system of safety control, progressive if desired, to meet operating conditions, as distinguished from what is ordinarily known as automatic stopping, by establishing a transient connecting link between the signal system of the road and the braking system controlled from the locomotive, which system, when occasion demands, will give a preliminary, audible and visible warning when approaching within a definite distance of a home signal, and permit the engineer a reasonable time to effectively control his train, but on his failure to do so will make a primary service braking, graduated in time, rate and amount according to the character of train and service; and in case of further necessity will then make a secondary braking, either full service or emergency, and take release control of the brakes, for the time being, out of the engineer's hands until the train is stopped.

In addition to accomplishing these results, I also provide for the recording of the clock times and character of braking.

Where provision is made for both an initial and a following braking, up to the time of making the second brake application the engineer, even during the period of automatic primary application, has full control of his brakes, the power to increase or diminish their effect, and in response to a clear signal to entirely release them.

Since both track and locomotive apparatus can be varied at will in their relative co-operative sensitiveness, the system provides, moreover, for speed limiting control, as follows:

1. Any given locomotive equipment can be made responsive to all speeds above any desired critical speed and irresponsive below such speeds, at any or variously selected points of the track; and without any readjustment of locomotive apparatus, but by variations in track equipment, these critical speeds can be varied at different points of the track.

2. The track equipment can be so located that the apparatus on the locomotive will be equally sensitive to the same for both directions of movement, whether similarly or oppositely headed; or, on the other hand, it can be located so that there will be response on trains headed in one direction on a single track, for example when leaving a tangent to enter a curve, and no response to the same track equipment on trains headed in the opposite direction, as when going out of a curve into a tangent.

The system of speed limiting control just outlined is in contra-distinction to another available method herein provided for of effecting brake operation to this end, which is based upon a train being braked when it passes over a given track length in less than a predetermined limited time, a non-braking impulse being given at the entrance point and a brake operating impulse when reaching the leaving point within the specified time limit. Such a system, if the operating track sections were short enough, also permits the enforcement of a graduated reduction of speed of a train on approaching a danger signal, by a progressive shortening of a series of adjacent or operative detached zones.

In the preferred form of my invention there is no physical connection whatever between the apparatus on the roadbed and that on the locomotive. I make use instead of the broad principle of induction, with which by my method I can utilize an exceedingly limited mechanical movement in a sensitive receiving apparatus, the movement being initiated by a transient creation or change of flux in a magnetic impulse or inductive receiver, carried on the locomotive and maintained normally in either an active or inert magnetic condition, when the receiver passes into proximity to a preferably enclosed stationary magnet or a movable mass of iron on or alongside of the roadway.

This general method permits of a variety of special developments, but in the present application I shall describe in detail the operation when the change of flux is produced in a coil-enclosed, laminated or wire-core receiver carried on the locomotive, when it passes over a temporarily energized track magnet, although I do not limit myself in any manner to this specific method.

In the preferred form the impulse transmitted to the locomotive is but momentary, and is not only fleeting in character but attenuated in degree. It performs no braking or signaling function, but simply initiates a cycle of operation; its own duration and immediate effect is limited to a small fraction of a second, represented, for example, by an interval of time less than that occupied by a train moving perhaps 80 miles an hour passing over a space of a single foot, and is, therefore, dynamically negligible. Having initiated a cycle of operation, because of a state of un-equilibrium maintained in the apparatus on the locomotive, its immediate function ceases.

In order to make use of an extraordinarily short and time variable impulse to initiate a cycle of operations, I have devised a novel method which can be utilized for many purposes, the principle of which will be set forth in detail later.

The above indicated roadbed equipment may be installed independent of, or in connection with and superimposed upon any known signal system used in block signaling, whether manual, electric, or electro-pneumatic, and can be operated without interference with the latter. In the preferred form, my system is interconnected with the railway signaling system.

The locomotive equipment for effecting the automatic braking herein provided for, whether consequent upon the receipt of an impulse as above indicated or otherwise initiated, is preferably superimposed upon and operates through the agency of the automatic air brake systems commonly employed in railroad operation and operated by the engineer.

In order that my invention may be comprehended, therefore, a preliminary understanding both of automatic signaling and automatic braking is necessary. I am accordingly now presenting a brief outline of these systems of railway control.

*Automatic railway signaling*

In automatic railway signaling the road is divided into blocks, at the beginning of each of which is stationed one or more suitable signals per track and direction.

In, for example, the normally clear automatic signal system, (which is well known in the art, and description whereof therefore is believed to be unnecessary) each train when it enters a block insures the display of a danger signal near the beginning of the block and for the entire time which the block is occupied; and where the system is more complete there is also displayed a caution signal near the beginning of the occupied block, as well as at the beginning of the preceding, and sometimes at the second preceding block entrance.

Consider the movement of a train on a track protected by automatic signals capable of giving clear, caution and danger indications with double two-position semaphores, with corresponding lights, and operating on a normal clear system.

As the locomotive enters a block the signals in immediate proximity, that is, at the beginning of that block, are thrown to danger and caution positions; as the train proceeds into the next block there is a similar setting of caution and danger signals, while the danger signal in the block just left is cleared but the caution is left effective; as the train enters the next block, its caution and danger signals are set, the home danger signal in the rear block is cleared, the caution being left effective, and the caution at the second rear block is cleared, giving for a train about to enter that block a double clear indication. Similarly, caution and danger signals may be indicated by single semaphores having three positions.

It follows that as the train approaches near enough, say within two blocks of a leading train, the first thing the engineer should see is a caution signal, which is a notice that the second block ahead is either occupied or that there is some other disturbance of the track circuit. This is also notice that a block ahead, that is at the beginning of the next block, there should be not only a caution but a danger or home signal as well.

Ordinarily, on seeing a caution signal the engineer will get his train under control if proceeding at a high speed, or at least be on the alert to promptly check his train speed, depending somewhat upon the length of blocks, the character of the train and schedule operated and the weather conditions; but if the caution signal remains as he proceeds into the block, its warning being supplemented by the visible home signal in the distance, then instant control of the train is essential and the train should be stopped before passing the home signal.

Automatic air brake system

The automatic air brake system upon which my invention is herein shown as superimposed, is the ordinary form embracing what is known as the Westinghouse G-6 engineer's valve, this valve being chosen for simplicity of illustration and without intended limitations. It comprises the following elements:

(a) One or more main reservoirs of large capacity carried on the locomotive, in which is normally maintained a volume of air under high pressure, varying on different equipments from 90 to 130 pounds, which air is supplied by an automatically controlled steam or electric pump.

(b) A pipe system consisting of air pipes individual to each car, joined continuously from car to car by detachable flexible hose couplings, this system being supplied with pressure air from the main reservoir through a feed valve by which the air therein is normally maintained at a fixed pressure usually ten or more pounds less than that of the main reservoir.

(c) The engineer's valve, with its equalizing chamber and reservoir, is connected to the air supply and the brake pipe system, and controls the latter, its function depending upon the position of the handle of the valve. The rotary element of the G-6 valve normally has five positions, namely: "running," when air from the main reservoir is permitted to feed through the automatic feed valve into the brake pipe to make up any loss, and to maintain therein a fairly constant pressure; "release," when air from the main reservoir is permitted to flow directly into the brake pipe system to charge it after it has been exhausted; "lap," which, with the two remaining positions, is oppositely disposed from the "release" position, when all ports in the rotary valve are blanketed, there being no feeding of air from the main reservoir into the brake pipe and no escape of air from the equalizing reservoir; "service," when the air supply from the main reservoir through the feed valve is blanketed from the brake pipe, and air from the latter is permitted to escape into free air, through a port controlled by an equalizing piston which is indirectly controlled by the rotary element of the valve through differential air pressure; and finally, "emergency" position, in which the air from the main reservoir through the feed valve is blanketed from the brake pipe, but the air in the latter is allowed free escape into atmosphere.

(d) The brake cylinders, in which move against spring resistance the pistons and rods connected with the foundation gear of the brake rigging, to force the brake shoes against the car wheels with a varying pressure, depending upon the handling of the engineer's valve.

(e) Auxiliary reservoirs individual to each car, normally charged with air at the same pressure of the brake pipe, and through the triple valves supplying air directly to the brake cylinders when required.

(f) Plain or quick-action triple valves, individual to each car, these forming the connecting links between the brake pipes, auxiliary reservoirs, brake cylinders and free atmosphere. This valve is operated by differential air pressures to supply pressure air from the auxiliary reservoir to the brake cylinder for the application of the brakes, and to cut off said supply and open the brake cylinder to atmosphere for the release of the brakes. Under normal condition it maintains an open connection between the brake pipe and the auxiliary reservoir, to insure therein similarity of air pressures; it also then affords a free opening from the brake cylinder to atmosphere.

In the improved type of triple valve, when emergency operation takes place some of the air of the brake pipe is, at the beginning of the brake application, put into the brake cylinder, to reinforce the volume of air in the auxiliary reservoir and thus raise the pressure in the brake cylinder.

(g) Duplex indicating air gauge, one indicator being connected with and showing the air pressure in the main reservoir, and the other connected with and showing the air pressure in the equalizing reservoir, as well, normally, as that in the brake pipe, the latter lagging slightly during reduction.

Various modifications of the above outlined air braking are extant including among others the adjunct of straight air braking and independent locomotive braking with slight changes in the system to meet these adjuncts; also operation of the brake system by electrical control; but for the purpose of this application it is not necessary to describe these in detail although my system is applicable to practically all of them.

Service and emergency braking

The operation of braking a locomotive or train effected by my invention, and employed in the ordinary automatic brake system, follows certain principles and practice now to be outlined:

All of the operations of braking, whether the making of small or large service applications of air or full emergency applications, are, as above indicated, effected by variations of air pressure in the brake pipe, in variable times and amounts depending upon the character of braking, and the release is effected by recharging the brake pipe and bringing its pressure back to normal.

All normal braking is initiated and controlled by the engineer through the engineer's valve, and such normal braking provides when brakes are applied, first, for cutting off connection between the main reservoir and the brake pipe system; second, service application of brakes, controlled as to rate of application and amount of air reduction in the brake pipe, the time being perhaps half a minute and the reduction anywhere from 3 to 4 pounds to 20 or 25 pounds; and third, emergency application by free exhaust from the brake pipe to atmosphere, the time occupied being but a few seconds, and the resultant more violent braking being the maximum possible under the existing conditions of air pressure in the brake pipe.

In service applications on modern systems the engineer does not directly open an exhaust from the brake pipe to atmosphere, but he makes a more or less limited or restricted opening from an equalizing chamber in the bottom of his valve, which is connected with the equalizing reservoir to get a volume of air to handle, and thereby refinement in making air reductions; this reduction of air in the equalizing chamber in turn lifts an equalizing piston by differential air pressure, which when lifted opens the brake pipe to atmosphere through the service port; and when, following the closure of the service controlling port in the engineer's rotary valve, the air on the upper and lower sides of the equalizing piston controlling the service port is equalized in pressure, the brake pipe opening is automatically closed.

In making an emergency application, however, the engineer's valve provides for a direct exit from the brake pipe through a different and larger port, and the reduction of air pressure in the brake pipe is very sudden. It acts first on the nearest car, and then, because not only of the air reduction due to the escape of air through the engineer's valve, but likewise because of the emptying of part of the air of the brake pipe into the brake cylinder through the triple valve when suddenly operated under emergency conditions, there is effected a very quick reduction of air pressure in the second car, and so on in each car of the train in rapid sequence, the application of the brakes under emergency application taking place, not simultaneously (except where electric control is introduced) but in very rapid succession, 40 or 50 cars having emergency brakes applied in a very few seconds.

It should be noted that in every case of normal service and emergency application by the engineer, in the system I have described, the air from the main locomotive reservoir is cut off from the brake pipe and held available for recharging it to effect a quick release of brakes; and further, that a service application is distinguished from an emergency application, in that definite air reductions, variable in rate and amount, are effected in the brake pipe system, with variable pressures in the brake cylinders, while in full emergency braking the air is normally exhausted from the brake pipe as quickly and as completely as possible.

There is another kind of braking which I may designate as abnormal, and that is quasi-emergency braking, ordinarily produced with a valve called a conductor's valve connected with the brake pipe system which may be opened to atmosphere (in principle the kind of valve ordinarily used in "automatic stopping"), or when an air hose bursts or a train pulls apart.

I have not deemed it necessary to illustrate the conductor's valve nor show its connection with the brake pipe, as its location and construction are well understood. It provides for no automatic cut-off from the main reservoir, and its use is restricted to unusual conditons.

The construction and operation of the automatic air brake system will be mo.e fully gone into in connection with the drawings.

General outline of system

Before entering into a detailed description of my invention, the various elements embraced in the preferred form and their relation one with the other will be briefly outlined.

On the track

*Track magnets.*—These are preferably located between the traffic rails, in conformity with the clearance requirements, and suitably cased for protection against interference and weather conditions, as, for example, in weatherproof locked boxes having non-magnetic tops, and suitably protected against dragging equipment by approach ramps.

Ordinarily there will be two track magnets for each block, (on single track probably two will be required for each direction unless the block is short enough to allow two magnets to be so located as to perform a dual service for each direction), each being located at such a distance from the block signals as the character and length of gradient and other conditions may require.

The track magnet which is located at the greater distance from the home signal or the advance block is designated herein as the "distant" track magnet, and the track magnet which is nearest such home signal is designated as the "home" track magnet.

For railway crossing, drawbridge, crossover, turn-out, slow order, train speed or other controls, the track magnets will be so located as to cause compliance with local rules and regulations.

Each track magnet is energized by an independent source of electric current supply, the circuit of which is normally open, and is completed only when there is a danger condition in the advance block. This energization can be coincident with this danger condition, or may occur only when the following or home block is also occupied, or for an even shorter time, as when the magnetic impulse or inductive receiver on the locomotive is within a short distance of the track magnet, after which the track magnet may remain energized until the train has passed over that section of the track.

It follows that even if a home signal is set against a train, there may be no current in the track magnet if there be no following train near by.

Batteries may be relied upon as of ample reserve capacity for the service requirements, so that a routine change only is necessary at regular intervals.

*On the locomotive frame*

*Magnetic impulse or inductive receiver.*—This is preferably a coil or a coil-enclosed core and is carried preferably on the locomotive or motor car in any manner which will practically eliminate material variation in running clearance and so located as to pass over or near the track magnet, within operative distance.

It receives a magnetic flux when passing over an energized track magnet, which creates a momentary variable current of the general nature of a single alternating current cycle. This current initiates—through the electric detector relay—the entire cycle of signaling, braking and recording operations, but performs no physical function whatsoever.

The receiver is also weatherproofed, and preferably carried in a protecting enclosure of non-magnetic material.

*In the locomotive cab*

*An electric detector.*—This comprises a peculiarly arranged circuit containing a low potential electric supply in series with a normally shunted and de-energized magnet, in combination with means for momentarily opening said shunt and then prolonging the results of said shunt opening, said means being in the form of a detector relay series-connected in a closed circuit with the coil of the inductive receiver carried outside the cab. Any current generated in the inductive receiver flows also, therefore, through the detector relay and any adjusting resistance.

The detector is preferably physically associated in the same case with other selected electrically controlled or operated apparatus, in such a manner that although its own function and operation is initiated by a momentary action (which lasts possibly 1/200th part of a second, depending upon the train speed), such initiation is followed by a cycle of operations which determine the moment, sequence, amount and character of automatic braking.

*Cycle train.*—This is preferably located in the protecting case last referred to. It is the controlling mechanism for the automatic braking, signaling and recording apparatus. In one form it comprises a suitably driven commutator, a set of brushes, a series of relays, and suitable leads and connections for the various parts.

This cycle train is put in operation through the initiation of the electric detector when the latter is energized by the locomotive passing over a live track magnet, and when so released the commutator is rotated at a suitable speed, insuring the proper correlation of the electric governing circuits, and controlling the moments of possible automatic primary or secondary brake applications. Primary braking is a service braking and takes place as a result of passing over a live distant track magnet, and the secondary braking follows as a result of passing over a live home track magnet while the commutator is still in operation.

*Cab visual signals.*—These may be located in or outside the cab, and consist preferably of an electric light "clear" indication that the automatic apparatus is in working order and that the locomotive or motor car has not yet arrived within a danger signal and automatic braking zone, and an electric light "danger" indication, or warning that the time cycle commutator is in operation and that automatic braking will occur after a brief time has been allowed the engineer to apply the brakes manually.

Only one cab signal light is displayed at one time, and the display of each is determined by the position of the cycle train commutator.

*Cab audible signal.*—This is located in the cab, and may be any suitable kind of an alarm, as, for example, a buzzer or bell. It comes into play through the agency of the cycle train coincidently with the visual danger signal, and may be adjusted to give a spasmodic, intermittent or continuous alarm.

*Automatic brake recorder.*—This device is located in the cab in conjunction with the cycle train. It records the clock time, character and sequence of the automatic brake pipe reductions.

*Current supply.*—This may consist of one or more storage batteries conveniently located on the locomotive. A small dynamo can be used instead of the batteries, or the two in conjunction, with automatic charging control.

When in operative condition, but at rest, and if arranged for local open circuit operation, the entire electrical apparatus in the locomotive or motor car may use about one-third of an ampere of current (for the clear cab signal). When operating (brake application) it may momentarily use from 2 to 3 amperes of current. It can be readily arranged for closed circuit operation if desired.

*Engineer's automatic valve head.*—This replaces the upper valve body of the usual engineer's valve, being interchangeable upon the lower valve body, and it is the only part of the existing air brake system that is physically altered by the installation of the safety control equipment. Its mechanism is brought into play through the agency of the cycle train. It does not interfere with any of the present movements or functions of the engineer's brake valve, so far as manual operation is concerned up to the time of automatic secondary brake operation.

The automatic valve head is pneumatically operated, but under electric control, for the purpose of placing the engineer's valve handle and rotary valve preferably in lap position immediately prior to the operation of the automatic service brake valve, to avoid other than manual releasing of the brakes; and, in one form, through the movement of its motor or driving yoke, it opens an outlet or pilot valve to free atmosphere. The pilot valve is in series with, and initiates the application of the automatic service brake valve—an automatically closing valve connected with the equalizing reservoir or the brake pipe.

After the engineer's valve handle and rotary valve have been automatically placed in lap position, they are so retained by pneumatic pressure for a definite period of time (until the completion of the movement of the time cycle commutator), after which the pneumatic pressure is again released. However, regardless of whether the pneumatic pressure is applied to or released from the brake valve handle and rotary valve, the latter can only be returned to release position by manual operation.

It is so interconnected with the engineer's valve that in the event of the timely manual operation of the latter, with application of the brakes, the automatic service brake valve will not come into action unless an attempt is made to release the brakes prior to the conclusion of the time cycle of the commutator.

Motor air is supplied through an electrically operated valve, which may be an integral part of the valve head, or separate from and connected to it pneumatically, and sometimes electrically as well. A throttle valve can be employed to govern the rate of supply, and a capacity chamber to insure the highest degree of reliability of operation.

*Automatic service brake valve.*—This is a distinct mechanism, but interconnected with the engineer's automatic valve head and the operation of an engineer's brake valve. It operates for all automatic graduated service applications of the locomotive and train brakes, and determines the amount and rate of the primary brake pipe service reduction irrespective of the brake pipe pressure at the time of application.

It is adjustable for both the amount and rate of the primary brake pipe service reduction, subject to established non-adjustable minimum reductions.

It ordinarily causes all automatic primary brake pipe service reductions to be made co-ordinately with the automatic movement of the engineer's brake valve handle. Its operation is controlled by the difference between the initial air brake pressure, or its equivalent, and the reduced brake pipe pressure after automatic service brake application.

*Automatic service brake valve capacity reservoir.*—This is normally in free connection with the brake pipe, and supplies air maintained at practically the initial brake pipe pressure at the moment of automatic service application, to close the automatic service brake valve. In one form of automatic service brake valve the equalizing reservoir itself may be used for this purpose, or in some other form its function may be otherwise obtained.

*Electric secondary exhaust valve.*—This may be located in the cab or any other preferred position.

Its operation takes the release of brakes out of the engineer's hands, by producing a direct opening of the brake pipe to atmosphere for the purpose of automatically applying the locomotive and train brakes in all full service or emergency actions; and this opening is in parallel with, and independent of, the regular emergency opening in the engineer's valve. Preferably, its closure is made sufficiently inconvenient to insure its full effectiveness in case of operation.

Preferably, under no conditions, at either the distant, home, speed or time control track magnets, are the train brakes released by the automatic apparatus. Such release is always manual.

Referring to the accompanying drawings in which corresponding parts are designated by corresponding marks of references:

Figure 1 is a diagrammatic view of an apparatus embodying my invention in its most complete and perfected form. At the bottom of the figure a track with the instrumentalities forming part of the track system is shown, and at the top of the figure parts carried by the engine are shown. On the right hand is represented the pneumatic brake apparatus carried on the vehicle, and on the left hand, the electric circuits and mechanism controlled thereby for carrying, with proper co-ordination, impulses received from the track system, to the brake apparatus, together with recording means for such impulses. The parts on the vehicle are represented in their normal position, the engineer's valve being in running position.

Figure 2 is an enlarged view of the parts of the pneumatic brake apparatus shown in Fig. 1, and showing in addition a brake cylinder, with its associated auxiliary reservoir and triple valve, the position of the parts being those assumed while the train is running unbraked.

Figure 3 is a view corresponding to Fig. 2, but showing the parts in the position they assume in the early part of the automatic primary and measured braking.

Figure 4 is a similar view, but showing a further, and conclusive step in the automatic primary braking, the pressure in the brake pipe having been reduced a definite amount as desired, and further reductions thereof having been arrested by the closing of the automatic service brake valve.

Figures 5, 6 and 7 are conventional representations of the release, service and emergency positions of a standard type of an engineer's valve, such as may be used in connection with this invention.

Figure 8 is a vertical section of a standard G–6 engineer's valve on the line $x^8$—$x^8$ of Fig. 9, but having mounted thereon in lieu of the standard head, my electrically controlled and pneumatically operated brake head.

Figure 9 is a plan view of the structure shown in Fig. 8, with the cover removed, the valve itself being in running position (having been moved to that position from release) and its pneumatic actuator being inert.

Figure 12 is a section through the controlling valve for the pneumatic actuator of the engineer's valve.

Figure 13 is a plan and elevation of the driving yoke for the engineer's valve.

Figure 14 is a plan and elevation of the driven yoke.

Figure 15 is a plan and elevation of the slack-motion switch arm.

Figure 16 is a plan and elevation of one of the pistons of the actuator for the engineer's valve.

Figure 17 is a plan and elevation of one of the connecting rods.

Figure 18 is a central section through the automatic service brake valve shown in preceding figures, and its associated pilot valve (the latter being shown as electrically actuated), in the positions they assume at the end of an automatic measured brake application.

Figure 18ª is a central sectional view of a modified form of automatic service brake valve.

Figure 19 is a plan of a form of automatic emergency valve capable of use in my invention, and forming a part thereof.

Figure 20 is an elevation thereof.

Figure 21 is a view partly in perspective and partly in diagram, showing the location and construction of a track magnet embodying this invention and the circuit connections thereof.

Figure 22 is a longitudinal section through a track magnet and its enclosing case.

Figure 23 is a transverse section at right angles thereto.

Figure 24:
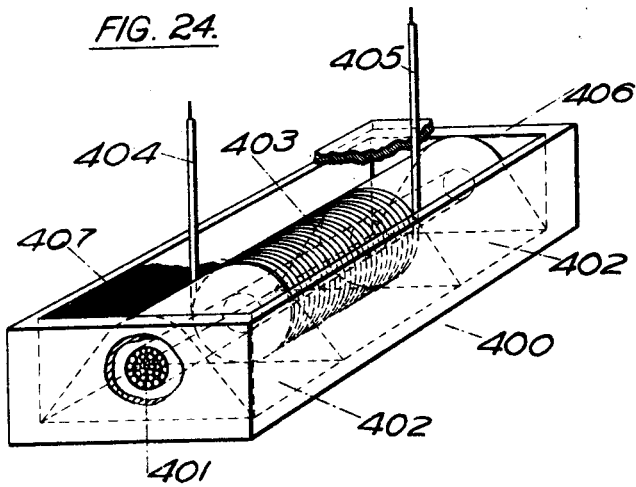

Figure 24 is a perspective view, partly broken away, of a type of inductive receiver embodying this invention.

Figure 25:
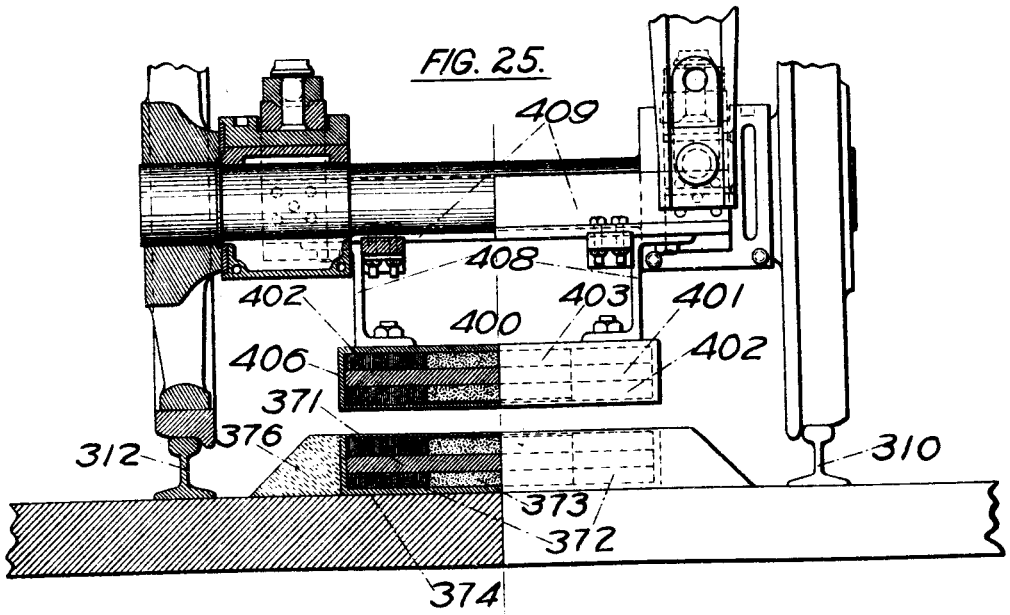

Figure 25 is an elevation, partly in section, showing a manner of mounting the inductive receiver on a locomotive.

Figures 26 to 31 inclusive are diagrams illustrating one manner of controlling the excitation of the track magnets by traffic in the home and advance blocks conjointly. The specific form of contact here shown is designated herein the "insulated joint" method. The several views illustrate different conditions arising in practice.

Figures 32 to 55 inclusive are diagrams illustrating various combinations of coils and the making and breaking of contacts effected thereby, by which a fleeting impulse is produced through the agency of which an operative circuit is controlled. The figures illustrate generally the principle of the detector circuit forming a part of this invention.

Figure 56 is a diagram on a larger scale than Fig. 1, showing the circuits and certain parts controlled thereby that are shown in Fig. 1. This figure shows, however, a different form of control of the track magnet circuit from that shown in Fig. 1. The parts are, however, in the same condition as is represented in Fig. 1.

Figure 57 is a similar view showing the detector as energized, but presumes the time interval thereafter to be so short that the cycle train has not started movement.

Figures 58 to 61 inclusive are similar views, but represent the position of the parts at successive intervals.

Figure 62:
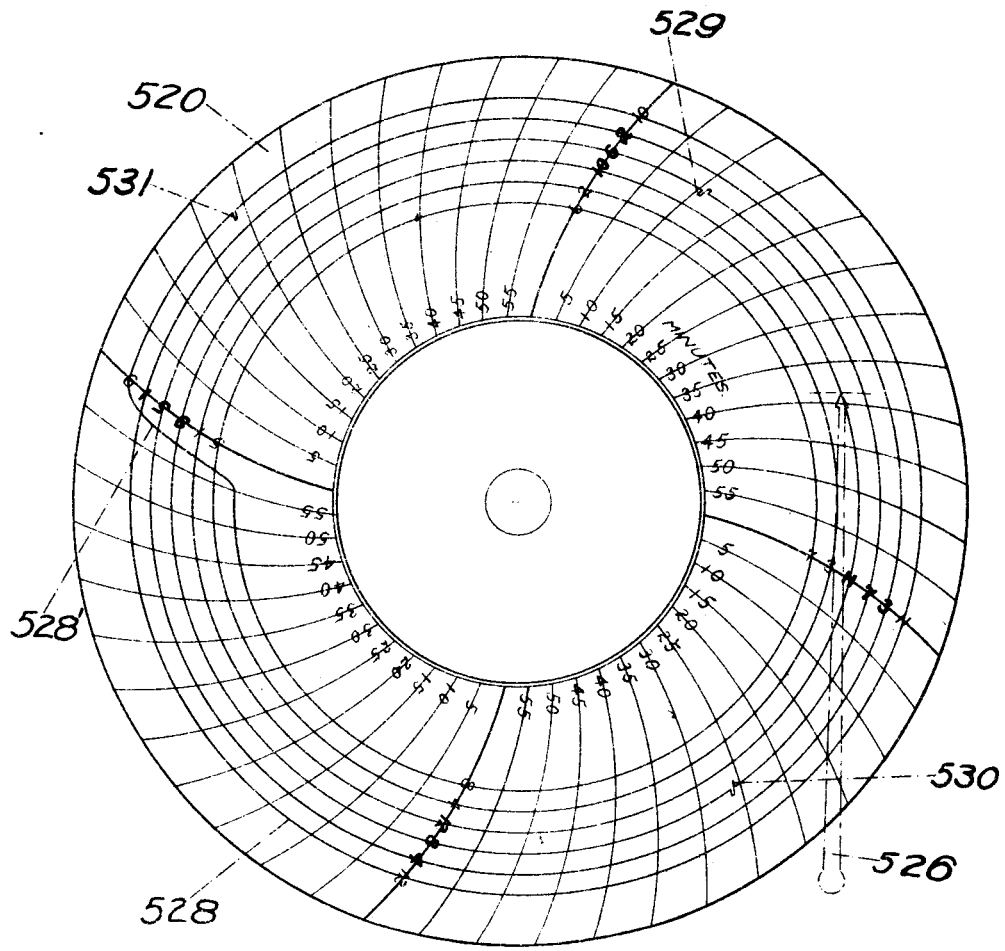

Figure 62 is a representation of a record card such as made by the mechanism shown in the foregoing figures.

Figures 63 to 77 inclusive are oscillograms of the current appearing in the circuit of an inductive receiver under varying conditions of that circuit, of train speed and of strength of track magnet.

Figure 78 is a diagram illustrating the principles applying to the braking of trains of different speeds (here represented as a passenger train and a freight train), and further illustrating the application of my system of speed limiting control thereto.

Figure 78ª is a diagram illustrating a modification of my system of speed limiting control by establishing control zones of progressively decreasing lengths, and specifically illustrating that embodiment thereof in which the control zones are separated from each other by longer intermediate or restoring zones.

Figures 79, 80 and 81 are diagrams representing the selective control of train movements on a single track according to the direction of movement of the train.

Figure 82 is a view similar to Fig. 1, but showing an electrically driven commutator in lieu of the clock-driven commutator of the first figure.

Figure 83 is a view similar to Fig. 1, but showing a slightly different form of automatic service brake valve.

Figure 84:
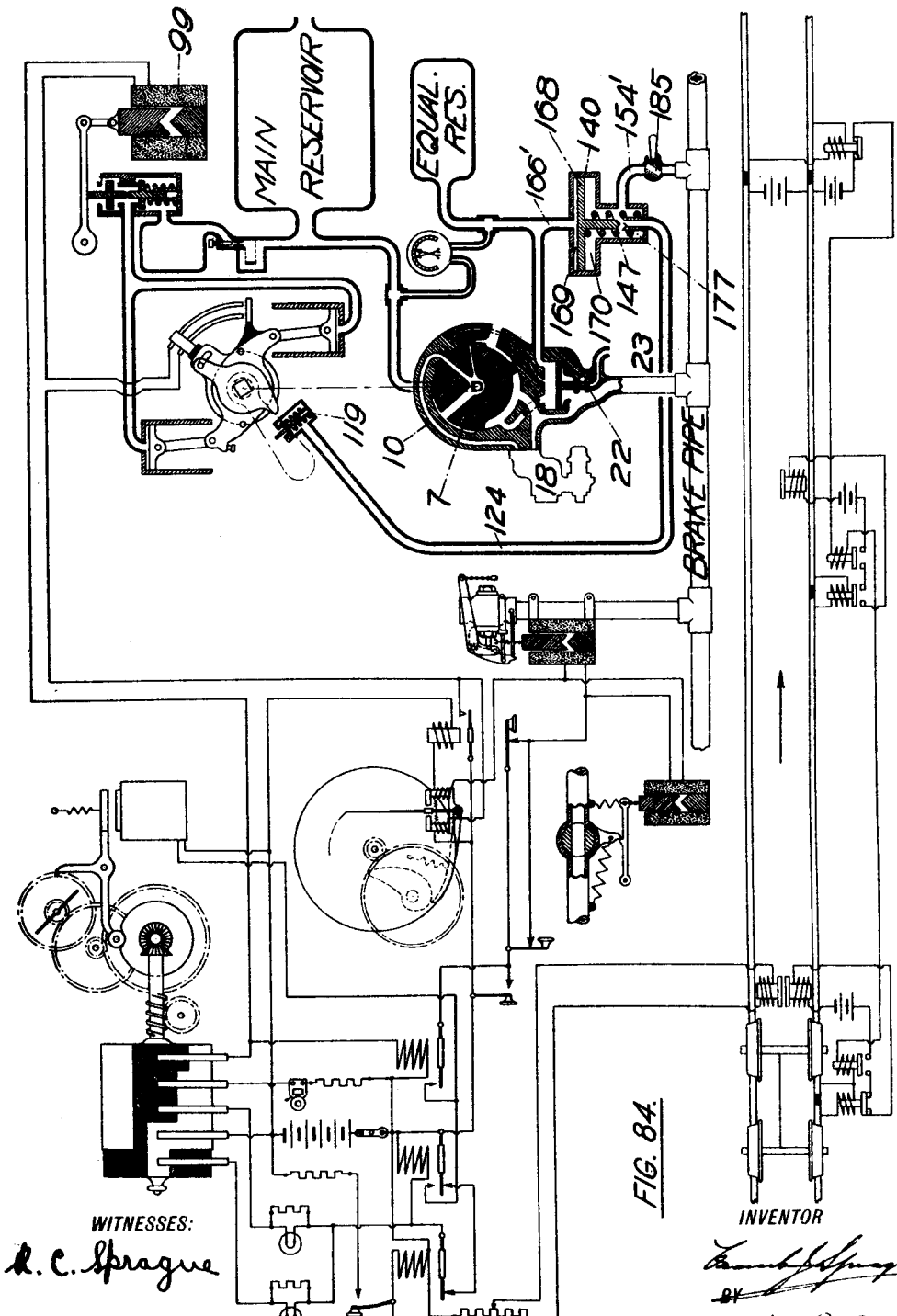

Figure 84 is a view similar to Fig. 1, but showing another form of automatic service brake valve.

Figure 85:
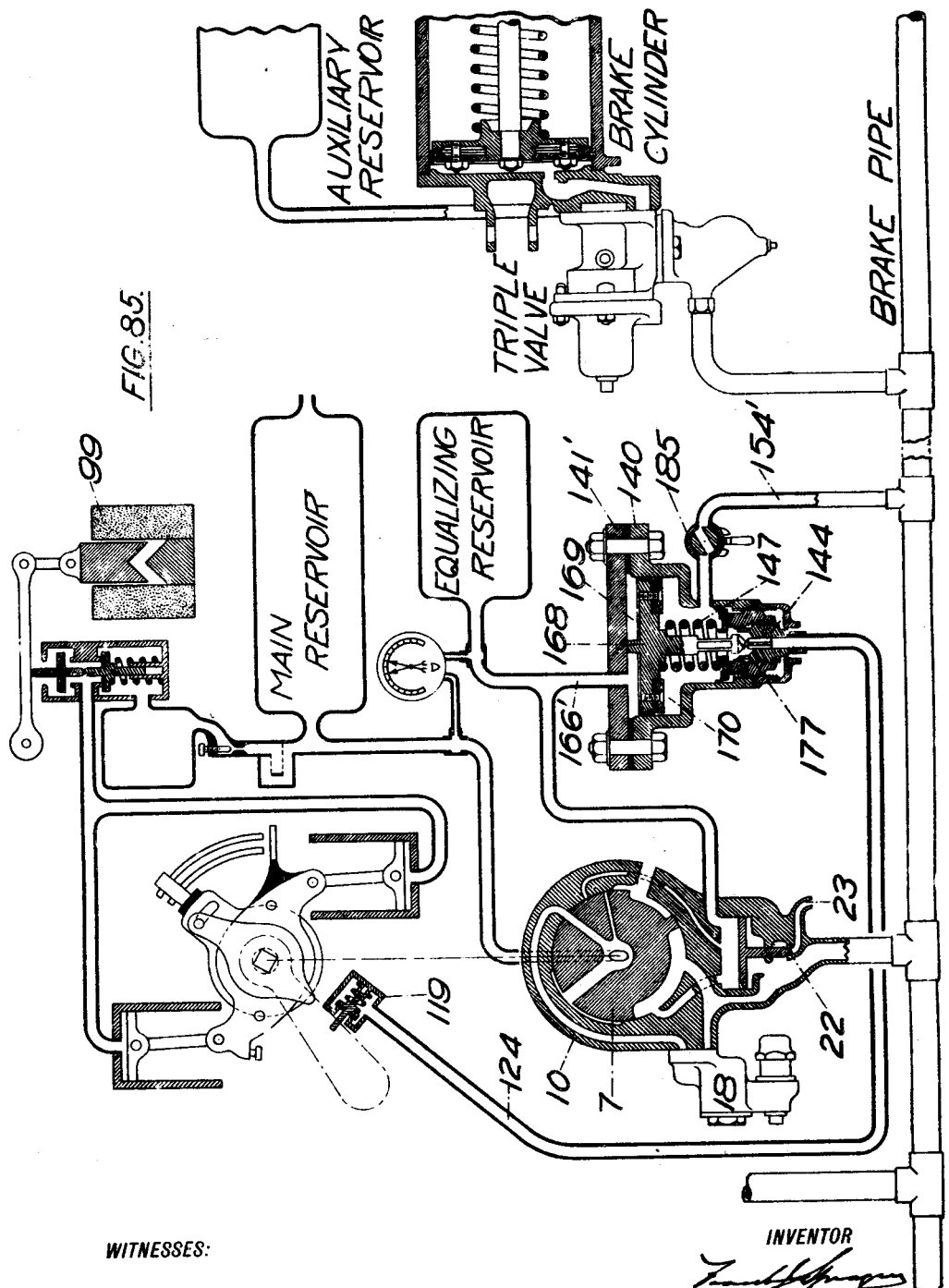
Figure 86:
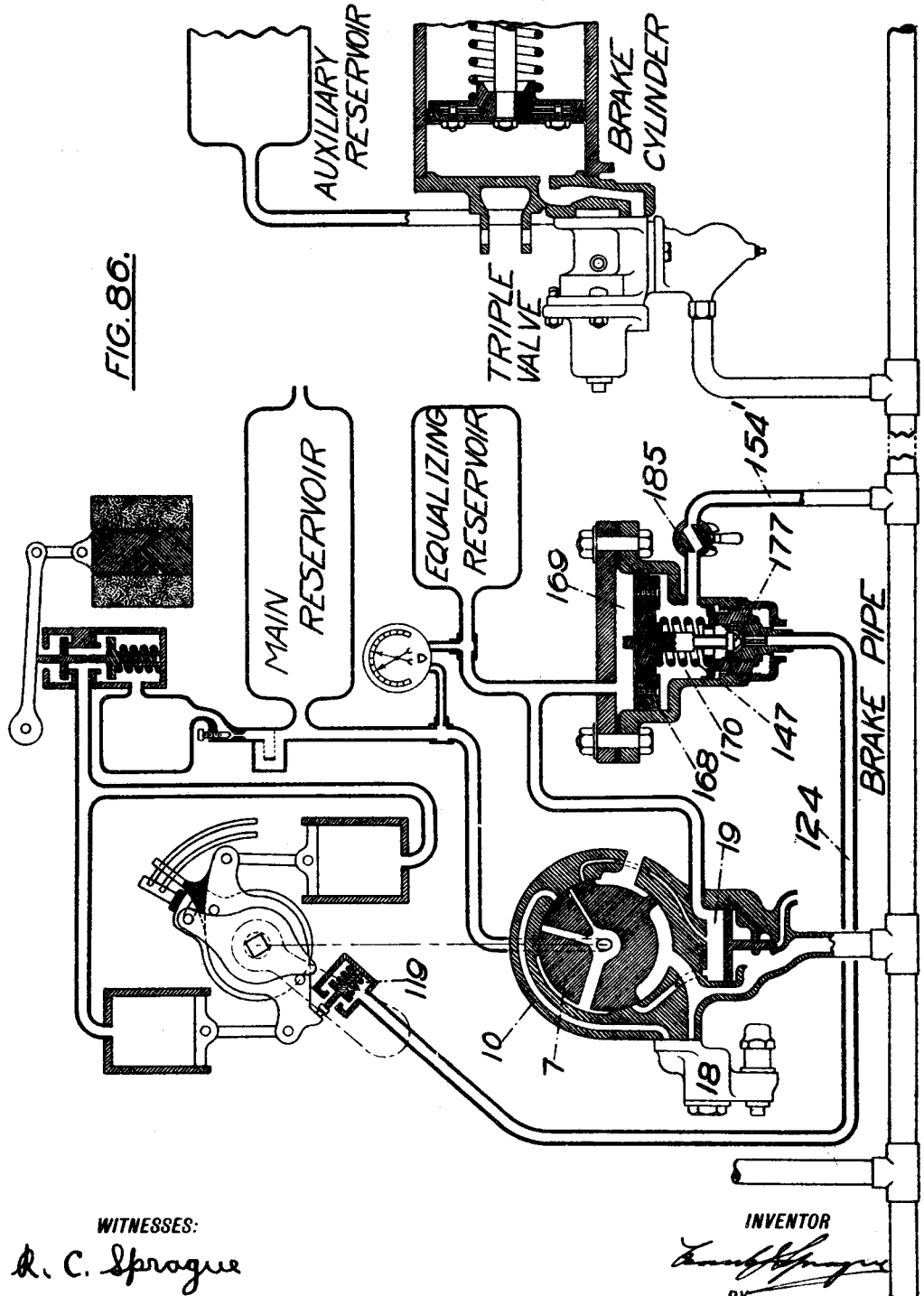
Figure 87:
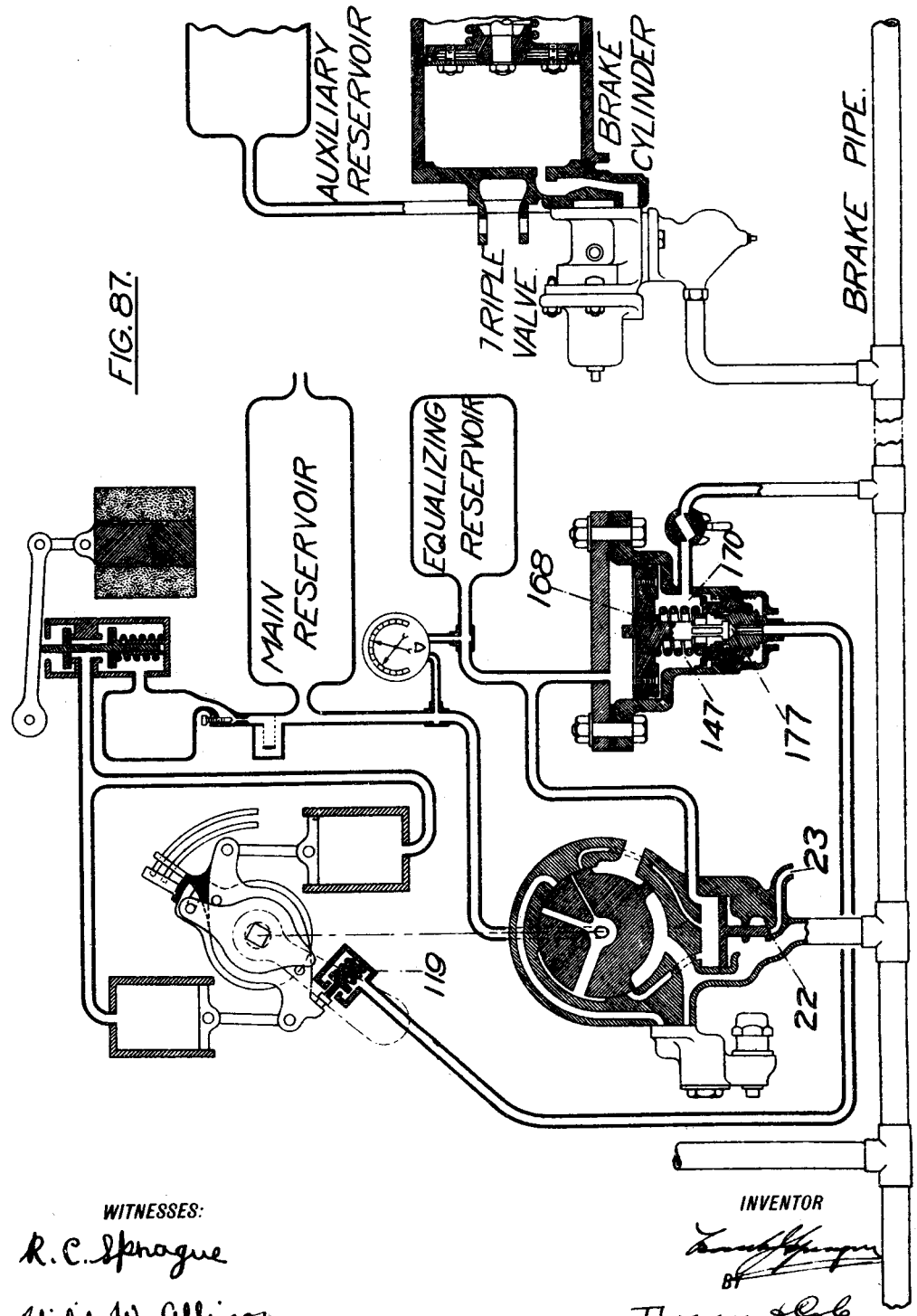

Figures 85, 86 and 87 are views which have the same relation to Fig. 84 that Figs. 2, 3 and 4 have to Fig. 1.

Figure 88:
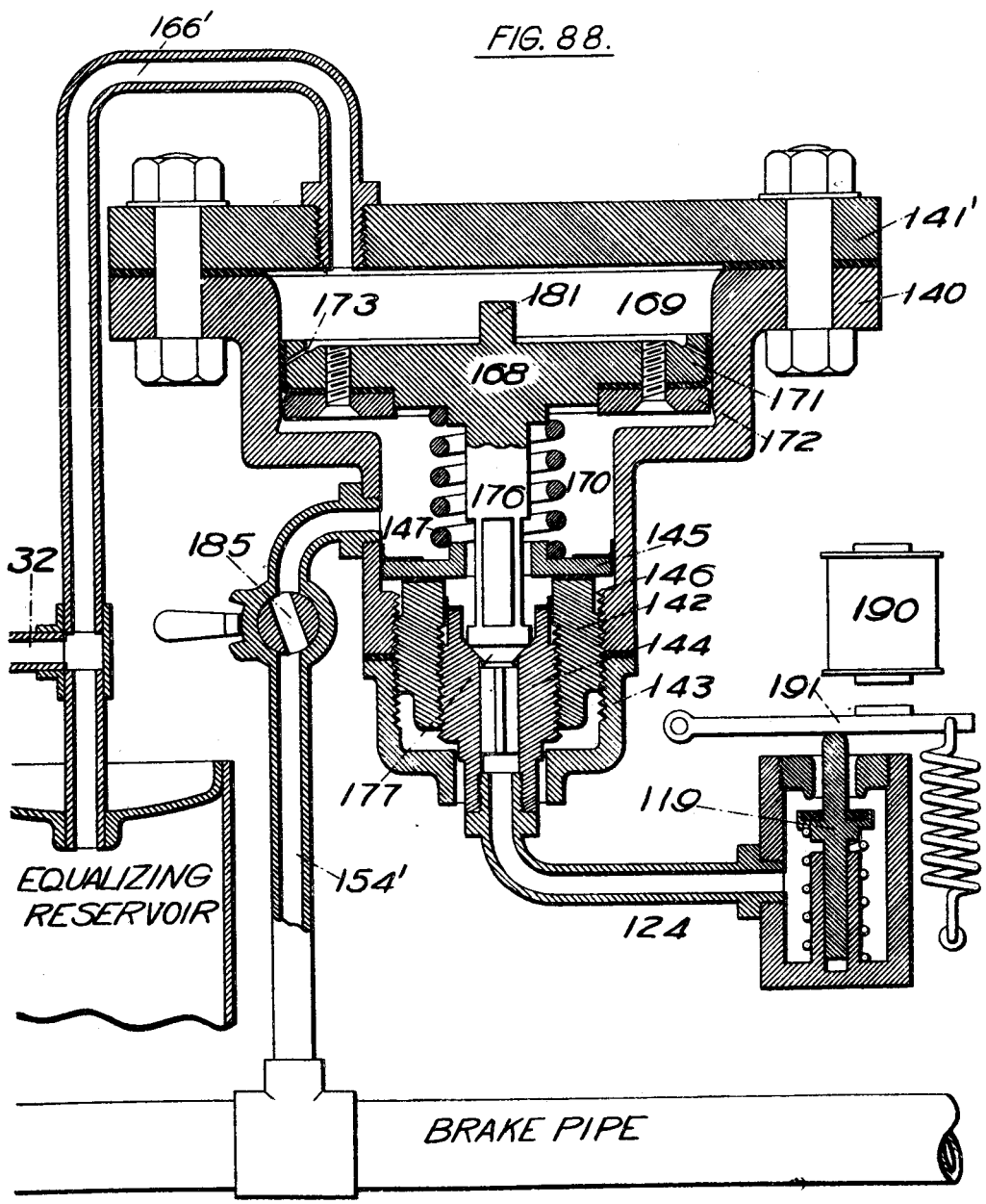
Figure 89:
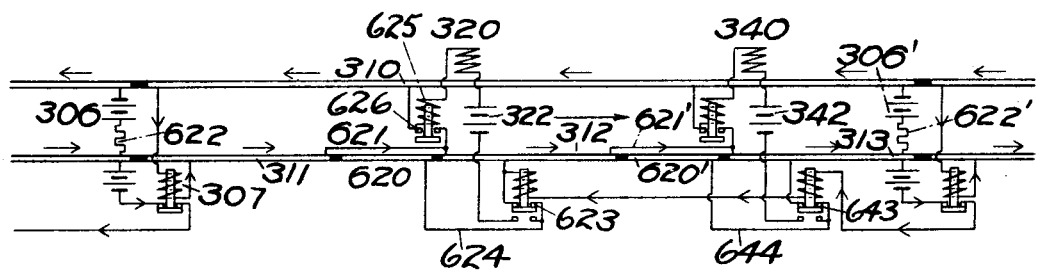

Figure 88 is an enlarged central section through the automatic service brake valve shown in Figs. 85 to 87 and its associated pilot valve.

Figures 89 to 94 are diagrams similar to Figs. 26 to 31 inclusive, but showing the control of track magnet excitation by what is known herein as the "insulated rail" method.

Figures 95 and 96 are diagrams showing the control of track magnet excitation from the advance block alone.

Figures 97, 98 and 99 are diagrams showing the joint control of track magnet excitation from the home and the advance blocks, by the use of two signal track relays.

Figure 100 is a diagram similar to Fig. 56, but illustrating a form of my invention in which the electrical impulse on the locomotive is controlled from the track by a contact rail, the current being supplied by a battery on the vehicle.

Figures 101 and 102 are diagrammatic views showing track circuit conditions with the arrangement of the track system shown in Fig. 100.

Figure 103 is a diagram similar to Fig. 56 and showing a system similar to that in Fig. 100 except that the current is derived from a battery along the track.

Figures 104 and 105 are diagrammatic views having the same relation to Fig. 103 that Figs. 101 and 102 have to Fig. 100.

Figure 106 is a diagram similar to Fig. 56, but showing a form of the invention in which the impulse is conductively imparted to the vehicle through the track rails.

Figures 107, 108 and 109 are diagrammatic views of still another method of conductively imparting the impulse to the vehicle from the track rails.

Figures 110 to 115 inclusive are diagrams representing different arrangements of track magnets and co-operating impulse receivers and circuits controlled thereby which are included within my invention.

Figure 116:
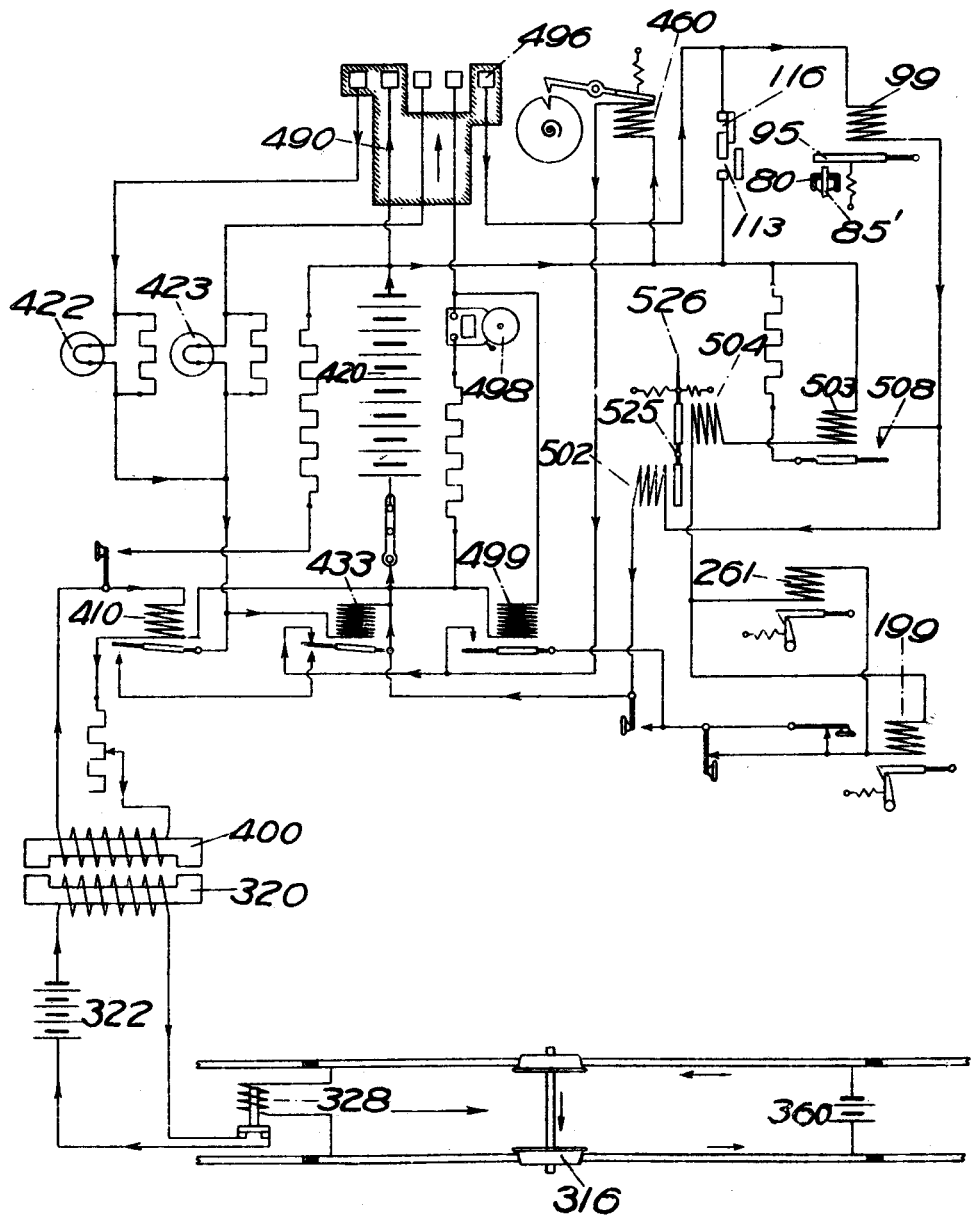

Figure 116 is a view similar to Fig. 56, but showing the control circuit for the controlling valve as arranged on a closed circuit.

*Details of automatic brake system*

The automatic brake system, with my additions, is shown in part in Figs. 1 to 20 inclusive. Considerable parts of these are repetitions in respect to their showing of the automatic brake system, and Figs. 1, 2, 8 and 9 can conveniently be considered in the following brief description of the parts illustrated and of their operation. Referring to Fig. 1, the main reservoir has a pipe connection 2 through which air is delivered into it and compressed therein by an automatically pressure-controlled pump, not shown. On the opposite side of the main reservoir is a pipe connection 3 which leads from the main reservoir into pipe 4, which communicates with a passageway 5 in the engineer's brake valve leading to chamber 6 in the top thereof (see Fig. 8). In actual construction of a portion of a standard G-6 engineer's brake valve, together with my additions thereto, is illustrated in Fig. 8 wherein the rotary valve 7 rests on its seat 8. The casing 9 enclosing the rotary valve and its seat are of standard construction in respect to passageway 5 and chamber 6.

Considering now Fig. 2, the chamber 6 is shown diagrammatically in the center of the rotary valve 7, and the valve seat 8 is shown surrounding the periphery of the rotary element in place of beneath it, the rotary element itself being shown with radiating passages and peripheral cavities in place of the more or less vertical corresponding elements in the physical construction shown in Fig. 8. The valve body 10 (Fig. 2) of the engineer's brake valve contains passageways 11, 12, 13 and 14, and an emergency exhaust port 15, all communicating directly with the seat for the rotary valve 7. In this seat also is chamber 16, which has no communication with the atmosphere except through the rotary valve, and a chamber 17, which is in communication with the atmosphere through the emergency exhaust port 15. The passageways 11 and 12 lead respectively to and from a feed valve 18. In the bottom of the engineer's valve is an equalizing piston chamber 19. Passageways 13 and 14 lead to and from this chamber respectively at the top thereof. This chamber also at its top is provided with a port 20, and the bounding walls of the chamber constitute a cylinder within which reciprocates an equalizing piston 21. The equalizing piston carries a service exhaust valve 22 which opens and closes a service exhaust port 23 leading to atmosphere on the one side, and communicating with a passageway 24 leading to the under side of the equalizing piston 21 and connecting also with the passageway 12 to the valve and to the brake pipe.

Still considering Fig. 2, the rotary valve 7 has three passageways 26, 27 and 28 radiating from chamber 6, and two cavities 29 and 30 on its periphery. Port 20 is the port by which communication is made between the equalizing piston chamber 19 and an equalizing reservoir by means of a pipe 32. The brake pipe is connected with a triple valve by means of a pipe connection 35, and the triple valve is in turn connected with an auxiliary reservoir and a brake cylinder by means of port 39.

The triple valve is the connecting link between the brake pipe, the auxiliary reservoir, the brake cylinder and free atmosphere. Its general construction and operation are well known to those versed in the science of braking, and hence no detailed description of its construction is given here, and only a brief reference will be made to its operation.

The spring retracted piston of a brake cylinder is shown at 40, this being the piston which forces the brake shoes against the car wheels, through the foundation gear of the brake rigging, not shown. A duplex air gauge 33 above referred to is suitably connected with the main reservoir through a branch from pipe 4 and with the equalizing reservoir through a branch from pipe 32.

The rotary valve 7 is manipulated by means of a spindle 42 (see Figs. 8 and 9), and while this is shown as adapted for use in my invention, it is practically identical with the spindle of the ordinary automatic brake system. The engineer's handle 43 attached to the top of the spindle is the same as that used in the ordinary automatic brake system.

Considering the ordinary practice and operation recited above with reference more especially to Figs. 2 to 7, the five positions of the G–6 engineer's brake valve—running, lap, service, emergency and release, are indicated, as follows:

*Running position.*—In Fig. 2 the rotary valve 7 is shown diagrammatically in running position. The passageway 26 of the rotary element registers with the blind chamber 16 and is blanketed. The passageway 28 is also blanketed; but the passageway 27 registers with the passageway 11 in the valve body, and thus permits a flow of air from the main reservoir into the feed valve 18, and thence into the brake pipe through the passageways 12 and 24. The passageway 12 is in communication with the passageway 13 through the cavity 29, thus permitting air from the feed valve to flow into the equalizing piston chamber 19 and thence into the equalizing reservoir. The passageway 14 and the emergency port 15 are both blanketed. The same pressure is then maintained in the equalizing piston chamber and the equalizing reservoir as in the brake pipe and beneath the equalizing piston 21, and the service exhaust valve 22 is maintained in its downward position, closing the service port 23. No air escapes from the brake pipe and the brakes are free.

*Lap position.*—In Figs. 3 and 4 the rotary valve is shown diagrammatically in lap position. The passageway 26 registers only with the blind chamber 16 and is blanketed; the passageways 27 and 28 are both blanketed. The passageways 11, 13 and 14, and the emergency exhaust port 15 are also blanketed. There is, therefore, no flow of air from the main reservoir into the brake pipe or the equalizing piston chamber either directly or through the valve feed, and no flow of air from the equalizing piston chamber. On coming to lap from service position, the service exhaust valve 22, on equalization of pressure due to the drop of pressure in the brake pipe, is moved downward from the position it has at the commencement of the lap position of the engineer's valve (see Fig. 3) by its weight and a slight excess of total pressure of air above the equalizing piston, closing the service exhaust port 23 (see Fig. 4), and after closing, it remains closed as long as lap position is maintained; in coming to lap position from running position the service port 23 is already closed.

*Service position.*—Service position is indicated in Fig. 6, which shows the rotary valve rotated further counter-clockwise until the passageway 14 registers with the cavity 30. The passageway 26 registers with the blind cavity 16 and is still blanketed. The passageways 27 and 28 also remain blanketed. As in lap position, the main reservoir is thus cut off from the feed valve, brake pipe, equalizing piston chamber 19 and the equalizing reservoir. The passageway 13 is also blanketed and since the cavity 30 registers both with the passageway 14 and the emergency port 15, the equalizing piston chamber and the equalizing reservoir are opened to atmosphere. Service position is normally reached from or through lap position, i. e., a position in which service exhaust port 23 is closed.

When the engineer makes a service application, he reduces the pressure in the equalizing reservoir and the equalizing piston chamber by the number of pounds which he wishes to reduce in the brake pipe, which reduction of pressure will be indicated by one of the hands of the duplex air gauge 33, that hand being black in ordinary practice. As the pressure is reduced in the equalizing piston chamber, the air pressure in the brake pipe, acting on the under side of the equalizing piston raises it together with the service exhaust valve 22, and opens the service exhaust port 23 to atmosphere, allowing the air to escape therethrough from the brake pipe. The rapidity with which the equalizing piston is thus raised depends upon the rapidity with which the differential between the pressure on top of the equalizing piston and on the bottom of the equalizing piston is made. So long as the equalizing reservoir and the equalizing piston chamber are open to atmosphere by the rotary valve being maintained in service position the service exhaust port 23 will be held open, provided there is sufficient pressure in the brake pipe to maintain the equalizing piston in its upward position. The resulting drop of pressure in the brake pipe effects a movement of the triple valve to close the opening of the brake cylinder to atmosphere and places the brake cylinder into connection with the auxiliary reservoir so that pressure air therefrom enters the brake cylinder and moves its piston to apply the brakes with increasing pressure. This may continue until what is called the point of equalization is reached, that is, when the air in the brake cylinder and in the auxiliary reservoir is at the same pressure. In ordinary operation, however, the desired service braking is effected before the point of equalization is reached. When the reduction desired in brake pipe pressure has been indicated by the gauge connected with the equalizing piston chamber and the equalizing reservoir, the engineer normally moves his handle into lap position. The passageway 14 having been closed by doing so and further escape of air from the equalizing piston chamber and the equalizing reservoir thus prevented, the pressure of the air in the equalizing reservoir will be exerted on the top of the equalizing piston, and, as soon as the pressure of air from the brake pipe on the under side of the equalizing piston is reduced to the same pressure as that in the equalizing reservoir, or to a negligible fraction less, will force it downward and the service exhaust valve 22 will close the service exhaust port 23. Therefore the reduction of air pressure in the equalizing reservoir, primarily made by putting the rotary valve in service position, is a measure of the reduction which subsequently follows in the brake pipe. The time which it will take for this reduction depends upon the amount of opening of the service port and the length of train, that is, the capacity of brake pipe which has to be exhausted and the opening afforded for such exhaust.

As the pressure in the brake pipe is reduced as above stated for a service application, following a like reduction in the equalizing reservoir, the triple valve, because of an unequilibrium of air pressures established between the auxiliary reservoir and the brake pipe, which are normally the same, automatically cuts off the connections with the brake cylinder to free air and opens it to the auxiliary reservoir. The air from this reservoir rushes into the brake cylinder at a rate and to an amount dependent upon the rate and amount of pressure reduction in the brake pipe, and when the pressure in the auxiliary reservoir falls slightly below that in the brake pipe the triple valve cuts off further supply of air to the brake cylinder. A further reduction of brake pipe pressure is followed by a further discharge of air into the brake cylinder, which operation can be continued until a full service application is made, when the air pressures in the auxiliary reservoir and the brake cylinder are equalized.

While in lap position after having made a service application, there being no port open by which air can enter or leave the brake pipe, the brakes will normally remain applied under this pressure until they have been released either by leakage, or by moving the rotary valve ordinarily into release (or possibly running) position, or until additional pressure has been applied to them by again moving the rotary valve to service or emergency position.

*Emergency position*:—The emergency position of the rotary valve is illustrated in Fig. 7. This is the extreme braking position of the valve, and it is only possible to come to it from or through service position by moving the rotary valve counter-clockwise from the latter. This leaves the ports in the rotary valve still blanketed, although in a slightly different position, so that there is still no flow of pressure air into the brake pipe and the main reservoir is not bled. The emergency exhaust port 15 is connected through the cavity 29 with the passageway 12, so that a free passage is open from the brake pipe to atmosphere. The exhaust port 15 is also connected by the chamber 17 and the cavity 30 with the passageways 14 and 11. This results in relieving the pressure on the top of the equalizing piston and prevents a possible jamming of the service exhaust valve.

As above indicated, although the brake pipe is open directly to atmosphere, and a large opening afforded for the escape of air from the brake pipe, movement of the rotary valve will not always insure an emergency application. If the movement is made when the pressure in the brake pipe system is normal or slightly under normal, the drop in pressure therein will be sufficiently sudden for the auxiliary reservoirs to move the triple valves into emergency position and a resultant emergency application of the brakes will occur, for not only will the full measure of air in the auxiliary reservoir be available, but an increase of pressure from air drawn from the brake pipes; but if the pressure in the brake pipe line is considerably under normal, as for example, when the rotary valve is moved into emergency position from a substantial service application of the brakes before recharging, then the drop in pressure in the brake pipe may not be sufficiently sudden to move the triple valve into emergency position, and only a full service application of the brakes may occur.

*Release position.*—The release position of the rotary valve is illustrated in Fig. 5. After the brakes have been applied it is only possible to come to release position from or through running position, by moving the rotary valve clockwise until passageway 11 is blanketed and air from the main reservoir is prevented from flowing into the feed valve; passageway 26 and cavity 29 both register with chamber 16, cavity 29 also registers with passageways 13 and 12, and passageway 27 registers with passageway 14. Air thus flows freely from the main reservoir through passageways 13 and 14 to the equalizing piston chamber 19 and thence to the equalizing reservoir, and through passageways 12 and 24 into the brake pipe, recharging both the equalizing reservoir and the brake pipe. This causes the triple valves to close the connections between the auxiliary reservoirs and brake cylinders and open the brake cylinders to atmosphere thereby releasing the brakes, and also to connect the brake pipe with the auxiliary reservoir to recharge the same. On going to release position the service exhaust port 23 is normally closed by the service exhaust valve 22, as above set forth, and it remains closed, for any differential of pressure which may exist in that position with respect to the equalizing piston is in favor of the top of the piston. The passageway 28 registers with the emergency port 15, and a small amount of air from the main reservoir escapes therethrough with a hissing noise, warning the engineer not to overcharge the system. By watching the black hand of the duplex air gauge the engineer can determine the increasing pressure in the brake pipe system, while retaining the rotary valve in release position, and when the desired pressure is registered return the rotary valve to running position.

Release and running positions may be regarded as charging positions, in that in both of them the main reservoir is either directly, or indirectly through the feed valve, in communication with the brake pipe and a transfer of air takes place from the former to the latter to create or maintain therein the proper pressure. In a like manner, service and emergency positions are both braking positions, in that they cause a reduction of brake pipe pressure.

The construction, function and operation of the triple valves in controlling the application and release of the brakes and of the feed valves in maintaining the differential of pressure between the main reservoir and brake pipe system are in no way changed or affected by the application of my invention; and the function and operation of the engineer's brake valve in manually applying and releasing the brakes when no automatic action occurs are likewise in no way changed or affected by the application of my invention; and the details of these elements are not further illustrated or described herein, as their action is well known.

I have illustrated my invention as superimposed upon the automatic air brake system just described, and as acting through that system in applying the brakes. As illustrated, the rotary valve casing 9 which is substituted for the upper valve body of the ordinary engineer's valve contains means which normally operate on the spindle 42 to rotate the spindle and its attached rotary valve 7, preferably into lap position, this being supplemental to the engineer's handle. In Figs. 1 to 4 and 8 to 11, this valve casing also contains means for effecting the initial outlet of air which operates an automatic service brake valve, which in turn effects the desired drop of pressure in the brake pipe, by reducing the pressure in the equalizing reservoir and the equalizing piston chamber, to cause the equalizing piston 21 to raise and open the service exhaust port 23, while air imprisoned in a capacity tank at brake pipe pressure is made use of to effect the closing of the automatic service valve. For the purpose of making automatic emergency application of the brakes, I have illustrated my invention by showing means for directly opening the brake pipe to atmosphere, the rotary valve having first been automatically rotated into lap position. In Figs. 84 to 87, the air imprisoned in the equalizing reservoir is used to close the automatic valve. In Figs. 18 and 88 are shown electrical means outside of the engineer's valve for opening the path to free air, and these figures also show on a large scale the details of two forms of automatic valves. The attachment to the engineer's brake valve (called herein the engineer's automatic valve head) and the automatic service valve illustrated in the first group of figures above named, together with a complete system of operating them on a double track railroad in connection with a block signal system in common use, as indicated diagrammatically in Fig. 1, will now be considered.

*Engineer's automatic valve head*

The engineer's automatic valve head, while maintaining in all respects the normal function of the engineer's valve through the movement of the rotary valve therein by the engineer's handle to the various positions of release, running, lap, service, and emergency, provides in addition for the automatic service application of the brakes through the agency of a supplementary brake valve in such a manner as to duplicate as far as is practical the action of the engineer in making service application, while at the same time leaving him free to make further service or emergency applications, or under certain conditions to release his brakes, or to anticipate possible automatic braking by proper manual brakings. It is electrically controlled and mechanically as well as manually operated, and maintains the rotary valve in lap position during both automatic service and emergency applications, so that no air escapes from the main reservoir or enters the brake pipe system therefrom. This device, being interchangeable with the upper valve body of the ordinary engineer's valve, is consequently located in the engineer's cab. While its normal function is as stated above, it in no way prevents the making of manual brake applications through the engineer's valve.

*Construction.*—The construction of this valve head can conveniently be understood by referring to Figs. 8 to 17 in connection with Fig. 1.

Casing 9 is a flanged cylindrical casting interchangeably bolted to the lower valve body 10 of the engineer's valve. It is partitioned horizontally, and the lower portion constitutes a cylindrical recess, forming the chamber 6 and constituting a cover for the rotary valve 7. The upper portion of the casing comprises an irregular recess with a detachable cover 60, which may be secured in place in any appropriate manner. The valve stem 42 of the rotary valve passes through the partition, which, at this point, is made in the form of and constitutes a bushing 61; thence through an aperture in the cover 60, above which the ordinary brake handle 43 is attached to the stem in the same manner as in the ordinary engineer's valve. The exterior of casing 9 is provided with a notched sector 62, which has the same relative position in respect to the rotary valve and brake handle as in the ordinary engineer's valve.

Cast integral with or fastened to the upper portion of the casing 9, are two motor cylinders 68 and 68', oppositely disposed, but with axes parallel to each other. These cylinders are closed at their outer ends but open at the inner ends, and within them reciprocate suitably packed trunk pistons 69 and 69' respectively, joined by connecting rods 70 and 70' to a driving yoke 71 which is rotatively mounted on bushing 61. Pins 72, 72' project upwardly from the driving yoke and engage the driven yoke 73, which is squared upon the rotary valve stem above the bushing 61 and rotates the valve stem, and with it the engineer's brake handle and rotary valve counter-clockwise when driven by the pins 72, 72'. The driving yoke 71 is provided with an adjustable stop 74, cooperating with a fixed shoulder 74', adjusted so that the limit of counter-clockwise motion of the driving yoke places the driven yoke in lap position (see Fig. 10); but because the driving yoke engages the driven yoke on one side only the rotary valve is free to be moved manually, through its spindle and the engineer's brake handle, to service or emergency position as may be desired. The motor cylinders and pistons are of such a size that, while the rotary valve is moved to lap position and maintained there during automatic service or emergency braking, it is not done so with such force as to render it impracticable for the engineer to manually move the rotary valve (carrying with it the two yokes) into either release or running position should he so desire, so that the action of the motor cylinders is subordinated to this manual operation.

The motor cylinders are pneumatically connected behind their respective pistons by pipes 75 and 75', which connect through a three-way coupling with a pipe 76 leading to a controlling valve 80, through which provision is made to connect the motor cylinders either with atmosphere direct through the upper part of the valve, or to pressure air through the lower part of the valve, supplied through a pipe 89, a throttling valve 90 and a pipe 91 leading from the throttling valve to the chamber 6, as is shown in Figs. 8 and 9. In other figures the pipe 91 is directly connected with the pipe 4, a strainer 88 is interposed on one side of the throttle and a capacity chamber 89' on the other side.

The construction of the controlling valve 80 is illustrated in Fig. 12. It consists of a double-faced section 81 with a connection 82 from its center to pipe 76. In this section are centered two suitably faced poppet valves 83 and 84 which are oppositely disposed, and whose valve stems, passing through guiding apertures in section 81, are in contact at their ends, which are rounded. The lower of these valves 84 is normally held against its valve seat 84' by a spring 85, reinforced by air pressure when the system is charged, and hence is normally closed; and in this position it lifts the upper poppet valve 83 from its seat 83' and raises plunger 85'. The contacting faces of the upper valve 83 and its plunger are also rounded. Conversely, when the upper poppet valve 83 is pressed downward by the plunger 85' against its valve seat 83' and is closed, the lower poppet valve is forced downward into its guide 86 and is opened. Both valves are enclosed in housings, in the upper of which provision is made for exit to atmosphere through ports 87, 87, and with the lower of which the throttling valve 90, and any capacity pipe or chamber if needed, is conveniently connected, as by pipe 89. To permit free circulation of air when the valves are open their stems are flattened on three sides, as indicated and the valves fit loosely in their respective housings.

The controlling valve, therefore, comprises in brief two oppositely disposed poppet valves, arranged in tandem, one of which is normally open and the other of which is normally closed. The rounded surface of the valve stems above mentioned eliminates possible improper seating of the valve faces. The position of the valve shown in Fig. 12 is its running position, i. e., the valve is in readiness for operation to admit pressure air to the motor cylinders for an automatic application of the brakes. When at rest no air from the main reservoir passes through the valve to the motor cylinders 68 and 68′ but air from the motor cylinders is allowed free escape to atmosphere past the poppet valve 83 through the ports 87, 87. When the automatic braking is initiated the poppet valves are moved from their upper or running position to their lower position, and the passageway from pipe 76 to atmosphere is then closed so that no air escapes from the motor cylinders, but air at main reservoir pressure is admitted to the motor cylinders through the open poppet valve 84.

The throttling valve 90, which is also illustrated in Fig. 12 as an adjustable needle valve, governs the rate of supply of pressure air from the chamber 6 to the controlling valve, and thence to the motor cylinders.

In Figs. 1 to 4, the pipe 89 is illustrated as being enlarged, forming a capacity reservoir 89′. This capacity reservoir merely assures ample volume of air to act on the pistons 69 and 69′ when the controlling valve 80 is thrown from normal to braking position, so as to promptly overcome the locking of the engineer's handle on the sector notches. It permits a more liberal opening of the throttle valve without the danger of throwing the rotary valve past lap position.

A strainer or dust separator 88 should be provided in the air line preceding the throttling valve 90. This is indicated diagrammatically in Fig. 1.

An arm 95 lies over the plunger 85′ of the controlling valve and has one end pivotally mounted at 95′ to the casing 9, and its other end is pivotally and adjustably attached to an armature 96 through a link 97 and a screw piece 98. The armature is actuated downward by a solenoid 99 which, as illustrated in Figs. 8 and 9, is rigidly mounted in the upper portion of the casing 9; but the armature is normally held up in the position illustrated in Fig. 12 by the spring 85 of the controlling valve, reinforced by air pressure when the system is charged. While thus shown as an integral part of the engineer's brake head, it is evident that this pilot valve with its magnet control can constitute a separate piece of apparatus, and also that it can be arranged to operate on a closed instead of an open circuit method.

Three terminals 101, 102, and 103 are mounted on an insulating block 104 contained in the upper portion of the casing 9; two of these terminals 101 and 102 are electrically connected in a battery circuit in a manner later to be described. Two copper strips 105 and 105′ are also mounted upon this insulating block and vertically disposed thereon. The coil of the solenoid 99 is electrically connested between the battery lead terminal 101 and copper strip 105′, the other of the strips being electrically connected with the other battery lead terminal 102. Consequently when the strips are bridged and there is a difference of potential between the terminals 101 and 102, the solenoid will be energized, its armature drawn downward and the controlling valve moved from inert free air (upper) position to active power supply (lower) position, and there maintained until the solenoid is de-energized, when it is returned to running position and raises the armature as above described.

On the same bushing 61 which carries the driving yoke 71, and below it, is rotatively mounted a slack-motion switch comprising a sleeved arm 110, having a slot 111 in which engages a pin 112 carried by and projecting downward from the driven yoke 73. At the outer end of the arm is an insulated section carrying two independent spring contacts 113, 113′, electrically connected and lying in a vertical plane. These spring contacts, for a certain arc of movement, press upon the copper strips 105, 105′, and constitute the means of bridging them, and thereby completing the solenoid control circuit.

The length and position of the copper strips is such that when the engineer's brake handle has been placed in release position they are bridged by spring contacts 113, 113′, and that this bridging will continue during counter-clockwise movement of the slack motion switch by the brake handle until the brake handle has reached a position between lap and service position.

The length of the slack-motion switch slot 111 illustrated is such that the engaging pin 112 has free movement therein through a distance equal to its travel in moving the engineer's brake handle from running to lap position, but no further.

The copper strips 105, 105′ are, therefore, always bridged by spring contacts 113, 113′ in manual release and running position, but never in service or emergency positions. They are bridged in lap position when that position is approached from release or running positions, but not when approached from emergency or service positions.

Figure 10:
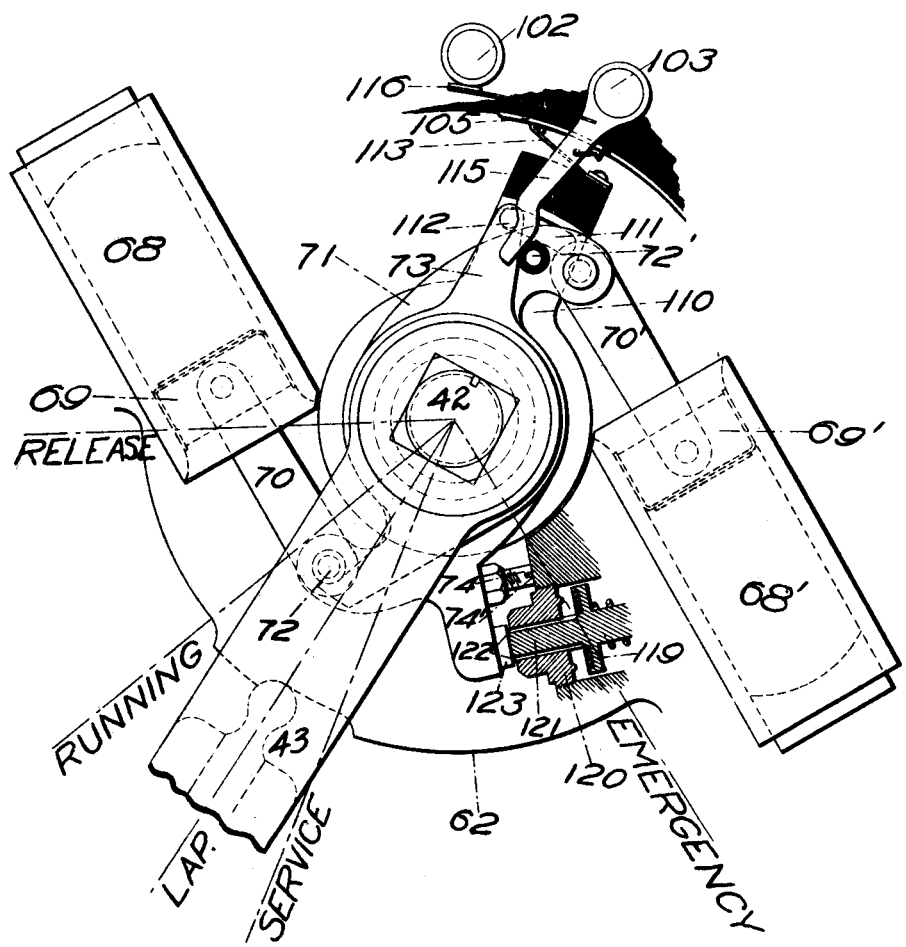
Figures 10 and 11 are fragmental but corresponding views, the valve in Fig. 10 being shown in lap position, and its pneumatic actuator energized, while in Fig. 11 the valve has been manually thereafter placed in emergency position.

The third of the terminals 103 is electrically connected with the copper strip 105′ with which the solenoid coil is connected. Rotatably mounted upon this terminal, and electrically connected with it, is a spring retracted arm 115 carrying a spring contact 116, which is normally out of contact with terminal 102 as illustrated in Fig. 9. The upper portion of pin 72' is covered with insulation, and arm 115 lies in its forward path of motion; when struck thereby it presses its spring contact 116 against terminal 102 and constitutes a second means of completing the circuit through the solenoid. Its closing position is illustrated in Fig. 10, where the position of the parts is such that the bridging of the copper strips 105, 105' by spring contacts 113, 113' has not been broken at the time contact is made between the spring contact 116 and the terminal 102, while in Fig. 11 the solenoid circuit is only completed through the spring contact 116 and terminal 102.

It will be noted that the closure of the cricuit by the follow-up spring contact 116 can be effected only by the movement of the driving yoke under air pressure to put the valve in lap position; and that this closure is maintained throughout all movement of the engineer's valve to service or emergency position after it has been automatically thrown to lap position.

In addition to the function of the driving yoke 71 above described, it has the further function of opening a pilot valve to atmosphere which brings into play the automatic service brake valve. This pilot valve 119 which is illustrated as a suitably faced spring closed poppet valve seats against its head 120, which is adjustably secured into the upper portion of the casing 9 adjacent to the stationary portion of the stop 74, 74' to permit regulation of the extent of valve opening. Its stem 121 passes through a guiding aperture at its head, and to assure a free passage of air when the valve is open, is flattened on three sides as indicated at 122, 122. It is in the line of forward travel of a lug 123 carried on the driving yoke 71, by which means the pilot valve is opened. In this connection the stop 74, 74' has the additional function to that above mentioned of preventing the jamming of the pilot valve head 120 by receiving the thrust from the driving yoke 71; see Figs. 10 and 11. The chamber of the pilot valve connects with what is herein termed the automatic service brake valve by means of a pipe 124. The pilot valve is so positioned and adjusted that when the driving yoke completes the movement of the rotary valve to lap position, it opens the pilot valve the desired amount to effect the operation of the automatic service brake valve, and so that any appreciable clockwise movement of the driving yoke from its then position, as for example when the engineer's handle is moved from lap position towards running and release positions, permits the valve to close instantly under its own pressure.

*Operation.*—Considering the operation of the engineer's automatic valve head, in Fig. 9, where all the parts are shown in running position, the pins 72, 72' of the driving yoke are shown out of contact with the radial arms of the driven yoke 73. If the engineer's handle is moved clockwise to release position then these radial arms will engage the pins of the driving yoke; so the latter, as shown, is in an inert position, and where it would be thrown when going to release from any advance position, the pistons 69, 69' being in their rearward position in readiness for a pneumatic drive. Due to the single direction drive, the pistons and driving yoke are not moved by counter-clockwise motion of the brake handle. Therefore, when the parts of the engineer's automatic valve head are free from automatic action the engineer has the entire sweep of his sector, and can with perfect freedom and without interference manipulate his brake handle, and apply and release his brakes in the ordinary manner.

Automatic service application of the brakes is normally initiated when the parts are in the position shown in Fig. 9, that is, with the engineer's valve in running position. Assuming the parts in that position, with the local gap in the solenoid control circuit completed by the bridging contacts 113, 113', if the circuit is exteriorly energized, as is the case when and at the time that the brakes are to be automatically applied, the armature 96 will be drawn downward into the solenoid and place the controlling valve 80 in its power supplying position by means of the operating arm 95; pressure air will then be admitted through the controlling valve, as above described, into the motor cylinders 68, 68', and will thrust the pistons outward and rotate the driving yoke 71 counter-clockwise. The pins 72, 72' on the driving yoke will then engage and rotate the radial arms of the driven yoke, which in turn will move the rotary valve to lap position, and, through its downwardly projecting pin 112, will advance the loose motion switch bridging contacts 113, 113' toward the end of the copper strips 105, 105' into the position illustrated in Fig. 10; the driving yoke will also, by means of the insulated portion of its upstanding pin 72', move the spring retracted arm 115 around so that its contacting spring 116 will press against the binding post 102, and make the follow-up circuit of the solenoid; and finally the driving yoke at the limit of its motion will open a normally closed pilot valve 119, which is in series with a normally open valve 177 (see Figs. 2, 3, and 4) in the automatic service brake valve, later to be described. The opening of the pilot valve at once starts the operation of the automatic service valve, which, in turn, automatically effects whatever automatic service application of the brakes may be decided upon.

The motion of the engineer's handle and rotary valve is opposed by two forces, one, the friction and compression of the spring tongue in the engineer's handle on the notched sector 62, which may be considered about the same, whatever the air pressure, and the other, the friction of the rotary valve on its face and of the rotary valve spindle aganist its air seat, which friction will vary about directly as the air pressure. These forces are to be taken into consideration in adjusting the throttling valve 90, the adjustment of which should be such that while the rotary valve is automatically moved to lap position, it is not done so with such a speed that its momentum carries it beyond that position.

When the solenoid circuit is de-energized exteriorly to the engineer's automatic valve head, as will be seen to be the case, the armature 96 is relieved from magnetic pull and is raised to its free position by the controlling valve 80, which then cuts off pressure air from the motor cylinders and opens them to atmosphere in the manner above described. But this causes no movement of the rotary valve from its then lap position, and consequently the brakes, once automatically applied, are held so until manually released by the engineer's brake handle being moved ordinarily into release position. This not only releases the brakes, but restores the motor pistons and driving yoke to the position illustrated in Fig. 9, in readiness for a second automatic service application.

An automatic operation of the parts of the engineer's automatic valve head is under certain circumstances effected by manual movement of the engineer's valve handle. While a manual movement to service position has no effect upon the driving yoke or pistons when the parts are in running position, such a movement does cause a movement of the slack motion switch arm 110, as has been heretofore stated. If the manual movement, counterclockwise, of the rotary valve is sufficient, that is, if it is moved to either service or emergency position, the driven yoke, by means of its engaging pin 112 will carry the slack motion switch 110 an angular distance sufficient to open the bridging contact at 113, and therefore the control circuit at that point; but if the handle be then moved back to lap position the slack motion switch will remain unmoved, leaving the control circuit still open. But if the handle be moved to running or release position the engaging pin 112 will move the slack motion switch 110 clockwise so that the bridging contacts are again closed, and if the handle be now moved to lap position the slack motion switch will remain unmoved and the control circuit still closed.

In short, the slack motion switch can be left in two positions with the same position of the engineer's handle, and likewise the engineer's handle can be left in two positions with respect to the same position of the slack motion switch.

Assuming that prior to the energizing of the solenoid circuit the engineer makes a service application of the brakes from release or running position, the slack-motion switch will be moved so that it breaks its bridging contact with the copper strips 105, 105', and if the engineer's handle is now moved back to lap position there will be no movement of the slack-motion switch, and the bridging contact will remain open, while, if the engineer's handle is pushed further back, say, to running position or beyond, the bridging contact will be again closed. If then, the engineer's handle is returned to lap position the bridging contact will remain closed instead of being open as it is when the engineer's handle is moved from service into the same lap position; in short, as above stated, the position of the slack-motion switch, and the opening or closing of the bridging contact at lap position depends upon whether the lap position is approached from the service or the running position, in other words, upon the intent and action of the engineer.

Since this breaking of the bridging contact opens the solenoid circuit, it follows that if, prior to the energization of the solenoid, the engineer's handle be moved to service and then to lap position, as will be the case when the engineer makes a service application of the brakes and holds the brakes applied, the possibility of primary automatic service operation is for the time being cut off. The solenoid circuit in this case cannot be completed by means of the spring contact 116, because such a contact is only effected by a forward movement of the pistons 69, 69' through the driving yoke pin 72', which movement is prevented by the failure of the spring contacts 113, 113' to bridge the copper strips. If, however, the engineer's handle be moved to running position or release position, and is then restored to the same position of lap with the intention of preventing automatic operation, the spring contacts 113, 113' will bridge the copper strips, complete the solenoid circuit in respect to the engineer's automatic valve head, and an automatic service application will take place if the solenoid circuit is alive unless the pistons 69, 69' are forcibly held back against their pneumatic thrust.

Furthermore, the co-operation of the follow-up contact 116 and the spring contacts 113, 113' operated by the slack-motion switch, insures that when the engineer's valve has been thrown to lap position by the closure of the controlling circuit external to the head of the engineer's valve and the consequent energization of the solenoid 99, such circuit will be maintained closed within the valve head, so that as long as the external closure persists, and despite any manual movement of the valve by the engineer, the solenoid 99 will be energized and pressure air be admitted to the trunk cylinders, tending to hold the engineer's valve in lap position.

Thus after the solenoid 99 has been energized, and during the completion of its circuit exterior to the automatic valve head, the engineer cannot by any manual movement of the valve kill the tendency of the pneumatic pistons to throw the engineer's valve to lap position and open the pilot valve 119. Thus should he, within the period stated, throw his valve to running or release position, it will be necessary for him to maintain pressure on his handle in order to hold it in such position, and this, regardless of any movement that he may make of his valve prior to putting it in such running or release position.

Consequently, prior to automatic emergency application of the brakes, a matter later to be considered, if the engineer has received a cab signal indicating that a service application of the brakes should be made, and that at a predetermined time thereafter the solenoid circuit will be energized exteriorly to the engineer's automatic valve head, he can manually and in a normal way apply the brakes and hold them, and can repeat this application and holding at will, without the action of the automatic thereon. He has full control of his train in a normal way so long as he controls it in the right way, but if he disregards the cab signal he can only defeat automatic service application by forcibly preventing or restraining the pnuematic thrust of the motor pistons.

An automatic service application of the brakes will occur in the manner above described, also when the engineer's handle is in release position, unless restrained, for the copper strips 105, 105' are then bridged in the same manner as in the running position. It will not occur when the brake handle is in service or emergency position, because the copper strips are not bridged in these positions. But here the engineer is taking care of his train and automatic application is not desired.

Figure 11:
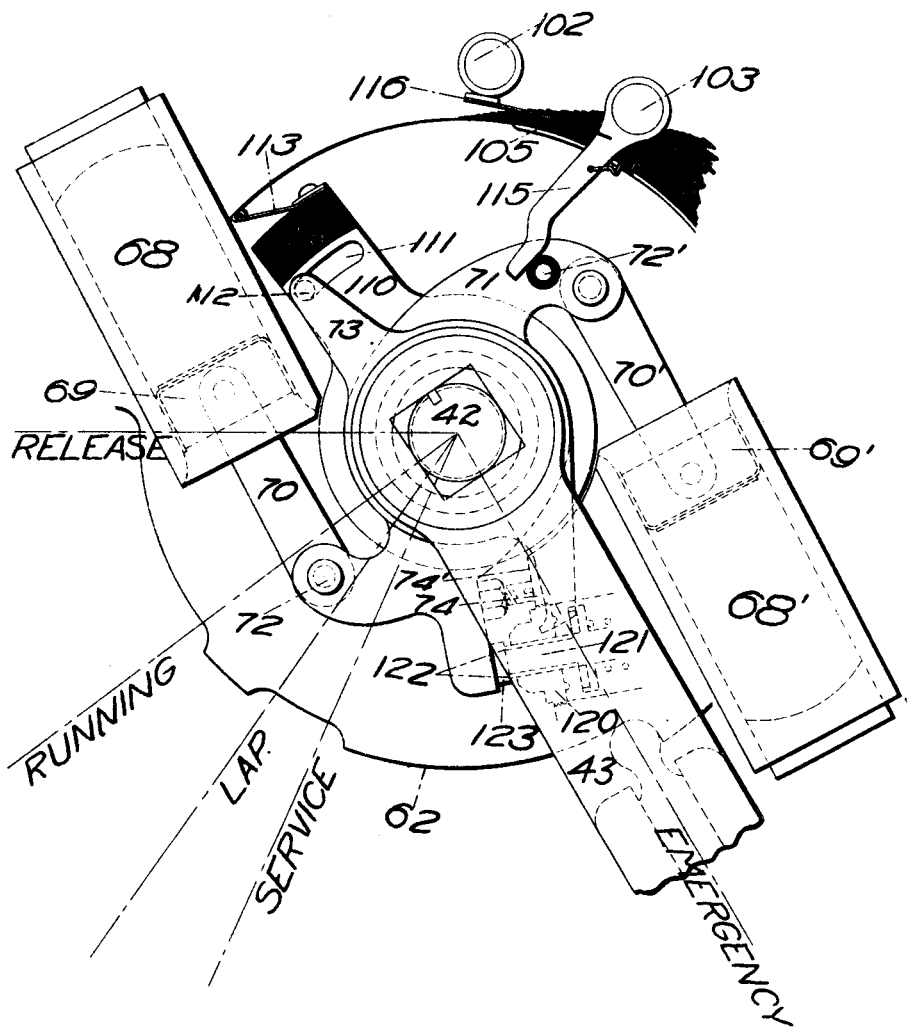

The engineer can at all times, and regardless of the position of the parts of the engineer's automatic valve head, move his handle into emergency position and make an emergency application of the brakes in the normal way, with perfect freedom and without interference, and he can likewise make a service application of the brakes in addition to and during automatic service application should he so desire; see Figs. 9 to 11.

In Fig. 18 a method of operating the pilot valve 119 is illustrated differing from the one already described through the agency of the driving yoke 71. A solenoid 190 operates a spring retracted armature 191 which is pivoted above the valve stem 121 and held out of operative contact therewith by the solenoid when alive, but when dead the tension of its spring holds the valve 119 open. This solenoid can be connected in any well known and convenient manner in a circuit which is preferably broken when the circuit of the solenoid 99 of the engineer's automatic valve head is completed, and made when the last named circuit is broken. This method, an electrical closed circuit one, assures an identical operation of the pilot valve with the method first described, and in the further discussion of my system the method first described, unless otherwise specified, is the one to be referred to.

Automatic service brake valve

It has been explained that this valve is brought into operation by the opening of the pilot valve 119 of the engineer's automatic valve head. The form now to be considered produces the same operation of the equalizing piston and its service exhaust valve 22 as is the case when a manual service braking is made. It contains means by which the amount of service braking can be adjusted and predetermined, and it is provided with adjustable means for governing the rate of equalizing reservoir or brake pipe discharge, and thereby the rate of making the service braking. It therefore practically simulates manual service braking in all particulars, and is adaptable to different conditions in any one service, freight or passenger, while at the same time permitting the locomotive to be shifted from one service to another.

*Construction.*—The construction of this valve can conveniently be understood by referring to Figs. 2 to 4 and 18, together with Fig. 1.

The body of the valve comprises a hollow flanged cylindrical casing 140, covered with a face plate 141 suitably attached thereon in a manner to afford an air tight joint. A compression regulating sleeve 142 is screwed into the lower and reduced part of the valve body and projects beneath it, and a protecting cap 143 is screwed on to the projecting portion so as to make an airtight joint with the lower end of the valve body, packing being provided for this purpose. On the inner side of the compression regulating sleeve, and in a manner to insure an airtight joint, is screwed a main valve seat plug 144, which is centrally bored and through an opening in the protecting cap connects directly with the pipe 124 leading to the pilot valve 119 of the engineer's automatic valve head. This construction permits the compression regulating sleeve and main valve seat plug to be moved for purposes of adjustment independently of each other.

Above the compression regulating sleeve and normally carried thereby is a centrally apertured movable disk 145, which fits loosely in the lower part of the valve body, and the downward travel of which is limited by an annular flange 146 when the compression regulating sleeve 142 is unscrewed to such a position that its top is below the said flange. Two concentric helical springs, the outside one 147, a regulating one, being heavy, and the inside one 148, a return spring, being relatively light, are supported by the movable disk 145 and the main valve seat plug 144 respectively.

In the upper part of the reduced portion of the valve body is screwed a limiting sleeve 149, the interior of which is machined and provided at the top with an annular flange 150. A reciprocating collar 151, which is exteriorly machined, is mounted to reciprocate in the said sleeve. It is expanded at the bottom to engage the annular flange 150 and be arrested thereby in the upper limit of its travel. This reciprocating collar, has on the inside an annular flange 152, and near its top, which projects above the reduced part of the valve body a short distance in the upper and larger part thereof, is provided a series of air apertures 153, 153. The regulating spring 147 abuts against the flange 152 and normally maintains the reciprocating collar in its upward position, its larger expanded portion then engaging the flange of the limiting sleeve.

The lower reduced portion of the valve body also has a pipe connection 154, which connects through pipe 32 with the equalizing chamber of the engineer's valve and the equalizing reservoir.

The face plate 141 covering the valve body has a vertical central aperture 158, and attached to its top above and in communication with the aperture is a supply valve casing 159. The casing is provided with a suitable valve seat 160 for a suitably faced and guided spring-pressed poppet supply valve 161. This valve, which is normally open, has a downwardly projecting extension 162, and the casing 159 is in air communication with the brake pipe by means of a pipe 163.

In the upper and larger part of the valve body is a piston 168 which divides the interior of the valve body into an upper chamber 169 and a lower chamber 170 varying in size with the position of the piston. Ample storage capacity should be given to the upper chamber. In the construction shown in the figures now under consideration this is accomplished by using a capacity reservoir 165 which is in air communication with that chamber by means of a pipe 166. A series of air channels 164, 164 connects the central aperture 158 with the upper chamber 169.

The piston is provided with a leather cap packing 171 held thereto by a ring 172 and forced against the walls of the valve body by pressure air admitted through a series of apertures 173, 173 which lead from the upper chamber through the periphery of the piston.

Projecting downward from the lower side of the piston, and centrally thereof, is an extended valve rod 176, which carries the main or operating valve 177 of this portion of the apparatus. This valve which is normally open, has a conical face and seats against the plug 144 held by the compression regulating sleeve. The valve rod extends through the regulating and return springs vertically, and extends into and is guided by the main valve seat plug 144. The portion of the rod which passes through these guides is flattened on three sides to afford a free passage of air at these points.

Projecting upward from the upper side of the piston, and centrally therein, is an extension 180 formed with a suitably faced annular stop flange 181, and provided at the top with an adjusting screw 182. The stop flange normally abuts against the under side of the face plate inside the openings of the air channels 164, 164 in a position not to close them, and limits the upward travel of the piston. There is always a free passageway for brake pipe air, therefore, from the supply valve, if open, to and from the capacity reservoir, and the latter is then normally maintained at brake pipe pressure. The adjustable screw normally impinges against the supply valve extension 162 and holds the valve open, but it is so adjusted as to permit the valve to close under its own spring pressure at the beginning of the down stroke of the piston, which motion thereby imprisons the air in the upper chamber and the capacity reservoir.

Considering now the condition when the brake pipe system is charged, the engineer's valve at running position, and the piston 168 at its upper limit of movement, as in Fig. 2, instead of at the bottom, as in Figs. 4 and 18, there exists in the chambers above and below the piston 168 in the brake pipe connection 163, in the capacity reservoir 165, in the connection 124 to the pilot valve 119 and in the equalizing reservoir, like equalizing reservoir and brake pipe pressures. In an apparatus which was actually built and embodied the construction of Figure 18, with an assumed brake pipe pressure of seventy pounds, the piston 168 had about 650 pounds of opposing air pressures on the two sides of the piston. The regulating spring 147 is stopped against the reciprocating collar 151, which is against the shoulder of the limiting sleeve 150, the upper end of the latter being now clear of the piston, and hence this spring exerts no upward pressure on the latter. The piston is therefore in a state of balance as regards air pressures, and is held up by the return spring 148, which is supported by the main valve seat plug 144 and abuts against the lower side of the piston. It possesses slightly more than sufficient strength, under equal pressure conditions, to move the piston to the upper limit of motion, against the weight and friction thereof, with sufficient push to lift the supply valve 161 against its spring and maintain an open air passage.

The top of the reciprocating collar 151, when the latter is in its upward position, is in such a relative position with the bottom of the piston that the piston will strike it and partially compress the regulating spring 147 before the main valve 177 closes; but not until the supply valve 161 has closed. This regulating spring 147 is of such strength and character that when the piston 168 rests on the reciprocating collar 151, and the supporting movable disk 145 rests on the annular flange 146, it, together with the return spring 148, will, when the piston is in such a position as to close the main valve 177, exert an upward pressure upon the piston equal to the product of the area of the piston and the minimum drop of pressure desired in the brake pipe; and that when its full compressing adjustment has been made by means of the compression regulating sleeve 142, it, together with the return spring, will exert a pressure on the piston equal to the product of the area of the piston and the maximum reduction of air pressure permissible in the brake pipe for service application.

The capacity reservoir is illustrated as of a volume much larger than that of the upper chamber 169, so that the total possible movement of the piston will have but small effect on the entire space volume, and in effect, gives a practically constant driving power variable only with the brake pipe pressure at the moment when automatic operation begins.

A regulating valve 185 is located in the pipe connection 154 between the lower chamber 170 and the equalizing reservoir. This regulating valve affords a variable opening for air passage into the lower chamber 170, but is stop-limited in movement so that it cannot be entirely closed. In its maximum opening position the passageway for air through it into the lower chamber is preferably somewhat less than the passageway for air out of the lower chamber through the main valve 177, the connecting pipe 124 and the pilot valve 119 when both the main valve and pilot valve are open.

*Operation.*—In considering the operation of the automatic service brake valve, it must be borne in mind that in the ordinary automatic air brake system the air pressure in the brake pipe and in the equalizing piston chamber and in the equalizing reservoir is the same when the engineer's handle is at running position, and that when a service application of the brakes is made the air pressure in the equalizing piston chamber and the equalizing reservoir starts to drop before the pressure in the brake pipe drops. Also, that on recharging, the equalizing piston chamber and the equalizing reservoir are fed co-temporaneously with the brake pipe, and for practical purposes increases in pressure can be considered alike, although that in the equalizing reservoir will be somewhat in advance of that in the brake pipe.

In running position, the pilot valve 119 being then closed and the supply valve 161 open, the pressure of air in the upper chamber 169 and the capacity reservoir 165 will be the same as the pressure of air in the lower chamber 170, for the upper chamber and capacity reservoir are in communication with the brake pipe, and the lower chamber is in communication with the equalizing piston chamber and the equalizing reservoir; see Fig. 2. And this will be so regardless of what the air pressure is. So far as air pressure alone is concerned, the piston 168 would remain in whatever position in its line of travel it happened to be, but its weight overcoming the friction of its bearing face on the lower valve body would cause it to assume the lower limit of its travel. This tendency is overcome by the return spring 148, which determines its above stated normal position as being in the upward limit of its travel with the stop flange 181 in contact with the face plate 141 and the supply valve and main valve both open.

As stated in the discussion of the engineer's automatic valve head, the opening of the pilot valve 119 starts the operation of this automatic service brake valve. With the parts in the position illustrated in Fig. 2, assume that the pilot valve is opened by the automatic movement of the engineer's valve to lap position in the manner described in the discussion of the engineer's automatic valve head; an air passage is at once opened from the equalizing piston chamber 19 and the equalizing reservoir through connecting pipes 32 and 154, through the lower chamber 170 past the main valve 177, through the connecting pipe 124 and past the pilot valve 119 to atmosphere. This reduces the pressure in the equalizing piston chamber and the equalizing reservoir, and the equalizing piston is raised, opening the service exhaust valve 22 and permitting the brake pipe to be exhausted therethrough the same as when a manual service application of the brakes is made. The path of exhaust from the equalizing piston chamber and the equalizing reservoir is different from, though parallel to the exhaust path in manual application, but the application of the brakes is identical with the manual application.

The first effect of opening the pilot valve upon the automatic service brake valve is a sudden drop of pressure in the lower chamber 170. This is assured by the air path out of the chamber being made slightly larger than the air path into it. This sudden drop of pressure beneath the piston 168 is not followed by a corresponding drop in the chamber above it, for, as just stated, the equalizing piston chamber and equalizing reservoir pressure drops before the brake pipe pressure. The resultant greater pressure on the upper side of the piston causes an immediate drop of the piston, which results in the closing of the supply valve 161 and the imprisoning of air in the upper chamber and capacity reservoir at the initial brake pipe pressure.

Assuming that the pilot valve 119 is still open, the piston will continue its downward travel against the pressure of the return spring 148, will come in contact with the reciprocating collar 151, and through it will compress the regulating spring 147 until it forces the main valve 177 against its seating plug 144, which will occur when the predetermined drop in pressure has occurred in the equalizing piston chamber and equalizing reservoir. This shuts off further escape of air from the equalizing piston chamber and the equalizing reservoir, and the equalizing piston will, upon the predetermined drop of pressure occurring in the brake pipe, travel downward and close the service exhaust valve in precisely the same manner as though the air exhaust from the equalizing piston chamber and the equalizing reservoir had been cut off manually, and with identically the same resultant action on the brake pipe pressure and brake application.

The drop in brake pipe pressure, therefore, is totally independent of its original running pressure. It is the difference in the air pressures in the upper and lower chambers in the automatic service brake valve at the time of closing the main valve 177, plus the minor element of the active gravitational pressure of the piston 168; and the aggregate of this difference in pressure is equal to the amount of pressure of the regulating and return springs exerted on the piston at the time of closing the main valve 177. Within minimum and maximum limits, the compression of the regulating spring can be adjusted by means of raising or lowering the compression regulating sleeve 142, and consequently the desired drop in brake pipe pressure can be thus predetermined. In making this adjustment care should be taken to retain the main valve seat plug 144 in its original position, for once that has been adjusted in respect to the main valve its adjustment should not be disturbed. This can be accomplished as indicated in the above discussion of the construction.

In order to govern the rate of brake pipe discharge, as is done by the engineer in manually manipulating the rotary valve, the regulating valve 185 has been introduced. The time required for brake pipe reduction, while dependent, with any given set of the regulating valve, upon the length of train and other variable external conditions, is, under fixed conditions determined by the amount of opening of the regulating valve, the smaller the opening the slower being the brake application. Knowing the conditions, the rate of automatic service brake application can be properly predetermined by setting the regulating valve at the required opening, between its maximum and minimum limits.

The parts are restored to their running position upon the manual release of the brakes and recharge of the brake pipe, equalizing piston chamber and equalizing reservoir. When this is initiated, it has been seen that the pilot valve 119 at once closes and is restored to normal position. This shuts off the possibility of the escape of air through the automatic service brake valve.

On recharging the system, pressure air enters the lower chamber 170 from the equalizing piston chamber, through the connecting pipes 32 and 154. This pressure air, co-operating with the regulating and return springs, exerts a greater pressure on the lower side of the automatic service brake valve piston than the pressure above it, and causes it to rise and open the main valve 177. As the air pressure in the lower chamber is increased the piston continues on its upward travel, leaves the reciprocating collar and its regulating spring, and when the combined pressure of the return spring and the pressure air in the lower chamber exceeds the pressure of the imprisoned air above the piston sufficiently to overcome the weight of the piston and the friction of its bearing faces, the piston takes its upward position and opens the valve 161. Thus all the parts are restored to their running position, and equalization of air pressures takes place, upon the basis of the then brake pipe pressure, in the two chambers, the capacity reservoir, and in the brake pipe system.

Normally, this new pressure will sooner or later be about that existing prior to the automatic brake application. The air will flow in one direction or another according to the then momentarily possible difference in pressures, but eventually uniformity of pressure will be established.

It is possible, however, in recharging, that the pressure in the brake pipe system, and hence in the equalizing reservoir and the lower chamber of the automatic service brake valve, may not, either immediately or under some conditions for some time, be the same as that which is imprisoned in the upper chamber and the capacity reservoir at the beginning of the recharging operation. If it exceeds it the upper movement of the piston will be quick, and there will be practically an immediate equalization of air pressure in the upper chamber and the capacity reservoir with that in the brake pipe; but if it is less, then the action will not be so prompt, and with the double spring construction shown, the regulating spring being cut out of action at the limit of its travel, the return spring may be sluggish in opening the supply valve 161; hence the return spring should have some excess capacity. In fact, the return spring 148, the reciprocating collar 151, and the limiting sleeve 149 are not essential to this form of automatic service brake valve provided the outlet from the lower chamber is of sufficiently greater capacity than the inlet, in order that there be satisfactory movement, and automatic application and re-positioning of the parts.

The limit of minimum reduction in the compression of the regulating spring above referred to prevents its compression being reduced to such an extent that automatic action would be practically negligible. This spring cannot be so adjusted that the train will run unbraked through zones where automatic service braking is provided for.

Likewise, the limit of minimum opening of the regulating valve prevents the automatic service brake valve being cut out and assures an outlet therethrough as described.

Consequently, the engineer can only forestall automatic braking by attending to his duties as indicated in the consideration of the engineer's automatic valve head.

It is obvious that as the operation of this valve is initiated solely by the operation of the pilot valve it in no way interferes with the manual operation of the brakes, as considered in the discussion of the engineer's automatic valve-head; furthermore, that the operation of the automatic service brake valve is independent of the method by which the pilot valve is opened, whether mechanically or electrically, or in any other way.

It should be noted that the path for air exhaust from the equalizing piston chamber of the engineer's valve and the equalizing reservoir connected with it, for automatic operation, is in parallel with, but independent of the corresponding air exhaust path in the engineer's valve; also that this automatic exit has two valves in series, the one nearest the equalizing reservoir being normally open, while that at the far end is normally closed, these conditions being reversed at the end of the movement. It is to be further noted that the operation of both of these valves is automatic, both as regards their opening and closing.

While I have described the closing of the automatic service brake valve as being effected by air at brake pipe pressure imprisoned at the beginning of automatic operation I do not limit myself to this specific method.

Instead of using the imprisoned air for a driving force on top of piston 168, an adjustable spring 167, as shown in the modified form of automatic service brake valve of this type in Fig. 18ª, can be used, the regulating and return springs with their adjusting features, and of course the supply valve and connections, being omitted. This would be satisfactory provided there were a constancy of brake pipe pressure at the time of possible automatic operation. For many reasons the normal brake pipe pressure, say 70 lbs. on some equipment and 110 lbs. on others, while usually obtaining because of the automatic operation of the feed valve, often varies. For example, in recharging the engineer may raise the brake pipe pressure above standard, or fall short of it, and there is always the possibility of irregular pump governor and feed valve actions, to say nothing of the ever present and varying leakages in the brake pipe system.

For satisfactory operation there should preferably be a basic pressure from which to work on top of the piston, inasmuch as it is desired to effect controllable reductions of air pressure, and this basic pressure should preferably at all times correspond to the actual brake pipe pressure existing at the moment of initiation of automatic operation.

It will be noted that, as is well known, the braking action caused by the triple valve varies with the difference, and the rate at which it is created, between the pressure existing in the brake pipe at the commencement of the brake applying movements (which will be called the initial pressure) and that existing in the brake pipe as a consequence and result of these movements; further, that the peculiar action of the triple valve renders the brake cylinder pressure in a sense independent of the initial brake pipe pressure; for that action is such that a given number of pounds reduction in the brake pipe will give practically the same brake cylinder pressure irrespective of ordinary differences in the brake pipe pressure at the moment of application. This action is of course based on the normal condition of substantial equilibrium between the pressures in the auxiliary reservoirs and the brake pipe. When such is the case it makes no difference whether, for example, a 20 lbs. reduction is made from 100 lbs. brake pipe pressure or from, for example, a 70 lb. brake pipe pressure, for the brake cylinder pressures, i. e., the braking effort, will be the same.

Thus, to secure the desired brake application, it is important that the reduction of brake pipe pressure be not to a definite pressure, or be an amount proportionate to the initial pressure, but that the reduction be a definite amount, irrespective of what the initial pressure may have been, and effected at such a rate as to be properly effective. The valve shown in Fig. 18ª will not cause definite amounts of reduction under varying initial pressures, but simply reductions to definite pressures.

The use of air at brake pipe pressure imprisoned at the moment of operation establishes at all times this basic pressure, and insures the possibility of perfectly definite air reductions, controllable as to rate and amount. Should a spring be used for the motive power, it would be necessary to provide a constant change in its adjustment at any moment to make it correspond to the actual existing brake pipe pressure, which is manifestly impracticable, for if left to a fixed adjustment, say corresponding to a 70 pound brake pipe pressure, and if for any reason such pressure at the moment of automatic operation should be, say 5 pounds above or below the normal 70 pounds, then, instead of, say, perhaps an intended reduction of 10 pounds being gotten, as would be insured with the brake pipe pressure air as a motive power, we would have a reduction of 15 or 5 pounds, depending upon whether the brake pipe pressure was 5 pounds above or below the normal.

From the above it will be seen that the service exhaust valve as embodied in the described standard type of apparatus is the means for effecting the measured service application of the brakes, and that the action of this valve is dependent upon a difference between the brake pipe pressure and a controlling air pressure as the latter may exist in the equalizing piston chamber and the equalizing reservoir, the valve causing a drop of pressure in the brake pipe to follow a drop of pressure therein. It will also be noted that the engineer's valve in the standard type of apparatus causes drops of controlling pressure of amounts variable at the will of the engineer upon successive brake applications. It will also be noted that the automatic service reductions before described, as accomplished by this form of my invention, are also effected through the service exhaust valve, by reductions of pressure of the controlling air, but that the amounts of the successive reductions, while variable by change in adjustment are, with any selected adjustment, of similar value and amounts predetermined by such adjustment. And finally that by this adjustable fixity of drop in brake pipe pressure the definite determination of brake cylinder pressure and therefore the desired measure of braking effort is accomplished irrespective of any ordinary variations in the initial brake pipe pressures.

In the construction above described, the actuation of the automatic valve is a consequence of the energization of the solenoid 99 and of the resultant movement of the controlling valve. It is obvious that the results thus obtained are of value, whatever may be the means employed for closing the circuit of such solenoid or effecting such movement of the controlling valve, and that, therefore, the above described features of my invention are of utility in connection with any approved means for such purpose. The mechanism described, however, has been especially designed for use in connection with means to be hereinafter described for controlling the circuit of the solenoid through and due to train movements.

*Electric secondary exhaust valve: Relief valve*

While it is desirable for the engineer to have control of his train as above described, up to the time when an emergency or full service application of the brakes must, for safety's sake, be made, and while nothing should prevent him from making such further application of the brakes as may be necessary, he should be prevented from ultimately nullifying the results of the automatically made application when such nullification threatens disaster. The electric secondary exhaust valve of my system is constructed and positioned with this in view.

At a convenient place the brake pipe is tapped, and provided with an emergency brake pipe 198 of such size as to afford an exhaust to the brake pipe when open commensurate with the usual practice. Of the drawings now under consideration, see Figs. 1 to 4. Upon the emergency brake pipe 198 is mounted a valve of a type suitable preferably to be opened by some automatic means and to remain open until manually closed. The emergency brake pipe is extended to permit the valve to be placed out of ordinary reach of the engineer, as, for instance, on the outside of the engineer's cab, or in a locked or sealed box access to which is delayable. In Figs. 19 and 20, I have shown a valve appropriate to my purposes illustrated as opened through the agency of a solenoid 199 when energized, the solenoid also conveniently being mounted on the emergency brake pipe. The solenoid is electrically connected in the circuit of a battery through terminals 200 and 201 in a manner later to be described. As shown, it is operated on the open circuit plan, but is readily constructed for closed circuit operation.

The automatic emergency exhaust valve illustrated in these two figures comprises a spring pressed valve 202, provided with suitable guiding means 203, which normally seats against a valve seat 204 illustrated as an integral part of a housing 205. The housing, as shown, is screwed on to the top of the emergency brake pipe, and is open at the top to provide an exhaust therethrough when the valve is open.

Two cylinders 206, 206 are pivoted on a suitably supported bar 207 at the rear of the valve casing, one on each side of it. The cylinders are provided with pistons 208, 208, which are forced toward the rear of the cylinders by suitably backed helical springs 209, 209, which springs are relatively much stronger than the valve seating spring.

The piston rods 210, 210 support at their ends a link 211, upon which is journalled the lower part of the releasing arm 212, suitably pivoted, as on a pivot 213. A releasing pin 214 extends through and is guided by the valve casing, and abuts against the valve 202 in line with its guiding means. The outer end of the releasing pin is in line with the inner side of the releasing arm; and both ends of the releasing pin are beveled.

A locking yoke 216 is pivoted to the valve housing, and is normally held in horizontal position by a spring 217, its stop 218 abutting against an outwardly extending portion of the valve housing. The outward end of the yoke is provided with a roller pin 219, which normally engages the lower inner end of the releasing arm, cut away in the shape of a quadrant for this purpose, and holds the releasing arm against the compression of the helical springs 209, 209 in a position so that insufficient force, if any, is exerted by the releasing arm through the releasing pin 214 to unseat the valve 202. The lower outward end of the releasing arm is bevelled downward toward the inner side thereof.

The solenoid armature 220 is linked with the holding yoke in a manner such that when the solenoid is energized and its armature drawn downward, the holding yoke is moved downward out of engagement with the releasing arm.

A bell crank yoke 221 suitably pivoted, as by the pivot 213, carries at the end of the lower pair of its arms a bar 222 which extends across the inside of the releasing arm. The other pair of arms of the bell crank yoke extend to the rear of the housing where they are united and provided with a handle 223.

The operation of the automatic emergency exhaust valve mechanism is the direct result of energizing the solenoid. The valve is in a normal state of unequilibrium; the helical springs 209, 209 exert a constant pull on the releasing arm which is under a constant tension to open the valve 202.

When the solenoid is energized, its armature 220 draws down the holding yoke 216 and trips off the releasing arm, which, when this occurs, is instantly drawn inward by the compression of the helical springs, its lower outer bevelled face sliding down the inside of the holding pin 219, and plunges the releasing pin 214 against the valve 202 opening the valve wide. The pivotal mounting of the cylinders 206, 206, and the journalling of the releasing arm upon the link 211, permit of this without binding friction. Compression of the helical springs 209, 209 preferably continues even when the pistons 208, 208 have reached the limit of their inward motion, and the valve is thus maintained open. The action takes place regardless of the length of time the solenoid remains energized. A momentary energization sufficient to draw down the armature is all that is necessary to trip off the releasing arm and open the valve. De-energizing the solenoid in no way resets the releasing arm; also, as long as the solenoid remains energized and the holding arm drawn down, the forcing outward of the releasing arm does not reset it, for the instant such force is relaxed it again plunges inward and re-opens the valve. With the valve open, the brake pipe is speedily exhausted and a full service or emergency application of the brakes made, as will be readily understood. Evidently, yoke 221 and arm 212 need not be separately constructed members.

In order to permit the valve to re-seat and close so that the brake pipe system can be recharged and the brakes released, downward pressure is manually exerted on the upper arm of the bell crank, as by handle 223, which swings outward the releasing arm 212, and if the solenoid is de-energized the holding yoke pin 219 slides down the bevelled end of the releasing arm, and under tension of its spring 217 snaps into normal and holding position against the curved inner end of the releasing arm.

In the discussion of the ordinary automatic brake system, it was pointed out that when the rotary valve was moved to the emergency position a path to free atmosphere was provided from the equalizing chamber 19 and the equalizing reservoir, for the purpose of relieving the equalizing piston from an excess downward pressure which might cause the service exhaust valve 22 to jam or stick. I have provided means which take care of these conditions, and which practically parallel the ordinary automatic brake system in this respect.

When the type of automatic service brake valve illustrated in Fig. 18 is used, these means comprise a relief valve connected between the brake pipe system and the equalizing piston chamber and equalizing reservoir. As illustrated in Figs. 1 to 4, the valve body 225 is connected on the one side by a pipe 226 with the riser of the brake pipe, and on the other side by a pipe 227 with the pipe 32 leading to the equalizing piston chamber and reservoir.

The relief valve 228 has a seat of the ordinary form, and opens away from the equalizing reservoir, being normally maintained against its seat 229 by a helical spring 230, the tension of which is regulated by a screw cap 231 so formed as to provide a guide for the valve and a seat for the spring. This spring need only be of sufficient strength to keep the valve closed when air pressures are equal on both sides thereof.

The operation of the valve depends on a differential of air pressures on the two sides thereof. Since, in the running position of the engineer's valve the pressure in the equalizing chamber and reservoir is the same as in the brake pipe, the relief valve 228 will remain closed; and, also, no flow of air will take place through the valve so long as the pressure on the equalizing reservoir side is less than the pressure on the brake pipe side, as is the case both at the moment of beginning manual service and emergency brake applications, as well as when making the automatic service application of the brakes with the form of automatic service brake valve illustrated in Fig. 18; nor, obviously, will any flow of air take place while a service application of the brakes is being held.

When a manual full service or emergency application of the brakes is made the equalizing valve may or may not open, depending on the comparative rate of air pressure reduction in the equalizing chamber and reservoir and in the brake pipe system. If it does open it merely furnishes an additional path of exhaust for brake pipe air, and to that extent accelerates the braking applications; and on recharging its effect whether open or closed is negligible.

It has been seen that when the secondary automatic exhaust valve 202 is opened the service exhaust valve 22 is ordinarily closed; also, that ordinarily the pressure in the equalizing piston chamber and reservoir is either a pressure occasioned by a manual application, or a predetermined pressure caused by the automatic service application, or an amount lower than the last named pressure, occasioned by an additional manual application of the brakes. When the brake pipe is opened through the automatic secondary exhaust valve the brake pipe pressure immediately falls below any of the pressures just mentioned, with the result that the pressure on the brake pipe side of the relief valve is less than that of the equalizing reservoir side, so that the valve opens and remains open until these pressures are nearly equalized. This equalizing of the pressures is paralleled in respect to the equalizing piston, and the service exhaust valve is thereby prevented from jamming or sticking.

It has been seen that ordinary emergency braking occurs by opening a direct path for the exhaust of pressure air from the brake pipe through the emergency exhaust port 15, and under certain conditions also through the service exhaust port 23. Automatic emergency braking, as provided for in my system, therefore, is in parallel relation to ordinary emergency braking in respect to the exhaust itself, and although made with the rotary valve ports in the engineer's valve blanketed, that is, normally in lap position, means are provided for equating the pressure on the two sides of the equalizing piston. The automatic secondary or emergency braking is independent of and in no way interferes with ordinary emergency braking, that is, with the engineer moving the engineer's handle and rotary valve to emergency position, but whether full service or real emergency braking follows depends on the reduction of brake pressure which exists at the time.

The action of this valve may be said to be not only supplementary, but automatically compensatory, for if it comes on when there is no or but little existing brake pipe reduction it gives a full emergency, but if brought into action when there is a marked reduction of air already in effect, the train being then actually under good control, a full service only will result. In short, the severity of the second braking is in a large measure determined by the amount of braking already in force.

*Steam power electric cut-off valve*

As the application of the brakes to a moving train under power, while sufficient to slacken the speed or stop the train as required regardless of whether or not the power is shut off, may be detrimental to the power driving apparatus, especially an electric motor, I have provided means for shutting off the power, which means are illustrated as preferably effective only when the emergency brake impulse is given.

Whatever means are adopted for automatically shutting off the power, before the automatic secondary exhaust valve comes into play the option to cut off the power after automatic cab danger signaling should preferably be left to the engineer, so that after receiving the signals the immediate control of slackening the speed of the train or of stopping the train will altogether remain in his hands. How soon after the signal is given the power is shut off is optional with the road adopting my system, as this feature lends itself to any time relative thereto. Where the action of the power cut-off is delayed until the automatic secondary exhaust valve operates its action should preferably be positive and instantaneous, regardless of what the engineer may previously have done.

There are many devices already developed which can be used, and the one shown in Fig. 1, where the wiring is such that the power is cut off co-temporaneously with the automatic secondary braking, is simply diagrammatically illustrated. The main steam pipe 250 from the boiler is provided with a cut-off valve 254, which has rigidly fastened thereto an operating arm 256 which is under spring tension to close the valve and shut off steam from the cylinders. This operating arm is maintained in an open valve position by a holding arm 257, which is pivoted at one end to a rigid portion of the locomotive in a convenient manner and place, and at the other end to the spring retracted armature 260 of a solenoid 261, which is also fastened to the locomotive in a convenient manner and place. A tooth 264 on the holding arm engages the operating arm when the armature is in its outward and upward position, and is the immediate means of retaining the operating arm in open valve position. Leads 266 and 267 from the solenoid are connected in a battery circuit in a manner later to be described.

The operation of the power cut-off is effected by closing the circuit of the solenoid 261 through the immediate agency of the cycle train in a manner later to be considered. The solenoid is normally dead, and so long as it remains dead there is no interference whatever with the handling of the steam by the engineer. When the solenoid is energized the drawing down of the armature swings the holding arm 257 downward, and withdraws the tooth 264 out of contact with the operating arm 256, which, under its spring tension, closes the cut-off valve 254 and thus shuts off steam from the locomotive driving cylinders.

The de-energizing of the solenoid does not effect the opening of the cut-off valve, which remains closed until manually opened; after the solenoid has become de-energized the holding engagement of the operating arm with the tooth of the holding arm has to be manually made, and the parts thus restored to normal open valve position. Obviously, some of the well known methods of unlatching and closing the throttle can be used. This general method of power cut-off is, of course, by no means confined to steam.

From the above it will be seen that automatic service, full service and emergency braking and the cutting off of power are each initiated by the energizing of a solenoid which, as explained in the preamble hereto, is brought about through the agency of the cycle train.

*Track equipment*

With this understanding of the construction and operation of the engineer's automatic valve head, the automatic service brake valve, the automatic secondary exhaust valve and the power cut-off valve, the apparatus for and the method of obtaining impulses from the track, the ultimate result of which is to energize the solenoid 99 of the engineer's automatic valve head, and in turn the solenoid 199 of the automatic secondary exhaust valve and the solenoid 261 of the power cut-off valve, can be approached.

It is obvious that the energizing of the solenoids and the entailed results thereof are independent of the type or character of means by which the electrical impulse is obtained from the track, or by which current is sent through the solenoids as a result of mechanism mechanically operated from the track.

Still confining the consideration to the construction indicated diagrammatically on Fig. 1, the track equipment thereon indicated can well be set forth by the aid of Figs. 21 to 23 and 25 to 31. In these figures I have illustrated as a means of maintaining the track magnet in a normally dead condition an insulated rail joint relay and a line relay on a normally independent closed circuit—a method by which the continuity of the rail circuit is unbroken.

In Figs. 1 and 26 to 31, the train is assumed to be running from left to right. In these figures an automatic signal block herein designated as the "home block" is indicated as lying between insulations 300, 301 and 300', 301'. A portion of the "rear" block is shown at the left of insulations 300, 301, and a portion of the "advance" block is shown at the right of insulations 300', 301'. The home block is typical of the system to be discussed.

The generic track circuit shown is that common to standard automatic railway signaling in its simplest form, in which, when the block is clear a track relay connected across the track rails at its near end is maintained alive by current flowing through the rails from a source at the far end.

The track magnets primarily controlled by the track relay of the advance block may be energized by various combinations of circuits, and for varying lengths of time when compared to the times for which the advance block track relay may be de-energized. Obviously, the shorter the time of track magnet excitation the less the demand upon its supplying battery, but the importance of this fact depends upon the rate of energy actually required for its excitation.

If excited by the "direct" method, that is, by the drop of the advance block signal track relay, as in Figures 95 and 96, evidently the magnet will be energized as long as that relay is de-energized, that is, as long as the danger signal for that block is shown, irrespective of whether or not there is a train in the home block.

By interlocking the advance and home block signal track relays, as in Figs. 97 to 99, the excitation of the track magnet will not take place until, in addition to the train in the advance block, a train enters the home block, but in this and the previous case mentioned both track magnets would be energized for like times, although the distant track magnet will be more frequently used than the home track magnet.

To shorten still further the time and to energize each track magnet independently, not only when there is a train in each block, but also not until the train in the home block is in immediate proximity to a track magnet, there are several methods available, one of which I will term the "bridged rail joint" method, illustrated in Figs. 1 and 26 to 31, and another of which, the "insulated rail" method, illustrated in Figs. 89 to 94; the latter gives the shortest time of excitation.

The "bridged rail joint" method (see Figs. 26 to 31) will now be described, more detailed references to the other methods being reserved till later. In this method the track rail 310 on one side of the home block is unbroken, while that on the other side is broken into sections 311, 312 and 313, by insulated rail joints 302 and 302'; but the first of these insulated joints is bridged by the coil of a relay 303 and the second by the coil of a relay 303', which coils are short-circuited as soon as the forward wheels of the train pass the corresponding joints.

Two signal batteries 306 and 306' are illustrated, the first supplying the rear block and the second the home block. Two signal track relays 307, 307' are also illustrated, the first of these being in the home block and the second in the advance block, these being connected across the rails of their respective blocks in the usual manner. The signal track circuit of the home block, when unoccupied, can then be traced as follows: Starting with the battery 306', through rail section 310, home block signal track relay 307, rail section 311, distant bridging relay 303, rail section 312, home bridging relay 303' and rail section 313 back to the battery.

When the home block is unoccupied, therefore, under normal conditions as in Figs. 26 and 29, the home block signal track relay 307 is energized, and its armature is raised against a pair of contacts 315, later to be referred to. But when the home block is occupied, as in Figs. 27, 28, 30 and 31, the home block signal track relay will be short-circuited, as by car trucks 316, and being thus de-energized its armature will drop away from its contacts. The same is true whatever the cause may be of short-circuiting the relay or of breaking the rail circuit.

The signal track relays, which are here shown as controlling contacts 315 and 315', may be of the type and construction now employed in automatic block signaling systems, and for the purposes of the present discussion, their position and use in said systems are assumed to be in no way changed or interfered with.

Figure 29:
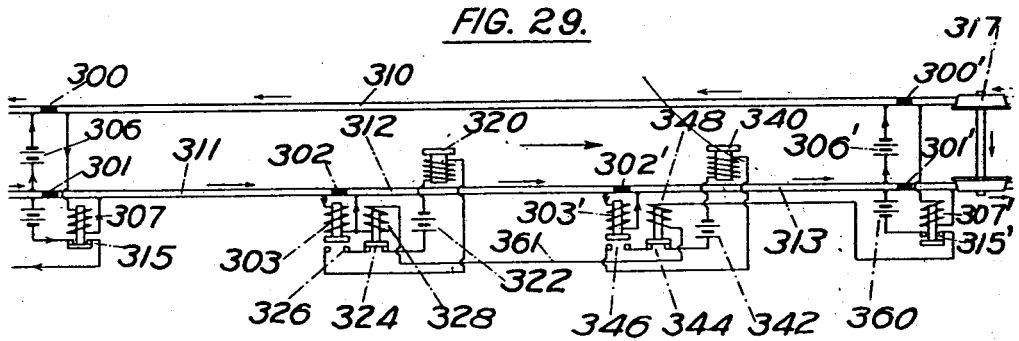

Assuming that the train occupying the home block has passed out of that block into the advance block, leaving the home block unoccupied, as illustrated in Fig. 29, and disregarding for the moment the circuits illustrated as affected by the signal track relays, the circuit at the contacts of the signal track relay 307 is again made, but that at the contacts of the signal track relay 307' is broken. In the ordinary automatic signal system this condition initiates, through the usual secondary apparatus, the display of both danger and caution signals for that advance block, with the maintenance of a caution signal for the block just left and a clear signal for the block preceding it; and so on as the train advances.

A distant track magnet 320 is shown diagrammatically in Figs. 26 to 31, as being located about midway between the rails of the home block a short distance in advance of the insulated rail joint 302. The distance from the advance block should be sufficient to insure stopping under a reasonable service application of brakes. The distant track magnet 320 is included in a circuit comprising a battery 322 and two pairs of contacts in series, which can be bridged by the dropping of the relays 303 and 328 respectively, when both are de-energized, but manifestly if either alone is energized the track magnet circuit is kept open and the track magnet dead.

The home track magnet 340, which should be so located with reference to the advance block as to insure safe stopping under a full service or emergency application, is shown as at a short distance in advance of the insulated rail joint 302'. The same general statement in regard to its position between the rails and its circuit, current supply, and the making and breaking of its circuit apply to the home track magnet as to the distant track magnet, the like parts being identical, the parts of the home track magnet corresponding with those of the distant track magnet being indicated by reference numerals twenty in advance of those of the distant track magnet, except that the home bridging relay is designated by 303'.

To resume, it will be noted that at each rail joint there is a pair of relays, one 303 or 303' of each pair, called the bridging relay, simply independently looping the insulated joint and being in the regular track circuit, in series with the signal track relay of the block, the other of the pair being the relay 328 or 348 just referred to. The last named relays are herein called the line relays and are in series in a line relay circuit including the contacts 315' of the advance block signal relay and a battery 360, and in the form shown, the rail sections 313 and 312, and a suitable aerial line 361, although it is obvious that such circuit may be completed between the parts in any desired manner. It will be seen that it requires the dropping of both a bridging and its corresponding line relay to complete a track magnet circuit.

The line relay circuit of the home block is evidently closed whenever the advance block signal track relay is energized, and is broken whenever it is de-energized; that is to say, the line relay circuit will be opened whenever for any reason the advance block signal track relay is short-circuited from whatever cause.

The opening of the line relay circuit of the home block is coincident with the normal display of caution and danger signals near the beginning of the advance block, but its circuit is entirely independent of the localized circuit causing the display of those signals, so that the breaking thereof is cotemporaneous with the moment when said signals ought normally to be displayed regardless of their actual display.

Considering the operation of this track equipment as a whole, when the line relay circuit is closed the line relays 328 and 348 will open at their respective contacts the circuit of the two track magnets, and while so open the short-circuiting of either of the bridging relays 303 and 303' by passing equipment will be ineffective to complete the circuit of the corresponding track magnet. Such completion of circuit and the consequent energizing of either track magnet is individually dependent, therefore, upon the simultaneous de-energization of its bridging relay and its corresponding line relay.

Figs. 26 to 31 illustrate the conditions of the making and breaking of the track magnet circuits by the presence or absence of trains in the home and advance blocks.

Figure 26:
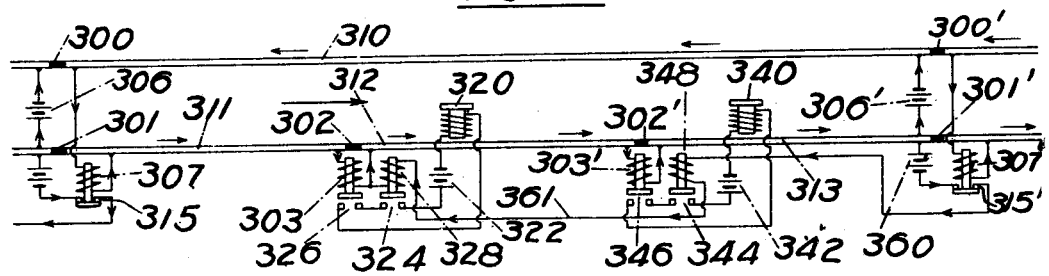

In Fig. 26 both the home block and the advance block are illustrated as unoccupied, the bridging relays and the line relays of the distant track magnet and of the home track magnet are energized, the circuits of the distant track magnet and the home track magnet are both open, and their respective batteries are inactive.

Figure 27:
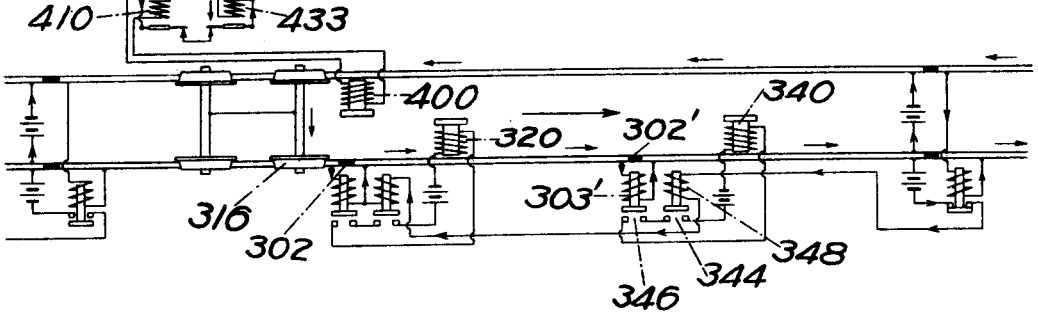

In Fig. 27, the advance block is unoccupied, but a train (indicated by a truck 316) is shown as having entered the home block and traveled therein up to near the first insulated rail joint 302. The same facts in respect to the distant track magnet and the home track magnet of this block and their respective relays and batteries, as stated regarding Fig. 26, are true in respect to this figure.

Figure 28:
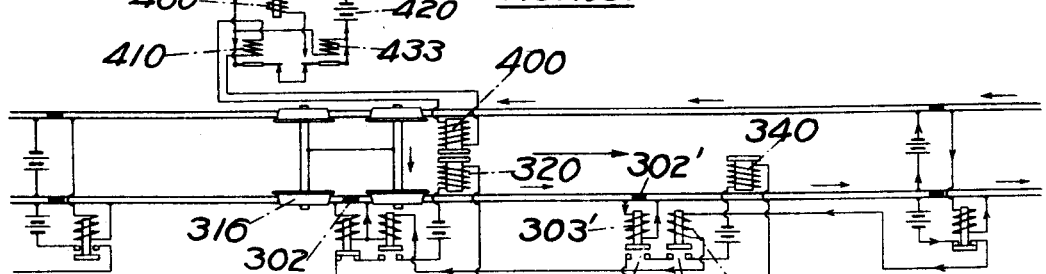

Fig. 28 shows the advance block unoccupied, but with the train of Fig. 27 advanced so that its forward trucks have just passed the first insulated rail joint 302. The truck 316 therefore short-circuits the bridging relay 303, and its armature drops, bridging one pair of contacts; but the line relay 328 is still energized and its contacts open, so that the distant track magnet circuit cannot be made and its battery therefore remains inactive. The home track magnet, its relays and battery remain as in Figs. 26 and 27. When the train passes the joint 302' a dropping of the bridging relay takes place, but the corresponding line relay is still open.

Fig. 29 shows the home block clear, but the advance block occupied by the train (indicated by a truck 317). This train, on entering the block, immediately short-circuits the signal track relay 307', and as a consequence breaks the line relay circuit, de-energizes the line relays and bridges the respective contacts in the track magnet circuits; but these circuits are not completed and their batteries remain inactive, since their respective bridging relays are still energized.

Figure 30:
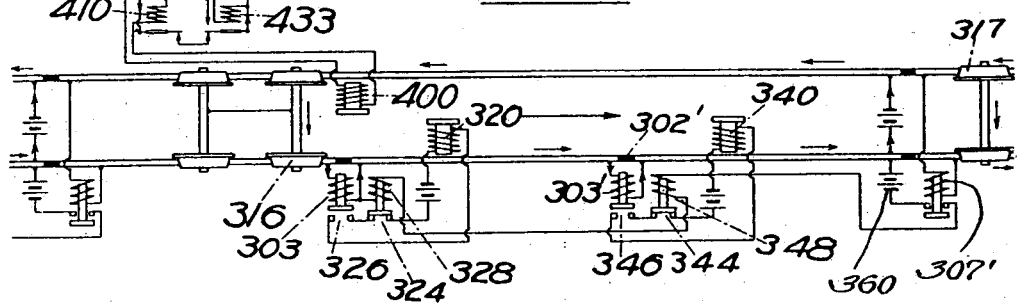

Fig. 30 illustrates the advance block occupied as in Fig. 29, and a following train in the home block progressed into the same position as is illustrated in Fig. 27, i. e., up to the first insulated rail joint 302. The same facts apply in respect to the bridging relays under these conditions as were true in Fig. 27, and consequently the track magnet circuits are still not completed and the batteries are still inactive.

Figure 31:
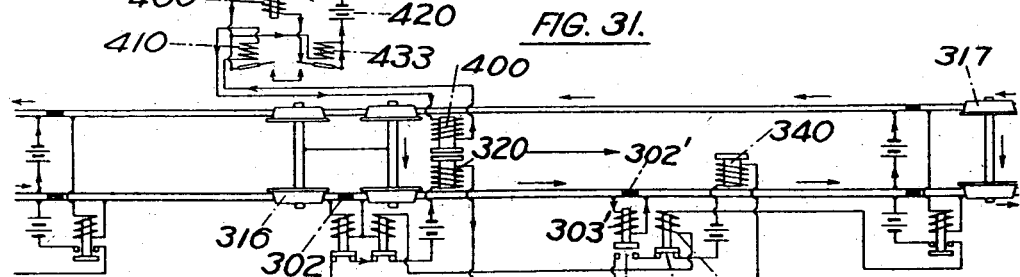

In Fig. 31, the advance block is still occupied as in Figs. 29 and 30. The same facts, therefore, apply in respect to the line relays and the bridging of the track magnet circuits thereby as in the two figures just mentioned. But the train in the home block has advanced to the same position as in Fig. 28, so that the bridging relay 303 of the distant track magnet is short-circuited and its armature bridges the distant track magnet circuit at its contacts. The distant track magnet circuit, therefore, is now completed and its magnet energized; but the home track magnet circuit is not completed and its battery remains inactive, for its bridging relay has not as yet been short-circuited. It will be necessary for the train occupying the home block to have advanced to the same position in respect to the second insulated rail joint 302', as is illustrated in Figs. 28 and 31 in respect to the first insulated rail joint 302, before the bridging relay 303' is de-energized and the track magnet circuit completed.

Thus, in order that a track magnet circuit be completed, a condition must exist in the advance block which results in the de-energization of the advance block signal track relay simultaneously with the short-circuiting of the track magnet bridging relay corresponding to that track magnet, for example, considering the distant track magnet, by the passing of a train across and beyond the first insulated rail joint 302.

There is, therefore, no consumption of current by either track magnet simply because of the presence of a train or other circuit disturbing element in the advance block, or simply because of the presence of a train or other circuit disturbing element in the home block; and the entrance of a train into the home block when there is a train or other circuit disturbing element in the advance block, causes no consumption of current in either track magnet, until the respective insulated rail joints in advance of it have been passed thereby.

In Fig. 1 only the forward portion of the home block is shown, the block being broken away a short distance to the rear of the first insulated rail joint 302. Aside from this the track equipment parts are identical with and in the same position as those illustrated in Fig. 28. The corresponding parts can be traced by their reference numerals.

Considering more fully the actual construction of the track magnets, reference is made to Figs. 21 to 23, and 25 wherein a suggested type of mechanism is shown, certain standard parts, however, being illustrated diagrammatically. These figures illustrate a type of track magnet suitable for all purposes, but here connected up as a distant track magnet with the units and connections illustrated in Figs. 26 to 31. The parts are shown in the positions illustrated in Figs. 26 and 27. One additional element, however, a rheostat 370, is placed in the track magnet circuit, for purposes later to be described.

The track magnet 320 as here illustrated comprises a soft iron core 371 and two triangular pole pieces 372, 372, located one on each end of the core with their faces upward. The core is surrounded with an energizing coil 373.

The track magnet is located in a suitable non-magnetic casing 374, suitably protected by insulating material 375. A ramp 376 is placed in advance of the casing as a protection against dragging equipment (see Fig. 25). In Fig. 21, the casings and insulations are indicated only in phantom. The battery 322, rheostat 370 and bridging and line relays 303 and 328 are protected against weather conditions and improper interference by a suitable housing 378.

The rheostat serves to permit manual regulation of the resistance in the track magnet circuit for the twofold purpose of maintaining a constant current in the track magnet when its circuit is made, should the battery deteriorate, and of adjusting the current supply to the track magnet for purposes of speed limiting control. This is a refinement which in some cases may not be considered essential.

With a view of illustrating the actual location of the track magnets in respect to the advance block, the following illustration of track operation is given, it being understood that no limitation is to be implied therefrom.

A train consisting of a Pacific locomotive, weighing about 200 tons, and 12 steel passenger cars each averaging 60 tons (total weight 920 tons), requires with an "emergency" brake application only about 1750 feet, and with a "full service" brake application, about 2250 feet, in which to stop from a speed of 60 miles per hour on level track under favorable operating conditions. For service of this character, the track magnets will be positioned accordingly.

While the above discussion of the track equipment assumes that the relays 307, 307' are a part of an automatic signal system, the entire block may be considered as one constructed solely for the purposes of my invention, without affecting the inherent construction and operation of the parts described.

Inductive receiver

In the drawings discussed under the previous title, Figs. 1, 27, 28, 30, and 31, the inductive receiver 400 is, for convenience of showing, indicated diagrammatically as being slightly in advance of the car truck 316. In the bridged rail joint construction, the one essential in regard to the position of the inductive receiver in relation to the car trucks of the locomotive or train is that some pair of wheels will short-circuit the bridging relay of the track magnet in question before the receiver passes by the track magnet.

A suitable construction of the receiver is illustrated in Figs. 24 and 25. It follows the general construction and dimensions of the track magnet, and comprises a core 401, preferably laminated, and two triangular pole pieces 402, 402 which are also preferably laminated, located one on each end of the core with their faces downward, and so positioned that they pass directly over the faces of the pole pieces of the track magnets.

The coil 403 of the receiver is connected in series with the detector circuits by leads 404 and 405 (see Figs. 1 and 24). Its winding can best be understood in connection with the detector and the detector characteristics later to be discussed, and a description thereof is deferred to the discussion thereof.

The receiver is located in a suitable non-magnetic casing 406 (partly broken away in the drawing) which is filled with insulation 407 (also broken away in the drawing), and is fastened to the lower part of the locomotive, and preferably to some non-spring-borne portion thereof. In Fig. 25 it is shown as suspended by brackets 408, 408, from the equalizing bars 409, 409.

The receiver is only energized by passing through the field of a live track magnet, and while the current set up therein may be used for any desired purpose in the operation of any one or more elements of this system or otherwise. I have illustrated its use only in connection with the detector, under which heading it will receive further discussion.

The electric detector

The electric detector of the apparatus now under consideration is illustrated as forming a part thereof in the ensemble diagrammatic Fig. 1 and in Figs. 56 to 61 showing the cycle train.

Briefly described, it consists of a novel circuit containing a source of constant low potential electric supply with means for restricting circuit flow, in series with a normally shunted coil of an electric magnet, in combination with external means for momentarily opening said shunt in order to energize the magnet, and means controlled by said magnet for prolonging said shunt opening and the consequent activity of the magnet itself.

The means for opening the shunt may be of the most varied character. It may be operated mechanically, magnetically or electrically. The shunt may be held spring-closed, or magnetically or electrically closed against spring action, and it may be local to the locomotive apparatus. or may include wheel and rail contacts. If spring-closed it may be opened electrically or by magnetic action, or if held closed by such action against spring retraction the shunt may be opened by removal of the closing force.

In the preferred form illustrated in the present application the shunt is normally spring closed, but momentarily opened by induced electro-magnetic action; and the shunt opening is prolonged by the then energized magnet opening the shunt at separate contacts in series with those first opened before the latter are closed.

Basic principle of detector

As this depends initially upon the momentary breaking of contacts in a shunted circuit, instead of the making of contacts in a series circuit, it must be fully considered before its place in my system can be fully comprehended.

Figs. 32 to 55 are diagrammatic illustrations to be considered in this connection.

Figure 32:
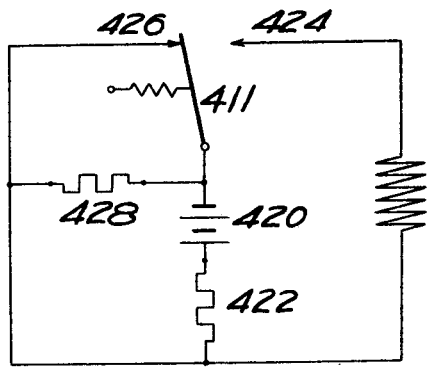

Fig. 32 shows a source of constant low potential (current supply) represented by a battery 420, connected on one side to a non-inductive resistance 422, to prevent (under the condition shown) excess current and exhaustion of battery, from which non-inductive resistance connections lead to contacts 426 and 424. The other side of the battery connects with a resistance 428 and with a spring retracted pivoted arm 411, which is normally spring retracted against the contact 426, but which is capable of being moved against the tension of its spring towards or to the contact 424. The parts of the circuit including contact 426 and resistance 428, respectively, are in parallel relation.

Any force applied to the arm 411 sufficient to overcome the tension of its spring will make physical break at the contact 426, and if the difference of potential at the shunted contacts at the moment of physical breaking is negligible there will likewise be an electric break. no matter if the physical movement be not over a thousandth of an inch and the time interval of break but of the minutest duration. For all practical purposes, the potential at the break can be made sufficiently low to be negligible if the current be taken from a source of low constant potential through a non-inductive resistance and the break be non-inductive and shunted.

Suppose, however, that it be desired to close the circuit at the contact 424, then the force applied must exceed that represented by the increasing tension of its spring as the arm is moved over the intervening gap; and of course any force equal or superior to this will, if applied for a sufficient interval of time, effect closure at this contact.

But suppose that the applied force be only a fleeting effort, in which case its energy is measured by time and force, while the energy required to move the arm is a definite amount represented by the average tension of the spring multiplied by the distance through which it is stretched, increased by such as is represented by the mass movement of the arm. Then, even with a considerable force, if it be applied for a very short time only, the arm might not be carried over to engagement, or might break contact at 424 too quickly to insure the required result sought by such contact.

Therefore the conditions obtain, that any force sufficient to move the arm at all will break contact at the contact 426 even if applied for only a very brief period of time, while considerably larger initial forces applied for like intervals of time will not insure closure at the contact 424.

These simple facts underlie the principle of detector operation by momentary contact break, made either mechanically or by fleeting electrical or magnetic impulses, whether direct or alternating, to initiate a subsequent cycle of operations requiring greater dynamic efforts.

Figure 33:
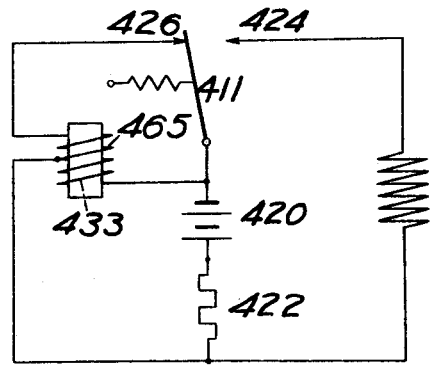

To make this principle available in the form of apparatus described in this application, that is, at the instant of breaking contact at 426, to energize a circuit which shall initiate or actuate a dynamic effort of some kind, all that is necessary is to utilize, in the form of a coil, the resistance 428 in shunt to the contact 426, which prior to the breaking of the contact has a negligible current flowing therein, but which on breaking contact at the contact 426 instantly becomes active. Or such shunt can comprise two opposite coils, one in each leg of the shunt, as is illustrated in Fig. 33 at 465 and 433, the other elements of the figure being the same as in the preceding figure. In this latter case, it is apparent that while the two coils are energized the magnetic results will be neutralized, but when the circuit of one, 465, is broken at contact 426, the remaining coil 433, will become effective. With this adaptation the resistance 422 may be omitted, for the coil 433 interposes the necessary resistance to current flow.

Figure 34:
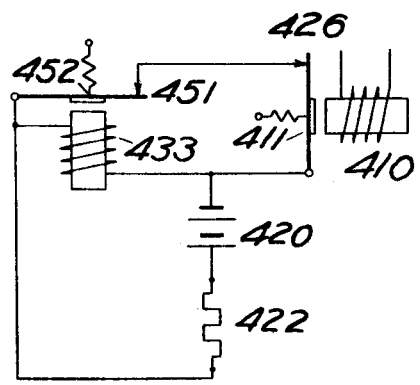

Fig. 34 is an operative circuit diagram showing an application on the principles outlined in the preceding diagrams. In this, the contact 424 and its lead are omitted, and the circuit from the battery 420, through its resistance 422, is completed through a two-branch circuit, one branch including the coil 433, and the other the two spring-retracted armatures 452 and 411 impinging upon the series connected contacts 451 and 426.

When in normal position the current from the battery 420 flows through the non-inductive resistance 422, and then mainly through the shunt circuit contacts 451 and 426 in series, a very small portion going through the coil 433, which is therefore practically inert, and without strength enough to retract its armature 452, against the pull of its spring, sufficiently to open circuit at the contact 451.

Suppose now that the contact at 426 be broken by movement of the armature 411, either mechanically or, for example, by the pull of a relay 410 energized momentarily from any source. The shunt path being thus broken, the coil 433 will instantly become active and retract the armature 452, opening the shunt also at the contact 451; and since the contacts 451 and 426 are in series with each other it is evident that the contact 426 can now be closed, but that the contact 451 will be kept open by the energized coil 433. It will thus be seen that the prolonging of the open shunt condition is effected by the breaking of a circuit at a second point prior to its closure at an initial breaking point; also, that the time element required in the original impulse, to insure operation of the apparatus, may be made extremely short, because such operation is initiated by the breaking of contact 426 at the beginning of the motion of armature 411. The maintenance of the open circuit is insured also by the breaking of contact 451 at the beginning of the motion of armature 452. Coil 433 is constantly potentialized, so that its current increment takes place practically instantly on the breaking of contact 426. Once the coil 433 has become energized it remains energized until its circuit is broken by other means than those indicated in the figure. It thus performs the function of a maintaining coil during the energization of which current flows through the resistance 422.

Although, manifestly, the contact 426 may be broken in a variety of ways, and the variants of sequential results are many, fundamentally the principle illustrated in Figs. 32 to 34 is unchanged; for whatever the minor variations, there is a source of constant potential low pressure supply in series with a maintaining coil and a magnet de-energizing shunt therefor, the circuit so formed having sufficient resistance to keep down the normal current in said circuit, and external means for opening the shunt around the magnet, such opening being prolonged by the maintaining coil.

The relay 410 can be considered for all intents and purposes the initial active element of my detector system, or for brevity, the actuator.

I have described a maintaining coil whose function is to continue the action of a momentary break in a circuit, but its action is distinctly different from that of the maintaining coils used in, for example, my multiple-unit system for railways, described in Patent No. 660,065.

In the latter type a coil normally open-circuited is in series with two contacts in parallel relation to each other, one of which is closed by some external agency and the other of which is closed by action of the maintaining coil itself when energized, the latter remaining closed while the first mentioned contact in parallel with it is broken.

In the preferred form of maintaining coil and circuit which form elements of the detector I have described in this specification the core of the maintaining coil is normally dead, and a normally live circuit is maintained in a shunt around the maintaining coil through two contacts in series, one of which may be broken by an external agency and the other by the maintaining coil when it becomes energized because of that break.

The one form depends upon the making of contacts which are in parallel with each other and in series with the maintaining coil, while the other depends upon the breaking of contacts which are in series with each other but are in a circuit parallel with the maintaining coil.

The remaining Figs. 35 to 55 inclusive, illustrate the principle and circuit action of the detector under varying conditions. The battery 420 is not shown, but the leads from its terminals are illustrated by vertical lines at the left and right of each figure respectively, a constant low potential source in circuit with the leads being assumed.

Figs. 35 to 37 inclusive show the maintaining coil 433 connected across the battery leads through the resistance 422. The maintaining coil has around it a low resistance shunt comprising the armature 411 and contact 426. The detector relay 410 is also connected across the battery leads, through pivotally mounted spring-retracted switches 443 and 444 in series. The detector relay is wound on the same core as the maintaining coil.

Fig. 35 shows the switch 443 closed and the switch 444 open, with current flowing through the resistance 422 and the shunt formed by the armature 411 and contact 426 around the maintaining coil 433, while the detector relay 410 is dead.

In Fig. 36 the switch 444 is closed, the switch 443 remaining closed also. Current flows through the detector relay and the magnet core common to the two coils is energized, pulling down the armature 411 and breaking the shunt circuit at the contact 426. The current now passes through the maintaining coil, and if direct current is used and the coils are wound in proper relation the current in the maintaining coil will co-operate with the current in the detector relay to hold down the armature 411 and keep the shunt circuit open.

In Fig. 37 the switch 444 has been further depressed, breaking contact at the switch 443 and open-circuiting the detector relay; but the circuit in the maintaining coil remains closed and the armature 411 is still retracted, so that the shunt is kept open at the contact 426, and the core, under the influence of the maintaining coil, remains energized. By a quick complete downward movement of the switch 444, the time of current flow in the actuator, i. e., the detector relay, can be made as short as desired.

In Figs. 38 to 40 the maintaining coil 433 is shown in the same electrical connection and with the same general shunt arrangement as in Figs. 35 to 37, except that it has a separate core from that of the relay coil 410. The latter, however, is shown supplied from a source independent from that of the maintaining coil, illustrated by an induced current in the coil of the magnetic impulse receiver 400, by the magnet 320. The armature 411 is lengthened out to extend over the cores of both coils.

In Fig. 38 the magnet 320 is shown as dead, with the consequent condition of de-energization of the detector relay, so that the current flows through the shunt to the maintaining coil and the latter is dead.

In Fig. 39 the magnet 320 is illustrated as momentarily energized with a consequent energization by induction of the detector relay. This draws down the armature 411 from the contact 426, and breaks the shunt so that the maintaining coil becomes energized. This in turn acts on the armature 411, and when the detector relay becomes de-energized, as in Fig. 40, prevents the shunt circuit being re-established.

Figs. 41 to 43 show a similar arrangement to that of Figs. 38 to 40, in that the maintaining coil, its connections and its shunts are similar to those of the last named figures, and the detector relay coil is independently energized. The coils, however, instead of being located both on the same side of the armature pivot, are located on opposite sides, and the armature 411 (still acting in double capacity) is pivoted centrally between them.

In Fig. 41 the magnet 320 and the detector relay are both dead, so that the current flows through the shunt to the maintaining coil, and the later is dead.

In Fig. 42 the magnet 320 and the detector relay are momentarily alive, so that the armature 411 is drawn toward the latter coil and rotated on its pivot, and the shunt to the maintaining coil is broken at the contact 426. The maintaining coil is thus energized, and when the detector relay is dead, as in Fig. 43, the maintaining coil 433 maintains the armature in the same position as in Fig. 42 and continues the break in the shunt circuit.

In Figs. 44 to 46, the circuit of the maintaing coil 433 is the same as in the preceding figures under discussion, but its shunt has two breaks in series, as in Fig. 34, and comprises the armature 411 and contacts 426 of the detector relay 410 and its own armature 452 and contact 451. The manner of energizing the detector relay is not shown, but it is understood that it can be energized from any suitable source.

In Fig. 44 the detector relay is shown dead and the current flows through the shunt of the maintaining coil, which coil is dead.

In Fig. 45 the detector relay is momentarily energized, its armature 411 drawn away from the contact 426 and the shunt circuit broken, which immediately results in the energizing of the maintaining coil and a withdrawing of its armature 452 from the contact 451.

In Fig. 46 the detector relay is shown as dead and its armature as once more making contact with the contact 426; but the shunt circuit is maintained open at the contact 451 by the armature of the live maintaining coil still being retracted.

Figs. 47 to 49 illustrate how the maintaining coil can be made use of in connection with a third or operating coil 460. The arrangement of the detector relay and maintaining coils, their circuits and the shunt to the maintaining coil are the same as in Figs. 44 to 46.

The operating coil 460 is connected at one end with one of the battery leads, and connection to the other lead is made whenever the armature 452 of the maintaining coil 433 is drawn up against its back contact 463 with which the operating coil is connected. The operating coil is shown as provided with an armature 464.

Fig. 47 shows the same condition in respect to the detector relay and maintaining coils and their armatures and circuits as Fig. 44, so that the operating coil is dead.

Fig. 48 shows the same condition in respect to the detector relay and maintaining coils and their armatures and circuits as Fig. 45, so that the maintaining coil armature 452 is now drawn against the contact 463, and a circuit is established through the operating coil 460, whose armature is of course drawn upward thereby.

Fig. 49 shows the same condition of the detector relay and maintaining coils, and their armatures and circuits as Fig. 46, but although the detector relay is dead and its armature 411 has re-established contact at the contact 426, the third coil is alive and its armature retracted, for the maintaining coil retains its armature against contact 463, and the circuit of the operating coil is still complete.

The operating coil and its armature are serviceable for any purpose to which they are adapted.

In Figs. 50 to 55, I have shown the detector relay and maintaining coils and their circuits in a slightly different arrangement than in the other drawings of this series, commencing with Fig. 35, and may be said to represent a combination of the explanatory drawings Figs. 33 and 34. Commencing with Fig. 35, the maintaining coil is shown as being in series with a non-inductive resistance and as being provided with a very low resistance shunt; but in Figs. 50 to 55 the maintaining coil is connected directly across the battery leads and is normally energized. On the same core with the maintaining coil is mounted differentially an equal and opposing coil 465, the two coils neutralizing their respective effect upon the core when both are energized. The differential coil is also connected across the battery leads, and in series with it are the detector relay coil armature 411, contact 426, contact 451 and maintaining coil armature 452. The manner of energizing the detector relay 410 is not shown, but may be from any source.

In Fig. 50 the detector relay is shown as dead and contact 426 closed; the maintaining coil armature is shown as retracted against the contact 451. Current, therefore, flows through both the maintaining coil and the differential coil as indicated by the arrows, but as the differential and maintaining coils are equal and opposing, their common core is dead and the contact 451 is closed.

In Fig. 51 the detector relay is shown as energized and its armature drawn away from the contact 426. This breaks the circuit of the differential coil, and the core of the maintaining coil now becomes energized and the contact 451 is broken, so that there are two breaks in series in the circuit of the differential coil.

Fig. 52 shows the detector relay de-energized and its armature returned to the contact 426, but the circuit of the differential coil is still broken at the contact 451, and the break maintained by the action of the live maintaining coil.

Figs. 53 to 55 inclusive illustrate the arrangement of Figs. 50 to 52 inclusive, with a showing of one method of connecting up the operating coil with such an arrangement. In this case the operating coil is connected at one end to one of the battery leads, and at the other end through the back contact 463, when closed, to the other lead. The relative position in respect to the maintaining coil armature 452 is as in Figs. 47 to 49.

Fig. 53 shows the same condition in respect to the detector relay, maintaining and differential coils, and the armatures and circuits, as Fig. 50, so that the core of the operating coil is dead.

Fig. 54 shows the same condition in respect to the detector relay, maintaining and differential coils, and the armatures and circuits, as Fig. 51, so that the contact 463 is closed and a circuit is established through the operating coil. The armature of the operating coil is, as in Fig. 48 drawn up thereby.

Fig. 55 shows the same condition of the detector relay, maintaining and differential coils, and the armatures and circuits as Fig. 52, with a consequent maintaining of the circuit in the operating coil.

Thus the same thing is accomplished with the arrangement of the last six figures as with the arrangement of the other figures of the series. Broadly speaking, the energizing of the detector relay causes a break in a circuit parallel to the maintaining coil, which makes the latter operative, and when so operative it maintains itself operative and is not affected by the de-energizing of the detector relay.

The operating coil or its circuit may have any character or function required; it may release a brake mechanism, make an electric circuit, release a train of mechanism in a state of unequilibrium, or sound an alarm,—in fact, set in motion any required action, occupying either a short or a long time, and requiring small or large effort, although the initiation of action through the detector relay may be of the briefest duration and attenuated character.

The above consideration of the principle of operation of the detector permits the cycle train and the relation of the detector thereto to be approached with understanding, for in the general type of apparatus now under consideration both the maintaining and operating coils are present.

*Cycle train*

*Construction.*—In the cycle train of the system now under consideration are found many elements whose construction and general operation have already been pointed out. Figs. 56 to 61 inclusive are diagrammatic illustrations of the cycle train and the detector in its relation thereto, and to these figures and to Fig. 1 attention is now directed.

The battery 420, discussed under "the electric detector" as being a convenient source of constant low potential current, is here seen. A commutator, however, is interposed into some of the battery circuits. A suitable battery is one consisting of six cells, and having a capacity of 80 ampere-hours at about 7 or 8 volts.

The commutator comprises a split metal shell 490 mounted on a cylinder 491 of insulating material. Many equivalent constructions are manifestly available. The commutator is rotatable as shown in the direction indicated by the arrow placed thereon. Its shell is stepped, as indicated diagramatically in Figs. 56 to 61, to insure variably timed electrical engagement with five contact fingers, 492, 493, 494, 495 and 496. Further reference will be made to the commutator shell at the close of the discussion of the general operation of the system. The commutator is normally at rest in the position shown in Figs. 56 and 57, and rotary motion is given to it under circumstances and in a manner later to be presented.

The battery 420 is connected at one end directly with the contact finger 493, which is maintained in constant contact with the shell 490 except during the period when it passes over the split or break across it. This break is made narrow, its width, however, being sufficient to prevent bridging by the contact fingers in passing thereover. The detector relay 410 and the receiver 400 are indicated on the left hand side of the series of diagrammatic figures, the detector relay being connected in series with the receiver through a regulating resistance 413 (later to be referred to).

The contact finger 492 is connected with the clear signal lamp 422 and its shunt resistance 422', and the contact finger 494 is connected with the danger signal lamp 423 and its shunt resistance 423'. These two lamp circuits are joined, and connected through the maintaining coil 433 and the shunt thereto formed by the armature 411 and contact 426 of the detector relay 410 and the armature 452 and contact 451 of the maintaining coil in series with each other, to the battery through a hand switch 497.

The non-inductive resistance normally in circuit, that is, when the apparatus is at rest, is the clear lamp 422 and its shunt 422'; but when the cylinder is rotated from its normal position the danger lamp 423 and its shunt 423' form such a resistance. The shunts to the lamps are for the purpose of maintaining continuity of those parts of the circuits in the event of lamp failure. The normally closed clear signal circuit can be traced as follows (see Fig. 56): starting from battery 420, by contact 493, shell 490, contact finger 492, lamp 422 and its shunt relay detector armature 411, contacts 426 and 451, armature 452, and hand switch 497 to the battery. An inappreciable part of the current therein also passes through the maintaining coil 433. If the circuit is broken at either contact 426 or 451 all of the then existing current will flow through the maintaining coil.

Whether or not the current from the battery passes through the maintaining coil when shunted, as long as its finger 492 is in contact with the shell 490 the clear signal lamp will be illuminated.

On the rotation of the commutator the shell passes out of contact with the finger 492, and after a slight interval makes contact with the finger 494. This breaks the normally closed clear signal circuit and establishes the danger signal circuit through the danger signal lamp 423 and its shunt (see Figs. 58 and 59). The breaking of the first mentioned normally closed circuit de-energizes the maintaining coil 433 and allows the shunt to it to be re-established.

The operating coil 460 of the detector diagrams (Figs. 47 to 55) forms a part of the cycle train; it is connected with the battery 420 on one side directly, and on the other side through the contact 463 and the armature of the maintaining coil when that coil is energized. The spring-retracted armature 464 of the operating coil 460 forms a stop for the cycle train, as will be hereinafter described.

The fourth contact finger 495 makes contact with the shell 490, simultaneously with the finger 494. It is connected directly with the audible danger signal 498, here illustrated as a buzzer or bell, the circuit through which is completed by a fixed connection to the hand switch and thus to the battery.

The finger 496 makes contact with the shell 490 as the commutator continues in its rotation (see Figs. 59 and 60), and through the battery circuits connected with it the various braking functions are controlled.

The shortest and most direct circuit is that through the coil of a supplemental relay 499, whose armature 500, when energized, closes a contact 501. The other end of this coil is fixedly connected to the battery through the switch 497.

In parallel with the circuit of this supplementary relay is another circuit, which includes the solenoid 99, the spring contacts 113, 113' (shown in the figures under consideration as a single contact 113) and the follow-up contact 116 of the engineer's automatic valve head, and the automatic service brake recording relay 502, the latter being connected with the hand switch 497.

There is another circuit besides that through the operating coil 460 which is not included in the five contact fingers enumerated and which is also supplied from the common battery 420. This circuit, however, only becomes secondarily energized following the energizing of the maintaining coil 433 and the supplemental coil 499.

Starting from the battery 420 at the end connected with the finger 493, a branch circuit passes through a cut-out coil 503, a secondary automatic brake recording relay 504, the solenoid 199 of the secondary exhaust valve, thence by two parallel paths through spring-closed contacts 505 and 506, through the armature 500 of the supplemental coil 499, and when that coil is energized through a contact 501 to the contact 463, and when the armature 452 of the maintaining coil 433 is energized to the hand switch 497 and the battery.

The coil of the solenoid 261 of the power cut-off valve is in parallel circuit with the solenoid 199 of the secondary exhaust valve, and hence these two magnets are simultaneously operated. If the contacts 505 and 506 are opened simultaneously, the general circuit will be broken. They are not, however, essential to the system now under discussion, but are for the purpose of permitting the circuit to be broken under certain circumstances which might arise in practice. If used, one should be placed on one side of the cab and one on the other side, so that one man can not open both simultaneously.

The cut-out coil 503 has an armature 507 which, with a co-operating contact 508, closes a shunt around the automatic service brake recording relay 502 when the coil 503 is energized. Thus, as the last named coil is in the circuit of the secondary exhaust valve solenoid 199, the closing of that circuit de-energizes the recording relay 502.

A normally open contact 509 is also shown in a shunt around the contacts 501 and 463 of the supplemental and maintaining coils respectively. If this is closed the circuit including the solenoid 199 of the secondary exhaust valve and the coil 261 of the power cut-off valve will be energized instantly, and the power will be cut off and full service or emergency brakes will be applied.

While any suitable driving apparatus can be used for rotating the commutator which will preferably effect its rotation at a uniform and desired speed, the apparatus illustrated in the type of the construction now under consideration comprises, in part, a spring-driven mechanism similar in general construction and action to the mechanism of some alarm clocks. The commutator is rigidly mounted on a suitably supported shaft 510, driven from a shaft 511 through beveled gears, at like axle speeds. Upon the shaft 511 is also rigidly mounted a releasing disk 512, with a depression in its periphery. The spring-retracted armature 464 of the operating coil 460 is mounted on one end of an extended arm 513, which is centrally pivoted, and carries on the opposite end from the armature a small wheel 514, which, in the normal or at-rest position of the apparatus, lies in the depression of the releasing disk. The arm 513 also carries a fixed pawl 515, which, in the normal position of the apparatus, engages in the teeth of a high speed wheel 516, connected by a train of gears with the shaft 511, and arrests the rotation of the commutator. When the wheel 514 is lifted from the periphery of the releasing disk 512 the pawl is out of tooth engagement and the train of gears is released.

The commutator shaft 510 may also drive a cyclometer 517 to record each rotation of the commutator. An adjustable fan 518, or other special speed governor is connected with the clockwork. Of course the clockwork must be kept wound to be in operative condition, but a single winding will give a large number of operations.

The clockwork, being locked in a state of unequilibrium, is set in operation by the energizing of the operating coil 460, which draws down its armature 464, clears the pawl 515, and raises the wheel 514 from the depression in the disk 512. The rotation of the commutator now being begun, the wheel then rides along the periphery of the disk and holds the pawl out of locking engagement, but when the commutator and the disk have made one complete rotation, assuming that the operating coil 460 is, by that time, de-energized, the wheel will drop into its depression and the pawl will return to its holding engagement. De-energizing of the operating coil 460 prior to the time of one revolution of the commutator will not permit the pawl to be returned to its holding engagement because of the fact that the wheel 514 is held up in riding on the disk.

The recording relays 502 and 504 control the movements of a recording pen over a movable recording card, the driving apparatus for which may be of any character, which causes the rotation of the card at a uniform and desired rate of speed. In the system now under discussion, I have illustrated a spring-driven clockwork 519 which, like the mechanism of the commutator should always be kept wound up.

Any sort of a recording card may be adopted which is suitable, but I have illustrated one in the form of a circular disk 520, which is removably mounted on a suitably positioned shaft 521 driven by the clockwork. A convenient speed of rotation for the card is six times in twenty-four hours.

The automatic service brake recording relay 502 and the automatic secondary brake recording relay 504 are mounted on a pivoted supporting yoke 522, having a spring-retracted arm 523, whose free end rests against a cam 524 geared in a convenient ratio to the time shaft of the clockwork.

The relay cores have a common spring-centered, centrally positioned armature 525, located between the inwardly projecting portions of their upper extremities. This arm carries a pen 526 maintained in contact against the record card 520.

The cam 524 is properly contoured as indicated in Fig. 1, and is adjustably mounted on a shaft 527 driven by the clockwork 519, the rotation of which bears a fixed relation to the rotation of the recording card; one revolution of the cam to six of the card has been found to be a convenient ratio to give a long indicating line.

The recording card is illustrated as rotating counter-clockwise and the cam clockwise.

In considering the operation of the recording device, assume the parts moving from the position shown in Fig. 1. As the cam rotates from that position, the end of the arm 523 is slowly moved downward against the tension of its spring, by the cam until the peak of the cam passes the end of the arm, when it slides up the reverse curve of its cam, until it reaches the beginning of the spiral portion of the contour of the cam, when it again starts its downward motion. The motion of the arm tilts the supporting block of the relays 502 and 504 so that the relays and their armature, with the recording pen, are slowly tilted counter-clockwise; when the peak of the cam passes the end of the arm 523 and the arm starts its upward motion, the supporting block, the relays and the recording pen are given a relatively faster motion in a direction away from the center of the recording card.

The effect of the downward motion of the arm 523 on the recording card as the latter rotates is illustrated by the spiral line 528 shown in Fig. 62 and the effect of the upward motion of the arm is shown by the line 528′ thereon where the inside line of the spiral crosses the other lines and starts the outside line of the spiral.

The recording of automatic service braking is effected by the energizing of the relay 502, which causes a sudden movement of the armature 525, and with it the pen 526, to one side and toward that relay, producing a jog in the spiral line on the recording card toward the center thereof, as is shown at 529 and 530.

The recording of the automatic secondary braking is effected by the energizing of the relay 504 when the relay 502 is cut out or dead. This causes a sudden movement of the pen 526 to one side and toward the relay 504, and produces a similar jog in the spiral line on the recording card, but away from the center thereof.

The recording card of Fig. 62 is practically a reproduction of a recording card which has been run 24 hours. It is divided off by forty-eight curved lines an equal distance apart, and extending in a general radial direction from the center of the card. These lines are struck from the center of rotation of the armature arm 525, with a radius equal to the distance between the pen point and its center of rotation. With the speed of rotation above given for the recording card, the lines divide the card into five-minute periods, and every twelfth line divides the card into hour periods.

The hour periods are numbered by the clock hours of the day, the a. m. hours being in light type and the p. m. hours in heavy type. These numbers are placed upon the hour lines a distance apart equal to that between the coils of the spiral line, and follow one another consecutively on the spiral line up to the place where the spiral line is crossed by the movement of the recording pen from the inner line to the outer line of the spiral where the next consecutive hour is moved to the outer line of the spiral. Thus in Fig. 62, the a. m. hour numeral 8 is the last hour numeral on the inner line of the spiral and a. m. 9 starts as the first hour numeral on the outer line of the spiral. The five-minute lines between the hour lines are marked with the five minute periods between the hours, 5, 10, 15, etc.

In reading the card, therefore, in order to determine the time of automatic brake applications, the spiral line containing the jog indication is followed counter-clockwise to the last hour numeral to determine the hour, and its position on or between the five minute lines determines the number of minutes after that hour the application was made. If the jog is toward the center of the recording card as has been seen above it is a primary service application, and if away from the center it is a secondary or emergency application. Thus the jog bearing the numeral 529 records an automatic service application followed by a full service application of the brakes at 6:11 p. m.; the jog bearing reference numeral 530 is the record of an automatic service application followed by an emergency application at 7:26 p. m.; and the jog bearing a reference numeral 531 is the record of an automatic service application at 9:19 a. m. Expert reading of these indications will indicate much more than simply the facts and times of brake application, but also much of what the engineer has done or tried to do.

It was stated that the cam 524 was adjustably mounted on its motor shaft. This is for the purpose of permitting the proper mounting of the card on the shaft 521. A card such as specifically described ought to be changed every twenty-four hours so as to avoid retracing of the spiral, but the cards can be changed as often as the service requires; one card can be used for each run, or for any portion of a run if engineers are changed during a run and it is desired to have one card for each engine run.

In changing cards the fresh one is mounted upon the shaft 521, and is turned and the cam 524 adjusted so that the recording needle starts its tracing on the actual clock time as indicated on the card. The recording card and the cam are next fastened in the then determined position, and the apparatus, on closing the battery switch 497 is in readiness for testing and for recording automatically.

Obviously, the clockwork 519 runs continuously, and the recording card and the apparatus for operating it are by no means confined for use to my safety control system.

From the duties required of the various cycle train relays, one skilled in the art can readily ascertain the proper strength and character of said relays. Without in any way limiting my invention in this particular, I may state by way of suggestion that I have found that relays of the character usually employed in telegraph instruments can be employed for relays 433, 460, 499, 502, 503 and 504.

For affording a ready means of testing the operation of the cycle train portion of the system, connections may be added for exciting the detector relay directly from the local source of current. I have shown such connections in Figs. 1 and 56 to 61, in which a test key 535 when closed connects the detector relay 410 in circuit with the battery 420 through a resistance 536. In this manner the detector relay can be energized with the same results as if energized through the inductive receiver in the regular operation of the system.

*Operation.*—With this understanding of the immediate means and manner of rotating the commutator and of effecting the recording automatic service and secondary brake applications, the relations of the various elements of the cycle train, one with another and with the entire apparatus of the type under consideration, will now be presented.

In the six diagrammatic Figures 56 to 61, the manner of energizing the track magnet 320 above described is not shown, but a more direct method is substituted for diagrammatic simplicity. The sectionalizing of the track is shown entirely independent of any signaling system, and the running rail sections are of equal length. In these diagrams the circuit of the track magnet 320 and its battery 322 is completed through contacts closed by the de-energizing of the track relay 328, connected across the traffic rails of an insulated track section supplied at its far end by battery 360.

The construction of the home and distant track magnets and blocks is identical, and the parts of the former bear reference numerals twenty in advance of those of the latter except that the battery 360 is repeated. The short-circuiting of the track relays is effected by the car truck 316.

Figs. 56 to 61 illustrate the cycle train and its signaling and recording devices, and the parts directly operated thereby, under six different conditions illustrative of the working of the type of my system now under consideration. Fig. 1 should also be referred to in considering these figures, and together with Fig. 56 illustrates the condition of the parts just referred to when the locomotive passes over a dead distant track magnet, and is typical of the condition existing in the normal or at-rest position of the parts.

In Figs. 56, of the various circuits connected with the battery 420, the only one unbroken is the circuit which includes the visible clear signal 422 and its shunt, that circuit being completed through the shunt to the maintaining coil 433, and through the fingers 492 and 493.

The circuits controlled either directly or indirectly by the remaining three contact fingers are open, and the commutator being at rest there are no visible or audible danger signals, no automatic braking actions of any kind and no power cut-off. The armature 525 of the recording pen remains in its midway position between its relays, and the recording pen traces an unbroken line on the recording card.

In Fig. 57 the track relay 328 has been short-circuited by the car truck 316, and its armature has closed the circuit of the battery 322 of the distant track magnet. The assumption is that the locomotive with its inductive receiver has just reached a position over the energized track magnet, and is traveling at a speed above a predetermined maximum. This has energized the coil of the detector relay 410, breaking the contact 426 and thereby the shunt to the maintaining coil 433, and shifting the circuit through the visible clear signal 422 from the shunt to the maintaining coil into the maintaining coil itself. Simultaneously, the contact 451 opens, thus preventing, so long as the circuit is complete, the shunt of the maintaining coil being again re-established by the de-energizing of the detector coil and the closing of the contact 426; the circuit of the operating coil 460 at the contact 463 is also closed, energizing the operating coil, which at once releases the clockwork of the commutator and starts the rotation of the commutator in a manner already described. In this figure the assumption is, that although the inductive receiver has just been energized insufficient time has passed for the commutator to get in motion.

Aside from the changes just mentioned, the condition of the other circuits, solenoids and relays referred to in connection with Fig. 56 applies to Fig. 57, with the qualification that the circuits of the solenoid 199 of the automatic secondary exhaust valve, of the solenoid 261 of the steam power electric cut-off valve, of the automatic secondary brake recording relay 504 and of the cut-off coil 503, while still incomplete, have now only one break, i. e., at the contact 501, instead of two breaks at 501 and 463 as before.

Fig. 58 assumes the parts as they will be a brief interval after the live track magnet of Fig. 57 has been passed. No car truck is shown short-circuiting the track relay, for after the track magnet has been passed by the receiver it makes no difference whether the track magnet is alive or dead. The impulse in the receiver having died away, the detector relay coil is dead and contact 426 is closed.

The commutator has progressed in its rotation until the contact finger 492 of the visible clear signal 422 has broken, but the contact fingers 494 and 495 of the visible danger signal 423 and audible danger signal 498 respectively have not yet made contact.

Every circuit directly or indirectly dependent upon the completion of its circuit by means of the commutator is, therefore, dead. As this applies among others to the maintaining coil 433, the contact 463 and the circuit of the operating coil 460 are also broken, but as already explained, this does not stop the rotation of the commutator. The closing of the contact 451, supplementing the closing of the contact 426, re-establishes the shunt to the maintaining coil.

In Fig. 59 the locomotive is assumed to have continued its travel for a brief time from the position shown in Fig. 58, with the result that the rotation of the commutator has brought the contact fingers 494 and 495 into contact with its shell, the contact fingers 492 and 496 being still idle. The home track magnet has not as yet been reached, the detector coil is still dead and contacts 426 and 451 remain closed.

The circuit of the visible danger signal 423 is now completed through the shunt to the maintaining coil, so that a visible danger signal is displayed; and the circuit of the audible danger signal 498 is now completed and an audible danger signal given, but aside from this the circuits of the other solenoids and relays referred to in the discussion of Fig. 56 are as there explained.

It is at the period shown in Fig. 59 that the engineer is warned both by visible and audible signals of danger ahead and the necessity for making a service application of the brakes and, if the proper manipulation of his train so demands, for shutting off power.

Figure 60:
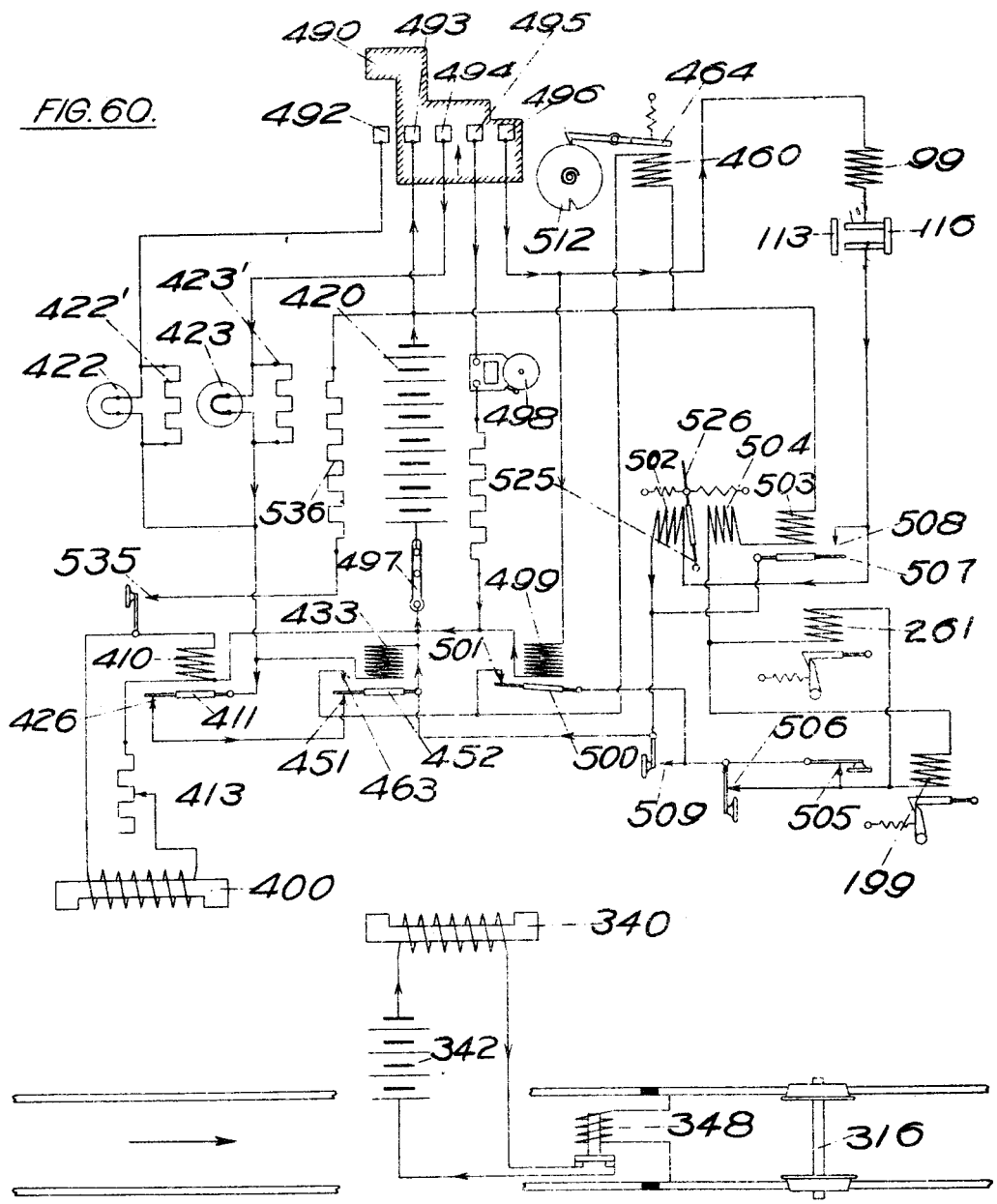

Fig. 60 assumes that the locomotive has traveled a portion of the distance between the distant and home track magnets. The commutator has continued its rotation until the contact finger 496 has contact with the shell 490. Nothing has transpired to change the condition of the detector coil, or of the visible clear or danger, or audible signals, or of the operating coil, or the clockwork of the commutator, from that illustrated under Fig. 58, except, of course, that that clockwork has further approached the position when it will be stopped as hitherto described.

For clearness of presentation it is assumed that the engineer has disregarded the cab signals, and has not interfered in any way with the automatic operation of my apparatus in the engineer's automatic valve head.

The instant the contact finger 496 makes contact with the shell 490, the circuit of the solenoid 99 of the engineer's automatic valve head is completed, and a service application of the brakes is automatically made in the manner described in detail in the discussions of the engineer's automatic valve head and the automatic service brake valve. The completion of this circuit energizes the automatic service brake recording relay 502, the core of which attracts the recording pen armature 525, making a record of this service application in a manner heretofore described. The circuit of the supplemental coil 499 is also completed, so that contact 501 is closed.

The circuits of the solenoid 199 of the automatic emergency exhaust valve and of the solenoid 261 of the steam power electric cut-off valve, and of the automatic secondary brake recording relay 504 and cut-off coil 503 are, however, not yet completed, because although closure has been effected at contact 501 a break still remains at contact 463 in series with it, by reason of the still shunted condition of the maintaining coil 433.

Figure 61:
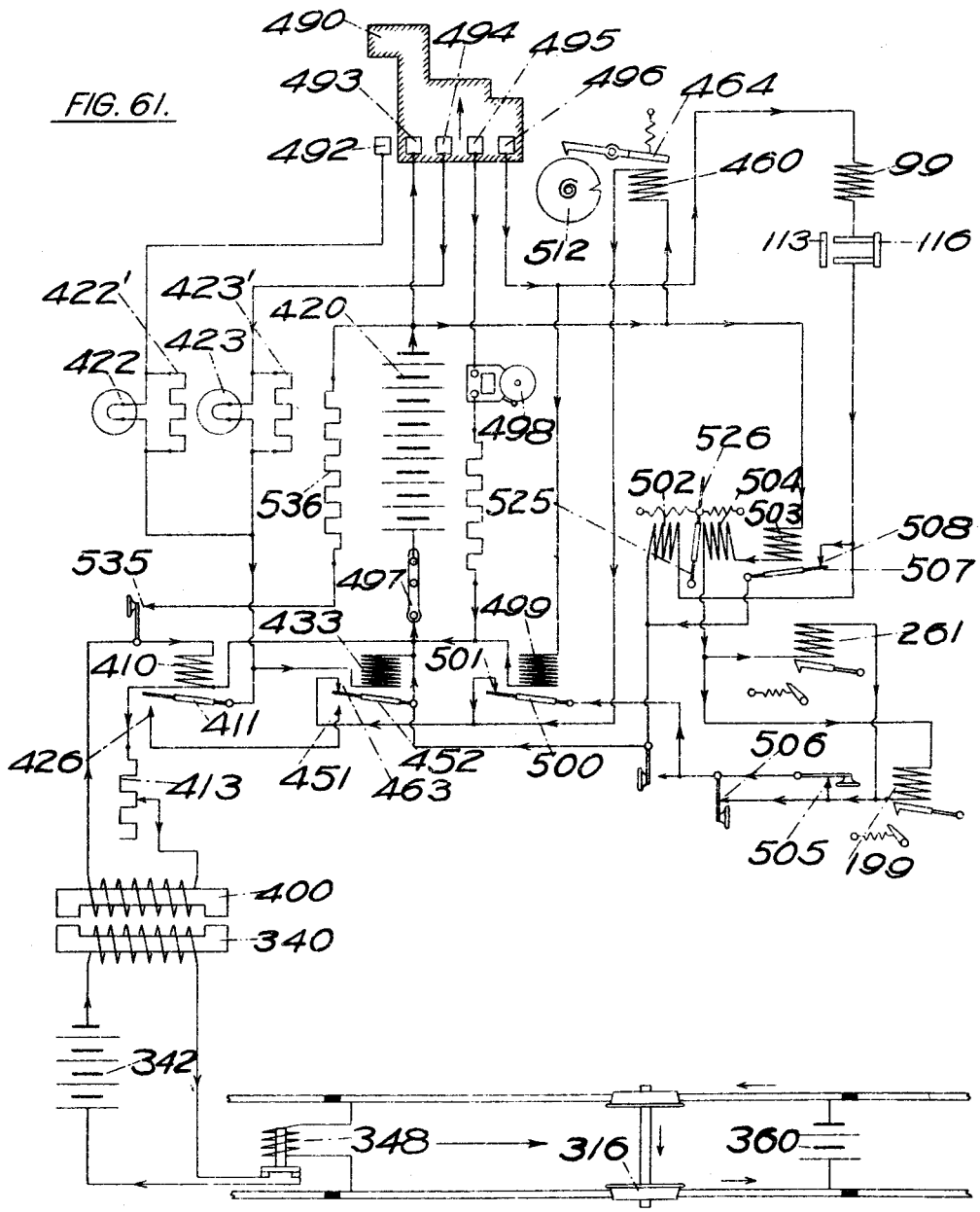

Fig. 61 assumes that the locomotive has traversed the distance between the two track magnets, and at a speed above the predetermined maximum has entered the field of the home track magnet 340, now alive by reason of the car truck 316 short-circuiting the track relay 348; also that the commutator is still continuing its rotation.

The contact finger 492 still contacts only with the insulation of the commutator, so that the clear visible signal continues dead, but the other four contact fingers are in contact with the shell 490. The detector coil now becomes momentarily alive and the contact 426 is again broken, which breaks the shunt to the maintaining coil, and current now flows through the latter.

The energization of the maintaining coil again breaks the contact 451 and makes the contact 463, and, as the supplemental coil 499 is still energized and its armature against the contact 501, the closure made at the contact 463 in series therewith completes the circuit of the solenoid 199 of the automatic secondary exhaust valve and a secondary full service or emergency application of the brakes takes place, in the manner described in detail under the title, "automatic secondary exhaust valve."

The completion of the circuit of the solenoid 199 also energizes the automatic secondary brake recording relay 504 and the cut-off coil 503, the latter shunting the automatic service brake recording relay 502. Attracted by the core of the relay 504, the recording pen records this secondary braking application.

Meanwhile, nothing has happened to break the circuit of the solenoid 99 of the engineer's automatic valve head, which now continues through the shunt 507 and 508 of the automatic service brake recording relay instead of through the relay itself; as stated in the discussion of the engineer's automatic valve head, the engineer's rotary valve remains in lap position and no air can enter the brake pipe to diminish the effect of this secondary brake application.

Co-temporaneous with this action, the circuit of the solenoid 261 of the steam power electric cut-off valve will be completed. This results in automatically cutting off steam from the driving cylinders of the locomotive in a manner heretofore described.

Nothing has yet happened to break the circuit of the audible danger signal 498, and current still flows through the danger lamp 423 so that as in Figs. 59 and 60, these are still active. The circuit of the operating coil 460, however, is again completed at contact 463, but this, of course, has no effect at this time, the wheel 514 and its pawl 515 still being held clear.

This completes the cycle of signaling and automatic brake operations in the construction now under consideration.

From the condition of Fig. 61 the commutator continues its rotation until all the contact fingers break contact, when it is obvious that all of the circuits from the battery 420 will be dead and the armatures of all the relays and solenoids affected thereby will return to the position of Fig. 56. As the commutator continues its rotation, the wheel 514 of the armature arm of the operating coil 460 drops into the depression in the releasing disk 512, which permits the pawl 515 to lock the high speed gear, and arrest the movement of the commutator in the position of the last named figure. The clear visible signal 422 is now again shown, and so far as the cycle train itself is concerned the apparatus is in readiness for another cycle of operation.

*General operation*

Having thus described the construction and the detailed operation of the parts of the system now under consideration, I will now sketch the general operation of the system.

The supposition is that when my system is installed on a road distant and home track magnets are located within the signal blocks to suit the local conditions, or if no signal blocks are present that the road is arbitrarily divided as desired for the use of the system; also that the strength of the various track magnets has been properly predetermined, and that they are adjusted to that strength when alive and positioned; furthermore, that the locomotive is equipped with the apparatus heretofore described.

Before the locomotive starts on its run, the regulating valve 185 (see Figs. 2, 3, 4 and 18) is set, and the regulating spring 147 is adjusted, so that the rate of air discharge from the equalizing reservoir and the reduction of pressure in the brake pipe will assure a correct braking of the particular train which the locomotive is to haul. The resistance in the circuit of the detector relay 410 (see Fig. 1) is adjusted so that the detector will be responsive only when the particular locomotive in question passes a live track magnet at a speed above the maximum which, with adverse signal conditions, is considered safe for it at that point. A fresh recording card such as is shown in Fig. 62 is fastened upon the shaft 521 in its proper position, so that the recording pen 526 starts its spiral on the recording card at the proper hour as indicated thereby. The battery switch 497 (see Fig. 1) is closed, the clear signal lamp is illuminated, and with the test key 535 the cab signals and the brake apparatus are tested if desired. If the test responses have been satisfactory the apparatus is ready for service.

The apparatus being ready, and the train entering a block with home signals set against it and continuing set during the time of passage over the distant and home track magnets at speeds above the maximum permissible, its operation may be considered broadly from two standpoints: first, as a purely automatic system on the assumption that the engineer is disabled; second, as a co-operative apparatus under the influence of a manual application or release of the brakes or interference with the automatic operation by the engineer.

In each case the home track magnet may be reached before or after the completion of the operative cycle; and where manual application is exercised it may be differently timed and continuous, or, on the other hand, released before reaching the home magnet.

I will now consider the purely automatic operation, under the two assumptions of the home magnet being reached before and after completion of the operative cycle.

Assuming that the advance block is occupied and the home block is entered without manual application of the train brakes, the condition of the track apparatus now under consideration and the relative position of the locomotive equipment will be as illustrated in Fig. 30, wherein the advance block is shown occupied by the car truck 317, and its signal track relay 307' short-circuited thereby, its contacts therefore breaking the circuit of the line relay battery 360. The line relays 328 and 348 have become de-energized, but the circuits of the distant and home track magnets 320 and 340 have not been completed by reason of the continued energization of the bridging relays 303 and 303'.

The condition of the locomotive apparatus is as illustrated in Figs. 1, 2, 8, 9 and 56.

Referring to Figs. 1 and 56, the detector coil 410 is dead, the commutator of the cycle train is in normal position, and the only circuit thereof alive is through the visible clear signal 422 made through the shunt to the maintaining coil 433. The clockwork 519 of the recording card mechanism is running and a spiral line is being traced on the recording card.

Referring to Fig. 2, the rotary valve 7 is in running position and the service exhaust valve 22 is closed. The solenoid 99 of the engineer's automatic valve head is dead. In the controlling valve 80 the poppet valve 83 is open and the poppet valve 84 is closed. The cylinders 68 and 68' of the engineer's automatic valve head are under only atmospheric pressure, and their respective pistons 69 and 69' in their inward position. The copper strips 105, 105' are bridged by spring contacts 113, 113'. The pilot valve 119 is closed.

Air is admitted to and maintained in the lower chamber 170 of the automatic service brake valve at brake pipe pressure. Piston 168 of the automatic service brake valve is in its upper position. Supply valve 161 is open, air is admitted to and maintained in the upper chamber 169 and the capacity reservoir 165 at brake pipe pressure, and the main valve 177 is open.

The automatic emergency exhaust valve 202 (see Figs. 19 and 20) is closed. In the brake cylinder the piston 40 is in its inward position, and the brake shoes are held away from the car wheels.

Next assume that the locomotive has passed the live distant track magnet above the allowed maximum speed. What happened to the track apparatus in so doing is illustrated in Fig. 31. The condition of the circuit of the distant track magnet in this figure, prior to the time that the locomotive truck 316 had passed the insulated rail joint 302, is as just described in Fig. 30, but the moment that the truck passed the insulated rail joint the bridging relay 303 was short-circuited, thus completing the circuit of the distant track magnet 320.

When the receiver enters the field of this energized distant track magnet, as stated in the discussion of Fig. 57, the now energized coil of the detector relay 410 breaks the shunt to the maintaining coil 433, which in turn closes the circuit of the operating coil 460, and thus permits the rotation of the commutator. As the commutator continues its rotation it passes to the position shown in Fig. 58, which results in cutting off the visible clear signal and in the re-forming of the shunt to the maintaining coil. The coil detector relay will have been also de-energized when the inductive receiver left the field of the live distant track magnet.

By the continued rotation of the commutator into the position shown in Fig. 59, the circuits of the visible danger signal 423 and the audible danger signal 498 are formed by the contact fingers 494 and 495. At this time, which is but a brief interval after the live distant track magnet has been passed, the engineer is given both visible and audible danger signals and is afforded the opportunity of controlling his train in a proper manner. The condition of the other elements is not changed from that prior to the locomotive's passing the insulated rail joint 302.

The assumption is that the engineer has not taken advantage of the visible and audible cab signals, and the apparatus of the system is permitted to operate without interference. Then, the moment that the commutator shell 490 made contact with the contact finger 496 the circuit of the solenoid 99 of the engineer's automatic valve head was formed. The apparatus of the locomotive then first assumes the condition illustrated in Fig. 3. In this figure the poppet valve 83 of the controlling valve 80 is closed and the poppet valve 84 opened, permitting pressure air to enter the cylinders 68 and 68' of the engineer's automatic valve head and to drive the trunk pistons 69, 69' thereof outward. The spring retracted contact 116 is moved into contact with the binding post 102, assuring a follow-up closure of the circuit of the solenoid 99 of the engineer's automatic valve head in this manner even although its circuit through contacts 113, 113' be subsequently broken. The rotary valve 7 is moved into lap position and the pilot valve 119 opened, permitting the air in the equalizing piston chamber 19 and equalizing reservoir and in the lower chamber 170 of the automatic service brake valve to escape therethrough; and the equalizing piston 21 being unbalanced moves upward and opens the service exhaust valve 22.

Co-temporaneous with this action, the piston 168 of the automatic service brake valve makes a short quick downward drop, resulting in the instant closing of the supply valve 161, and the imprisoning of air in the upper chamber 169 and in the capacity reservoir 165 connected therewith at brake pipe pressure as illustrated in Fig. 3.

The air thus imprisoned acts as a practically constant force to press down the piston of the valve, against the regulating and return springs and the diminishing pressure of the air in the equalizing reservoir and the lower chamber of the valve body, until the main valve 177 as shown in Fig. 4 is closed. This cuts off further loss of air and consequent drop of pressure in the equalizing reservoir and the equalizing piston chamber of the engineer's valve, and establishing a pressure limit to which the air in the brake pipe, whose escape through the service exhaust port 23 is controlled by the equalizing piston in the engineer's valve, drops, with the intended resultant braking of the train.

As the train progresses in its advance from the distant track magnet to the live home track magnet under this automatic service braking, and the inductive receiver enters the field of the live home track magnet at a speed above the permissible speed at that track magnet before the completion of the operative cycle period, there will be an additional automatic brake application through the agency of the secondary exhaust valve.

The character of this second automatic brake application, it will be remembered, depends, however, on the air pressure in the brake pipe at the time it is made; if the brake pressure has been only slightly diminished it will be an emergency application, but if the pressure has been diminished even a moderate amount the second application will be a full service application.

After the train has left the distant track magnet the condition of the home track magnet circuit before reaching the home track magnet is as illustrated in Fig. 31. If the home track magnet 340 and its circuit of this figure is compared with the distant track magnet 320 and its circuit in Fig. 30, it will be noted that their conditions are identical, that is, the circuit of the home track magnet is broken by the continued energization of the bridging relay 303' until the forward wheels of the car trucks 316 pass the insulated rail joint 302', and short-circuit this bridging relay, when its armature drops and completes the track magnet circuit, precisely as in the case of the distant track magnet.

Referring now to the cycle train and its directly connected relays and circuits, it will be recalled that the circuit of the visible danger signal 423 was complete and was made through the shunt to the maintaining coil 433, that the circuit of the audible danger signal 498 was complete, and that both of these signals were active irrespective of whether the brakes were manually or automatically applied on passing the live distant track magnet; also that the circuit of the supplemental coil 499 was complete, and closure made at the contact 501 in the circuit of the solenoid 199 of the automatic secondary exhaust valve and the coil 261 of the power cut-off valve.

With this condition of the parts, the instant that the coil of the detector relay 410 is energized by the receiver passing through the lines of force created by the live home track magnet, the detector breaks the contact 426 and hence the shunt to the maintaining coil 433; the maintaining coil instantly breaks the contact 451 and makes the contact 463, completing the circuit of the solenoid 199 of the automatic secondary exhaust valve and allied circuits. When this circuit is completed the automatic secondary exhaust valve 202 (see Figs. 19 and 20) is released and the brake pipe opened to free air, thus effecting the full service or possibly emergency application of the brakes above described.

Co-temporaneous with this action, the automatic service brake recording relay 502 is shunted, the automatic secondary brake recording relay 504 energized and a record of the automatic braking made on the recording card; also the circuit of the solenoid 261 of the steam power electric cut-off valve is completed, so that the power cut-off valve 254 shuts off steam from the driving cylinders.

This completes the operation of this form of my apparatus in effecting the primary and secondary automatic braking on the assumption made, when the live home track magnet is passed prior to the completion of the operative cycle of the commutator.

If the operative cycle has been completed prior to passing the live home track magnet a record will be made on the recording card of the clock time of passing this magnet, which record will be on the primary braking side of the spiral line, but no additional automatic braking of any kind will be effected. The secondary braking is eliminated because the commutator in coming to rest at the completion of its cycle has broken all the cycle train circuits directly or indirectly connected with its contact fingers. It has also re-established the circuit of the clear visible signal 422 through the shunt to the maintaining coil, but this completion of the cycle has not disturbed the bridging of the copper strips 105, 105' in the engineer's automatic valve head by contacts 113, 113' and the follow-up contact 116; therefore, on passing the live home track magnet the signaling and recording effected on passing the distant track magnet will be repeated, but there will not be a repetition of automatic service for the following reason: From Fig. 4, which represents the condition of the parts there illustrated at the completion of the primary braking, it will be seen that the main valve 177 is seated, and in order to unseat this valve and restore the automatic service brake valve to running position it is necessary to recharge the brake pipe system and thereby introduce pressure air in the lower chamber 170 of this valve; consequently, as this has not been done, the second opening of the pilot valve, by closing the circuit of the solenoid 99 of the engineer's automatic valve head on passing the live distant track magnet, simply continues an existing condition.

So much for the purely automatic operation, but the whole system must be fully restored to normal conditions. It has been seen that the continued rotation of the commutator completes the operative cycle, first breaking all the contacts therein. The recording relays 502 and 504 being dead, their armature 525 resumes its midway position between their cores and the recording pen 526 continues the tracing of the normal spiral line on the recording card. On completion of the rotation the circuit of the clear visible signal is re-established through the shunt to the maintaining coil 433.

But there are certain other parts which have not been reset. The engineer cannot let steam into the locomotive cylinders until he has reset the steam power electric cut-off valve 254. He cannot recharge the brake pipe system and release the brakes until he has closed the opening in the brake pipe by resetting the secondary valve exhaust 202. In recharging he must move the engineer's valve handle into release position, which restores the pistons 69 and 69' to their inward, i. e., normal or at-rest position.

It will be remembered that as soon as solenoid 99 is de-energized the controlling valve 80 is restored to its normal or at-rest position, cutting off the pressure air from the motor cylinders and opening them to free atmosphere, thus relieving the pressure on the engineer's valve handle; also that when the engineer moves the rotary valve to release position pressure air from the equalizing piston chamber 19 enters the lower chamber 170 of the automatic service brake valve through the pipe connection 32, moving the piston 168 therein upward, and opening the valve 177, and at the upper limit of motion opening the supply valve 161 to permit equalization of air pressures in the upper chamber 169 and capacity reservoir 165 with that of the restored brake pipe pressure.

Thus when the engineer gets his train again in motion all the elements in my automatic system are in readiness for a second operation.

Consider, now, the operation of the system in case the engineer has made and is holding a manual service brake application, on passing a distant track magnet, or takes advantage of the visible and audible danger signals given him and makes a manual application of the brakes prior to the commutator shell 490 reaching the contact finger 496. He will thereby prevent the primary automatic service braking and recording at that magnet because of opening the circuit of the solenoid 99 of the engineer's automatic valve head and allied circuits at the copper strips 105, 105'; and the attendant results on reaching the live home track magnet will depend upon whether or not the brakes are held or released, and upon whether or not the commutator has completed its cycle.

If the cycle has not been completed, a secondary braking will occur and be recorded and the power will be cut off at the live home magnet, irrespective of whether the brakes are held or released at that point; for in either event the circuit of the solenoid 199 of the automatic secondary exhaust valve and the allied circuits are independent of the circuits controlled by the mechanism in the engineer's automatic valve head, and are complete.

If, however, the commutator has completed its cycle, then, assuming that the engineer is still holding his manual application, there will not only not be any secondary braking or power cut-off at the live home track magnet, but there will not even be any automatic primary application of the brakes or recording thereof, because the engineer in moving his handle from service back to lap position has not carried the spring contacts 113, 113' on the slack-motion switch back into contact with the copper strips 105, 105'; and since the manual application has been made prior to the commutator shell 490 reaching the contact finger 496, the follow-up contact 116 has not effected closure in the circuit through the engineer's automatic valve head. But a warning will be given by the visible and audible danger signals, whose circuits will have been closed in the normal manner heretofore described.

It should be noted that under the conditions of this assumption the train has been slowed down to such an extent that it has occupied more than the allotted safety time in traveling from one live magnet to the other, and that the brakes are still applied. The necessity for an automatic application of the brakes at the home track magnet is therefore minimized if not altogether eliminated.

But if the engineer, having made the manual application of the brakes as above, has released his brakes and the commutator has completed its cycle prior to passing the live home track magnet, then, since by the release the contacts 105, 105' in the engineer's automatic valve head have been bridged by spring contacts 113, 113', there will, at the home magnet, be identically the same condition as normally exists at the distant track magnet with purely automatic operation, as already described, and there will be a new alarm, and the initiation of the preliminary cycle train steps to effect an automatic service application of the brakes.

Assume now an interference by the engineer with the primary braking action on passing a live distant track magnet, but without making any manual application at the time, either by resisting the automatic movement of his valve handle or, if the automatic primary has come into operation, the forcible thrusting back of the same.

In the former case the contacts 105, 105' will still be bridged, for there will have been no movement of the slack-motion switch which carries contacts 113, 113'; in the latter case also these contacts will still be bridged because the automatic operation has moved the handle only to lap position.

If, now, while the operative cycle is incomplete, and the home track magnet has not been reached, the engineer lets go his handle there will be a recorded automatic primary brake application. All the time, however, whatever he does, he knows that if a live home magnet is reached before the commutator cycle is completed he will get a recorded secondary brake application of greater or less severity, together with a power cut-off, for the circuit of the solenoid 199 of the automatic secondary valve and allied circuits has been in no way disturbed. Meanwhile, the engineer not only has the active pressure touch to remind him of this possibility, but also the visible and audible signals controlled by the commutator.

If the indicated interference with automatic braking has taken place but the commutator has completed its cycle, there will be a recorded primary automatic braking at the live home track magnet, for the circuit of the solenoid 99 of the engineer's automatic valve head and the automatic brake recording relay 502 by the bridging of the copper strips 105, 105' by spring contacts 113, 113' has not been broken on moving the handle to running or release position, and the automatic service brake valve has by this movement been restored to its running position.

Generally speaking therefore, as ordinarily installed in the preferred and most complete form, where there are both primary and secondary applications, all automatic primary applications of the train brake are limited service applications. The full service or emergency application feature of the air brake system is only brought into use through the automatic operation of the safety control system when the two impulses occur within a limited time. When an automatic application occurring at a distant track magnet is manually released and the brake pipe is recharged prior to the completion of the operative cycle, an automatic full emergency application will obtain at the home track magnet; should, however, the home track magnet be reached after the completion of the operative cycle then only an automatic primary service application would take place.

The operation of the air brake equipment is preferably under manual control at all times and under all conditions of automatic primary service applications of the safety control system, during which period the braking can be increased or diminished, but it is taken out of manual control for the time being when a secondary full service or an emergency application is brought into action. Once the automatic secondary exhaust valve 202 has been opened the engineer is powerless to prevent the braking effort, for even an instantaneous attempt to recharge the brake pipe would merely result in the recharging pressure air escaping through the automatic secondary exhaust valve itself, without release of the triple valves.

All automatic secondary brake pipe reductions for full service or emergency application of the brakes usually supplement automatic primary service braking controlled, in the automatic service brake valve now under consideration, through the equalizing chamber and reservoir; and as they open the brake pipe directly to free atmosphere there is, therefore, given even a greater brake pipe exhaust opening to the atmosphere than is afforded in the standard air brake equipment emergency operation, when the service port usually remains closed. Of course, this fact does not of itself insure emergency as distinguished from full service braking, but there are conditions in operation when the value of the double opening may become manifest.

The dependence in my system of the sequence of automatic operations upon the speed of the commutator and the arrangement of the shell thereof may now be clearly seen. The sequence of operations and the length of time between them can be governed at the will of the road installing the system by proper change in the shape of commutator shell 490: for example, if it is desired that a longer time be given the engineer within which to make a manual service application after the display of cab visible and audible danger signals, it is merely necessary to increase the circumferential distance between the second and third steps of the commutator; or if it is desired to display the visible and audible danger signals in sequence rather than simultaneously, the form of the commutator shell can be readily modified so that the contact finger of either of these signals which it is desired to first make active will be first reached by the commutator shell. The scheme obviously has a large number of variations to carry out the desires of the road installing my system.

Assuming that the commutator is such as to meet the requirements of the road, the speed at which it rotates must also be determined. This is more or less governed by the distance between the distant and the home track magnets and the character of the service. A possibly desirable speed of the commutator is such that the time of its rotation shall be slightly longer than the time consumed by a train of the slowest normal speed in traveling from the distant track magnet to the home track magnet when under a proper automatic service braking effected at the distant track magnet. Under these conditions, assuming that the slowest train arrives at the distant track magnet at this speed, and that thereupon a proper service application of the brakes is automatically made and the train accordingly slackened in speed, the length of time it takes that train under such braking to go from the distant track magnet to the home track magnet might conveniently be a fraction less than the length of time it takes the commutator to complete its operative cycle. Such an arrangement would assure that the commutator will not have completed its rotation prior to the time that a train running at a faster speed than this has passed the home track magnet, and consequently provides for the action of the automatic secondary exhaust valve.

This time of commutator rotation is given as a mere suggestion, and is not to be considered in any way a limitation of my invention in this particular.

It will be seen that the commutator constitutes means for determining the time interval between the receipt of an operating impulse from the receiver and the actuation of braking, signaling or recording mechanisms and the order of actuation thereof, and may therefore be termed a timing element or timing controller.

It may be further pointed out that the signaling or the recording apparatus or both may be omitted altogether, and that any desired ratios of braking or any required intervening time interval may be adopted; also, that the secondary braking may be omitted, and the primary braking may be a full service or an emergency application.

*Detector characteristics*

The generation of current in the receiver heretofore described is caused by the transitory movement of such receiver due to the motion of the train through a field of force created by a track magnet, and not to any variation of the strength of such field as a whole while the receiver is located therein, and as the development of my system in its most preferred form depends upon a correct detector response to varying conditions, the actual physical, magnetic and electric characteristics of the detector should be fully understood. Among the conditions which must be met is the one that the relay of the detector and the receiver in circuit with it should be jointly capable of being ratably adjustable to directly respond to proportionate adjustments in the strength of a track magnet and the speed of the train over that magnet, and this more especially in the application of the system to direct speed limiting control, which system will be hereinafter more fully discussed. To attain this object in its entirety, certain magnetic and electrical characteristics should exist, and these are affected not alone by the mass and quality of materials used but by the electrical windings, both considered individually and in relation to each other.

The current generated varies almost in direct proportion to the length of the air gap, although an increase in the polar area of the track magnet and the inductive receiver will permit a proportional increase in the air gap with about the same current.

Close regulation of the air gap is essential only when direct acting speed limiting automatic control of train speed is required. Ordinarily, on account of wheel wear the tendency of the air gap is to decrease rather than to increase, and thereby to intensify the magnetic impulse; therefore any change in the locomotive or motor car adjustment that lowers it is in line with greater security of operation. The better practice is to provide uniformity of air gap, and the following considerations will be based on that condition.

The construction of the receiver heretofore described is such as to insure a quick response in passing over an energized track magnet. Inasmuch as in practice the air gap is necessarily large and the total magnetic flux is actually small, it is more important to extend the polar surfaces of the receiver than to insure perfect magnetic contact between the pole pieces and the core. I have found that pole pieces comprising an assembly of a number of thin annealed laminated iron sheets, such as are used in transformers, are sufficiently sensitive, give the requisite polar surface to reduce the air gap resistance, and are especially suited for my purpose.

Whatever the winding on the receiver or on the relay coil fed thereby, the passage of the receiver over an active track magnet will be attended by a magnetic flux in the core of the receiver, and a consequent electromotive force and current in the surrounding coil. This current, however, in turn creates a counter magnetizing effort, which stems the magnetic flux in the receiver, so that the flux may be much less than would appear if the receiver coil were open circuited.

In general, an operative combination comprises a non-moving field magnet, with upwardly extending flat polar faces across which passes, at some distance away, a rectilinearly-moving armature having a single coil, without a commutator, but connected in a closed circuit to an external coil, in which circuit there is excited an electro-motive force and resultant current of a single phase alternating character. To get the responsive results desired in their entirety this current should vary directly with the strength of the magnetic field through which the receiver (or armature) passes, and also with the speed of movement. This result will not follow unless the impedance of the receiver circuit is properly reduced; otherwise, the self-induction in the circuit may produce results different from that desired with variable speeds, as is explained in connection with Figs. 63 to 77. But even without this latter variable function the apparatus will be operative under regular signal control.

It will be noted that there is no reversal of flux, that is, the current generated is unicyclic in character, for the armature simply passes into and out of one field, and not into and out of a reversed field immediately thereafter, as in ordinary dynamo operation. It should, however, be pointed out that the operation of the detector is not dependent upon similarity of polar presentation at different track magnets.

In a properly constructed alternating current dynamo the current which appears in an armature coil is of a sine wave character for both halves of the cycle. This is not necessarily so in the structure used herein, for not only is the character of the two halves materially and controllably different, but the duration of current in the latter half may be materially longer than in the first half.

The characteristics of the current set up in the receiver actuator circuit are illustrated in Figs. 63 to 77 inclusive, which are reproductions of photographic records taken with an oscillograph.

Figs. 63, 64 and 65 are records of the currents obtained with like track magnet strength and air gap, but with car speeds varying nearly 300 per cent (Fig. 63 being the lower speed), the ohmic resistance of the detector relay coil being approximately the same as that of the coil of receiver, and without resistance other than that of connecting leads. It will be noted that each of the first halves of the curves is practically of sine wave character, but that the second halves are materially flattened, the current strength being only about a quarter of that for the first halves, while there is a gradual and quite prolonged dying away of this current.

By superposing the curves one upon the other, as in Fig. 66, another surprising result is noted, namely, that the maximum amplitudes of current for each first half of a cycle are practically the same, irrespective of the speed. This result occurs to a greater or less extent whenever the relation of windings and the resistances are such that there is a large counter-magnetizing effort in the receiver, represented by the ampere-turns in its coil.

While the current in the circuit under the conditions indicated is of considerable volume, this combination evidently fails to respond in degree to train speed variations; in short it acts much like a constant current transformer. For certain purposes, therefore, as for a speed limiting control system, its character needs to be altered.

In Figs. 67 and 68 are shown the oscillograms of currents at two different speeds, with the same receiver and detector coils, but with an external non-inductive resistance of considerable amount inserted in the circuit of the detector.

It will be noted in this latter case that, although the curves of the second halves of the cycles are still not of the same character as those of the first halves, they are very different from those illustrated in Figs. 63 to 65, inclusive, and the current amplitudes more nearly approach those in the first half cycles while the time element of the current is much shortened. With the curves superposed, as in Fig. 69, it will also be seen that the amplitudes of current generated, represented by the ordinates, are about inversely proportional to the time, represented by the length of the cycle—that is, the circuits now respond to variations in train speed.

Results similar to those shown in Figs. 67 and 68 are illustrated in Figs. 70, 71 and 72, and as superposed in Fig. 73, which show results with a lower track magnet excitation, and with the same receiver as used in obtaining the diagrams of the previous figures, but with a detector relay of higher turns and resistance, and a non-inductive external resistance in its circuit.

Figs. 74 and 75, with the superposed curves in Fig. 76, illustrate results under the last named conditions, except with an increased track magnet strength.

Fig. 77 shows three superposed curves taken with a different track magnet strength, at fairly equal high speeds, with the same inductor and detector as in Figs. 70 to 72, but with different external resistances in the detector circuit.

From the records thus briefly indicated, supplemented by a knowledge of metal masses and electrical windings and relative proportionings, it has, therefore, been found that to get the most effective apparatus, such as will respond most nearly in ratable degree to both variations of track magnet strength and train speed variations, as well as to local regulation, the ampere turns in the receiver 400 should be limited, to reduce self induction, either by reducing the number of turns of wire or by limiting the current by increasing the turns, and hence the resistance, in the detector relay 410. With this arrangement it is found that the amplitude of current will bear a direct relation both to the speed of travel and the strength of track magnet. The higher the speed or the greater the strength of track magnet, the greater the amplitude, and vice versa.

Some idea of the delicacy of this apparatus may be indicated by the fact that, with a receiver weighing about 50 lbs. and a track magnet weighing nearly 75 lbs., the detector has operatively responded, even at moderate car speeds, with an energy rate of excitation of the track magnet as low as one-fourth of a watt; and even with solid cast iron pole pieces in the track magnet, and only momentary excitations of the same, the total energy per car movement expended therein has been as low as one watt-second, or 1/180,000th part of the amount of energy used in one 16-candle carbon incandescent lamp in one hour.

The importance of this lies not in the fact, per se, that so small an amount of energy per movement is required, but that with circuits so arranged that the track magnets are energized only when there is a combination of a danger signal (or conditions normally requiring it) and a train in a certain relation thereto, the demand upon the local exciting battery of the track magnet is so small as to reduce its maintenance to a minimum, and to practically eliminate the possibility of failures due to reduction of battery capacity between times of normal replacement.

Reverting to the general apparatus and conditions now under consideration, and having a detector which requires a given strength of current to actuate its relay, it should be understood, that the normal bringing into play of automatic braking at the distant track magnet 320 and the home track magnet 340 is a matter of predetermined adjustment. These track magnets when energized are maintained at a desired and certain strength commensurate with the general equipment of the road in a manner already described; and while such track magnets in any block will ordinarily be of about the same strength, it is, as has already been pointed out, evidently possible to have either the home or the distant track magnet the stronger, and with any desired comparative strengths, so as to vary the critical speeds required to insure response at either magnet, with any particular adjustment of the detector relay.

The sensitiveness of the detector on the locomotive is individually determined by the adjustment of the air gap or retracting spring of the relay coil, or by varying the non-inductive resistance in the circuit. The air gap having been set for the proper individual sensitiveness, that is, responsiveness to a given current, it should not be changed, but the regulating resistance or the spring should be used to determine the train speed which, with any given track magnet strength, is necessary to insure sufficient electro-motive force in the inductor to give the necessary operative current in the detector relay.

As an example of an installation embodying the invention here discussed, I will state the following details of one construction actually built and used by me, but in giving this example I do not do so for the purpose of limiting my invention, but merely to illustrate the general discussion before given by a concrete case.

a. *Track magnets.*—These have a round core of Norway iron two inches in diameter, split longitudinally, and having on each end a cast iron pole piece, the face of which is about ten inches long and about six inches wide; the distance between the inner walls of the pole pieces being about twelve inches, and the core being wound with about 936 turns of #11 (B. & S.) copper wire having a resistance of about 1.09 ohms.

b. *Inductive receiver.*—This has a soft iron wire core two inches in diameter, over the ends of which are sleeved thin triangular-shaped annealed soft iron laminations sufficient in number to give polar surfaces about 10 inches long and 4 inches wide; the core is wound with about 980 turns of #12 (B. & S.) copper wire having a resistance of about .77 ohms, although a less number of turns of coarser wire would have been preferable.

c. *Detector relay.*—This is of the ordinary telegraphic form, wth the cores about three inches long, and 3/8 inch diameter, each wound with about 616 turns, or a total of 1,232 turns, of wire with a total resistance of 7.1 ohms.

d. *External non-inductive resistance.*— This is a rheostat of the ordinary variable resistance type, and was made use of to introduce resistance into the circuit of the inductive receiver varying from a few ohms to upwards of 200 ohms.

Various excitations of track magnets have been used, with operative results, the magnetizing current varying from 158 watts down to .27 watts, and the source of current for the track magnets has been varied from two 7-volt storage batteries in series down to a pocket test lamp dry cell.

Detector and brake operation at a speed of about 30 miles per hour, has been gotten under the following conditions, which except as to the distance between the track magnet and the inductive receiver are extreme:

Amperes in track magnet—0.50
Ampere turns in same—468
Watt rate in same—.27
Operative distance between pole faces of track magnet and inductive receiver—2¾ in.
Volts in circuit of inductive receiver and detector—.45
Amperes in same,—.056
Watt rate in same—.025

*Speed limit control*

We may now consider a special problem in braking from different speeds at successive points along a track in case it is desired to enforce upon an engineer the necessity of a manual graduated reduction of speed when approaching a slow-down or stopping point, to avoid being subject to automatic braking.

The diagram, Fig. 78, illustrates the principles governing the strength of the track magnets and their disposition to meet this specific case. Curves AB and CB show braking curves which illustrate the behavior of a passenger and freight train respectively when stopped in equal distances, although originally moving at different rates when the brakes are applied. As they show different rates of retardation, they must, of course if they have like brake equipment, have different degrees of reduction in their respective brake pipes. The initial speed of the passenger train is 59 miles an hour and that of the freight train is 39 miles, and in each case the train is brought to a full stop in a total distance of about 1700 ft., although, of course in different times, as indicated by the time curves OE for the passenger train and OJ for the freight train. The abscissæ represent units of distance traveled, and the ordinates for curves AB and CD, speeds in miles per hour, and in connection with the time curves OE and OJ, the elapsed time in seconds.

In addition, there is another curve, FG, whose ordinates indicate the relative track magnet strengths of the magnetic fields through which the receivers on the locomotives pass.

There is also indicated a series of track magnets 320, 320, etc., in a home block, whose energization is made dependent in some way on a danger condition in an advance block, the approach to which is to be made subject to different controlling speeds at different points.

Along the base line of the diagram, at distances corresponding to the locations of the track magnets, which, in order to illustrate two different methods of speed limiting control, are located at distances corresponding to 570, 1030, 1380 and 1600 ft., ordinates are erected which intersect the speed, time and track magnet curves as indicated.

Referring to the ordinate OF as a standard of track magnet strength, it will be noted that the ordinates increase at an accelerated rate until the last one HG is over four times the first; and that as one recedes from the point of origin the distances between the successive magnets and those between the ordinates diminish rapidly. The distances here indicated are those traversed by a train in equal units of time. At the rate of braking indicated these time units are about seven seconds for the passenger train and about eleven seconds for the freight train.

Speed control of train braking is possible by various methods. In the simplest and preferred form it is by the initiation, through the detector, of either automatic service or emergency braking, whichever may be selected, using track magnets of different strengths located wherever desired along the roadway. In the signal controlled braking before described, in which is usually effected a primary service with a possible secondary full service or emergency braking, the track magnets will be of approximately equal strength, and the detector should respond upon traveling at above a selected minimum speed over any such magnet. But it may be desired to have automatic braking at other points, whether in conjunction with or irrespective of signal indications such as entrances to curves, or at crossovers or the approach to stations, drawbridges, grade crossings, or repair locations, when a train approaches such a point at above a speed determined as safe by the conditions there existing.

Since the current in the detector, when it and the receiver are properly proportioned and wound, will vary directly in proportion to both the speeds of trains and to variations in track magnet strength, it follows that if magnets whose effective field strengths are properly adjusted are installed wherever required at crossovers, curves, etc., then a detector on the locomotive on passing through the field of any such magnet will respond only when the speed of the locomotive exceeds the operative speed for which such magnet is adjusted. This speed will be in a ratio inversely proportional to the track magnet strength. Therefore, there will be at one place operative response at speeds as low as, say, ten miles an hour, while at others the detector will respond only to higher speeds, say twenty-five miles at one, forty at another and sixty at another. Another locomotive, with a different adjustment of its receiver, will respond to higher or lower speed at these same points, but the ratios of increase or decrease at each will be the same.

As shown in the diagram, with track magnets of strengths shown by the successive ordinates, the apparatus on passenger and freight locomotives must be independently adjusted on account of necessarily different braking characteristics. In the case illustrated, the passenger locomotive apparatus has only two-thirds the sensitiveness of the freight locomotive. But at any track magnet, if the speed of either locomotive at that point should exceed the speed indicated as safe for its braking at that particular point there will be braking response. Of course, for this purpose of limiting speed at specified braking points the magnets can be located wherever desired so long as each has a strength indicated by the ordinates intersecting the curve FG at the points selected.

Referring to Fig. 78, and assuming it is desired to insure the stopping of trains at the point B, it will be seen that by properly proportioning the effective field strengths of the several track magnets, as indicated by the successive and corresponding ordinates, and with the proper braking effort, any train passing over any of such track magnets at above the permissible speed determined by the strength of the track magnet will have a braking impulse initiated by the detector thereof; and if the braking apparatus on such train is properly adjusted such train will be stopped at the point B, for the greater the speed of a given train the earlier will be the braking impulse imparted thereto. Obviously, instead of demanding a stoppage at the point B, the arrangement may be such as to limit the train speed to a selected maximum.

This method, of course, requires during any braking period only a single brake application, preferably a full service one subject to release in case a signal clears, which shall be sufficient to insure the proper slowing down or stoppage of a train at any selected point when braked from any one of several proceding points.

For this purpose the cycle train shown in Figs. 1 and 56 to 61 may be used, with any obvious changes which may be desired, as, for example, shortening or eliminating the preliminary warning period, eliminating the emergency solenoid, or changing from an initial service to an initial emergency brake application by change of the necessary circuit connections; also with a shortening of the time cycle or entirely doing away with it.

Another method, and one of quite a different character, insuring braking at different limiting speeds, is dependent upon the time occupied by a train in passing over a series of gradually shortening distances on its approach to a stopping or slow down point, these distances being so determined that a specific interval of time (dependent upon the specific rate of train braking) consumed for each distance shall not be encroached upon, which will, therefore, require a proper manual slowing down of the train if automatic braking is to be avoided.

In this case a time controller is required, but the track magnets, located at the properly spaced intervals, can be all of like strength, but still ineffective if the train be running below the permissible speeds.

In one arrangement the track is divided into a series of adjacent zones of diminishing length, and there will be a detector response at every energized track magnet, if traversed at above the limiting speed, which will either initiate a primary non-braking action if the run over the preceding space interval has been made in a period longer than the unit time, as determined by the time controller, or a braking action if the run has been made in too short a time. If the run is not made too quickly this impulse will simply initiate another primary action, to be followed again by an operative or primary action according as the runs are made, and so on.

A third method is a variation of the preceding, in that the progressively shortened zones are not adjacent, but between each is interposed a longer zone, sufficient to insure the completion of the time cycle while passing thereover. In this case, at the beginning of each of the shorter zones a non-braking action is initiated, to be followed at the beginning of the longer zone by a braking action if the shorter zone is passed over too quickly.

An example of a specific case of this last named variation is shown in Fig. 78ª, in which are illustrated a plurality of track magnets 320 and 320' arranged in a plurality of groups along a track section and in advance of a stopping or slow-down point. Each group consists of a track magnet 320 and a track magnet 320', the former in advance of the latter. The distance between the magnets of the several groups decreases as the groups are nearer the stopping or slow-down point, while the several groups are separated by distances greater than the distances between the individual magnets of the groups. The zones between the magnets of each group may be regarded as controlling zones, while the zones between the groups may be regarded as restoring zones. Thus, assuming that the magnets are energized, on a locomotive passing over the magnet 320 of the first group (i. e., the group furthest from the stopping or slow-down point) the time-controller thereon will be started and if the locomotive runs through the control zone, established by the magnets 320 and 320' of such group, in a time interval less than the time interval established by the time-controller, the impulse due to passage over the second magnet of said group will initiate an automatic braking action and the consequent proper slowing-down or stoppage of the train. If, for example because of manual braking, the time interval of passage over the said control zone is longer than that of the time-controller, so that the latter has been restored, the impulse imparted by the magnet 320' will merely serve again to start the time-controller in motion, while the distance between the magnet 320' of the first group and the magnet 320 of the second group will insure that the time-controller returns to normal position before the locomotive passes over the last named magnet. The several parts will then have been restored to a position in which similar action will take place while passing over the second group of magnets, and if the time interval of passage over the shortened control zone between the magnets of the second group is less than that due to the proper speed at said zone, the train will be slowed down or stopped, as before described in connection with the first zone. In the figure under consideration, the length of the controlling zones is such that the permissible train speeds, averaged, are about 58 miles per hour through the first controlling zone, 47 miles through the second controlling zone and about 30 miles through the third controlling zone, the time interval of the time-controller on the locomotive being set for about two seconds.

As stated, Fig. 78ª shows the progressively shortening control zones formed by the magnets 320 and 320' separated by longer restoring zones. If, however, these last named zones are shortened so that all the zones taken together progressively diminish in length; the action will be that of the modification described immediately preceding, in that as the locomotive passes over each magnet an impulse will be imparted to the time-controller, the resultant of such impulse being determined by the position of the controller. If the zone in advance of such magnet has been passed over in greater than the permissible time determined by the time-controller, the action will be merely preparatory, to release the controller, whereas if the speed in such zone has been excessive the impulse at such magnet will initiate a braking action. Thus all of the zones would be controlling zones.

The difference in the two arrangements is that with the modification of Fig. 78ª just suggested each magnet either initiates a primary non-braking action or (except for the first magnet) an automatic braking action, dependent on the time interval required to reach that magnet after passing the preceding magnet, while in the arrangement specifically shown in Fig. 78ª the first magnet in each group is always an initiating magnet and the second magnet either an initiating or braking magnet, dependent on the train speed.

It should be added that where special speed controlled braking is required, such braking can be either measured service or emergency, and may be instantaneous in response or preceded by warnings.

The essential difference between my preferred method of speed limiting control and the alternatives suggested, is that in the former the braking effort is brought into play when the permissible speed limit at the moment of passing any individual point is exceeded, while in the latter it is in response to a double impulse in case the average speed between two points is exceeded. One responds directly to an actual speed rate, the other to a time-speed interval.

*Single track operation*

In the preamble it has been stated that, for the purpose of controlling train speed at curves, it was possible to arrange track magnets so as to have detector responses with consequent automatic braking, when traveling in one direction over an energized magnet, but no response when traveling over the same magnet in an opposite direction.

In this connection attention is called to Figs. 79, 80 and 81. In these are shown like portions of a single track, one track rail 310' being continuous and the other being divided into sections 311', 312' and 313' by insulation 302. The track magnet 320 is connected through a battery 322 and a rheostat 370 on the one hand with the rail 312' and on the other with section 310'. In these figures the track magnets are indicated in outline and the receivers as shaded, while the direction of motion is represented by the arrows and the heading of the locomotive by a conventional showing of a cow-catcher. Normally, if no train is present this circuit is open, but if the running wheels connect the insulated rail section 312' with the track rail 310' the track magnet will be alive.

The track magnet is located some distance beyond the insulated rail, "beyond" here referring to the direction of train movement. Assume for illustration a wheel base of the locomotive as 21 ft., the receiver being located 3 ft. behind the front axle thereof, a length of insulated rail as 30 ft. and the track magnet located 16 ft. beyond the latter. As soon as the forward wheel of the locomotive, moving head on, as shown at A to the left in Fig. 79, comes upon the insulated rail 312', circuit is closed to the track magnet, but the inductive receiver is still about 49 ft. away from the track magnet. As the locomotive proceeds the track magnet remains energized during the period of movement over the combined lengths of the insulated rail and the overall wheel base, and, as the track magnet has been placed, the inductive receiver will pass it when there is but two feet of travel remaining prior to breaking the track magnet circuit. The general condition is shown at B', Fig. 79. But during the time consumed by the moving locomotive between the time the track magnet circuit is closed and the receiver is brought into the field thereof, there has been ample time for the magnetism of the track magnet to build up, and there will be response by the detector.

Such a track magnet installation may be made at the approach to curves where there should be a slow-down, the strength of the magnet being determined by the permissible speed allowed.

If now, as indicated in Fig. 80, the locomotive be operated backwards, the track magnet will be closed only during the time occupied by the car traveling a very short distance equal to the difference between the spacing of the track magnet from the rail section and the distance of the receiver from the rear axle, before the inductive receiver passes over the track magnet, and there will be response or not, depending on the speed of locomotive movement, and the distance allowed, and the characteristics of the electric circuits and magnets, which last named factors may be properly adjusted for the end in view.

But if, as shown in Fig. 81, the locomotive be moving from right to left, properly headed, then the circuit of the track magnet will not be completed until after the inductive receiver has passed well beyond the track magnet.

The condition indicated in Fig. 81, corresponds to a train coming out of the curve into a tangent, when there is not only no need to slow it down but it may be accelerated.

Usually in single track work, the length of blocks is such as would prohibit the use of a single pair of track magnets to protect both directions of train movements, and it will therefore generally be necessary to use two sets of track magnets, each set appropriated to one direction of train movement and controlled by the proper adjacent block or the condition of the signal governing movement into that block.

Motor driven commutator

In Fig. 82 is illustrated a method of driving the commutator electrically. The operating coil 460 and the driving clockwork therefor shown in Fig. 1 are omitted. On the shaft 510 of the main commutator is mounted a second and separate commutator comprising a contact ring 601, with an extension 602 which is in line with the lateral extending portion of the commutator shell 490, which makes contact with the contact finger 492 when in the normal position. In line with the extension 602 is an insulated section 603 which is narrower than the extension; the top line of this lies slightly below the top of the main commutator shell 490, and the bottom line of the insulated section lies slightly above the line of break between the main commutator shell and the contact finger 492.

The comutators are driven at the desired speed with a set of reducing gears 604 operated by a small motor 605 supplied from the battery 420, with which it is directly connected at one side. The other side of the motor terminates in a contact finger 606 which makes continuous contact with the commutator ring 601. Two other contact fingers 607 and 608 lie in the same axial line with the contact finger 606. The contact finger 607 bears against the insulated section 603, when the apparatus is at rest, and is directly connected with the other end of the battery. The third contact finger 608 is connected with the contact 463.

When the cycle train is at rest and the apparatus in normal position, it is noted that the circuit from the upper end of the battery 420 through the motor to the contact finger 606 is broken at contact 463, althrough the contact finger 608 is in contact with the extension 602 of the commutator ring; also that because the extension 602 is wider than the insulated section 603 there is an overlap of the circuits through the contact fingers 607 and 608 when the commutators are first advanced; and further, that because of the relation of the insulated section 603 to the main commutator shell 490, the contact finger 607 will make contact before the contact finger 492 of the main commutator breaks contact at the beginning of the commutator cycle, and will continue this contact until the finger 492 again makes conact at the end of the commutator cycle.

With these facts in mind, the action of the motor will be readily understood. When on operation of the detector the contact 463 closes and completes the circuit of the motor through the contact finger 608, the motor starts to rotate the commutator shaft, and the contact finger 607 picks up and continues the motor circuit before the contact finger 608 lets go, and also before the contact 463 is broken by reason of a break at contact finger 492. The motor, therefore, continues to rotate, the contact finger 492 breaks contact, with resultant break at contact 463, and re-establishment of the shunt to the maintaining coil 433, and then the contact finger 608 breaks contact with the extension 602. The motor will now continue to rotate until the contact finger 607 breaks contact, when it will stop; but the contact finger 608 will now have made contact with the extension 602, and be ready, therefore, to again start the motor cycle on the completion of the circuit at contact 463 by operation of the detector; and the contact finger 492 will have resumed contact with the main commutator shell 490 in normal or running position.

Electrical control of imprisoned air

In Figs. 1 to 4 and Fig. 18 the imprisoning of the air at brake pipe pressure as it exists at the beginning of the automatic service brake application, for the purpose of providing a suitable driving force to close the automatic valve, is effected by closure of the supply valve 161 by the first downward movement of the piston 168.

In Fig. 83 is shown another method of effecting this result. In this method the supply valve 161 is replaced by a valve 161', interposed between the brake pipe and the chamber 169 in the automatic valve. The valve 161' is normally open to allow equalization of air pressure in the capacity reservoir 165 with that in the brake pipe, and is closed by a solenoid 174 in parallel circuit with solenoid 99 of the controlling valve. Thus the moment the latter is energized, with the normal resultant movement of the motor piston 69 and 69' and opening of pilot valve 119, the solenoid 174 is energized, the valve 161' is closed, and the air in the capacity reservoir 165 is imprisoned at brake pipe pressure.

Automatic service brake valve, alternative form

This form is the one heretofore referred to as operating in direct connection with the brake pipe instead of upon the equalizing reservoir and the equalizing piston chamber of the engineer's brake valve. Save for the elimination of the supply valve, it is of the same general construction as the first form of automatic brake valve.

It utilizes the same principle, that is, an imprisoned air cushion at initial brake pipe pressure, to actuate a piston against an opposed spring and falling air pressure, to close a normally open valve in series with a normally closed valve, the valves in this case being in a connection from the brake pipe.

This valve, like the first form, is brought into operation by the opening of the pilot valve 119 in the engineer's automatic valve head. It contains means by which the amount of service braking can be adjusted and predetermined, and it has connected with it adjustable means for governing the rate of brake pipe discharge and thereby the rate of making automatic service braking, simulating ordinary service braking in this latter respect and possessing the same adaptability to varying conditions of service as the valve of the first form.

This form of automatic service brake valve can conveniently be understood by referring to Figs. 85, 86, 87 and 88, together with diagrammatic Fig. 84. These figures correspond respectively with Figs. 2, 3, 4, 18 and 1, and aside from the construction of the second form of automatic service brake valve and certain of the pipe connections therefrom, the other elements of these two sets of drawings are identical. This valve is so constructed as to be interchangeable with the first form in the system already described without making any alterations therein except in certain of the pipe connections of the valve itself.

In taking up the construction of the valve, Fig. 88 should be considered side by side with Fig. 18, for many of the valve parts are identical, and the description thereof in connection with the first form of valve reads directly on Fig. 88 and will not be repeated.

A comparison of the figures shows that the hollow cylindrical flanged casing 140 forming the valve body is identical with that of Fig. 18, except that no provision is made for the limiting sleeve 149 of Fig. 18, which, together with reciprocating collar 151, is omitted. Aside from this the bodies of the two valves are identical and, so far as the valve itself is concerned, serve the same purpose.

The second form of valve embraces also the compression regulating sleeve 142, the protecting cap 143, the main valve seat plug 144 and the movable disk 145, the main valve seat plug as before being connected with the pilot valve 119 by the pipe 124; and the piston 168 with its extended valve rod 176 and the main operating valve 177. The piston divides the interior of the valve body into an upper chamber 169 and a lower valve chamber 170 as in the first form, all of these parts having the same intrinsic functions.

The face plate 141', however, of the second form of valve is different from that of the first form; no supply valve is employed and the capacity reservoir 165 is omitted. The face plate is merely a disk, suitably fastened to the valve body, and through it communication is made by a pipe 166' directly with the pipe 32 which connects the equalizing piston chamber 19 with the equalizing reservoir. Due to the absence of the supply valve the upper face of the piston carries only a stop 181 which corresponds in function with the stop 181 of Fig. 18.

Further, as there is no open supply valve to be closed by the initial movement of the air piston, as in the first form of automatic service brake valve, but one spring is used, this spring performing the double function of lifting the piston and regulating the differential pressure at which the valve will close.

The heavier spring 147 is the one employed, its strength and length being properly proportioned. This spring rests on the movable disk 145, by which its tension is regulated in the same manner and with the same results as already described, and abuts directly against the lower face of the piston 168.

The second form of valve is, as before, provided with the stopped regulating valve 185, but in this case, while the regulating valve still acts in connection with the lower chamber 170, that chamber is connected directly with the brake pipe by a pipe 154' in which the valve is now located. Its operation is intrinsically the same as before described.

The construction of this form of valve does not necessitate the pipe 124 being larger in diameter than the air inlet of the lower valve chamber; requirements are met if these are of the same size when the regulating valve is wide open. The pilot valve 119, however, should be of sufficient size to permit a flow of air therethrough commensurate with the brake pipe discharge in ordinary service braking.

The operation of this form of automatic service brake valve can best be understood in connection with Figs. 85 to 87. The intrinsic operation of many of the parts is the same as in the first form of valve. Fig. 85 illustrates the normal or running position of the valve and the other elements of my system there shown. The piston 168 of the valve is at the limit of its upward position, the main valve 177 is open and the pilot valve 119 is closed.

The rotary valve 7 is in running position, and the service exhaust valve 22 closes the service exhaust port 23. As already stated, the air pressure in the equalizing reservoir and in the brake pipe is the same, so that the air pressure in the upper valve chamber 169 and in the lower valve chamber 170 is also at brake pipe pressure.

It will be recalled that in the normal operation of my system, as illustrated in these drawings, if there is no interference on the part of the engineer, when the solenoid 99 of the engineer's automatic valve head is energized the rotary valve 7 is turned to lap position, and at the same time pilot valve 119 is opened.

This condition is illustrated in Fig. 86. There it is seen that both the exhaust ports from the equalizing piston chamber 19 are blanketed, so that the air pressure therein, and in the equalizing reservoir and the upper valve chamber 169, remains at brake pipe pressure.

When the pilot valve 119 is opened air escapes from the brake pipe through pipe 154', through the regulating valve 185, which is assumed to have been properly set as hitherto described, through the lower valve chamber 170, past the main valve 177, through the pipe 124 and pilot valve 119 to atmosphere. Not only does this result in lowering the brake pipe pressure and causing a service application of the brakes, as before described, but it lowers the air pressure in the lower valve chamber 170, so that under the pressure of the imprisoned air in the equalizing reservoir, piston 168 starts its downward travel to close main valve 177.

It continues its down travel against the compression of its spring 147 until the main valve 177 is seated, cutting off escape of air from the brake pipe and limiting the service-braking. This condition is illustrated in Fig. 87, where attention is called to the fact that the service exhaust valve 22 still closes the service exhaust port 23, as obviously there has been nothing to cause it to rise and open this port.

The amount of reduction of air pressure in the brake pipe is therefore a matter of adjusting the compression of the spring 147, corresponding thus with the first form of valve.

Consequently, in this second form of valve, as in the first, the amount and rate of reduction of the brake pipe pressure within certain maximum and minimum limits are matters of pre-determination, commensurate with the requirements of the particular equipment upon which my system is installed.

The normal releasing of the brakes by the engineer results in automatically re-setting this form of automatic service brake valve, for the moment the engineer's handle is turned from lap position toward release position the pilot valve 119 closes under influence of its own spring, and on recharging pressure air flows into the brake pipe and thence into the lower valve chamber 170. This incoming air, together with the compression of the spring 147, forces the piston 168 upward until the valve 177 is fully opened and the parts are restored to the normal position illustrated in Fig. 85.

The ultimate results of the operation of this valve are thus seen to be identical with that of the first form of valve, and the manner of its operation is so analogous thereto that it is not thought necessary to repeat the general operation of my system with this form of valve substituted for the form heretofore described. Its place in the system should readily be understood from Fig. 84.

It is obvious that, as the operation of this valve is initiated solely by the operation of the pilot valve, it, like the first form of valve, in no way interferes with the manual operation of the brakes; furthermore, that the operation of this form of automatic service brake valve is also independent of the method by which the pilot valve is opened; and generally speaking, that this automatic exit has two valves in series, the one being normally open while the other is normally closed, and that these conditions are reversed at the end of the movement.

There is, however, one distinct difference in the valves. In the first form the valve responds whenever manual operation takes place, but in the second form the valve remains inert during such operation.

It may be pointed out here that, as in the first form of automatic service brake valve described, the function of the imprisoned air could be performed by a suitable spring if the normal brake pipe pressure always remained the same, but because such is not the case irregularities of operation would often likely result if such spring were used.

*Alternative track equipment—Insulated rail*

One of the alternative methods illustrated for properly energizing the track magnets is the "insulated rail" method, in contradistinction to the "bridged rail joint" method. This is illustrated in Figs. 89 to 94 inclusive. These figures correspond respectively with Figs. 26 to 31 inclusive already described, and the corresponding parts have received the same reference numerals.

The insulated rail method is so closely akin to the insulated rail joint method that repetition of a description of the corresponding parts is omitted, and no figures corresponding with Figs 21 to 23 are added, for it is assumed that the last three figures suffice for both methods, the necessary changes being obvious in view of the diagrammatic figures. As in the case of Figs. 26 to 31, certain parts shown in Figs. 21 to 23 have been omitted for clearness of showing, with the intention that they be supplied therefrom. An example of this is the rheostat 370 in Fig. 21.

In this method the insulated rail joints 302, 302' have been replaced by insulated rails 620 and 620', and loops 621 and 621' respectively span these insulated rails. The track batteries 306, 306' are shown as being provided respectively with resistances 622, 622', obviously optional. The normal track circuit of the home block therefore can be traced in Fig. 89 as follows: Starting with the battery 306', through unbroken traffic rail section 310, home block signal relay 307, rail section 311, loop 621, rail section 312, loop 621', rail section 313, and resistance 622' to the battery.

Figure 90:
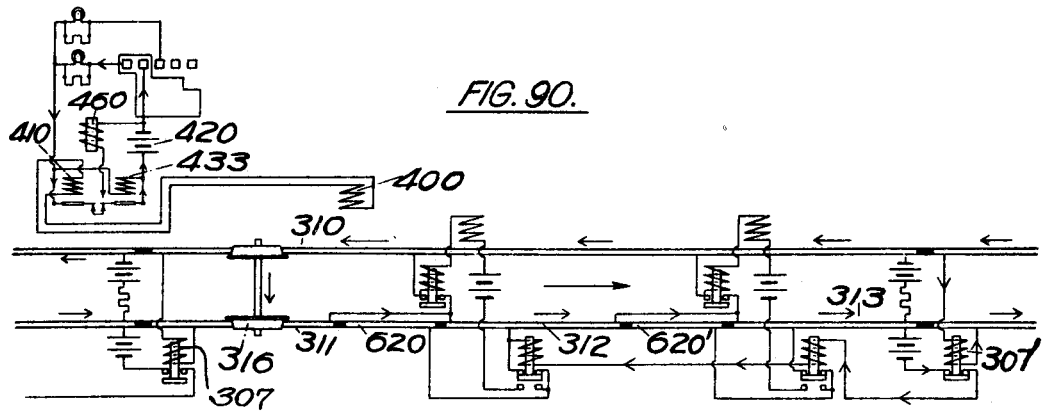

In Fig. 90 the car trucks 316, as in Fig. 27, are shown short-circuiting the home block signal track relay 307, and opening the line relay circuit controlled thereby as heretofore described. Obviously the home block signal track relay will be short-circuited so long as the car trucks connect rail section 310 with either of the rail sections 311, 312 or 313. But there are two other conditions which must be provided for in signaling; the first is the condition in which the car trucks connect the rail section 310 only with either of the insulated rails 620 or 620', and the advance signal track relay 307' is energized; and the second in which the same is true about the car trucks but the advance block signal track relay is de-energized.

Figure 91:
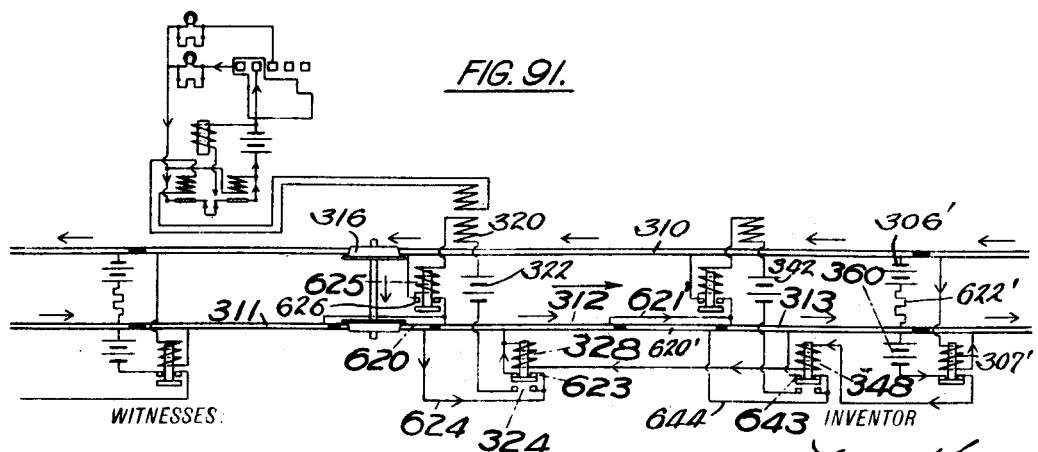
Figure 92:
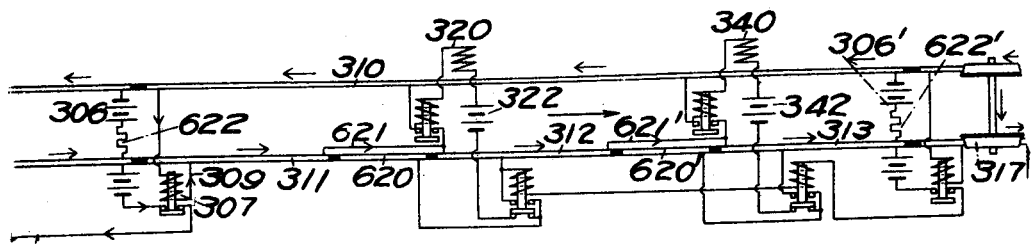
Figure 93:
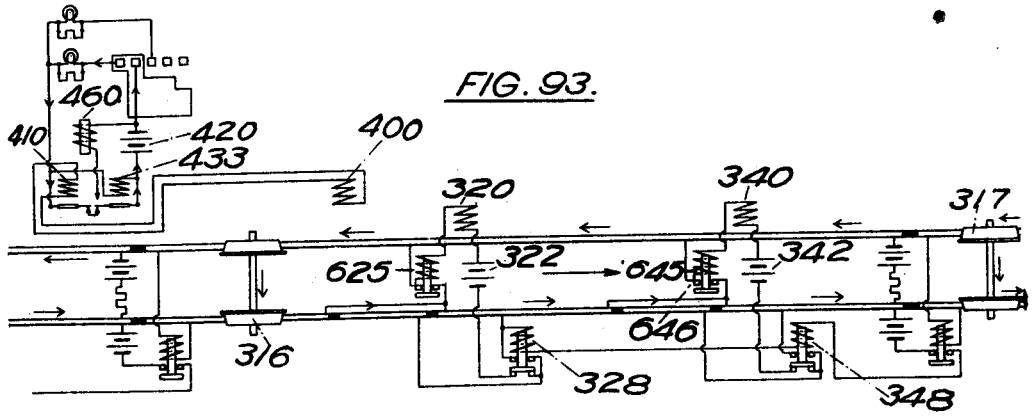
Figure 94:
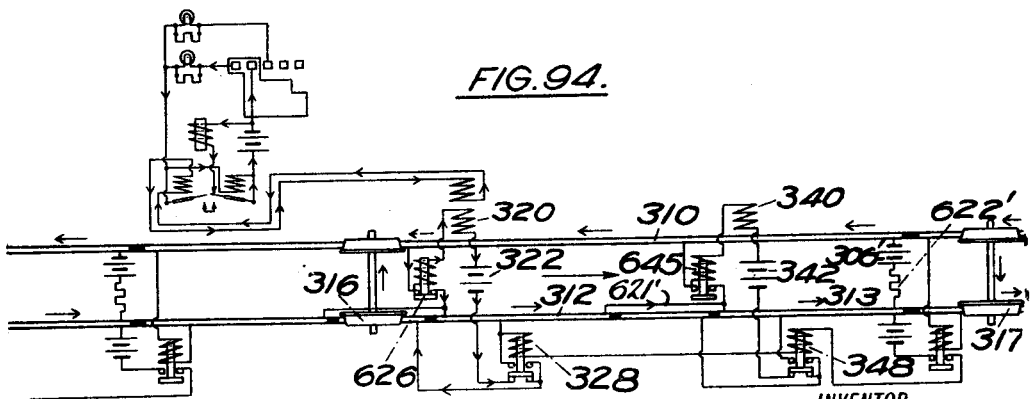

The first of these conditions is illustrated in Fig. 91. It is met through the agency of the line relays 328 and 348 in series with each other, and with the contacts of the advance block signal track relay 307' and the battery 360. The circuit of the line relays is completed through the traffic rail sections 312 and 313 and loop 621'.

The correspondence of this circuit with that in the "insulated rail joint" method is readily perceived. It is only broken when the advance block signal relay is open-circuited.

The armatures of the line relays in this method are each provided with pairs of top contacts 623 and 643 respectively, through which and the leads 624 and 644, when the line relays are energized, the traffic rail sections 312 and 313 are respectively connected to the adjacent insulated rail sections 620 and 620'.

Taking up now the condition of Fig. 91, the circuit of the home block signal battery 306' runs as follows: from the battery 306' through rail section 310, car trucks 316, insulated rail 620, lead 624, top contacts 623, rail section 312, loop 621', rail section 313, and resistance 622' to the battery. When the car trucks 316 progress to the insulated rail 620' a similar circuit is established in respect to the top contacts of the line relay 348. This can readily be traced on the drawings and is not repeated.

Without these circuits it is seen that under the conditions assumed, with the car trucks contact restricted to the insulated rail section, the normal circuit of the home block signal battery 306' would be re-established and the home block signal 307 energized, which would result in a false clear signal in the rear block.

The second of the last named signal conditions is taken care of through the agency of the track magnet batteries 322 and 342, the current from which, for this purpose, passes through the track magnet coils. The track magnet circuits will therefore be first explained.

The circuit of the distant track magnet 320 in this method is different from that in the bridged rail joint method, but the circuits and construction of the distant track magnet and of the home track magnet in the insulated rail method are similar. The corresponding parts of the home track magnet and its circuit bear reference numerals twenty in advance of those of the distant track magnet, and a separate description is omitted for the most part. The same is true of the short-circuiting relays.

The circuit of the distant track magnet 320 passes on one side through a relay 625 to the rail section 310; on the other side it passes through the track battery 322, to the bottom contacts 324 of the line relay 328—and when this relay is de-energized—through the lead 624 to the insulated rail section 620, being completed by the car truck 316 when the latter bridges the rail section 310 and the insulated rail 620. See Fig. 94.

The circuit of the home track magnet can readily be traced from the drawings and is obviously similar to that of the distant track magnet.

Thus in this system, in order that the distant track magnet be energized the advance block signal relay 307' must be de-energized as by the presence of a train in the advance block, which de-energization must be simultaneous with the presence of a train or car trucks connecting rail section 310 with the insulated section 620, and in order that the home track magnet be energized the same conditions must obtain in the advance block, and the train or car trucks in the home block must connect rail section 310 with the insulated section 620'.

It has been pointed out that with a car truck resting on the insulated section 620 (or 620') and the advance block signal track relay energized, under certain conditions the track signal circuit of the home block is completed through the car trucks resting on such insulated rail section and through the top contacts of the corresponding line relay, as has been described in connection with Fig. 91. Inasmuch, however, as the de-energization of the advance block signal track relay results in the opening of such top contacts, the described circuit through the truck will be broken. The energizing of the line relay 625 closes the contacts 626 thereof and short-circuits the home block signal track relay 307.

Considering now the last named signaling conditions more fully, the contacts 626 of the relay 625 connect the two traffic rails together when that relay is energized. When the distant track magnet is energized (the conditions necessary for which have just been recited), the circuit of the home block signal battery can be traced in Fig. 94 as follows: starting with battery 306', through rail section 310, contacts 626, rail section 312, loop 621', rail section 313, and resistance 622' to the battery. The circuit of the relay 645, under like conditions, is similar, and can readily be traced from the figures, the loop 621 and the rail section 312 of course being omitted. Without these circuits it is seen under the conditions assumed, that is, with the car truck 316 connecting the rail section 310 only with the insulated rail 620, that the normal circuit of the home block signal battery 306' would be re-established and the home block signal relay 307 energized, which would result in a false clear signal in the rear block.

This "insulated rail" method as developed therefore takes care of all of the signaling conditions above enumerated. It should readily be understood that the distant and home track magnets are energized and de-energized under the same conditions as in the case of the "bridged rail joint" method, and a fuller description of the operation is therefore omitted. There is, however, one difference to which attention may be called in the "insulated rail" method: When the train has passed onto the rail section 312 and the advance block is occupied, the distant track magnet battery 322 will be open-circuited as the circuit thereof is, as has been seen, completed through the car trucks 316 only when one side thereof rests on the insulated rail 620; and the same is correspondingly true in respect to the home track magnet when the train has passed onto rail section 313.

Single contact method

The most direct method of energizing the track magnets is illustrated in Figs. 95 and 96. This method I have called the "single contact" method. It is comparatively simple, and as in the case of the "insulated rail" method, no figures corresponding to 21 to 23 inclusive are repeated—the intention being to supply such parts as the system requires from those figures, for example, again, the rheostat 370. The distant track magnet and its circuits, and the home track magnet and its circuits are as before similar in their construction, and the corresponding parts of the home track magnet bear reference numerals twenty in advance of those of the distant track magnet.

In this method two traffic rails 310 and 630 of equal length comprise the signal section of the home block and the signal battery 306' is connected directly across them, the home block being typical of the system. The showing of car trucks short-circuiting the home block signal battery is not repeated, as it is obvious that the battery would be short-circuited by trucks similar to 316 in Fig. 90 throughout the entire length of the block section.

For convenience of showing, the line relay battery 360 is connected at one end to the rail section 630 through the contacts 315' of the advance block signal track relay when the latter is energized, and at the other end through the coils of the line relays 348 and 328 to the same rail section.

The circuit is thus always complete when the advance block signal track relay is energized, and is broken whenever this relay is open-circuited.

The circuit of distant track magnet 320 is completed from its battery 322 through the bottom contacts 324 of its line relay 328 whenever the latter is de-energized from any cause, such as opening contacts 315' of the advance block signal track relay, or a short-circuiting or breaking of the relay line: the same is correspondingly true of the home track magnet 340.

Obviously the operation of the locomotive or train equipment is the same regardless of the method by which the track magnets are energized, and no separate description is given thereof in connection with this method. In this method the track magnets are energized for the whole time the advance block is occupied, no matter whether or not there is a following train near by.

Double line relay method

The object of this is to permit the track magnet to be energized only when the advance and home block are both occupied, and thus reduce the demand on the track magnet battery. This alternative method illustrated in Figs. 97 to 99 inclusive, is for the most part a duplication of the "single contact" method just described. The signal track relays are provided with two pairs of top contacts instead of one, and there are two independent sets of line relays and circuits in each block. Considering the home block, one of the sets is under the control of the signal track relay of the advance block, and the other under control of the signal track relay of the home block.

The home block line relays and circuit under the control of the signal relay of the advance block are identical with those just described in connection with the "single contact" method. This applies not only to the showing of the diagrammatic figures themselves, but the parts to be supplied from Figs. 21 to 23. The same is true for the most part in respect to the home block line relays and circuit under the control of the signal relay of the home block.

Considering the signal track relay of the home block as typical of those of all blocks, the drawings show that an additional independent pair of top contacts 315″ have been added, through which, when the home block signal track relay 307 is energized, one end of a line relay battery 360′ is connected to the traffic rail 630. The other end of the battery is connected to the same traffic rail through the coils of the line relays 328′ and 348′ which are in series. The contacts 315″ are opened and closed simultaneously with the contacts 315.

The contacts 324′ and 344′ controlled by the line relays of this circuit are introduced respectively into the circuits of the distant and home track magnets, in series with the like contacts 324 and 344, controlled by the independent pair of line relays 328 and 348 supplied by battery 360 through the lower contacts 315′ of the advance block signal track relay when it is energized as heretofore described.

It has been seen in connection with the "single contact" method that so long as the advance block signal relay 307′ is energized both the distant and home track magnet coils are de-energized and the track magnets dead, but when the advance block signal relay is open-circuited, the armatures of the line relays drop and effect closure in track magnet circuits and the track magnets become alive. From Fig. 98 where the advance block signal track relay is open-circuited due to the car trucks 317 in the advance block, it is seen that the circuit of the coils of the distant track magnet and home track magnet are not completed owing to line relays 328′ and 348′ respectively being energized, i. e., the presence of a train or other open-circuiting conditions in the advance block is not sufficient to energize the track magnets in the home block.

In Fig. 99, the car trucks 316 are shown spanning the rail sections 310 and 630, which of course short-circuits the home block signal track relay 307, opening its controlled contacts 315″, and de-energizing the line relays 328′ and 348′. When the car trucks 317 also short-circuit the advance block signal track relay 307′ simultaneously with the shunting of the home block signal track relay, the circuits of the distant track magnet 320 and the home track magnet 340 are both completed and their coils will be energized—that is to say, the presence of a train (or an open-circuiting cause) in the advance block and in the home block simultaneously is necessary before the track magnets are energized; the presence of a train (or an open-circuiting cause) in either block alone is not sufficient for this purpose.

Obviously, the locomotive equipment operates in the same manner as with the systems already described and a description of its operation is not repeated.

*Contact rail method*

This is shown in Figs. 100 to 102, in which the energizing current is on the locomotive, and in Figs. 103 to 105, in which the energizing battery is situated on the roadbed.

Figs. 101 and 102, and Figs. 104 and 105 show a complete home block and portions of the rear and advance blocks, the home block being provided with two line relays 328 and 348, in series with the top contacts 315′ of the advance block signal track relay 307′ and with the battery 360, their circuit being completed through the track rail 630 and controlled as previously described. Figs. 100 and 103 show the same arrangement of these parts except, that for simplicity and clearness, the home relay 348 and the home contact rail 671 are omitted.

The diagram of the cycle train and the various circuits connected therewith in Fig. 100 are similar in all respects to the diagram of Fig. 57, except that the detector relay 410, instead of being connected in series with the coil of a receiver 400 and provided with a resistance 413 as in Fig. 57, now has a different circuit. One end of the detector relay is connected with the battery 420 at its lower end, and the other to the contact shoe 650 impinging against a section of contact rail 651, whose position and function in a block may correspond generally to that of the track magnets before discussed. The contact rail is electrically connected with the traffic rail 630 through the contacts of the line relay 328. The opposite end' of the battery is, through the resistance 536, connected with the car truck 316. Consequently the detector relay circuit is complete only when the contact shoe 650 is in contact with the contact rail 651 (or 671) simultaneously with the de-energizing of the line relay 328 (or 348); that is, there must be a short-circuiting of the advance block signal track relay, as by the presence of a train represented by the car trucks 317, simultaneously with the contacting of the shoe 650 with the contact rail 651 or 671 to close the circuit of the detector relay. The operation of the system from that point on is as previously described.

In Figs. 103 and 105 the resistance 413 is interposed between one end of the coil of the detector relay 410 and the contact shoe 650; the battery 322 is interposed between the contacts of the line relay 328 and either the contact rail 651 or the track rail 630; and the car trucks 316 are connected to the other end of the detector relay coil. The operation of this arrangement is the same as that shown in Figs. 100 to 102.

In either arrangement it should be noted that the consumption of current in the battery in circuit with the detector relay and occasioned thereby, is at most coincident with the contact of the contact shoe with the contact rail section.

Track rail contact method

This is shown in Fig. 106. In it the coil of the detector relay 410, instead of being connected between a contact shoe and the truck wheels as in Figs. 100 and 103, is connected between a contact wheel or brush 650′, running on one of the track rails, and the truck wheels 316.

The track is sectionalized by insulating rail joints 300, and each section has connected across it the battery 360. In each rail is interpolated an insulated length 620, the insulated lengths in the two rails being staggered in respect to each other and not overlapping. The continuity of the track circuits around these lengths is maintained by the loops 621. A battery 322 is connected across the insulated lengths 620 of each section, the connection being made through the contacts of relay 328 (or 348) the coil of which is connected across the rails of the section in advance, so that when such relay is de-energized, as by the presence of a train on such advance section, a difference of potential will exist between the two insulated lengths.

Normally, the advance section is unoccupied and the contacts of the relays are broken, and the circuit through the insulated lengths 620 is also normally broken by the absence of wheels running thereon, but when the wheels 316 of a locomotive span one of the insulated lengths 620 and the opposite rail of a section, and the advance section is also occupied as shown by the wheels 317 in Fig. 106, the circuit from the battery 322 is completed through one of the insulated lengths 620, the truck wheels 316, the detector relay 410, contact wheel 650′, the other insulated length 620, and the contacts of the relay, thus giving as the train passes along, a momentary excitation of the detector relay, with the same function and operation of the apparatus of the locomotive as has been described in connection with the apparatus in Figs. 56 to 61.

Track rail contact method—Second form

This is illustrated in Figs. 107, 108 and 109.

In these figures a portion of the circuits controlled by the commutator only are shown. The detector relay of the previous forms is dispensed with, and the contact 451 of the maintaining coil 433 is connected with the contact wheels 650′, which are insulated from the truck, while the armature 452 of the maintaining coil is, as in previous figures, connected with one end of the battery 420. The opposite end of the battery is, as before, connected with the commutator finger 493, while the clear and danger signals 422 and 423 are connected with the fingers 492 and 494, as before, and with the truck wheels 316, 316. The maintaining coil is connected at one side to the battery 420 and at the other with the clear and danger signal circuits as before. Thus, in this form, the shunt to the maintaining coil includes not only its armature and the contact controlled thereby, but also the truck wheels 316 and the contact wheels 650′ and track rails bridging the latter. The operating coil 460 has, as before, its circuit completed through the contact 463 controlled by the maintaining coil.

So long as nothing occurs to break the shunt to the maintaining coil as made through the truck wheels 316, the contact wheels 650′ and the track rails, as shown in Fig. 107, the maintaining coil will remain de-energized and the cycle train at rest, but if for any reason the circuit through the track rails be broken there will result the same sequence of operation in the circuits controlled by the cycle train as already described in reference to the structure shown in Figs. 56 to 61. To effect the breaking of the shunt circuit when required, there is interposed in each of the track rails a length of insulated rail 620, but instead of staggering these lengths without overlap, as has been described in connection with Fig. 106, the lengths are staggered but overlap, the distance between one end of one insulated length and the opposite end of the other insulated length being less than that of the wheel base of a truck. The insulated lengths of the opposite rails are conductively connected by a cross connection, and one of them is also connected with the track rails adjacent thereto by means of contacts controlled by the relay 328, such relay being energized by the battery 360 and being controlled by the track signal relay 307′ of the advance block. In the figures under consideration, two relays 328 and 348, are shown with corresponding sets of insulated rail lengths to afford the primary and secondary braking impulses.

By this construction, so long as the circuit through the contacts of relay 328 (or 348) is closed, the shunt to the maintaining coil is not broken when the locomotive passes over the insulated lengths 620, for such shunt will then be closed from the truck wheels 316 through the traffic rail, the contacts of relay 328 (or 348), the insulated rail lengths and the contact wheel 650′, as is shown in Fig. 108. If, however, the advance block is occupied and the relays 328 and 348 are de-energized, when a locomotive passes over the insulated lengths controlled thereby, as is shown in Fig. 109, then the connection between the rail sections 620 and the adjacent lengths of traffic rails will be broken, breaking the shunt to the maintaining coil 433, and energizing that coil, which will open its shunt at contact 451 and close the circuit of the operating coil 460 at contact 463, whereupon the cycle train will be started in operation. This will result in breaking the circuit of the maintaining coil and of its shunt at contact finger 492 and in the dropping of the armature of the maintaining coil to close the circuit of its shunt at contact 451. Further rotation of the commutator completes the circuit of the maintaining coil and its shunt through the contact finger 494 of the danger signal circuit, and then, if the locomotive in its advance movement passes over the insulated rail lengths corresponding to the relay 348 while the danger condition still exists in the advance block, the shunt to the maintaining coil will be again broken, with the resultant operations incident to the home track magnet heretofore described.

The insulated lengths 620 are staggered in respect to each other in this form to prevent the breaking of the shunt to the maintaining coil by reason of the contact wheels 650' being simultaneously on the insulation at the end of the opposite insulated lengths and they are cross connected for the same reason; for otherwise the shunt circuit would be broken when, as illustrated, the right hand contact wheel passes onto the forward insulation of its insulated rail length.

*Other methods of operating the detector*

As has been stated, the momentary impulse necessary to initiate the operation of my detector can be gotten in many ways besides those shown in the various preceding diagrams. Some of these alternative methods are shown in abbreviated fashion in Figs. 110 to 115.

Figure 110:
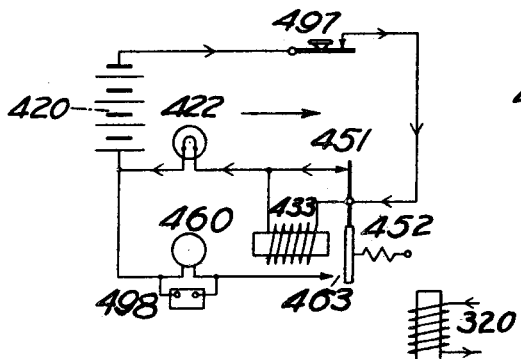
Figure 111:
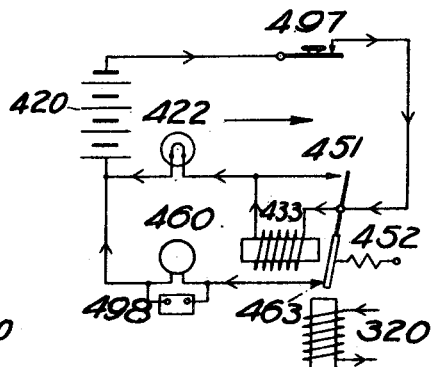

In Fig. 110, the armature 452 is normally held spring-retracted against the contact 451 in the shunt to the maintaining coil 433, which is therefore de-energized; but when the locomotive moves in the direction shown by arrow point over the track magnet 320, as shown in Fig. 111, the armature 452 meets resistance to its forward movement and is pulled back, breaking the contact 451, with the resultant energization of the maintaining coil 433, and closure of the contact 463 in the circuit of the danger signal 498 and the operating coil 460.

Figure 112:
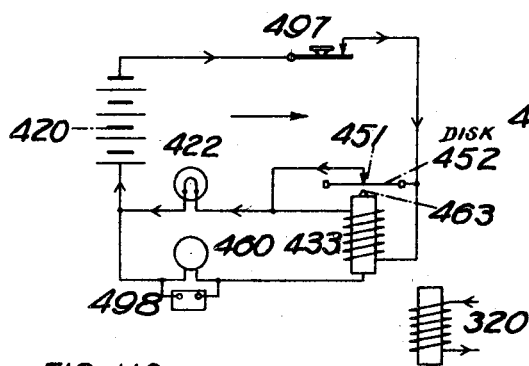
Figure 113:
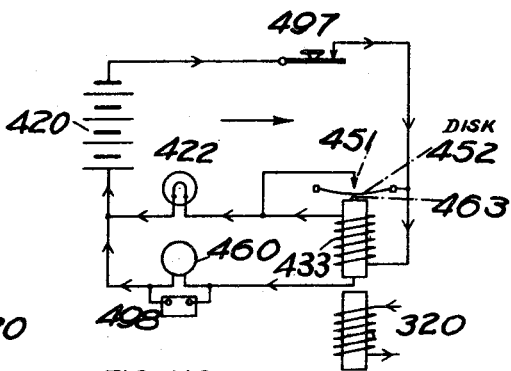

In Fig. 112 the armature of the maintaining coil 433 is shown as a disk 452, and the shunt to the coil is made by the contact 451 impinging against its center. When, however, the core of the maintaining coil 433 passes over the track magnet 320, as shown in Fig. 113, the disk 452 is drawn down, the contact 451 in the shunt is broken, the maintaining coil is energized and contact is made at 463, as before.

Figure 114:
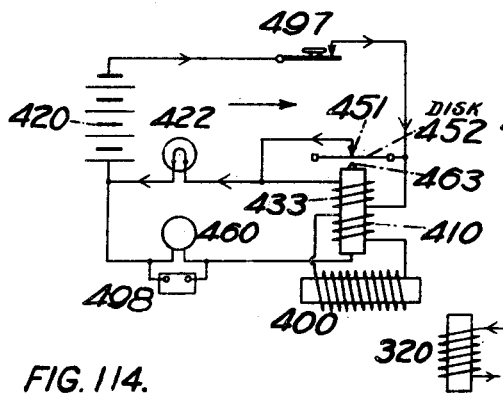
Figure 115:
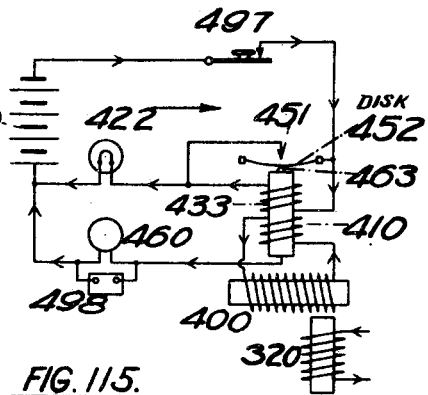

In Fig. 114, the core of the maintaining coil 433 is wound with a supplemental coil 410 in series with an inductive coil 400, and the shunt to the maintaining coil is made, as in Fig. 112, by the contact 451 impinging against the disk 452. As the coil 400 passes into the field of the track magnet 320 a current is induced in it and coil 410, which momentarily breaks contact 451, which, as before, is then kept broken by the maintaining coil 433, and contact is made at 463.

In the cases shown in Figs. 110 to 115 inclusive the restoration of the demagnetized shunt condition of the maintaining coil 433 is made by breaking circuit at the switch 497.

*Normally closed control circuits*

While the construction of apparatus and the connection of brake operating circuits as shown in Figs. 1 and 56 to 61 embody a normal open circuit method of operation, it is evident that the closed circuit method may be used by obvious changes. This is indicated in diagrammatic Fig. 116, which, so far as the track and detector and allied circuits are concerned, is the same as Fig. 57.

But in Fig. 116, the commutator shell 490 is changed in form on its right hand end, so that solenoid 99 is in a normally closed circuit, and hence is energized by current from the battery 420. The solenoid, when energized, instead of pulling down the lever 95 (see Fig. 12) to operate the controlling valve 80, holds it up, the lever being pulled by its operating spring, when released, against the plunger 85' of the controlling valve 80. Such release of the lever will occur whenever the current in coil 99 is broken from any cause; normally, this happens when, as the commutator 491 advances in its rotation, contact finger 496 breaks contact.

To effect the same control of the action of solenoid 99 as is in the open circuit method shown in Fig. 56 exercised through the movement of a slack-motion switch by the rotation of the air spindle of the engineer's brake valve, it is necessary to have the slack-motion contacts 113 close a maintaining shunt around the finger 496 when a manual brake application is made, and the follow-up contact 116 open the same shunt circuit when an automatic application is made.

While I have shown the signal blocks as formed by insulated rail joints, and the sources of track signaling currents as batteries, as is a common practice on steam railroads, it is obvious that my invention is equally applicable to railroads in which the rails are used as the return for the propulsion current, and the track signaling currents are superimposed thereon and are of different character therefrom. Such schemes are well known in the art, and in them the signal blocks are formed in various ways, dependent upon the characters of the two currents. It is not, therefore, necessary to show such use of my invention, it being understood that the relays energized by the currents individualized to and flowing in the track rails of the several blocks will be properly constructed and connected to respond to such currents, and not to the propulsion currents if the latter flow therethrough. Such constructions of relays are well known.

As already indicated, the system set forth can be used without reference to, and independent of any signal system; for, in addition to their normal use and their use for speed limiting control, one or more track magnets may be installed wherever desired for the purpose of insuring automatic service braking alone, or service and full service or emergency braking of a train at any desired point where special danger necessitates such actions. When so used, the circuits of such magnets may be kept normally open, or normally closed to give constant magnetization, or their closure may be made manually, or dependent upon train approach, or upon any required combination of manual and automatic actions.

Should a particularly hazardous condition on the line of road require extraordinary measures for stopping a train quickly in the event of its passing a distant track magnet before the danger signal is or normally should be displayed, then an additional track magnet placed a short distance from the home track magnet will, when energized cause an automatic full emergency application of the brakes on passing the second of this pair of magnets.

Also, if it be desired to protect a train against a home signal thrown because of some sudden emergency after the train has passed the second regular magnet, as for example in case of a wreck on one of the tracks in the advance block, involving its mate, special track magnets may be installed beyond the home signal and operated thereby.

It will be noted that the track magnets form impulse creating means, that is to say, are the means of creating impulses in and through the agency of the vehicle apparatus which are utilized in determining the vehicle movements. In a like manner, the contact rails shown in certain figures of the accompanying drawings are also impulse creating means, and in certain aspects of my invention it is obviously immaterial whether the impulse so created on the vehicle is electrical or dynamic.

In a like manner, the impulse receiver upon the vehicle is susceptible of assuming a variety of forms provided it be of such character as to co-operate with the impulse creating means and be capable of receiving the impulse created by the latter.

It will be further noted that the impulses created in the car are either operative or inoperative, dependent on whether or not they are of a predetermined strength. If in excess of such strength they are operative in controlling the train movement, either by affording signal indications to the engineer by which he is to be guided, or by themselves actuating speed controlling mechanism, or, as in the preferred construction shown herein, first giving the signal indication and then if such indication is not manually followed, automatically applying the brakes.

I have in the foregoing described certain mechanisms and their assemblage to fully accomplish the ends in view, and have described the operation and inter-action of such mechanisms when so assembled. Not only is this invention embraced in such conjoint use of some or all of the several mechanisms, whether in the form herein shown or in some other form or embodiment equivalent thereto for the purpose had in view in such assemblage, but it is also embraced in the individual mechanisms themselves, either in the form herein shown or in some other form or embodiment equivalent thereto for the purpose then had in view.

Moreover, as has been pointed out, I have invented certain methods which, while they may be carried out by the aid of the mechanisms shown herein, are capable of being carried out by other and different mechanisms, and therefore, I do not, in claiming such methods, restrict the claims thereon in any way to mechanisms by which they may be performed.

The term "vehicle" is used herein as designating not only a single vehicle but a plurality of them when assembled in a train.

The foregoing detailed description has been given for clearness of understanding, and no undue limitation should be deduced therefrom, but the appended claims should be construed as broadly as permissible in view of the prior art.

It should be noted that the disclosure of this application includes several features on which separate divisional applications have been filed, viz., on the detector circuit, application Ser. No. 80,714 filed Feb. 26, 1916, now Patent No. 1,248,942 of Dec. 4, 1917; on the recorder, application Ser. No. 80,715 of Feb. 26, 1916, now Patent No. 1,322,148 of Nov. 18, 1919; on the automatic control of the engineer's valve, application Ser. No. 59,564 filed Sept. 30, 1925, now Patent No. 1,581,094 of Apr. 13, 1926; on the pressure equalizer, application Ser. No. 34,703 filed June 3, 1925, original Patent No. 1,553,295 of Sept. 8, 1925—reissue application Ser. No. 96,658 filed Mar. 22, 1926, now Patent Re. 16,395; and on the feature of forestalling, application Ser. No. 215,119 filed Aug. 24, 1927.

Attention is also called to the fact that some features of the invention of this application have formed the subject matter of divisional applications which resulted in the following patents: U. S. Patent 1,248,942 of December 4, 1917 (div. application Ser. No. 80,714 of Feb. 26, 1916) relating to the electric detector circuit; U. S. Patent 1,322,148 of November 18, 1919 (div. application Ser. No. 80,715 of Feb. 26, 1916) relating to the recorder; U. S. Patent 1,518,094 of April 13, 1926 (div. application Ser. No. 59,564 of Sept. 30, 1925) relating to the movement of the engineer's brake valve and Reissue 16,395 of July 27, 1926 (div. application Ser. No. 34,703 of June 3, 1925, original No. 1,553,295 dated Sept. 8, 1925, reissue filed Mar. 22, 1926 Ser. No. 96,658) relating to the pressure equalizer for air brake systems.

Having thus described my invention, what I claim and desire to secure by Letters-Patent is:

1. The hereinbefore described method of control of a vehicle provided with a braking system embodying an engineer's valve, which comprises automatically signalling on the vehicle a danger condition, automatically moving the engineer's valve to lap position, thereafter and while the engineer's valve is in said position, automatically effecting a controlled primary braking, and thereafter and while the valve is in said position, automatically effecting a secondary braking of an emergency character if the danger condition continues and the train is not stopped.

2. The combination with a track and a vehicle moving thereon, of a brake system upon the vehicle, means located upon the vehicle and along the track for effecting a reduction of air pressure, and means located on the vehicle for causing such reduction to be uniform and predetermined in amount irrespective of the initial air pressure.

3. The combination with a track and a vehicle moving thereon, of a brake system on the vehicle, co-operating track impulse creating means and vehicle impulse receiving means, means for effecting a predetermined and uniform drop of brake pipe pressure, and means actuated by an impulse in excess of a predetermined strength for actuating the brake applying means.

4. The combination with a track and a vehicle moving thereon, of a brake system including an engineer's valve, and means located along the track and upon the vehicle for effecting a reduction of air pressure in the brake system and at the same time for placing the engineer's valve in lap position.

5. The combination with a track and a vehicle moving thereon, of means upon the vehicle for automatically effecting, when actuated, a primary brake application of predeterminately uniform amount, means upon the vehicle for effecting an increased secondary brake application, and means located along the track for successively actuating the brake applying means upon the passage thereby of the vehicle.

6. The combination with a track and a vehicle moving thereon, of means upon the vehicle for automatically effecting, when actuated, a limited brake application thereto, a timing controller for actuating the brake applying means, means, located along the track, for initiating the action of the controller, and means under the control of the engineer for actuating the brake-applying means, and for preventing, for a limited time after the initiation of the action of the controller, the actuation of the brake applying means by the controller.

7. The combination with a vehicle having a braking system thereon, of a track along which the vehicle moves, means located along the track for imparting a primary braking to the vehicle, means located along the track for imparting a secondary braking impulse to the vehicle, and a timing element for nullifying the application of the last named braking impulses unless the successive impulses are received by the vehicle within a predetermined time.

8. The combination with a track and a vehicle moving thereon, of a timing element upon the vehicle, an alarm circuit controlled by the timing element, means controlled by the timing element to automatically effect a limited brake application to the vehicle, means located along the track for governing the action of the timing element, and means under the control of the engineer for actuating the brake applying means and for preventing, for a limited time after the initiation of the action of the timing element, the actuation of the brake applying means by the timing element.

9. In a braking system, the combination with a service brake applying circuit and with an emergency brake applying circuit, of means for closing only the service brake applying circuit and for closing both circuits, a recording solenoid in each of the said circuits, a stylus subject to the action of both of said solenoids and differently responsive thereto, and means in the emergency brake applying circuit for nullifying the action of the solenoid in the service brake applying circuit.

10. In a braking system, the combination with a track apparatus, of a circuit for effecting a service application of the brakes, a circuit for effecting an emergency application of the brakes, a solenoid in each of said circuits, a single recording stylus under the influence of both of the said solenoids, means including a track controlled part and a timing element for conjointly determining the closure of the said circuits and means contained in the emergency brake circuit for shunting the stylus solenoid in the service brake circuit.

11. The combination with a track and a vehicle moving thereon, of a braking system upon the vehicle provided with means for making service and emergency brake applications, means for imparting to the vehicle from the track a plurality of impulses, a timing element upon the vehicle set in motion by a track impulse, a service brake circuit including a contact made by the timing element after it has been put in motion, an emergency brake circuit including in series a contact which is closed while the service brake circuit is energized and a contact made upon the receipt of an impulse subsequent to the first-named impulse, a recording solenoid in each of said circuits, a stylus subject to the action of both of these solenoids and means in the emergency circuit for short-circuiting the recording solenoid in the service circuit.

12. In a braking system, the combination with a brake apparatus and means for effecting service and then emergency braking, of a circuit for effecting the actuation of the service brake applying means, a circuit for effecting the actuation of the emergency brake applying means, a track controlled element adapted to receive a plurality of transitory impulses at different points along the track, a detector actuated by said impulses, a cycle train controlled thereby and controlling the energization of the service brake circuit, a relay in shunt with the service brake applying means which when energized closes a contact in the emergency brake applying circuit, a relay controlled by the energization of the detector relay to close another contact in the emergency brake circuit, recording solenoids in the service and emergency brake circuits, a recording stylus controlled thereby and means in the emergency brake circuit to shunt the recording solenoid in the service brake circuit.

13. The combination with a vehicle having a brake system thereon, of means for effecting a primary brake application, and means controlled by the speed of the vehicle after the primary brake application for effecting a secondary brake application.

14. The combination with a vehicle having a brake system thereon, of means for effecting a primary measured brake application, and means controlled by the speed of the vehicle after the primary brake application for effecting a secondary measured brake application.

15. The combination with a vehicle, of a brake system on the vehicle, means for effecting a primary brake application, and means controlled by the distance traveled by the vehicle after the primary brake application and the time consumed therein for effecting a secondary application.

16. The combination with a track and with a vehicle moving thereon, of a timing element on the vehicle, means for effecting, when actuated, a primary brake application to the vehicle, means for effecting a secondary brake application to the vehicle, and means located along the track, and controlling the actuation of the brake applying means upon the vehicle, the actuation of the second brake applying means being also controlled by the timing element.

17. The combination with a track and a vehicle moving thereon, of means located along the track for imparting a succession of impulses to the vehicle, means controlled by the first of such impulses to effect a primary braking of the vehicle, a timing element operated by the first of such impulses, and means controlled by the timing element and a following impulse, to effect a secondary braking.

18. The combination with a track and a vehicle moving thereon, of means located along the track for imparting successive impulses to the vehicle, means controlled by the first of such impulses for effecting a primary braking, and means controlled by a succeeding impulse within a predetermined time interval from the first impulse for effecting a secondary braking.

19. The combination with a track and a vehicle moving thereon, of a brake system on the vehicle, means for effecting a primary measured brake application, and means controlled by the speed of the train after the primary brake application for effecting a secondary brake application.

20. The combination with a track and a vehicle moving thereon, of a brake system including means for manually controlling the brake application, automatic means for effecting a primary brake application subordinated in their action to the manual application of the brakes, and means controlled by the speed of the train for effecting a secondary brake application.

21. The combination with a track and a vehicle moving thereon, of a brake system including means for manually controlling brake applications, means located along the track for imparting an impulse to the vehicle, means actuated by the impulse so conveyed to the vehicle for automatically effecting a primary brake application subject to manual control of the brakes, means located along the track for imparting a second impulse to the vehicle, and means located on the vehicle and including a timing element for effecting a secondary brake application by the second impulse.

22. The combination with a track, of a vehicle moving thereon, of a track magnet, a circuit-closer for the said magnet located at a distance from such magnet and controlling the energization thereof and controlled by the vehicle when in proximity thereto, and an impulse receiver asymmetrically mounted upon the vehicle to receive an impulse from the energized track magnet dependent upon the asymmetrical position of the receiver upon the vehicle.

23. The combination with a track magnet, of a circuit-closer for determining the energization of such magnet, a vehicle controlling the circuit-closer when at a distance from the track magnet, and an impulse receiver mounted upon the vehicle asymmetrically of the length thereof to receive an impulse from the energized track magnet dependent upon the asymmetrical position of the receiver upon the vehicle.

24. In an automatic train brake system, the combination with means for effecting a reduction of air pressure to make an automatic brake application, of means for causing such reduction to be of a value determined by adjustments established prior to initiation of the action of such means.

25. In an automatic train brake system, the combination with means for effecting a reduction of air pressure to make an automatic brake application, of means for causing such reduction to be of a value in rate and amount determined by adjustments established prior to initiation of the action of such means.

26. In an automatic train brake system, the combination with means for effecting reductions of air pressure to make a plurality of different automatic service brake applications, of means for causing the several reductions to be predetermined and uniform.

27. In a train brake system, means automatically limited in their action for effecting a reduction of air pressure by a definite predetermined value irrespective of the initial air pressure.

28. In a train brake system, the combination with means for reducing the brake pipe pressure therein, of means brought into action thereby for automatically limiting such reduction of pressure to a reduction of a predetermined amount irrespective of the initial pressure.

29. In a train brake system, the combination with means for effecting reductions of air pressure to make a plurality of different brake applications, of means for automatically causing the several reductions to be predetermined, limited and uniform, irrespective of the initial air pressure.

30. In a train brake system including a brake pipe, the combination with means for making a limited reduction of air pressure in the brake pipe at will, of means for reducing air pressure in the brake pipe by fixed amount irrespective of the initial pressure.

31. In a train brake system, the combination with a brake pipe of a plurality of means for effecting limiting reductions of pressure in the brake pipe, one of such means being manually operable at will, and the other of such means being automatic in its action to cause the reductions effected thereby to be fixed and uniform in amount irrespective of initial pressure.

32. In a train brake system, the combination with a brake pipe and a source of charging air therefor, of means for disconnecting the two and for then reducing the brake pipe pressure, and means brought into action thereby to limit such reduction to a predetermined amount irrespective of the initial pressure.

33. In a train brake system, the combination with a brake pipe and a source of charging air therefor, of means for disconnecting the two, means for reducing the brake pipe pressure, and means actuated thereby for automatically limiting such reduction to a predetermined amount independently of the initial pressure.

34. In a train brake system, the combination with an exhaust valve therefor operated by opposing air pressures, of means for reducing one of said pressures to operate the valve to make a service brake application, and means for automatically causing such reduction of pressure to be of a uniform amount.

35. In a train brake system, the combination with an exhaust valve therefor operated by a difference between the brake pipe pressure and a controlling air pressure, of means for initially causing these pressures to be alike, and means for automatically causing a reduction of the controlling air pressure of a uniform amount and for thereby effecting a similar reduction of brake pipe pressure.

36. In a train brake system, the combination with an exhaust valve operated by a difference between the brake pipe and a controlling air pressure, of means for reducing the last named pressure, and means brought into action thereby for automatically limiting such reduction by a definite amount irrespective of the initial controlling air pressure.

37. In a train brake system, the combination with an exhaust valve therefor operated by a difference between the brake pipe pressure and a controlling air pressure, of means for initially causing these pressures to be alike, means for automatically reducing the controlling air pressure by a definite amount irrespective of the initial pressure and for thereby effecting a similar reduction of brake pipe pressure.

38. In a train brake system, the combination with an exhaust valve therefor operated by a difference between the brake pipe pressure and a controlling air pressure, of means for initially causing these pressures to be alike, means for automatically reducing the controlling air pressure by a definite amount irrespective of the initial pressure and for thereby effecting a similar reduction of brake pipe pressure, and adjustable means for regulating the rate of drop of the controlling air pressure.

39. In an air brake system, the combination with an exhaust valve operated by a difference between the brake pipe pressure and a controlling air pressure, of means for regulating the last named pressure, comprising two valves in series, one being normally open and the other normally closed, means for opening the normally closed valve and means for automatically closing the normally open valve upon a drop of the controlling air pressure.

40. In a train brake system, comprising an equalizing reservoir and brake pipe, the combination of a capacity chamber normally connected with the brake pipe, a cut-off valve for such connection, a chamber connected to the equalizing reservoir, a connection from last named chamber to atmosphere, two valves in series in said connection, one of the said valves being normally closed and the other normally open, means for opening the normally closed valve to reduce pressure in the last named chamber and to close the cut-off valve to maintain pressure in the capacity chamber, and a piston subjected to the opposing pressures in the two chambers and which when thrown closes the normally open valve.

41. In a train brake system, comprising an equalizing reservoir and brake pipe, the combination of a capacity chamber normally connected with the brake pipe, a cut-off valve for such connection, a chamber connected to the equalizing reservoir, a connection from the last named chamber to atmosphere, two valves in series in said connection, one of said valves being normally closed and the other normally open, means for opening the normally closed valve to reduce the pressure in said last named chamber, a piston subject to the opposing pressure in the two chambers and which when moved first closes the cut-off valve to maintain pressure in the capacity chamber and then closes the normally open valve to limit the reduction of pressure in the equalizing chamber.

42. In a train brake system comprising an equalizing reservoir, a brake pipe, and a service valve whose position varies with the difference of pressure between the equalizing reservoir and the brake pipe, the combination with a chamber normally maintained at brake pipe pressure, a second chamber normally maintained at equalizing reservoir pressure, means for reducing the pressure in the equalizing reservoir and in the last named chamber, and means operated by the difference of pressure so created between the two chambers for closing the connection between the first named chamber and the brake pipe and for limiting the reduction of pressure in the equalizing chamber.

43. In a train brake system, comprising an equalizing reservoir, a brake pipe, and a service valve whose position varies with the difference of pressure between the equalizing reservoir and the brake pipe, the combination with two chambers, the pressure in the equalizing reservoir, the brake pipe and the two chambers being normally the same, of means for reducing the pressure in the equalizing reservoir and in one of the chambers, means operated by the difference of pressure between the two chambers so created for closing the connection between the other chamber and the brake pipe and for limiting the reduction of pressure in the equalizing reservoir.

44. In a brake pipe system, the combination with an equalizing reservoir, a brake pipe, and a capacity chamber normally having the same air pressure therein, of a service valve whose position varies with the difference of pressure in the equalizing reservoir and the brake pipe, means for causing a variation of pressure between the equalizing reservoir and the capacity chamber and the brake pipe, and means operated by such difference of pressure for limiting the reduction of pressure in the equalizing reservoir.

45. In a train brake system, the combination with an equalizing reservoir, of a brake pipe, a service valve whose position varies with the difference of pressure between the equalizing reservoir and the brake pipe, a capacity chamber, a second chamber connected with the equalizing reservoir, means for reducing the pressure in the equalizing reservoir and the last named chamber without immediate reduction of pressure in the capacity chamber, a piston subjected to the opposing pressure in the two chambers and biased against pressure in the capacity chamber, and means operated by the piston upon a reduction of pressure in the equalizing reservoir determined by the amount of bias of the piston and for limiting the reduction of pressure in the equalizing reservoir.

46. In a train brake system, the combination of an equalizing reservoir, a brake pipe, a service valve whose position varies with the difference of pressure between the equalizing reservoir and the brake pipe, a capacity chamber normally in communication with the brake pipe, a second chamber connected with the equalizing reservoir, means for reducing the pressure in the equalizing reservoir and in the last named chamber, a piston subjected to the opposing pressures in the two chambers and biased against pressure in the capacity chamber, and means, operated by the piston upon a reduction of equalizing reservoir pressure determined by the amount of bias of the piston, for closing the connection between the capacity chamber and the brake pipe and for limiting the reduction of pressure in the equalizing reservoir.

47. In a train brake system, the combination with a brake pipe, of a source of charging air therefor, an equalizing reservoir, a service exhaust valve from the brake pipe operated by a difference between the brake pipe pressure and the equalizing reservoir pressure, means for reducing the last named pressure and for disconnecting the source of charging air and the brake pipe, and means brought into action thereby for automatically limiting such reduction of pressure.

48. In a train brake system, the combination with a brake pipe, of a source of charging air therefor, a service exhaust valve from the brake pipe operated by a difference between the brake pipe pressure and a controlling air pressure, of means for reducing the last named pressure and for disconnecting the connection between the source of charging air and the brake pipe, and means brought into action thereby for automatically limiting such reduction of pressure to a definite amount irrespective of the initial controlling air pressure.

49. In a brake pipe system, the combination with a service valve operated by a controlling air pressure, of an engineer's valve for variable reducing such controlling pressure at will, and means for predeterminately effecting a uniform reduction of such controlling pressure.

50. In a train brake system, the combination with a service valve operated by air pressure and with an engineer's valve controlling the operating air pressure thereon, of supplemental means for reducing such operating pressure whereby the service valve is opened to reduce brake pipe pressure, and means controlled by a predetermined drop in such operating pressure for automatically limiting the same whereby the service valve is closed.

51. In an air brake system, the combination with a service valve operated by air pressure, of a plurality of means for reducing such pressure whereby the service valve is opened to reduce brake pipe pressure, one of such means including a valve which, when operated, effects a predeterminately limited reduction thereby determining the opening and closing of the service valve, and another of which means includes a manually operated valve.

52. In a brake pipe system, the combination with a service valve operated by a controlling air pressure, of an engineer's valve for variably reducing such controlling pressure at will, and means for effecting a predetermined reduction thereof independently of the initial pressure whereby the opening and closing of the service valve is determined.

53. In a train brake system, the combination with a service valve and with an engineer's valve controlling the operating air pressure thereon, of supplemental means for reducing such operating pressure whereby the service valve is opened to reduce brake pipe pressure, and means for automatically limiting the amount of the reduction effected thereby irrespective of the initial operating air pressure whereby the service valve is closed.

54. In an air brake system, the combination with a service valve operated by air pressure, of a plurality of means for releasing such pressure, one of such means including a valve which, when operated, effects a predetermined reduction of pressure independent of the initial pressure, and the other of which means includes a manually operated valve.

55. In a train brake system, the combination with a service valve and with an engineer's valve controlling the operating air pressure thereon, of supplemental means for effecting a limited reduction in such operating pressure, such means comprising two valves in series, one of said valves being normally closed and the other being normally open and adapted to be closed by a predetermined reduction of the operating pressure caused by the opening of the normally closed valve.

56. In a train brake system, the combination with an engineer's valve and a brake pipe, of means for throwing such valve to lap position and permitting escape of air from the brake pipe.

57. In a train brake system, the combination with an engineer's valve and a brake pipe, of a valve for permitting escape of air from the brake pipe, and means for opening the escape valve and moving the engineer's valve to lap position.

58. In a train brake system, the combination with an engineer's valve and a brake pipe, of a valve for permitting escape of air from the brake pipe, means for throwing the engineer's valve to lap position without actuation of the escape valve, and means for throwing the engineer's valve to lap position with actuation of the escape valve.

59. In a train brake system, the combination with an engineer's valve and a brake pipe, of a valve for permitting escape of air from the brake pipe, and means controlled by the position of the engineer's valve for opening the escape valve and moving the engineer's valve to lap position.

60. In a train brake system, the combination with an engineer's valve and a brake pipe, of means for throwing such valve to lap position and for causing a limited reduction of air pressure in the brake pipe.

61. In a train brake system, the combination with an engineer's valve and a brake pipe, of a valve for causing a limited reduction of air pressure in the brake pipe, and means for operating the limiting valve and moving the engineer's valve to lap position.

62. In a train brake system, the combination with an engineer's valve and a brake pipe, of a valve for causing a limited reduction of air pressure in the brake pipe, means for throwing the engineer's valve to lap position without actuation of the limiting valve, and means for throwing the engineer's valve to lap position with actuation of the limiting valve.

63. In a train brake system, the combination of a service valve and with an engineer's valve controlling the operating air pressure thereon, of two valves in series also controlling the operating air pressure, one of the said valves being normally open and the other normally closed, means for simultaneously moving the engineer's valve to lap position and to open the normally closed valve, and means for automatically closing the normally open valve upon a measured drop of operating pressure.

64. In a train brake system, the combination with an engineer's valve and a brake pipe, of a valve causing a limited reduction of air pressure in the brake pipe, and means controlled by the position of the engineer's valve for opening the limiting valve and moving the engineer's valve to lap position.

65. In a train brake system, the combination with a service valve operated by a controlling air pressure, of means for causing an automatically limited reduction of the controlling air pressure, an engineer's valve manually operable for causing a reduction of the controlling air pressure at will, and automatically operated in conjunction with the said means for maintaining the automatic reduction effected thereby.

66. In a train brake system, the combination with a brake pipe and an engineer's valve for controlling the application of the brakes thereby, of a valve causing a limited reduction of air pressure in the brake pipe, and means controlled by the engineer's valve and inoperative when the latter is in a brake applying position for opening the limiting valve and moving the engineer's valve to lap position.

67. In a train brake system, the combination with an engineer's valve and a brake pipe, of means for throwing the valve to lap position and for causing a limited reduction of air pressure in the brake pipe, and a timing element controlling the action of the said means.

68. The combination with an engineer's valve having manual movement to charging, lap, and braking positions, of mechanically operated means for moving such valve to lap position and retaining it there independent of manual movement of the valve to such position.

69. The combination with an engineer's valve having manual movement to charging, lap, and braking positions, of mechanically operating means for moving such valve to lap position and retaining it there independent of position and retaining of the valve to such position manual movement but subject to manual movement of the valve to other positions.

70. An engineer's valve having manual movement to charging, lap, and braking positions, in combination with means operable only for moving such valve from a charging position to lap position.

71. An engineer's valve having manual movement to charging, lap, and braking positions, in combination with means subject to control by the engineer in manual movement of the valve to a charging position and operable only for moving such valve from a charging to a lap position.

72. An engineer's valve having manual movement to charging, lap, and braking positions, in combination with means subject to control by the engineer in manual movement of the valve to a charging position and operable only for moving such valve from a charging to a lap position while leaving it free for manual movement to a braking position.

73. The combination with a brake pipe system including an engineer's valve, of means for moving the valve from a charging position and for then holding it in a lap position, and a timing element controlling the duration of the action of such means.

74. The combination with a train brake system including an engineer's valve having manual movement to charging, lap, and braking positions, of means subordinated in its action to manual control for moving the engineer's valve to lap position and for holding it in that position, and a timing element controlling the duration of the action of such means.

75. The combination with a brake pipe, and with a manually operable engineer's valve and an automatically acting valve controlling the reduction of pressure in the brake pipe, of means tending to open the automatic valve but subordinated in their action to manual movement of the engineer's valve, and controlled in their initiation by, but when initiated being independent of, the position of the engineer's valve.

76. In a train brake system, the combination with an engineer's valve having manual movement to charging, lap, and braking positions, of mechanically operated means operable only for moving such valve from charging to lap positions, and means actuated by such last named movement of the valve to lap position for effecting a brake application.

77. In a train brake system, the combination with an engineer's valve having manual movement to charging, lap, and braking positions, of mechanically operated means operable only for moving such valve from a charging to a lap position, and means controlled by the first named means for effecting a brake application.

78. In a train brake system, the combination with an engineer's valve having manual movement to charging, lap, and braking positions, of means subject to control by the engineer in manual movement of the valve to a charging position and operable only for moving such valve from a charging position to lap position while leaving it free for manual movement to a braking position, and means controlled by the first named means for effecting a brake application.

79. In a train brake system, the combination with an engineer's valve having manual movement to charging, lap, and braking positions, of means governed by the position of the valve and its movement prior thereto and operable only to move the valve to lap position, and means controlled by the first named means for effecting a brake application.

80. In a train brake system, the combination with an engineer's valve having manual movement to charging, lap, and braking positions, of means subject to control by the engineer in manual movement of the valve to a charging position, and governed by the position of its valve and its movement prior thereto, and operable only to move the valve to lap position while leaving it free for manual movement to a braking position, and means controlled by the first named means for effecting a brake application.

81. In a train brake system, the combination with an engineer's valve having manual movement to charging, lap, and braking positions, of an actuating member for moving the valve to lap position, driving means for the actuating member operable only in a charging position of the valve and in lap position thereof when reached from a charging position, and means controlled by the actuating member when in a position to place the valve in lap position for effecting a brake application.

82. In a train brake system, the combination with an engineer's valve having manual movement to charging, lap, and braking positions, of an actuating member for moving the valve to lap position subject to control by the engineer in manual movement of the valve to a charging position, driving means for the actuating member operable only in a charging position of the valve and in lap position thereof when reached from a charging position, and means controlled by the actuating member when in a position to place the valve in lap position for effecting a brake application.

83. In a train brake system, the combination with an engineer's valve having manual movement to braking, lap, and charging positions, of a supplemental valve for effecting a predetermined reduction of pressure in the brake pipe, driving means which when actuated work the supplemental valve and place the engineer's valve in lap position if in a charging position, means controlled by the engineer's valve for limiting the actuation of the said driving means to a charging position of the engineer's valve, and means for maintaining the actuated condition of the driving means, subordinated to manual movement and retention of the engineer's valve to and in a running position.

84. In a train brake system, the combination with a brake pipe and with a manually operable engineer's valve having braking, lap, and charging positions, of a supplemental valve for effecting a predetermined reduction of pressure in the brake pipe, a driver for the engineer's valve which when actuated works the supplemental valve, and means, actuating the driver, including contacts in shunt to each other, one of such contact shunts being closed when the engineer's valve is in charging position and the other of the contact shunts being closed by the resultant actuation of the driving means.

85. In a train brake system, the combination with a train pipe and an engineer's valve manually operable to charging, lap, and braking positions, of a supplemental valve for reducing pressure in the brake pipe, means for opening the supplemental valve and tending to move the engineer's valve to lap position but subordinated to the manual movement of that valve against such tendency, and a controlling circuit for the said means including contacts in shunt to each other, one of such contact shunts being closed when the engineer's valve is in charging position and the other of which contact shunts is made on the closure of the circuit through the first named shunt.

86. In a train brake system, the combination with an engineer's valve having manual movement to braking, lap, and charging positions, of a supplemental valve for effecting a predetermined reduction of pressure in the brake pipe, driving means which when actuated work the supplemental valve and place the engineer's valve in lap position if in a charging position, such means being subordinated to manual movement of the engineer's valve to a running position and including two controlling contacts in shunt to each other, one of said contacts being closed when the engineer's valve is in a charging position, and the other of such contacts being closed by the movement of a driving means resulting from the closure of the first named contact.

87. In a train braking system, the combination with a brake pipe, an equalizing reservoir and an exhaust valve for the brake pipe actuated by a drop of pressure in the equalizing reservoir, of means actuated by a drop of pressure in the brake pipe below the pressure in the equalizing reservoir to exhaust the equalizing reservoir.

88. In an air brake system, the combination with a brake pipe, an auxiliary reservoir, an engineer's valve, and with an exhaust valve for the brake pipe actuated by a drop of air pressure in the equalizing reservoir below that in the brake pipe, of means independent of the engineer's valve for exhausting the equalizing reservoir pressure when the brake pipe pressure falls below the equalizing reservoir pressure by a predetermined amount.

89. The combination with a train brake system, of means for effecting a primary reduction of air pressure to make a service brake application of a predetermined degree, means for effecting a secondary and increased brake application, and a controller for automatically actuating the said means in succession.

90. The combination with a train brake system, of means for effecting a measured primary reduction of air pressure to make a service brake application, means for effecting a secondary and increased brake application, and a timing element for automatically actuating the said means in succession and with a predetermined time interval between their action.

91. The combination with a track and a vehicle moving thereon, of means upon the vehicle for effecting, when actuated, a brake application, an operating coil for the said means, a circuit on the vehicle containing a source of constant potential and a maintaining coil, the maintaining coil controlling a normally closed shunt around it and controlling the circuit of the operating coil, and means including apparatus located along the track for momentarily opening the normally closed shunt circuit.

92. The combination with a track and a vehicle moving thereon, of means upon the vehicle for effecting, when actuated, a brake application, an operating coil for the said means, a circuit on the vehicle containing a source of constant potential and a maintaining coil, the maintaining coil controlling a normally closed shunt around it and controlling the circuit of the operating coil, a timing controller controlled in its movement from the momentary opening of the normally closed shunt circuit to open and then reclose said circuit.

93. Car apparatus for train control systems comprising a brake setting appliance, apparatus including speed-responsive means and controlling said appliance, control means operable manually by the operator for governing the movement of the car, and means for preventing the operation of said appliance when the control means is in position to retard the car.

94. Train control apparatus for railway vehicles comprising a brake controlling electro-magnet, a circuit for normally maintaining said magnet energized, speed responsive means for causing interruption of said circuit, and means for preventing deenergization of said electro-magnet while the brakes of the train are applied.

95. In a train control system, the combination of means for effecting a brake application, a circuit for controlling the brake applying means having two shunts, means responsive to the speed of the train for controlling one of the shunts, and means responsive to the braking of the train for closing the other shunt.

96. The combination with a track and vehicle moving thereon, of means for establishing magnetic fields at successive intervals along a track, a coil for effecting a brake application, means upon the vehicle adapted to be influenced by the magnetic fields along the track, and means controlled by one magnetic field to place said coil under the control of a succeeding magnetic field.

97. In a control system for effecting automatic braking on a vehicle, the combination of a controller responsive to external magnetic influences, means responsive to the speed of a vehicle, means for effecting a brake application, and means actuated by an external magnetic influence to render the brake applying means responsive to a subsequent magnetic influence and to the speed responsive means conjointly.

98. In a system of a train control, the combination with vehicle-carried braking mechanism, of a succession of track magnets controllable by traffic conditions and each influenced thereby to set up a local magnetic field, brake-controlling means influenced by the field of the track magnet for initiating the operation of the braking mechanism, means responsive to the movement of the vehicle for retarding the speed thereof subsequent to the initial brake application, and additional brake-controlling means also influenced by the field of one track magnet for effecting a brake application subsequent to the initial brake application by the first mentioned brake-controlling means.

99. In a system of train control, the combination with braking mechanism, of track magnets controllable by traffic conditions and each responsive to such conditions for setting up a local magnetic field, brake-controlling means influenced by the fields of said magnets for effecting successive brake applications, and means responsive to the movement of the vehicle for retarding the speed thereof at periods following the brake applications.

100. The combination with track and a vehicle moving thereon, of means for establishing magnetic fields at successive intervals along a track, a coil for effecting a brake application, means upon the vehicle adapted to be influenced by the magnetic fields along the track, and means controlled by one magnetic field to place said coil under the control of a succeeding magnetic field to effect an application of the brakes.

101. In combination, a railway vehicle provided with a braking system, automatic apparatus for causing an automatic application of the brakes when said vehicle exceeds certain prescribed limit speeds during its progress along the track, and means for preventing operation of said automatic apparatus said means being effective only when the brakes have been applied manually by the operator of the vehicle.

102. In combination, a railway vehicle provided with a braking system, automatic apparatus for causing an automatic application of the brakes when said vehicle exceeds certain prescribed limit speeds during its progress along the track, governing means under the control of the operator for governing the speed of the vehicle, and means dependent upon the operation of said governing means to a degree sufficient to cause retardation of the vehicle for preventing operation of said automatic apparatus.

103. In combination, a railway vehicle provided with a braking system including a manually operable control device for causing a brake application, automatic apparatus for causing automatic application of the brakes when said vehicle exceeds certain prescribed limit speeds during its progress along the track, and means responsive only to an actual application of the brakes by operation of said control device for preventing operation of said automatic apparatus.

104. In combination, a railway vehicle provided with a braking system including a manually operable control device for causing a brake application, automatic apparatus for causing automatic application of the brakes when said vehicle exceeds certain prescribed limit speeds during its progress along the track, and means dependent upon a brake application of predetermined value by the action of said manually operable control device for preventing operation of said automatic apparatus.

105. In combination, a railway vehicle provided with a braking system, automatic apparatus for causing an automatic application of the brakes upon a prescribed change in traffic conditions if the speed of the vehicle exceeds a prescribed value, and manually operable means for preventing such automatic application of the brakes, said means being effective only when the brakes have been applied manually by the operator of the vehicle.

106. In combination, a railway vehicle provided with a braking system including a manually operable brake control device, automatic means for causing an application of the brakes, and means for preventing operation of said automatic means when said brake control device is in brake-applying position and for continuing to prevent operation of said automatic means after said device is subsequently restored away from brake-applying position if and while a brake application of predetermined value is in effect due to operation of said device.

107. In combination, a railway vehicle provided with a braking system including a manually operable device for causing application of the brakes, automatic apparatus for also causing application of the brakes under certain traffic conditions, and means for preventing operation of said automatic apparatus while said device is in position to initiate a brake application and also after said device has been restored away from initiating position if and while a brake application of at least predetermined value is in effect due to said device having been in initiating position.

108. Railway traffic controlling apparatus comprising a plurality of block sections, a vehicle; apparatus on the vehicle adapted when in one condition to cause an automatic application of the brakes if the speed exceeds a predetermined intermediate value, and when in another condition to cause an automatic application of the brakes if the speed exceeds a predetermined lower value: means located adjacent the entrance end of each section for placing said apparatus in the first-mentioned condition when the section next in advance is occupied. means located in the rear of the entrance end of each section for placing said apparatus in the second mentioned condition when such section is occupied, and means on the vehicle acting to prevent operation of said apparatus if the brakes are applied through the usual manually operable means.

109. Railway traffic controlling apparatus comprising a plurality of block sections, a vehicle; apparatus on the vehicle adapted when in one condition to cause an automatic application of the brakes if the speed exceeds a predetermined intermediate value, and when in another condition to cause an automatic application of the brakes if the speed exceeds a predetermined lower value; means for placing said apparatus in the first-mentioned condition when the vehicle enters the section in the rear of an occupied section, means for placing said apparatus in the second mentioned condition when the vehicle reaches a point at a predetermined distance in the rear of an occupied section, and means on the vehicle acting to prevent operation of said apparatus if the brakes are applied through the usual manually operable means.

110. In combination, a railway vehicle provided with a braking system, a valve device for causing an automatic application of the brakes and arranged to remain in brake applying position after once being placed there until the vehicle has been brought to a full stop, apparatus for placing said valve device in brake-applying position when the vehicle exceeds certain prescribed limit speeds during its progress along the track, and means acting when the brakes have been applied manually by the operator of the vehicle for preventing actuation of said valve device to brake applying position.

111. In combination, a railway vehicle provided with a braking system including a manually operable brake valve, automatic means for stopping the vehicle if certain prescribed limit speeds are exceeded by said vehicle in its progress along the track, and means controlled by said manually operable valve and effective only if the valve is held in brake applying position long enough to actually apply the brakes, for preventing said action of said automatic means.

112. In an automatic train controlling mechanism for vehicles, the combination with a vehicle having an air-brake system including a train-line, a vent device to reduce the pressure in said train-line to effect an application of the brakes, an air-storage reservoir charged from train-line pressure, and a vent-control device having a casing with a chamber and a piston therein and with a valved-outlet at one side of the piston which valved outlet is controlled by the piston, a connection from one side of the piston to the said storage reservoir, a connection between the said valved-outlet and the other side of the piston with the train-line and a third connection from the escape side of the valved-outlet to the said vent device.

113. In an automatic train-controlling device for vehicles the combination with a vehicle having an air-brake system including a train-line and a vent means to reduce the pressure in the train-line to effect an automatic application of the brakes; an air-storage reservoir charged with pressure from the train-line; a vent control device independent of the vent means and having a valve that is interposed between the train-line and the said vent means, and a piston device to move said valve said piston device having one side exposed to the train-line pressure during the venting operation and the other side thereof subject to a greater pressure in the said storage reservoir during the venting operation.

114. In an automatic train control system, brake controlling apparatus for railway vehicles adapted to be governed by magnetic impulses transmitted from the right of way at each caution signal for causing an automatic application of the brakes, and means for preventing such brake application in spite of the transmission of an impulse if the brakes are applied at the time.

115. In an automatic train control system, trackway and car carried elements cooperating magnetically to produce a control impulse, automatic means on the car responsive to said impulse for causing a brake application, and means for preventing such brake application while the brakes of the car are acting.

116. In an automatic train control system brake control apparatus adapted to be governed from the trackway, comprising means operable to exert a tendency for a predetermined time to produce an automatic brake application, manually operable means to prevent an automatic brake application, and automatic means to prevent an automatic brake application, said automatic means being effective only if the brakes are acting at the time.

117. In an automatic train control system, vehicle carried brake control apparatus including impulse receiving means and a train pipe, and traffic controlled impulse transmitting means on the track, cooperation of said impulse transmitting means and impulse receiving means resulting in the venting of the train pipe, and means responsive to the pressure in said train pipe for preventing such automatic venting, notwithstanding the cooperation of the impulse transmitting and impulse receiving means.

118. Car apparatus for train control systems comprising means establishing a continuing predetermined maximum speed limit and acting to apply the brakes automatically if the car exceeds that speed limit, and means associated with the brake equipment of the vehicle for preventing such automatic brake application if the brakes are already acting.

119. A train control system comprising a stick relay on a vehicle, means partly on the vehicle and partly on the track for dropping and picking up said relay, a brake setting appliance, means having its operation dependent on the speed of the vehicle and rendered effective to control said appliance when the relay is changed from its normal condition, and means for independently governing the brake setting appliance, to prevent an automatic brake application if the brakes of the vehicle are acting.

120. A train control system, comprising brake control means, automatic means for actuating said brake control means when a predetermined speed is exceeded, and pressure responsive means to prevent the actuation of said brake control means by said automatic means at said speed when the brakes are applied.

121. A train control system, comprising brake control means, automatic means for actuating said brake control means when a predetermined speed is exceeded, and pressure responsive means to prevent the actuation of said brake control means by said automatic means at said speed when the brakes are manually applied.

122. In an automatic train control system, the combination with a vehicle, of automatic train control apparatus therefor comprising a normally energized slow acting device having a tendency to assume its active condition and adapted when set into operation to cause an automatic application of the brakes after an interval of delay, a warning signal arranged to attract the attention of the operator of the vehicle and operated as said slow acting device is set into operation, and means adapted to be controlled manually by the operator of the vehicle for preventing such automatic application of the brakes by the action of said slow acting device.

123. In an automatic train control system, the combination with train control apparatus on a vehicle comprising a warning signal adapted to attract the attention of the operator, time-controlled means for automatically applying the brakes at the expiration of a predetermined time following the initiation of its operation, and means for actuating the warning signal and initiating the operation of said time-controlled means, of means operable manually by the operator for rendering said time-controlled means inactive and thereby preventing an automatic brake application.

124. In an automatic train control system for railway vehicles, the combination of trackway elements and vehicle carried speed control apparatus cooperating with said trackway elements and adapted when set into operation to enforce decreasing limitations upon the speed of said vehicle, said apparatus including a brake setting appliance, of means whereby the operator of the vehicle may prevent such automatic brake application by shutting off the power and manually applying the brakes.

125. Automatic train control apparatus for railway vehicles comprising an electrically operable time-controlled device adapted when set into operation to cause an automatic brake application after the lapse of a predetermined time, a warning signal arranged to attract the attention of the operator, and means having its operation dependent on the speed of the vehicle for actuating the warning signal and setting said time-controlled device into operation.

126. Automatic air-brake applying mechanism for train control systems comprising, automatic means for venting the brake pipe, and means responsive to the movement of the engineer's brake valve for limiting the reduction in brake pipe pressure produced by said automatic means by a predetermined amount irrespective of any reduction made manually by the engineer prior to the operation of said automatic venting means.

127. Brake applying mechanism for train control systems acting upon the usual air-brake system and comprising, a reservoir normally connected to the brake pipe and charged at the normal running brake pipe pressure, means for disconnecting said reservoir from the brake pipe upon movement of the engineer's valve to a brake applying position, and automatic means for venting the brake pipe down by a predetermined amount.

128. Apparatus for acting upon the air-brakes to produce an automatic brake application for train control systems comprising, a reservoir in which is maintained normal brake pipe pressure irrespective of any reduction of brake pipe pressure made by manual operation of the engineer's brake valve, and automatic means for venting the brake pipe down by a predetermined amount.

129. Automatic means for venting the brake pipe of the usual air-brake system to a predetermined pressure to produce an automatic brake application comprising, an equalizing reservoir, a connection between the brake pipe and said reservoir, and means dependent upon the position of the engineer's brake valve for opening and closing said connection.

130. In an automatic brake applying mechanism for air-brake systems, the combination with brake pipe venting means including a reservoir and adapted to produce a limited reduction in brake pipe pressure, of means normally connecting said reservoir to the brake pipe and operable upon movement of the engineer's brake valve to a brake applying position to disconnect said reservoir from the brake pipe.

131. In an automatic train control system, the combination with a vehicle, of automatic train control apparatus therefor adapted to cause an automatic application of the brakes whenever the vehicle exceeds certain prescribed limiting speeds during its progress along the track, a warning signal adapted to attract the attention of the operator of the vehicle and given prior to the automatic application of the brakes, control device for the vehicle adapted to be actuated manually by the operator, and means dependent upon said control devices being in position to retard the movement of the vehicle for preventing the automatic application of the brakes by the action of said apparatus.

132. In an automatic train control system for railroads, having tracks divided into blocks each provided with a normally closed track circuit, train control apparatus on a vehicle normally tending to assume its active condition and including a brake setting appliance operated when the speed of the vehicle is excessive, traffic controlled impulse transmitting means partly on the vehicle and partly along the track for rendering said train control apparatus active in a block when the next block in advance is occupied, and means effective while the brakes of the vehicle are acting for maintaining said brake setting appliance in its normal condition independently of the control thereof by said apparatus.

133. In a system of train control, the combination with braking mechanism of track magnets controllable by traffic conditions and each responsive to such conditions for setting up a local magnetic field, braking controlling means influenced by the field of said magnets for effecting one or more brake applications, and means responsive to the movement of the vehicle and cooperating with the braking mechanism for retarding the speed of the vehicle subsequently to an initial brake application.

134. The combination with a track and a vehicle moving thereon, of impulse creating means located at successive points along the track, means upon the vehicle for effecting a brake application, receiving means upon the vehicle for the impulses created by the track means, means shifted by the reception of an impulse to place the brake applying means under the control of a succeeding impulse only if the shiftable means are in a shifted position, and means actuated from the track for restoring the shifted means to normal position.

135. In a control system for effecting automatic braking on a vehicle, the combination of means for receiving external impulses, means responsive to the speed of the vehicle, means for effecting a brake application, and means actuated by the reception of an external impulse to render the brake applying means responsive to the joint action of a subsequent external impulse and to the speed responsive means.

136. In a train braking system, the combination with brakes and means for effecting an application thereof, of means for rendering the brake applying means operative if the train exceeds a given speed unless it is being concurrently braked.

137. In an automatic train control system, a railway track divided into signal blocks and a vehicle moving thereon, an impulse receiver on the vehicle, a normally inactive track element located along the track, a cut-section controlling the track element, to place it in an active condition upon approach of the vehicle if danger exists ahead, effectiveness of the influence of the track element upon the receiver being dependent upon the speed of the vehicle.

138. In an automatic train control system, a railway track divided into signal blocks and a vehicle moving thereon, an impulse receiver on the vehicle, a magnet on the track to create flux, if danger condition exists ahead, said flux gradually building up upon approach of the vehicle and influencing the receiver only if the speed of the vehicle exceeds a predetermined value.

139. The combination with a track and a vehicle moving thereon, of impulse means at successive points along the track for initiating braking, means upon the vehicle for effecting a brake application, receiving means upon the vehicle adapted to be influenced by said track impulse means, means operated by the magnetic influence of a track impulse means to place the brake applying means under the control of a succeeding track impulse means only if said operated means are in a shifted position, and means for restoring the operating means to normal position.

140. The combination with a track and a vehicle moving thereon, of impulse means at intervals along the track, a coil for effecting a brake application, receiving means upon the vehicle adapted to be influenced by the track impulse means, and means operated by the magnetic influence of one track impulse means to place the coil under the control of a succeeding magnetic influence only if said operated means are in a shifted position, and track operated means for restoring the parts to normal position.

141. In a train braking system, the combination of means for effecting an initial automatic braking, means for effecting a subsequent automatic braking, a controller for actuating said initial braking application means, and means operative upon the movement of said controller for placing the subsequent braking application means under the control of said controller.

142. The combination with a track and a vehicle moving thereon, of a succession of magnetic impulse means located along the track, means on the vehicle influenced by one of said magnetic impulse means to effect an initial braking of the vehicle, and means controlled by a following magnetic impulse means only while the first named means occupy a shifted position for effecting a subsequent braking of the vehicle.

143. In a train braking system, the combination with successive track impulse devices, of a controller on the train to be influenced by the said track impulse devices, means for effecting an initial braking when the controller is influenced by a track impulse device, means for effecting a subsequent brake application, and means actuated upon the operation of the initial braking operating means for putting the subsequent braking application means under the control of said controller to be actuated thereby by the influence of a succeeding track impulse device.

144. In a train braking system the combination with a coil controlling a primary braking thereof, a coil controlling an increased braking thereof, a common circuit breaker for the circuits of the said coils, and means for preventing the operation of the second coil upon the operation of the common circuit breaker when the speed of the train is below a selected limit.

145. In a train braking system the combination with a coil controlling a primary braking thereof, a coil controlling an increased braking thereof, track operated means for breaking the circuits of the said coils, and means for maintaining the circuit of the second coil when the speed of the train is less than a selected amount.

146. In a train braking system the combination with a coil controlling a primary braking thereof, a coil controlling an increased braking thereof, a common circuit breaker for the circuits of the said coils, and means influencing the action of the common circuit breaker for preventing the operation of the second coil when the speed of the train is below a selected limit.

147. In a train braking system the combination with a coil controlling a primary braking thereof, a coil controlling an increased braking thereof, track operated means for breaking the circuits of the said coils, and means for maintaining the circuit of the second coil inoperative to effect braking when the speed of the train is less than a selected amount.

148. In a train control system, the combination with the pneumatic brake mechanism of a train, of automatic mechanism for effecting either a service or emergency application of the brakes, a stationary electric system for selectively controlling the service and emergency applications of the brakes including means for electrically communicating with the train, cooperating means upon the train for effecting the service application when the speed is above a predetermined limit and for effecting the emergency application.

149. In a train control system, the combination with the brake mechanism of a train, of automatic mechanism for effecting either a service or emergency application of the brakes, a stationary electric control system for selecting the service and emergency applications including means for electrically communicating with the train, and means upon the train cooperating with said stationary control system to transmit control to said automatic mechanism, said means being controlled by the speed of the train in effecting service application of the brakes.

150. In a train control system, the combination with the brake mechanism of a train, of automatic mechanism for producing a service application of the brakes, automatic mechanism for producing an emergency application of the brakes, means communicating with the train for transmitting thereto either an emergency or service control, means upon the train for receiving the control transmitted by the last-mentioned means and correspondingly influencing the automatic brake mechanism, and means for rendering the transmission of either an emergency or service control to the train effective to produce operation solely of the automatic service brake mechanism.

151. In a train control system, the combination with the brake mechanism of a train, of automatic mechanism for applying the brakes, electro-magnetic control means for said mechanism, an inductance for energizing said control means, an inductor in the path of the train for energizing said inductance, means for energizing said inductor, and coacting members respectively carried by the train and located in proximity to said inductor for limiting the period of energizing said inductor substantially to the duration of a coacting relation between said inductor and inductance.

152. In a train control system, the combination with the brake mechanism of a train, of automatic mechanism for applying the brakes, electro-magnetic control means for said mechanism, a circuit in the path of the train for energizing said control means, and coacting members respectively carried by the train and associated with said circuit for limiting the period of energization of said circuit substantially to the duration of communication between said circuit and the train.

153. In an automatic train control system train-carried brake apparatus comprising an engineer's brake valve and a rotary valve thereof, a valve spindle engaging said rotary valve, a member adapted to rotate in a plane parallel to that of the rotary valve and carried by the spindle to move always therewith, a normally inactive driving member rotatable about the axis of the spindle in a horizontal plane parallel to that of the first said member, a normally non-contacting driving connection between the two members effective only on one side, and pneumatically actuated means to rotate the driving member into engagement with the first said member and thereby to move the rotary valve for effecting an automatic application of the brakes.

154. In an automatic train control system in combination train-carried brake apparatus and trackway means, said brake apparatus comprising an engineer's brake valve and a rotary valve thereof, a valve spindle engaging said rotary valve, a movable member adapted to rotate in a plane parallel to that of the rotary valve and carried by the spindle to move always therewith, a normally inactive driving member rotatable about the axis of the spindle in a horizontal plane parallel to that of the first said member, an interlocking normally non-contacting driving connection between the two members effective only on one side, and means operated by pneumatic pressure upon receipt of an impulse from the trackway means to rotate the driving member into engagement with the first said member and thereby to move the rotary valve for effecting an automatic application of the brakes.

155. In an automatic train control system apparatus comprising a normally pressure charged equalizing reservoir and an engineer's brake valve and a rotary valve thereof, a valve spindle engaging said rotary valve, a member adapted to rotate in a plane parallel to that of the rotary valve and carried by the spindle to move therewith, a normally inactive driving member rotatable about the axis of the spindle in a horizontal plane parallel to that of the first said member, an interlocking normally non-contacting driving connection between the two members effective only on one side, and means operated by pneumatic pressure to rotate the driving member into engagement with the first said member and thereby to move the rotary valve for effecting a limited reduction of the equalizing reservoir pressure.

In testimony whereof I have hereunto signed my name.

FRANK J. SPRAGUE.